US012646522B2

(12) United States Patent
Goldstein

(10) Patent No.: US 12,646,522 B2
(45) Date of Patent: *Jun. 2, 2026

(54) PERSONAL AUDIO ASSISTANT DEVICE AND METHOD

(71) Applicant: ST R&DTech LLC, Delray Beach, FL (US)

(72) Inventor: Steven Wayne Goldstein, Delray Beach, FL (US)

(73) Assignee: ST R&DTech LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,648

(22) Filed: Oct. 28, 2020

(65) Prior Publication Data

US 2021/0043219 A1    Feb. 11, 2021

Related U.S. Application Data

(63) Continuation of application No. 14/148,743, filed on Jan. 7, 2014, now Pat. No. 10,885,927, which is a
(Continued)

(51) Int. Cl.
*G10L 21/00*      (2013.01)
*G06F 3/16*       (2006.01)
(Continued)

(52) U.S. Cl.
CPC .............. *G10L 21/00* (2013.01); *G06F 3/165* (2013.01); *G06F 3/167* (2013.01); *G06F 16/60* (2019.01);
(Continued)

(58) Field of Classification Search
CPC .... H04R 25/505; H04R 1/1016; H04R 25/70; H04R 2205/041; H04R 2410/01;
(Continued)

(56) References Cited

U.S. PATENT DOCUMENTS 2,803,308 A    8/1957   Alfred
3,028,454 A    4/1962   Henry
(Continued)

FOREIGN PATENT DOCUMENTS

AU    2006200446      2/2006
AU    2005337518 A1 *  4/2008   ............. H04R 25/70
(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.
(Continued)

*Primary Examiner* — Steven P Sax
(74) *Attorney, Agent, or Firm* — Akerman LLP; Peter A. Chiabotti

(57)    ABSTRACT

A personal audio assistant includes a first microphone for capturing audio, a logic circuit coupled to the first microphone, a communication module coupled to the logic circuit, a memory storage unit communicatively coupled to the logic circuit, and a user interaction element. The interaction element is configured to perform at least one among accessing selection of audio content via an audio input received at the first microphone or determining a user preference of audio content by tracking genre of content selected, artist of content selected, and at least one among the day of the week or time of day. Other embodiments are disclosed.

9 Claims, 5 Drawing Sheets

Related U.S. Application Data continuation of application No. 11/774,965, filed on Jul. 9, 2007, now abandoned.

(60) Provisional application No. 60/806,769, filed on Jul. 8, 2006.

(51) Int. Cl.

| | |
|---|---|
| *G06F 16/60* | (2019.01) |
| *G10L 13/00* | (2006.01) |
| *G10L 15/26* | (2006.01) |
| *G10L 21/06* | (2013.01) |
| *G10L 25/48* | (2013.01) |
| *H04M 1/05* | (2006.01) |
| *H04M 1/247* | (2021.01) |
| *H04R 1/10* | (2006.01) |
| *H04R 3/00* | (2006.01) |
| *H04W 4/80* | (2018.01) |
| *H04M 1/60* | (2006.01) |
| *H04M 1/72442* | (2021.01) |

(52) U.S. Cl.
CPC ............. *G10L 13/00* (2013.01); *G10L 15/26* (2013.01); *G10L 21/06* (2013.01); *G10L 25/48* (2013.01); *H04M 1/05* (2013.01); *H04M 1/2471* (2013.01); *H04R 1/1016* (2013.01); *H04R 3/00* (2013.01); *H04W 4/80* (2018.02); *H04M 1/6066* (2013.01); *H04M 1/72442* (2021.01)

(58) Field of Classification Search
CPC . H04R 2420/07; H04R 2460/03; G06F 16/68; G06F 16/60; G06F 3/165; G06F 3/167; G09B 21/0009; G09B 5/04; A61B 5/121; G10L 21/00; G10L 13/00; G10L 15/26; G10L 25/48; H04W 4/80; H04M 1/72442; H04M 1/6066
See application file for complete search history.

(56) References Cited

U.S. PATENT DOCUMENTS

| | | | |
|---|---|---|---|
| 3,729,598 A | 4/1973 | Tegt et al. | |
| 3,865,998 A | 2/1975 | Weiss et al. | |
| 3,876,843 A | 4/1975 | Moen | |
| 4,041,256 A | 8/1977 | Ohta et al. | |
| 4,054,749 A | 10/1977 | Suzuki et al. | |
| 4,088,849 A | 5/1978 | Usami et al. | |
| 4,455,677 A | 6/1984 | Fox | |
| 4,533,795 A | 8/1985 | Baumhauer et al. | |
| 4,539,439 A | 9/1985 | Strothmann et al. | |
| 4,555,677 A | 11/1985 | Beesley | |
| 4,596,902 A | 6/1986 | Gilman | |
| 4,827,458 A | 5/1989 | D'Alayer de Costemore D'Arc | |
| 4,891,841 A | 1/1990 | Bohn | |
| 4,941,187 A | 7/1990 | Slater | |
| 4,947,432 A | 8/1990 | Topholm | |
| 4,947,440 A | 8/1990 | Bateman et al. | |
| 5,002,151 A | 3/1991 | Oliveira et al. | |
| 5,027,410 A | 6/1991 | Williamson et al. | |
| 5,033,090 A | 7/1991 | Weinrich | |
| 5,182,774 A | 1/1993 | Bourk | |
| 5,202,927 A | 4/1993 | Topholm | |
| 5,204,906 A | 4/1993 | Nohara et al. | |
| 5,208,867 A | 5/1993 | Stites, III | |
| 5,220,595 A | 6/1993 | Uehara | |
| 5,251,263 A | 10/1993 | Andrea et al. | |
| 5,259,033 A | 11/1993 | Goodings et al. | |
| 5,267,321 A | 11/1993 | Langberg | |
| 5,276,740 A | 1/1994 | Inanaga et al. | |
| 5,298,692 A | 3/1994 | Ikeda et al. | |
| 5,317,273 A | 5/1994 | Hanson et al. | |

| | | | |
|---|---|---|---|
| 5,327,506 A | 7/1994 | Stites, III | |
| 5,345,430 A | 9/1994 | Moe | |
| 5,390,254 A | 2/1995 | Adelman | |
| 5,430,826 A | 7/1995 | Webster et al. | |
| 5,473,684 A | 12/1995 | Bartlett et al. | |
| 5,479,522 A | 12/1995 | Lindemann et al. | |
| 5,524,056 A | 6/1996 | Killion et al. | |
| 5,526,819 A * | 6/1996 | Lonsbury-Martin .. A61B 5/121 600/559 |
| 5,528,739 A | 6/1996 | Lucas et al. | |
| 5,539,831 A | 7/1996 | Harley | |
| 5,550,923 A | 8/1996 | Hotvet | |
| 5,557,659 A | 9/1996 | Hyde-Thomson | |
| 5,577,511 A | 11/1996 | Killion | |
| 5,606,621 A | 2/1997 | Reiter et al. | |
| 5,619,554 A | 4/1997 | Hogan et al. | |
| 5,632,002 A | 5/1997 | Hashimoto et al. | |
| 5,636,351 A | 6/1997 | Lee | |
| 5,647,011 A | 7/1997 | Garvis | |
| 5,649,055 A | 7/1997 | Gupta et al. | |
| 5,692,059 A | 11/1997 | Kruger | |
| 5,694,475 A | 12/1997 | Boyden | |
| 5,714,997 A | 2/1998 | Anderson | |
| 5,740,262 A | 4/1998 | Yoshida et al. | |
| 5,742,689 A | 4/1998 | Tucker et al. | |
| 5,748,754 A | 5/1998 | Maag et al. | |
| 5,751,820 A | 5/1998 | Taenzer | |
| 5,757,933 A | 5/1998 | Preves et al. | |
| 5,764,778 A | 6/1998 | Zurek | |
| 5,787,187 A | 7/1998 | Bouchard et al. | |
| 5,799,273 A | 8/1998 | Mitchell et al. | |
| 5,826,064 A | 10/1998 | Loring et al. | |
| 5,862,065 A | 1/1999 | Muthusamy | |
| 5,887,070 A | 3/1999 | Iseberg et al. | |
| 5,903,868 A | 5/1999 | Yuen et al. | |
| 5,909,667 A | 6/1999 | Leontiades et al. | |
| 5,920,835 A | 7/1999 | Huzenlaub et al. | |
| 5,923,624 A | 7/1999 | Groeger et al. | |
| 5,930,751 A | 7/1999 | Cohrs et al. | |
| 5,933,506 A | 8/1999 | Aoki et al. | |
| 5,933,510 A | 8/1999 | Bryant et al. | |
| 5,937,070 A | 8/1999 | Todter et al. | |
| 5,946,050 A | 8/1999 | Wolff | |
| 5,953,392 A | 9/1999 | Rhie et al. | |
| 5,956,681 A | 9/1999 | Yamakita | |
| 5,978,689 A | 11/1999 | Tuoriniemi et al. | |
| 6,005,525 A | 12/1999 | Kivela | |
| 6,021,205 A | 2/2000 | Yamada et al. | |
| 6,021,207 A | 2/2000 | Puthuff et al. | |
| 6,021,325 A | 2/2000 | Hall | |
| 6,028,514 A | 2/2000 | Lemelson et al. | |
| 6,048,320 A | 4/2000 | Brainard, II | |
| 6,056,698 A | 5/2000 | Iseberg et al. | |
| 6,069,963 A | 5/2000 | Martin et al. | |
| 6,072,645 A | 6/2000 | Sprague | |
| 6,072,884 A | 6/2000 | Kates | |
| 6,094,492 A | 7/2000 | Boesen | |
| 6,094,494 A | 7/2000 | Haroldson | |
| 6,101,256 A | 8/2000 | Steelman | |
| 6,118,877 A | 9/2000 | Lindemann et al. | |
| 6,118,878 A | 9/2000 | Jones | |
| 6,141,426 A | 10/2000 | Stobba et al. | |
| 6,151,571 A | 11/2000 | Pertrushin | |
| 6,157,705 A | 12/2000 | Perrone | |
| 6,160,758 A | 12/2000 | Spiesberger | |
| 6,163,338 A | 12/2000 | Johnson et al. | |
| 6,163,508 A | 12/2000 | Kim et al. | |
| 6,167,251 A | 12/2000 | Segal et al. | |
| 6,167,275 A | 12/2000 | Segal et al. | |
| 6,173,259 B1 | 1/2001 | Bijl et al. | |
| 6,175,633 B1 | 1/2001 | Morrill et al. | |
| 6,181,800 B1 | 1/2001 | Lambrecht | |
| 6,198,971 B1 | 3/2001 | Leysieffer | |
| 6,226,389 B1 | 5/2001 | Lemelson et al. | |
| 6,263,147 B1 | 7/2001 | Tognazzini | |
| 6,269,161 B1 | 7/2001 | McLaughlin et al. | |
| 6,298,323 B1 | 10/2001 | Kaemmerer | |
| 6,308,158 B1 | 10/2001 | Kuhnen et al. | |
| 6,311,092 B1 | 10/2001 | Yamada | |

(56)                References Cited

U.S. PATENT DOCUMENTS

| | | | |
|---|---|---|---|
| 6,338,038 B1 | 1/2002 | Hanson | |
| 6,359,993 B2 | 3/2002 | Brimhall | |
| 6,373,942 B1* | 4/2002 | Braund | H04R 1/1058 |
| | | | 379/430 |
| 6,379,314 B1 | 4/2002 | Horn | |
| 6,400,652 B1 | 6/2002 | Goldberg et al. | |
| 6,405,165 B1 | 6/2002 | Blum et al. | |
| 6,408,272 B1 | 6/2002 | White et al. | |
| 6,415,034 B1 | 7/2002 | Hietanen | |
| 6,421,725 B1 | 7/2002 | Vermilyea et al. | |
| 6,424,721 B1 | 7/2002 | Hohn | |
| 6,445,799 B1 | 9/2002 | Taenzer et al. | |
| 6,456,975 B1 | 9/2002 | Chang | |
| 6,463,413 B1 | 10/2002 | Applebaum et al. | |
| 6,475,163 B1 | 11/2002 | Smits et al. | |
| 6,480,961 B2 | 11/2002 | Rajasekharan et al. | |
| 6,483,899 B2 | 11/2002 | Agraharam et al. | |
| 6,490,557 B1 | 12/2002 | Jeppesen | |
| 6,507,643 B1 | 1/2003 | Groner | |
| 6,513,621 B1 | 2/2003 | Deslauriers et al. | |
| 6,526,148 B1 | 2/2003 | Jourjine et al. | |
| 6,526,381 B1 | 2/2003 | Wilson | |
| 6,532,446 B1 | 3/2003 | King | |
| 6,554,761 B1 | 4/2003 | Puria et al. | |
| 6,567,524 B1 | 5/2003 | Svean et al. | |
| 6,574,600 B1 | 6/2003 | Fishman et al. | |
| 6,587,822 B2 | 7/2003 | Brown et al. | |
| 6,587,871 B1 | 7/2003 | Schrader | |
| 6,590,303 B1 | 7/2003 | Austin et al. | |
| 6,593,848 B1 | 7/2003 | Atkins, III | |
| 6,597,787 B1 | 7/2003 | Lindgren et al. | |
| 6,606,598 B1 | 8/2003 | Holthouse et al. | |
| 6,633,846 B1 | 10/2003 | Bennett et al. | |
| 6,636,953 B2 | 10/2003 | Yuasa et al. | |
| 6,639,987 B2 | 10/2003 | McIntosh | |
| 6,647,123 B2 | 11/2003 | Kandel et al. | |
| 6,647,368 B2 | 11/2003 | Nemirovski | |
| 6,648,368 B2 | 11/2003 | Smith et al. | |
| RE38,351 E | 12/2003 | Iseberg et al. | |
| 6,658,122 B1 | 12/2003 | Westermann et al. | |
| 6,661,886 B1 | 12/2003 | Huart et al. | |
| 6,661,901 B1 | 12/2003 | Svean et al. | |
| 6,671,379 B2 | 12/2003 | Nemirovski | |
| 6,671,643 B2 | 12/2003 | Kachler et al. | |
| 6,674,862 B1 | 1/2004 | Magilen | |
| 6,687,339 B2 | 2/2004 | Martin | |
| 6,687,377 B2 | 2/2004 | Voix et al. | |
| 6,687,671 B2 | 2/2004 | Gudorf et al. | |
| 6,717,991 B1 | 4/2004 | Gustafsson et al. | |
| 6,725,194 B1 | 4/2004 | Bartosik et al. | |
| 6,728,385 B2 | 4/2004 | Kvaloy et al. | |
| 6,738,482 B1 | 5/2004 | Jaber | |
| 6,738,485 B1 | 5/2004 | Boesen | |
| 6,748,238 B1 | 6/2004 | Lau | |
| 6,754,359 B1 | 6/2004 | Svean et al. | |
| 6,760,754 B1 | 7/2004 | Isaacs et al. | |
| 6,768,798 B1 | 7/2004 | Dempsey | |
| 6,775,206 B2 | 8/2004 | Karhu | |
| 6,782,106 B1 | 8/2004 | Kong et al. | |
| 6,782,253 B1 | 8/2004 | Shteyn et al. | |
| 6,785,394 B1 | 8/2004 | Olsen et al. | |
| 6,789,060 B1 | 9/2004 | Wolfe et al. | |
| 6,795,688 B1 | 9/2004 | Plasson et al. | |
| 6,804,638 B2 | 10/2004 | Fiedler | |
| 6,804,643 B1 | 10/2004 | Kiss | |
| 6,826,286 B1 | 11/2004 | Arndt et al. | |
| 6,837,857 B2 | 1/2005 | Stirnemann | |
| 6,840,908 B2 | 1/2005 | Edwards | |
| 6,879,692 B2 | 4/2005 | Nielsen et al. | |
| 6,910,013 B2 | 6/2005 | Allegro et al. | |
| 6,912,289 B2 | 6/2005 | Vonlanthen et al. | |
| 6,937,984 B1 | 8/2005 | Morgan et al. | |
| 6,941,161 B1 | 9/2005 | Bobisuthi et al. | |
| 6,944,474 B2 | 9/2005 | Rader et al. | |
| 6,965,770 B2 | 11/2005 | Walsh et al. | |
| 6,987,992 B2 | 1/2006 | Hundal et al. | |
| 7,003,099 B1 | 2/2006 | Zhang et al. | |
| 7,003,123 B2 | 2/2006 | Kanevsky et al. | |
| 7,003,463 B1 | 2/2006 | Maes et al. | |
| 7,020,297 B2 | 3/2006 | Fang et al. | |
| 7,024,207 B2 | 4/2006 | Gorday et al. | |
| 7,031,437 B1 | 4/2006 | Parsons et al. | |
| 7,037,274 B2 | 5/2006 | Thornton et al. | |
| 7,039,195 B1 | 5/2006 | Svean et al. | |
| 7,039,585 B2 | 5/2006 | Wilmot et al. | |
| 7,043,037 B2 | 5/2006 | Lichtblau | |
| 7,050,592 B1 | 5/2006 | Iseberg et al. | |
| 7,050,966 B2 | 5/2006 | Schneider et al. | |
| 7,050,971 B1 | 5/2006 | Kaufholz | |
| 7,072,482 B2 | 7/2006 | Van Doorn et al. | |
| 7,072,686 B1 | 7/2006 | Schrager | |
| 7,082,393 B2 | 7/2006 | Lahr | |
| 7,092,532 B2 | 8/2006 | Luo et al. | |
| 7,103,188 B1 | 9/2006 | Jones | |
| 7,107,109 B1 | 9/2006 | Nathan et al. | |
| 7,110,554 B2 | 9/2006 | Brennan et al. | |
| 7,130,437 B2 | 10/2006 | Stonikas et al. | |
| 7,133,924 B1 | 11/2006 | Rosenberg et al. | |
| 7,142,814 B2 | 11/2006 | Nassimi | |
| 7,149,319 B2 | 12/2006 | Roeck | |
| 7,158,643 B2 | 1/2007 | Lavoie et al. | |
| 7,158,933 B2 | 1/2007 | Balan et al. | |
| 7,162,041 B2 | 1/2007 | Haapapuro et al. | |
| 7,174,022 B1 | 2/2007 | Zhang et al. | |
| 7,177,433 B2 | 2/2007 | Sibbald | |
| 7,181,020 B1 | 2/2007 | Riley | |
| 7,181,030 B2 | 2/2007 | Rasmussen et al. | |
| 7,181,297 B1* | 2/2007 | Pluvinage | A61B 5/0002 |
| | | | 381/60 |
| 7,206,429 B1 | 4/2007 | Vossler | |
| 7,209,569 B2 | 4/2007 | Boesen | |
| 7,215,766 B2 | 5/2007 | Wurtz | |
| 7,223,245 B2 | 5/2007 | Zoth et al. | |
| 7,233,321 B1 | 6/2007 | Larson et al. | |
| 7,246,058 B2 | 7/2007 | Burnett | |
| 7,277,722 B2 | 10/2007 | Rosenzweig | |
| 7,280,849 B1 | 10/2007 | Bailey | |
| 7,292,880 B2 | 11/2007 | Lehtonen | |
| 7,312,699 B2 | 12/2007 | Chornenky | |
| 7,343,177 B2 | 3/2008 | Seshadri et al. | |
| 7,346,504 B2 | 3/2008 | Liu et al. | |
| 7,359,504 B1 | 4/2008 | Reuss et al. | |
| 7,363,029 B2 | 4/2008 | Othmer | |
| 7,383,178 B2 | 6/2008 | Visser et al. | |
| 7,395,090 B2 | 7/2008 | Alden | |
| 7,430,299 B2 | 9/2008 | Armstrong et al. | |
| 7,430,300 B2 | 9/2008 | Vosburgh et al. | |
| 7,433,463 B2 | 10/2008 | Alves et al. | |
| 7,433,714 B2 | 10/2008 | Howard et al. | |
| 7,444,353 B1 | 10/2008 | Chen et al. | |
| 7,450,730 B2 | 11/2008 | Bertg et al. | |
| 7,464,029 B2 | 12/2008 | Visser et al. | |
| 7,477,754 B2 | 1/2009 | Rasmussen et al. | |
| 7,477,756 B2 | 1/2009 | Wickstrom et al. | |
| 7,477,922 B2 | 1/2009 | Lewis | |
| 7,496,387 B2 | 2/2009 | Byford et al. | |
| 7,502,484 B2 | 3/2009 | Ngia et al. | |
| 7,512,245 B2 | 3/2009 | Rasmussen et al. | |
| 7,519,193 B2 | 4/2009 | Fretz | |
| 7,529,379 B2 | 5/2009 | Zurek et al. | |
| 7,529,545 B2* | 5/2009 | Rader | H04R 25/70 |
| | | | 455/268 |
| 7,529,677 B1 | 5/2009 | Wittenberg | |
| 7,532,734 B2 | 5/2009 | Pham et al. | |
| 7,533,061 B1 | 5/2009 | Cheng et al. | |
| 7,536,006 B2 | 5/2009 | Patel et al. | |
| 7,542,816 B2 | 6/2009 | Rosenberg | |
| 7,546,144 B2 | 6/2009 | de Leon et al. | |
| 7,558,529 B2 | 7/2009 | Seshadri et al. | |
| 7,562,020 B2 | 7/2009 | Le et al. | |
| 7,574,917 B2 | 8/2009 | Von et al. | |
| 7,590,254 B2 | 9/2009 | Olsen | |
| 7,617,099 B2 | 11/2009 | Yang et al. | |
| 7,623,823 B2 | 11/2009 | Zito et al. | |

(56) References Cited

U.S. PATENT DOCUMENTS

| | | | |
|---|---|---|---|
| 7,634,094 B2 | 12/2009 | Reber | |
| 7,643,458 B1 | 1/2010 | Talwar et al. | |
| 7,659,827 B2 | 2/2010 | Gunderson et al. | |
| 7,680,465 B2 | 3/2010 | Zad-Issa | |
| 7,702,482 B2 | 4/2010 | Graepel et al. | |
| 7,702,792 B2 | 4/2010 | Shaffer et al. | |
| 7,710,654 B2 | 5/2010 | Ashkenazi et al. | |
| 7,715,568 B2 | 5/2010 | Nakano | |
| 7,715,577 B2 | 5/2010 | Allen et al. | |
| 7,729,912 B1 | 6/2010 | Bacchiani et al. | |
| 7,738,434 B1 | 6/2010 | Reuss et al. | |
| 7,756,281 B2 | 7/2010 | Goldstein et al. | |
| 7,756,283 B2 | 7/2010 | Lars | |
| 7,756,285 B2 | 7/2010 | Sjursen et al. | |
| 7,773,743 B2 | 8/2010 | Stokes et al. | |
| 7,773,759 B2 | 8/2010 | Alves et al. | |
| 7,773,763 B2 | 8/2010 | Pedersen | |
| 7,774,202 B2 | 8/2010 | Spengler et al. | |
| 7,778,434 B2 | 8/2010 | Juneau et al. | |
| 7,801,318 B2 | 9/2010 | Barthel | |
| 7,801,726 B2 | 9/2010 | Ariu | |
| 7,804,974 B2 | 9/2010 | Paludan-Muller et al. | |
| 7,813,520 B2 | 10/2010 | Von et al. | |
| 7,817,808 B2 | 10/2010 | Konchitsky et al. | |
| 7,844,070 B2 | 11/2010 | Abolfathi | |
| 7,844,248 B2 | 11/2010 | Sotack | |
| 7,853,031 B2 | 12/2010 | Hamacher | |
| 7,861,008 B2 | 12/2010 | Batson et al. | |
| 7,861,723 B2 | 1/2011 | Dedrick et al. | |
| 7,869,606 B2 | 1/2011 | Fichtl et al. | |
| 7,881,656 B2 | 2/2011 | Khedouri et al. | |
| 7,903,793 B2 | 3/2011 | Visser | |
| 7,903,825 B1 | 3/2011 | Melanson | |
| 7,903,826 B2 | 3/2011 | Boersma | |
| 7,903,833 B2 | 3/2011 | Goldberg et al. | |
| 7,920,557 B2 | 4/2011 | Moote | |
| 7,925,007 B2 | 4/2011 | Stokes et al. | |
| 7,929,713 B2 | 4/2011 | Victorian et al. | |
| 7,933,423 B2 | 4/2011 | Baekgaard et al. | |
| 7,936,885 B2 | 5/2011 | Frank et al. | |
| 7,953,241 B2 | 5/2011 | Jorgensen et al. | |
| 7,978,861 B2 * | 7/2011 | Michael | G01H 3/14 |
| | | | 381/317 |
| 7,983,433 B2 | 7/2011 | Nemirovski | |
| 7,983,907 B2 | 7/2011 | Visser et al. | |
| 7,986,791 B2 | 7/2011 | Bostick et al. | |
| 7,986,802 B2 | 7/2011 | Ziller | |
| 7,995,756 B1 | 8/2011 | Mckinney et al. | |
| 7,995,773 B2 | 8/2011 | Mao | |
| 8,014,553 B2 | 9/2011 | Radivojevic et al. | |
| 8,018,337 B2 | 9/2011 | Jones et al. | |
| 8,019,091 B2 | 9/2011 | Burnett et al. | |
| 8,027,481 B2 | 9/2011 | Beard | |
| 8,045,840 B2 | 10/2011 | Murata et al. | |
| 8,047,207 B2 | 11/2011 | Perez et al. | |
| 8,050,143 B2 | 11/2011 | Bufi et al. | |
| 8,068,627 B2 | 11/2011 | Zhang et al. | |
| 8,077,872 B2 | 12/2011 | Dyer et al. | |
| 8,081,780 B2 | 12/2011 | Goldstein et al. | |
| 8,085,943 B2 | 12/2011 | Bizjak | |
| 8,086,093 B2 | 12/2011 | Stuckman | |
| 8,094,848 B1 * | 1/2012 | Frerking | H04R 25/505 |
| | | | 381/314 |
| 8,111,839 B2 | 2/2012 | Goldstein et al. | |
| 8,111,840 B2 | 2/2012 | Haulick et al. | |
| 8,111,849 B2 | 2/2012 | Tateno et al. | |
| 8,116,472 B2 | 2/2012 | Mizuno | |
| 8,116,489 B2 | 2/2012 | Mejia et al. | |
| 8,121,301 B2 | 2/2012 | Suzuki et al. | |
| 8,140,325 B2 | 3/2012 | Kanevsky et al. | |
| 8,144,881 B2 | 3/2012 | Crockett et al. | |
| 8,144,891 B2 | 3/2012 | Her et al. | |
| 8,150,044 B2 | 4/2012 | Goldstein et al. | |
| 8,150,084 B2 | 4/2012 | Jessen et al. | |
| 8,160,261 B2 | 4/2012 | Schulein et al. | |
| 8,160,273 B2 | 4/2012 | Visser et al. | |
| 8,162,846 B2 | 4/2012 | Epley | |
| 8,180,078 B2 | 5/2012 | Zellner | |
| 8,184,823 B2 | 5/2012 | Itabashi et al. | |
| 8,186,478 B1 | 5/2012 | Grason | |
| 8,189,803 B2 | 5/2012 | Bergeron et al. | |
| 8,194,864 B2 | 6/2012 | Goldstein et al. | |
| 8,194,865 B2 | 6/2012 | Goldstein et al. | |
| 8,199,919 B2 | 6/2012 | Goldstein et al. | |
| 8,199,942 B2 | 6/2012 | Mao | |
| 8,204,435 B2 | 6/2012 | Seshadri et al. | |
| 8,208,609 B2 | 6/2012 | Harris et al. | |
| 8,208,642 B2 | 6/2012 | Edwards | |
| 8,208,644 B2 | 6/2012 | Goldstein et al. | |
| 8,208,652 B2 | 6/2012 | Keady | |
| 8,209,181 B2 | 6/2012 | Heckerman et al. | |
| 8,213,629 B2 | 7/2012 | Goldstein et al. | |
| 8,218,784 B2 | 7/2012 | Schulein et al. | |
| 8,221,861 B2 | 7/2012 | Keady | |
| 8,229,127 B2 | 7/2012 | Jorgensen et al. | |
| 8,229,128 B2 | 7/2012 | Keady | |
| 8,229,148 B2 | 7/2012 | Rasmussen et al. | |
| 8,229,513 B2 | 7/2012 | Ibe | |
| 8,251,925 B2 | 8/2012 | Keady et al. | |
| 8,254,586 B2 | 8/2012 | Voix et al. | |
| 8,254,591 B2 | 8/2012 | Goldstein et al. | |
| 8,260,618 B2 | 9/2012 | Mahlbacher | |
| 8,270,629 B2 | 9/2012 | Bothra et al. | |
| 8,270,634 B2 | 9/2012 | Harney et al. | |
| 8,306,235 B2 | 11/2012 | Mahowald | |
| 8,312,960 B2 | 11/2012 | Keady | |
| 8,315,400 B2 | 11/2012 | Goldstein et al. | |
| 8,322,222 B2 | 12/2012 | Goldberg et al. | |
| 8,340,309 B2 | 12/2012 | Burnett et al. | |
| 8,351,634 B2 | 1/2013 | Khenkin | |
| 8,369,901 B2 | 2/2013 | Haulick et al. | |
| 8,374,361 B2 | 2/2013 | Moon et al. | |
| 8,385,560 B2 | 2/2013 | Solbeck et al. | |
| 8,391,534 B2 | 3/2013 | Ambrose et al. | |
| 8,401,198 B2 | 3/2013 | Oh et al. | |
| 8,401,200 B2 | 3/2013 | Tiscareno et al. | |
| 8,411,880 B2 | 4/2013 | Wang et al. | |
| 8,417,185 B2 | 4/2013 | Braho et al. | |
| 8,437,492 B2 | 5/2013 | Goldstein et al. | |
| 8,447,370 B2 | 5/2013 | Ueda et al. | |
| 8,462,969 B2 | 6/2013 | Claussen et al. | |
| 8,462,974 B2 | 6/2013 | Jeong et al. | |
| 8,472,616 B1 | 6/2013 | Jiang | |
| 8,477,955 B2 | 7/2013 | Engle et al. | |
| 8,488,799 B2 | 7/2013 | Goldstein et al. | |
| 8,493,204 B2 | 7/2013 | Wong et al. | |
| 8,504,437 B1 | 8/2013 | Agarwal et al. | |
| 8,515,089 B2 | 8/2013 | Nicholson | |
| 8,522,916 B2 | 9/2013 | Keady | |
| 8,548,181 B2 | 10/2013 | Kraemer | |
| 8,550,206 B2 | 10/2013 | Keady et al. | |
| 8,554,350 B2 | 10/2013 | Keady et al. | |
| 8,577,062 B2 | 11/2013 | Goldstein et al. | |
| 8,594,341 B2 | 11/2013 | Rothschild | |
| 8,600,067 B2 | 12/2013 | Usher et al. | |
| 8,611,548 B2 | 12/2013 | Bizjak | |
| 8,611,560 B2 | 12/2013 | Goldstein et al. | |
| 8,625,818 B2 | 1/2014 | Stultz et al. | |
| 8,625,819 B2 | 1/2014 | Goldstein et al. | |
| 8,631,801 B2 | 1/2014 | Keady | |
| 8,649,540 B2 | 2/2014 | Killion et al. | |
| 8,652,040 B2 | 2/2014 | Leboeuf et al. | |
| 8,657,064 B2 | 2/2014 | Staab et al. | |
| 8,678,011 B2 | 3/2014 | Goldstein et al. | |
| 8,693,704 B2 | 4/2014 | Kim et al. | |
| 8,718,288 B2 | 5/2014 | Woods et al. | |
| 8,718,305 B2 | 5/2014 | Usher et al. | |
| 8,718,313 B2 | 5/2014 | Keady | |
| 8,744,091 B2 | 6/2014 | Chen et al. | |
| 8,750,295 B2 | 6/2014 | Liron | |
| 8,774,433 B2 | 7/2014 | Goldstein | |
| 8,774,435 B2 | 7/2014 | Ambrose et al. | |
| 8,792,669 B2 | 7/2014 | Harsch | |
| 8,798,278 B2 | 8/2014 | Isabelle et al. | |

(56) References Cited

U.S. PATENT DOCUMENTS

| | | |
|---|---|---|
| 8,798,279 B2 | 8/2014 | Ranta |
| 8,798,289 B1 | 8/2014 | Every et al. |
| 8,804,974 B1 | 8/2014 | Melanson |
| 8,848,939 B2 | 9/2014 | Keady et al. |
| 8,851,372 B2 | 10/2014 | Zhou et al. |
| 8,855,343 B2 | 10/2014 | Usher et al. |
| 8,903,113 B2 | 12/2014 | Gebert |
| 8,917,880 B2 | 12/2014 | Goldstein et al. |
| 8,917,892 B2 | 12/2014 | Poe et al. |
| 8,917,894 B2 | 12/2014 | Goldstein et al. |
| 8,942,370 B2 | 1/2015 | Li et al. |
| 8,942,405 B2 | 1/2015 | Jones et al. |
| 8,948,428 B2 | 2/2015 | Kates |
| 8,983,081 B2 | 3/2015 | Bayley et al. |
| 8,992,710 B2 | 3/2015 | Keady |
| 9,002,023 B2 | 4/2015 | Gauger, Jr. |
| 9,013,351 B2 | 4/2015 | Park et al. |
| 9,037,458 B2 | 5/2015 | Park et al. |
| 9,053,697 B2 | 6/2015 | Park et al. |
| 9,076,427 B2 | 7/2015 | Alderson et al. |
| 9,112,701 B2 | 8/2015 | Sano et al. |
| 9,113,240 B2 | 8/2015 | Ramakrishnan et al. |
| 9,113,267 B2 | 8/2015 | Usher et al. |
| 9,123,323 B2 | 9/2015 | Keady |
| 9,123,343 B2 | 9/2015 | Kurki-Suonio |
| 9,124,982 B2 | 9/2015 | Goldstein et al. |
| 9,135,797 B2 | 9/2015 | Couper et al. |
| 9,135,809 B2 | 9/2015 | Chang et al. |
| 9,137,597 B2 | 9/2015 | Usher et al. |
| 9,138,353 B2 | 9/2015 | Keady |
| 9,142,207 B2 | 9/2015 | Hendrix et al. |
| 9,165,567 B2 | 10/2015 | Visser et al. |
| 9,185,481 B2 | 11/2015 | Goldstein et al. |
| 9,191,732 B2 | 11/2015 | Wurtz |
| 9,191,740 B2 | 11/2015 | McIntosh et al. |
| 9,196,247 B2 | 11/2015 | Harada |
| 9,216,237 B2 | 12/2015 | Keady |
| 9,270,244 B2 | 2/2016 | Usher et al. |
| 9,288,592 B2 | 3/2016 | Basseas |
| 9,338,568 B2 | 5/2016 | Van Hal |
| 9,357,288 B2 | 5/2016 | Goldstein et al. |
| 9,369,814 B2 | 6/2016 | Victorian et al. |
| 9,445,183 B2 | 9/2016 | Dahl |
| 9,451,324 B2 | 9/2016 | Jarman et al. |
| 9,462,100 B2 | 10/2016 | Usher et al. |
| 9,491,542 B2 | 11/2016 | Usher |
| 9,497,423 B2 | 11/2016 | Moberly |
| 9,539,147 B2 | 1/2017 | Keady et al. |
| 9,554,733 B2 | 1/2017 | Henriksen et al. |
| 9,609,424 B2 | 3/2017 | Goldstein |
| 9,628,896 B2 | 4/2017 | Ichimura |
| 9,653,869 B1 | 5/2017 | Hersman et al. |
| 9,679,570 B1 | 6/2017 | Edara |
| 9,684,778 B2 | 6/2017 | Tharappel et al. |
| 9,685,921 B2 | 6/2017 | Smith et al. |
| 9,757,069 B2 | 9/2017 | Keady et al. |
| 9,763,003 B2 | 9/2017 | Usher et al. |
| 9,779,716 B2 | 10/2017 | Gadonniex et al. |
| 9,781,530 B2 | 10/2017 | Usher et al. |
| 9,843,854 B2 | 12/2017 | Keady |
| 9,894,452 B1 | 2/2018 | Termeulen et al. |
| 9,943,185 B2 | 4/2018 | Chen |
| 10,012,529 B2 | 7/2018 | Goldstein et al. |
| 10,045,107 B2 | 8/2018 | Kirsch et al. |
| 10,142,332 B2 | 11/2018 | Ravindran et al. |
| 10,190,904 B2 | 1/2019 | Goldstein et al. |
| 10,210,884 B2 | 2/2019 | Lyon et al. |
| 10,284,939 B2 | 5/2019 | Radin et al. |
| 10,297,246 B2 | 5/2019 | Asada et al. |
| 10,365,883 B2 | 7/2019 | Goldstein et al. |
| 10,413,197 B2 | 9/2019 | Leboeuf et al. |
| 10,506,320 B1 | 12/2019 | Lott |
| 10,709,339 B1 | 7/2020 | Lusted |
| 10,760,948 B2 | 9/2020 | Goldstein et al. |
| 10,848,827 B2 | 11/2020 | Sengupta et al. |
| 10,917,711 B2 | 2/2021 | Higgins |
| 10,966,015 B2 | 3/2021 | Usher |
| 10,970,375 B2 | 4/2021 | Shila et al. |
| 10,979,836 B2 | 4/2021 | Usher et al. |
| 10,991,009 B2 | 4/2021 | Marsh |
| 11,006,198 B2 | 5/2021 | Lott |
| 11,012,770 B2 | 5/2021 | Hatfield et al. |
| 11,039,259 B2 | 6/2021 | Goldstein et al. |
| 11,051,704 B1 | 7/2021 | Tran |
| 11,057,701 B2 | 7/2021 | Goldstein et al. |
| 11,115,750 B2 | 9/2021 | Monsarrat-Chanon et al. |
| 11,122,357 B2 | 9/2021 | Burnett |
| 11,172,298 B2 | 11/2021 | Carrigan et al. |
| 11,217,237 B2 | 1/2022 | Usher et al. |
| 11,244,666 B2 | 2/2022 | Goldstein et al. |
| 11,277,682 B2 | 3/2022 | Usher |
| 11,277,700 B2 | 3/2022 | Goldstein |
| 11,294,619 B2 | 4/2022 | Usher et al. |
| 11,383,158 B2 | 7/2022 | Bonanno |
| 11,393,486 B1 | 7/2022 | Woodruff et al. |
| 11,432,043 B2 | 8/2022 | Jarman et al. |
| 11,610,587 B2 | 3/2023 | Goldstein et al. |
| 11,659,315 B2 | 5/2023 | Perez et al. |
| 11,665,493 B2 | 5/2023 | Usher et al. |
| 11,710,473 B2 | 7/2023 | Goldstein et al. |
| 11,720,227 B2 | 8/2023 | Michalski et al. |
| 11,736,769 B2 | 8/2023 | Khov et al. |
| 11,750,965 B2 | 9/2023 | Usher et al. |
| 2001/0000505 A1 | 4/2001 | Segal et al. |
| 2001/0039494 A1 | 11/2001 | Burchard et al. |
| 2001/0041559 A1 | 11/2001 | Salabaschew |
| 2001/0046304 A1 | 11/2001 | Rast |
| 2001/0047262 A1 | 11/2001 | Kurganov et al. |
| 2001/0054087 A1 | 12/2001 | Flam et al. |
| 2002/0002039 A1* | 1/2002 | Qureshey ........... H04L 65/4076 |
| | | 455/188.1 |
| 2002/0003889 A1 | 1/2002 | Fischer |
| 2002/0007315 A1 | 1/2002 | Rose |
| 2002/0009203 A1 | 1/2002 | Erten |
| 2002/0012429 A1 | 1/2002 | Matt et al. |
| 2002/0012432 A1 | 1/2002 | England et al. |
| 2002/0018798 A1 | 2/2002 | Sewing et al. |
| 2002/0020040 A1 | 2/2002 | Gallup |
| 2002/0026311 A1 | 2/2002 | Okitsu |
| 2002/0055418 A1 | 5/2002 | Pyles et al. |
| 2002/0057817 A1 | 5/2002 | Darbut |
| 2002/0059068 A1 | 5/2002 | Rose |
| 2002/0068986 A1 | 6/2002 | Mouline |
| 2002/0069056 A1 | 6/2002 | Nofsinger |
| 2002/0076057 A1 | 6/2002 | Voix |
| 2002/0076059 A1 | 6/2002 | Joynes |
| 2002/0077988 A1 | 6/2002 | Sasaki |
| 2002/0085690 A1 | 7/2002 | Davidson et al. |
| 2002/0087632 A1 | 7/2002 | Keskar |
| 2002/0098878 A1 | 7/2002 | Mooney et al. |
| 2002/0106091 A1 | 8/2002 | Furst et al. |
| 2002/0111798 A1 | 8/2002 | Huang |
| 2002/0116187 A1 | 8/2002 | Erten |
| 2002/0116541 A1 | 8/2002 | Parker et al. |
| 2002/0118798 A1 | 8/2002 | Langhart et al. |
| 2002/0123893 A1 | 9/2002 | Woodward |
| 2002/0133513 A1 | 9/2002 | Townsend et al. |
| 2002/0141599 A1 | 10/2002 | Trajkovic et al. |
| 2002/0141602 A1 | 10/2002 | Nemirovski |
| 2002/0143534 A1 | 10/2002 | Hol |
| 2002/0165719 A1 | 11/2002 | Wang et al. |
| 2002/0169596 A1 | 11/2002 | Brill et al. |
| 2002/0169615 A1 | 11/2002 | Kruger et al. |
| 2002/0191799 A1 | 12/2002 | Nordqvist et al. |
| 2002/0191952 A1 | 12/2002 | Fiore et al. |
| 2002/0193130 A1 | 12/2002 | Yang et al. |
| 2003/0001978 A1 | 1/2003 | Smith et al. |
| 2003/0008633 A1 | 1/2003 | Bartosik |
| 2003/0014407 A1 | 1/2003 | Blatter et al. |
| 2003/0026438 A1 | 2/2003 | Ray et al. |
| 2003/0032447 A1 | 2/2003 | Bulthuis |
| 2003/0033146 A1 | 2/2003 | Morin et al. |
| 2003/0033152 A1 | 2/2003 | Cameron |
| 2003/0035551 A1 | 2/2003 | Light et al. |

(56)         References Cited

U.S. PATENT DOCUMENTS

| | | |
|---|---|---|
| 2003/0044002 A1 | 3/2003 | Yeager et al. |
| 2003/0046689 A1 | 3/2003 | Gaos |
| 2003/0048882 A1 | 3/2003 | Smith |
| 2003/0050777 A1 | 3/2003 | Donald |
| 2003/0055627 A1 | 3/2003 | Balan et al. |
| 2003/0061032 A1 | 3/2003 | Gonopolskiy |
| 2003/0064746 A1 | 4/2003 | Rader et al. |
| 2003/0065512 A1 | 4/2003 | Walker |
| 2003/0065620 A1 | 4/2003 | Gailey et al. |
| 2003/0069002 A1 | 4/2003 | Hunter et al. |
| 2003/0069854 A1 | 4/2003 | Hsu |
| 2003/0083879 A1 | 5/2003 | Cyr et al. |
| 2003/0083883 A1 | 5/2003 | Cyr et al. |
| 2003/0084188 A1 | 5/2003 | Dreyer |
| 2003/0092468 A1 | 5/2003 | North |
| 2003/0110040 A1 | 6/2003 | Holland et al. |
| 2003/0118197 A1 | 6/2003 | Nagayasu et al. |
| 2003/0130016 A1 | 7/2003 | Matsuura et al. |
| 2003/0130852 A1 | 7/2003 | Tanaka et al. |
| 2003/0138118 A1 | 7/2003 | Stahl |
| 2003/0139933 A1 | 7/2003 | Kimmel |
| 2003/0144846 A1 | 7/2003 | Denenberg |
| 2003/0152359 A1 | 8/2003 | Kim |
| 2003/0156725 A1 | 8/2003 | Boone et al. |
| 2003/0158657 A1 | 8/2003 | Agnew et al. |
| 2003/0161097 A1 | 8/2003 | Le et al. |
| 2003/0165246 A1 | 9/2003 | Kvaloy et al. |
| 2003/0165319 A1 | 9/2003 | Barber et al. |
| 2003/0190047 A1 | 10/2003 | Aarts |
| 2003/0198357 A1 | 10/2003 | Schneider et al. |
| 2003/0198359 A1 | 10/2003 | Killion et al. |
| 2003/0200096 A1 | 10/2003 | Asai |
| 2003/0202666 A1 | 10/2003 | Ching |
| 2003/0228019 A1 | 12/2003 | Eichler et al. |
| 2003/0228023 A1 | 12/2003 | Burnett et al. |
| 2004/0008850 A1 | 1/2004 | Gustavsson |
| 2004/0019482 A1 | 1/2004 | Holub |
| 2004/0024688 A1 | 2/2004 | Bi et al. |
| 2004/0042103 A1 | 3/2004 | Mayer |
| 2004/0047474 A1 | 3/2004 | Vries et al. |
| 2004/0047486 A1 | 3/2004 | Van et al. |
| 2004/0049385 A1 | 3/2004 | Lovance et al. |
| 2004/0054539 A1 | 3/2004 | Simpson |
| 2004/0055447 A1 | 3/2004 | Childs et al. |
| 2004/0064704 A1 | 4/2004 | Rahman |
| 2004/0066924 A1 | 4/2004 | Wertsberger |
| 2004/0086138 A1 | 5/2004 | Kuth |
| 2004/0088162 A1 | 5/2004 | He et al. |
| 2004/0091119 A1 | 5/2004 | Duraisawmi et al. |
| 2004/0109579 A1 | 6/2004 | Izuchi et al. |
| 2004/0109668 A1 | 6/2004 | Stuckman |
| 2004/0125965 A1 | 7/2004 | Alberth, Jr. et al. |
| 2004/0128136 A1 | 7/2004 | Irani |
| 2004/0133066 A1* | 7/2004 | Mann ................... H04R 25/554 |
| | | 600/25 |
| 2004/0133421 A1 | 7/2004 | Burnett et al. |
| 2004/0150717 A1 | 8/2004 | Page et al. |
| 2004/0160572 A1 | 8/2004 | Jannard et al. |
| 2004/0160573 A1 | 8/2004 | Jannard et al. |
| 2004/0162064 A1 | 8/2004 | Himmelstein |
| 2004/0165742 A1 | 8/2004 | Shennib et al. |
| 2004/0175005 A1 | 9/2004 | Roeck |
| 2004/0179694 A1 | 9/2004 | Alley |
| 2004/0185804 A1 | 9/2004 | Kanamori et al. |
| 2004/0190737 A1 | 9/2004 | Kuhnel et al. |
| 2004/0196992 A1 | 10/2004 | Ryan |
| 2004/0202333 A1 | 10/2004 | Csermak et al. |
| 2004/0202339 A1 | 10/2004 | O'Brien et al. |
| 2004/0202340 A1 | 10/2004 | Armstrong et al. |
| 2004/0203351 A1 | 10/2004 | Shearer et al. |
| 2004/0203368 A1 | 10/2004 | Haller et al. |
| 2004/0203611 A1 | 10/2004 | Laporta et al. |
| 2004/0209595 A1 | 10/2004 | Bekanich |
| 2004/0215909 A1 | 10/2004 | Imai |
| 2004/0224723 A1 | 11/2004 | Farcasiu |
| 2004/0252852 A1 | 12/2004 | Taenzer |
| 2004/0258263 A1 | 12/2004 | Saxton et al. |
| 2004/0264721 A1* | 12/2004 | Allegro ................ H04R 25/353 |
| | | 381/316 |
| 2004/0264938 A1 | 12/2004 | Felder |
| 2005/0008167 A1 | 1/2005 | Gleissner et al. |
| 2005/0028212 A1 | 2/2005 | Laronne et al. |
| 2005/0033384 A1 | 2/2005 | Sacha |
| 2005/0033571 A1 | 2/2005 | Huang et al. |
| 2005/0045373 A1 | 3/2005 | Born |
| 2005/0046790 A1 | 3/2005 | Jannard et al. |
| 2005/0047611 A1 | 3/2005 | Mao |
| 2005/0049854 A1 | 3/2005 | Reding et al. |
| 2005/0058300 A1 | 3/2005 | Suzuki et al. |
| 2005/0058313 A1 | 3/2005 | Victorian et al. |
| 2005/0060142 A1 | 3/2005 | Visser et al. |
| 2005/0068171 A1 | 3/2005 | Kelliher et al. |
| 2005/0070337 A1 | 3/2005 | Byford et al. |
| 2005/0071158 A1 | 3/2005 | Byford |
| 2005/0071626 A1 | 3/2005 | Bear et al. |
| 2005/0075095 A1 | 4/2005 | Dillon |
| 2005/0077102 A1 | 4/2005 | Banter et al. |
| 2005/0078838 A1 | 4/2005 | Simon |
| 2005/0078842 A1 | 4/2005 | Vonlanthen et al. |
| 2005/0078843 A1 | 4/2005 | Bauman |
| 2005/0080625 A1 | 4/2005 | Bennett et al. |
| 2005/0090295 A1 | 4/2005 | Ali et al. |
| 2005/0096764 A1 | 5/2005 | Weiser |
| 2005/0096899 A1 | 5/2005 | Padhi et al. |
| 2005/0102142 A1 | 5/2005 | Soufflet et al. |
| 2005/0114124 A1 | 5/2005 | Liu et al. |
| 2005/0114896 A1 | 5/2005 | Hug |
| 2005/0123146 A1 | 6/2005 | Voix et al. |
| 2005/0125354 A1 | 6/2005 | Pisaris-Henderson et al. |
| 2005/0134710 A1 | 6/2005 | Nomura et al. |
| 2005/0136958 A1 | 6/2005 | Seshadri et al. |
| 2005/0157891 A1 | 7/2005 | Johansen |
| 2005/0163289 A1 | 7/2005 | Caspi et al. |
| 2005/0169219 A1 | 8/2005 | Serpa et al. |
| 2005/0175194 A1 | 8/2005 | Anderson |
| 2005/0181826 A1 | 8/2005 | Yueh |
| 2005/0182620 A1 | 8/2005 | Kabi et al. |
| 2005/0207605 A1 | 9/2005 | Dehe et al. |
| 2005/0215907 A1 | 9/2005 | Toda et al. |
| 2005/0216531 A1 | 9/2005 | Blandford |
| 2005/0222820 A1 | 10/2005 | Chung |
| 2005/0227674 A1 | 10/2005 | Kopra et al. |
| 2005/0239546 A1 | 10/2005 | Hedrick et al. |
| 2005/0251224 A1 | 11/2005 | Berg |
| 2005/0254640 A1 | 11/2005 | Ohki et al. |
| 2005/0254676 A1 | 11/2005 | Rass et al. |
| 2005/0255837 A1 | 11/2005 | Kwon |
| 2005/0258942 A1 | 11/2005 | Manasseh et al. |
| 2005/0260974 A1 | 11/2005 | Lee et al. |
| 2005/0260978 A1 | 11/2005 | Rader et al. |
| 2005/0264425 A1 | 12/2005 | Sato et al. |
| 2005/0281422 A1 | 12/2005 | Armstrong et al. |
| 2005/0281423 A1 | 12/2005 | Armstrong et al. |
| 2005/0283369 A1 | 12/2005 | Clausner et al. |
| 2005/0288057 A1 | 12/2005 | Lai et al. |
| 2006/0008078 A1 | 1/2006 | El-Fishawy |
| 2006/0008256 A1 | 1/2006 | Khedouri et al. |
| 2006/0013410 A1 | 1/2006 | Wurtz |
| 2006/0018496 A1 | 1/2006 | Niederdrank et al. |
| 2006/0018497 A1 | 1/2006 | Komagel |
| 2006/0023158 A1 | 2/2006 | Howell |
| 2006/0025214 A1 | 2/2006 | Smith |
| 2006/0031106 A1 | 2/2006 | Browde |
| 2006/0031257 A1 | 2/2006 | Lipscomb et al. |
| 2006/0045281 A1* | 3/2006 | Korneluk ................ H04R 5/04 |
| | | 381/60 |
| 2006/0053007 A1 | 3/2006 | Niemisto |
| 2006/0064037 A1 | 3/2006 | Shalon et al. |
| 2006/0067551 A1 | 3/2006 | Cartwright et al. |
| 2006/0068703 A1 | 3/2006 | Ng et al. |
| 2006/0074895 A1 | 4/2006 | Belknap |
| 2006/0075429 A1 | 4/2006 | Istvan et al. |
| 2006/0079291 A1 | 4/2006 | Granovetter et al. |
| 2006/0080103 A1 | 4/2006 | Van Breemen |

(56) References Cited

U.S. PATENT DOCUMENTS

| | | |
|---|---|---|
| 2006/0083387 A1 | 4/2006 | Emoto |
| 2006/0083388 A1 | 4/2006 | Rothschild |
| 2006/0083390 A1 | 4/2006 | Kaderavek et al. |
| 2006/0083395 A1 | 4/2006 | Allen et al. |
| 2006/0086236 A1 | 4/2006 | Ruby et al. |
| 2006/0088176 A1 | 4/2006 | Werner, Jr. |
| 2006/0092043 A1 | 5/2006 | Lagassey |
| 2006/0093997 A1* | 5/2006 | Kearby ................ G09B 21/009 |
| | | 381/60 |
| 2006/0095199 A1 | 5/2006 | Lagassey |
| 2006/0116073 A1 | 6/2006 | Richenstein et al. |
| 2006/0116175 A1 | 6/2006 | Chu |
| 2006/0116877 A1 | 6/2006 | Pickering et al. |
| 2006/0120545 A1 | 6/2006 | Rasmussen |
| 2006/0126821 A1 | 6/2006 | Sahashi |
| 2006/0126865 A1 | 6/2006 | Blamey et al. |
| 2006/0132382 A1* | 6/2006 | Jannard ................ G02C 11/06 |
| | | 345/8 |
| 2006/0140425 A1 | 6/2006 | Berg et al. |
| 2006/0143455 A1 | 6/2006 | Gitzinger |
| 2006/0147063 A1 | 7/2006 | Chen |
| 2006/0153394 A1 | 7/2006 | Beasley |
| 2006/0154642 A1 | 7/2006 | Scannell, Jr. |
| 2006/0165040 A1 | 7/2006 | Rathod et al. |
| 2006/0166716 A1* | 7/2006 | Seshadri ................ H04R 5/033 |
| | | 455/575.2 |
| 2006/0167687 A1 | 7/2006 | Kates |
| 2006/0168259 A1 | 7/2006 | Spilotro et al. |
| 2006/0173563 A1 | 8/2006 | Borovitski |
| 2006/0173683 A1 | 8/2006 | Roth et al. |
| 2006/0182287 A1 | 8/2006 | Schulein et al. |
| 2006/0182295 A1 | 8/2006 | Dijkstra et al. |
| 2006/0184369 A1* | 8/2006 | Levonas ................ G09B 5/04 |
| | | 704/275 |
| 2006/0184983 A1 | 8/2006 | Casey |
| 2006/0188075 A1 | 8/2006 | Peterson |
| 2006/0188105 A1 | 8/2006 | Baskerville et al. |
| 2006/0188116 A1* | 8/2006 | Frerking ................ H04W 88/02 |
| | | 381/315 |
| 2006/0193450 A1 | 8/2006 | Flynt et al. |
| 2006/0195322 A1 | 8/2006 | Broussard et al. |
| 2006/0204014 A1 | 9/2006 | Iseberg et al. |
| 2006/0206340 A1 | 9/2006 | Silvera et al. |
| 2006/0223502 A1 | 10/2006 | Doulton |
| 2006/0223547 A1 | 10/2006 | Chin et al. |
| 2006/0233413 A1 | 10/2006 | Nam |
| 2006/0235938 A1 | 10/2006 | Pennell et al. |
| 2006/0241948 A1 | 10/2006 | Abrash et al. |
| 2006/0242584 A1 | 10/2006 | Johanson et al. |
| 2006/0245610 A1* | 11/2006 | Chalupper ............. H04R 25/70 |
| | | 381/321 |
| 2006/0253782 A1 | 11/2006 | Stark et al. |
| 2006/0258325 A1 | 11/2006 | Tsutaichi et al. |
| 2006/0262935 A1 | 11/2006 | Goose et al. |
| 2006/0262938 A1 | 11/2006 | Gauger et al. |
| 2006/0262944 A1 | 11/2006 | Rasmussen et al. |
| 2006/0264176 A1 | 11/2006 | Hong |
| 2006/0273930 A1 | 12/2006 | Godden |
| 2006/0274166 A1 | 12/2006 | Lee et al. |
| 2006/0285709 A1 | 12/2006 | Barthel |
| 2006/0287014 A1 | 12/2006 | Matsuura et al. |
| 2007/0003090 A1 | 1/2007 | Anderson |
| 2007/0009122 A1 | 1/2007 | Hamacher |
| 2007/0009127 A1 | 1/2007 | Klemenz et al. |
| 2007/0014423 A1 | 1/2007 | Darbut et al. |
| 2007/0019817 A1 | 1/2007 | Siltmann |
| 2007/0021148 A1 | 1/2007 | Mahini |
| 2007/0021958 A1 | 1/2007 | Visser et al. |
| 2007/0025194 A1 | 2/2007 | Morse |
| 2007/0027676 A1 | 2/2007 | Chambers et al. |
| 2007/0036377 A1 | 2/2007 | Stirnemann |
| 2007/0038457 A1 | 2/2007 | Hwang et al. |
| 2007/0041589 A1 | 2/2007 | Patel et al. |
| 2007/0043563 A1 | 2/2007 | Comerford et al. |
| 2007/0043667 A1 | 2/2007 | Qawami |
| 2007/0076896 A1 | 4/2007 | Hosaka et al. |
| 2007/0079692 A1 | 4/2007 | Glatt |
| 2007/0082658 A1 | 4/2007 | Tengler et al. |
| 2007/0086600 A1 | 4/2007 | Boesen |
| 2007/0088727 A1 | 4/2007 | Kindig |
| 2007/0092087 A1 | 4/2007 | Bothra et al. |
| 2007/0092089 A1 | 4/2007 | Seefeldt et al. |
| 2007/0100637 A1 | 5/2007 | McCune |
| 2007/0124142 A1 | 5/2007 | Mukherjee |
| 2007/0127660 A1 | 6/2007 | Roberts et al. |
| 2007/0135096 A1 | 6/2007 | Sampath |
| 2007/0136140 A1 | 6/2007 | Smith, Jr. |
| 2007/0142024 A1* | 6/2007 | Clayton ................ H04H 20/62 |
| | | 709/219 |
| 2007/0143820 A1 | 6/2007 | Pawlowski |
| 2007/0147635 A1 | 6/2007 | Dijkstra et al. |
| 2007/0150286 A1 | 6/2007 | Miller |
| 2007/0156063 A1* | 7/2007 | Zoth ...................... A61B 5/126 |
| | | 600/559 |
| 2007/0160243 A1 | 7/2007 | Dijkstra et al. |
| 2007/0165875 A1 | 7/2007 | Rezvani et al. |
| 2007/0169115 A1 | 7/2007 | Ko |
| 2007/0172087 A1 | 7/2007 | Olsen |
| 2007/0177743 A1 | 8/2007 | Mertens |
| 2007/0185601 A1 | 8/2007 | Lee et al. |
| 2007/0189544 A1 | 8/2007 | Rosenberg |
| 2007/0194893 A1 | 8/2007 | Deyoe |
| 2007/0198267 A1 | 8/2007 | Jones et al. |
| 2007/0201705 A1 | 8/2007 | Dorogusker et al. |
| 2007/0206247 A1 | 9/2007 | Kaplan |
| 2007/0206825 A1 | 9/2007 | Thomasson |
| 2007/0206826 A1 | 9/2007 | Gerhard |
| 2007/0223717 A1 | 9/2007 | Boersma |
| 2007/0225035 A1 | 9/2007 | Gauger et al. |
| 2007/0230734 A1 | 10/2007 | Beard |
| 2007/0233487 A1 | 10/2007 | Cohen et al. |
| 2007/0239294 A1 | 10/2007 | Brueckner et al. |
| 2007/0253569 A1 | 11/2007 | Bose |
| 2007/0255435 A1* | 11/2007 | Cohen ................ H04R 25/505 |
| | | 700/94 |
| 2007/0260460 A1 | 11/2007 | Hyatt |
| 2007/0269037 A1 | 11/2007 | Gardiner et al. |
| 2007/0274531 A1 | 11/2007 | Camp |
| 2007/0281744 A1 | 12/2007 | Andreasson |
| 2007/0283033 A1 | 12/2007 | Bloebaum et al. |
| 2007/0291953 A1 | 12/2007 | Ngia et al. |
| 2007/0294122 A1 | 12/2007 | Johnston |
| 2007/0297634 A1* | 12/2007 | Hansson ............. H04R 1/1041 |
| | | 381/384 |
| 2008/0010372 A1 | 1/2008 | Khedouri |
| 2008/0037801 A1 | 2/2008 | Alves et al. |
| 2008/0063228 A1 | 3/2008 | Mejia et al. |
| 2008/0069369 A1 | 3/2008 | Dyer |
| 2008/0079571 A1 | 4/2008 | Samadani |
| 2008/0089530 A1 | 4/2008 | Bostick et al. |
| 2008/0091421 A1 | 4/2008 | Gustavsson |
| 2008/0101638 A1 | 5/2008 | Ziller |
| 2008/0107282 A1 | 5/2008 | Asada |
| 2008/0107297 A1 | 5/2008 | Fischer et al. |
| 2008/0123866 A1 | 5/2008 | Rule et al. |
| 2008/0125172 A1 | 5/2008 | Leon et al. |
| 2008/0129520 A1 | 6/2008 | Lee |
| 2008/0130908 A1 | 6/2008 | Cohen et al. |
| 2008/0137873 A1 | 6/2008 | Goldstein |
| 2008/0145032 A1 | 6/2008 | Lindroos et al. |
| 2008/0152167 A1 | 6/2008 | Taenzer |
| 2008/0152169 A1 | 6/2008 | Asada et al. |
| 2008/0159547 A1 | 7/2008 | Schuler et al. |
| 2008/0162133 A1 | 7/2008 | Couper et al. |
| 2008/0165988 A1 | 7/2008 | Terlizzi et al. |
| 2008/0175411 A1 | 7/2008 | Greve |
| 2008/0181419 A1 | 7/2008 | Goldstein et al. |
| 2008/0201138 A1 | 8/2008 | Msser et al. |
| 2008/0216002 A1 | 9/2008 | Morita |
| 2008/0221880 A1 | 9/2008 | Cerra et al. |
| 2008/0240458 A1 | 10/2008 | Goldstein et al. |
| 2008/0257047 A1 | 10/2008 | Pelecanos et al. |
| 2008/0260180 A1 | 10/2008 | Goldstein et al. |

(56) References Cited

U.S. PATENT DOCUMENTS

| | | |
|---|---|---|
| 2008/0269926 A1 | 10/2008 | Xiang et al. |
| 2009/0010456 A1 | 1/2009 | Goldstein et al. |
| 2009/0016501 A1 | 1/2009 | May et al. |
| 2009/0016541 A1 | 1/2009 | Goldstein et al. |
| 2009/0024234 A1 | 1/2009 | Archibald |
| 2009/0034748 A1 | 2/2009 | Sibbald |
| 2009/0046867 A1 | 2/2009 | Clemow |
| 2009/0067661 A1 | 3/2009 | Keady et al. |
| 2009/0071487 A1 | 3/2009 | Keady |
| 2009/0076821 A1 | 3/2009 | Brenner et al. |
| 2009/0076881 A1 | 3/2009 | Svendsen |
| 2009/0077052 A1 | 3/2009 | Farrelly |
| 2009/0085873 A1 | 4/2009 | Betts et al. |
| 2009/0087003 A1 | 4/2009 | Zurek et al. |
| 2009/0122996 A1 | 5/2009 | Klein et al. |
| 2009/0150935 A1 | 6/2009 | Peters et al. |
| 2009/0175474 A1 | 7/2009 | Salvetti et al. |
| 2009/0180631 A1 | 7/2009 | Michael et al. |
| 2009/0192688 A1 | 7/2009 | Padmanabhan et al. |
| 2009/0227888 A1 | 9/2009 | Salmi et al. |
| 2009/0238386 A1 | 9/2009 | Usher et al. |
| 2009/0274314 A1 | 11/2009 | Arndt et al. |
| 2009/0286515 A1 | 11/2009 | Othmer |
| 2009/0319267 A1 | 12/2009 | Kurki-Suonio |
| 2010/0061564 A1 | 3/2010 | Clemow et al. |
| 2010/0077441 A1 | 3/2010 | Thomas et al. |
| 2010/0119077 A1 | 5/2010 | Platz et al. |
| 2010/0150367 A1 | 6/2010 | Mizuno |
| 2010/0166203 A1 | 7/2010 | Peissig et al. |
| 2010/0223223 A1 | 9/2010 | Sandler et al. |
| 2010/0241256 A1 | 9/2010 | Goldstein et al. |
| 2010/0296668 A1 | 11/2010 | Lee et al. |
| 2010/0299590 A1 | 11/2010 | Gissler et al. |
| 2010/0311390 A9 | 12/2010 | Black et al. |
| 2010/0316033 A1 | 12/2010 | Atwal |
| 2010/0328224 A1 | 12/2010 | Kerr et al. |
| 2011/0026724 A1 | 2/2011 | Doclo |
| 2011/0055256 A1 | 3/2011 | Phillips et al. |
| 2011/0079227 A1 | 4/2011 | Turcot et al. |
| 2011/0096939 A1 | 4/2011 | Ichimura |
| 2011/0116643 A1 | 5/2011 | Tiscareno et al. |
| 2011/0125063 A1 | 5/2011 | Shalon et al. |
| 2011/0135120 A1 | 6/2011 | Larsen et al. |
| 2011/0187640 A1 | 8/2011 | Jacobsen et al. |
| 2011/0264447 A1 | 10/2011 | Visser et al. |
| 2011/0288860 A1 | 11/2011 | Schevciw et al. |
| 2011/0293103 A1 | 12/2011 | Park et al. |
| 2011/0299695 A1 | 12/2011 | Nicholson |
| 2012/0076317 A1 | 3/2012 | Fratti et al. |
| 2012/0109630 A1 | 5/2012 | Badino et al. |
| 2012/0150538 A1 | 6/2012 | Proux et al. |
| 2012/0170412 A1 | 7/2012 | Calhoun et al. |
| 2013/0056295 A1 | 3/2013 | Campbell et al. |
| 2013/0098706 A1 | 4/2013 | Keady |
| 2013/0136285 A1 | 5/2013 | Naumann |
| 2013/0149192 A1 | 6/2013 | Keady |
| 2013/0219345 A1 | 8/2013 | Saukko et al. |
| 2013/0251172 A1 | 9/2013 | Mosseri |
| 2013/0289986 A1 | 10/2013 | Graylin |
| 2014/0003644 A1 | 1/2014 | Keady et al. |
| 2014/0010378 A1 | 1/2014 | Voix et al. |
| 2014/0023203 A1 | 1/2014 | Rothschild |
| 2014/0026665 A1 | 1/2014 | Keady |
| 2014/0089672 A1 | 3/2014 | Luna et al. |
| 2014/0122092 A1 | 5/2014 | Goldstein |
| 2014/0126748 A1 | 5/2014 | Usher et al. |
| 2014/0148101 A1 | 5/2014 | Seshadri et al. |
| 2014/0163976 A1 | 6/2014 | Park et al. |
| 2014/0166122 A1 | 6/2014 | Goldstein et al. |
| 2014/0169582 A1* | 6/2014 | Brown .............. H04R 1/1041 |
| | | 381/74 |
| 2014/0205123 A1 | 7/2014 | Lafort et al. |
| 2014/0270200 A1 | 9/2014 | Usher et al. |
| 2014/0372109 A1 | 12/2014 | Iyer |
| 2014/0373854 A1 | 12/2014 | Keady |

| | | |
|---|---|---|
| 2015/0150728 A1 | 6/2015 | Duvall |
| 2015/0170645 A1 | 6/2015 | Di et al. |
| 2015/0195641 A1 | 7/2015 | Di et al. |
| 2015/0215701 A1 | 7/2015 | Usher |
| 2015/0358730 A1 | 12/2015 | Kirsch et al. |
| 2016/0012714 A1 | 1/2016 | Patenaude et al. |
| 2016/0015568 A1 | 1/2016 | Keady |
| 2016/0019024 A1 | 1/2016 | Suzuki et al. |
| 2016/0050483 A1 | 2/2016 | Kulavik et al. |
| 2016/0057551 A1 | 2/2016 | Higgins et al. |
| 2016/0058378 A1 | 3/2016 | Wisbey et al. |
| 2016/0104452 A1 | 4/2016 | Guan et al. |
| 2016/0127818 A1 | 5/2016 | Ambrose |
| 2016/0192077 A1 | 6/2016 | Keady |
| 2016/0249128 A1 | 8/2016 | Goldstein |
| 2016/0269817 A1 | 9/2016 | Basseas et al. |
| 2016/0277854 A1 | 9/2016 | Puria et al. |
| 2016/0295311 A1 | 10/2016 | Keady et al. |
| 2017/0134865 A1 | 5/2017 | Goldstein et al. |
| 2017/0142511 A1 | 5/2017 | Dennis |
| 2017/0223451 A1 | 8/2017 | Kirsch et al. |
| 2018/0054668 A1 | 2/2018 | Keady |
| 2018/0115818 A1 | 4/2018 | Asada et al. |
| 2018/0132048 A1 | 5/2018 | Usher et al. |
| 2018/0160211 A1 | 6/2018 | Kirsch et al. |
| 2018/0220239 A1 | 8/2018 | Keady et al. |
| 2018/0233125 A1 | 8/2018 | Mitchell et al. |
| 2018/0349502 A1 | 12/2018 | Maycock |
| 2019/0038224 A1 | 2/2019 | Zhang et al. |
| 2019/0082272 A9 | 3/2019 | Goldstein et al. |
| 2019/0387305 A1 | 12/2019 | Keady |
| 2020/0379717 A1 | 12/2020 | Mazur et al. |
| 2020/0380945 A1 | 12/2020 | Woodruff et al. |
| 2021/0014597 A1 | 1/2021 | Andersen et al. |
| 2021/0152924 A1 | 5/2021 | Keady |
| 2022/0036405 A1 | 2/2022 | Publicover et al. |
| 2022/0061767 A1 | 3/2022 | Goldstein et al. |
| 2022/0217528 A1 | 7/2022 | Shapiro et al. |

FOREIGN PATENT DOCUMENTS

| | | | |
|---|---|---|---|
| CA | 1169969 A | 6/1984 | |
| CA | 2215764 | 11/1996 | |
| CA | 2448669 A1 | 12/2002 | |
| CA | 2643115 A1 * | 9/2007 | ........... H04R 25/356 |
| CA | 2643326 A1 * | 9/2007 | ........... H04R 25/453 |
| CA | 2382362 C * | 6/2009 | ........... H04R 25/356 |
| CA | 2418031 C * | 3/2010 | ........... H04R 1/1083 |
| CN | 101044793 A * | 9/2007 | ............. H04R 25/70 |
| CN | 100374096 C * | 3/2008 | ............. A61F 11/00 |
| CN | 102647647 A * | 8/2012 | |
| DE | 4312155 | 10/1994 | |
| DE | 102012221233 | 3/2014 | |
| DE | 102013203334 | 5/2014 | |
| EP | 0495653 A1 | 7/1992 | |
| EP | 0643881 A1 | 3/1995 | |
| EP | 0692169 A1 | 1/1996 | |
| EP | 0935236 A1 | 8/1999 | |
| EP | 1033063 B1 | 5/2003 | |
| EP | 1320281 A2 | 6/2003 | |
| EP | 1385324 A1 | 1/2004 | |
| EP | 1401240 A1 | 3/2004 | |
| EP | 1415505 A1 | 5/2004 | |
| EP | 1483591 A2 | 12/2004 | |
| EP | 1489596 A1 | 12/2004 | |
| EP | 1519625 A2 | 3/2005 | |
| EP | 1570244 A1 | 9/2005 | |
| EP | 1594344 A2 | 11/2005 | |
| EP | 1603316 A2 | 12/2005 | |
| EP | 1638079 A2 | 3/2006 | |
| EP | 1640972 A1 | 3/2006 | |
| EP | 1674061 A1 | 6/2006 | |
| EP | 1681903 A2 | 7/2006 | |
| EP | 1800950 A2 | 6/2007 | |
| EP | 1841283 A2 | 10/2007 | |
| EP | 1322268 B1 | 1/2009 | |
| EP | 1313417 B1 | 2/2009 | |
| EP | 1313418 B1 | 3/2009 | |
| EP | 2749043 A1 | 7/2014 | |

(56) References Cited

FOREIGN PATENT DOCUMENTS

| EP | 2991381 | A1 | | 3/2016 |
|----|---------|----|----|--------|
| EP | 3068142 | A1 | | 9/2016 |
| ES | 2312851 | T3 | | 2/2009 |
| FR | 2560520 | A1 | | 9/1985 |
| GB | 1518299 | A | | 7/1978 |
| GB | 2082820 | A | | 3/1982 |
| GB | 2155276 | A | | 9/1985 |
| GB | 2253082 | A | | 8/1992 |
| GB | 2441835 | A | | 3/2008 |
| JP | 02-097362 | A | | 4/1990 |
| JP | 05-145623 | A | | 6/1993 |
| JP | 05-199590 | A | | 8/1993 |
| JP | 05-336599 | A | | 12/1993 |
| JP | 08-077468 | A | | 3/1996 |
| JP | 10-162283 | A | | 6/1998 |
| JP | 10-294989 | A | | 11/1998 |
| JP | 11-331990 | A | | 11/1999 |
| JP | 2000508217 | A | * | 7/2000 |
| JP | 3085237 | B2 | | 9/2000 |
| JP | 2001-045585 | A | | 2/2001 |
| JP | 2001-054184 | A | | 2/2001 |
| JP | 2002-204500 | A | | 7/2002 |
| JP | 3353701 | B2 | | 12/2002 |
| JP | 2003-304599 | A | | 10/2003 |
| JP | 3556987 | B2 | | 8/2004 |
| JP | 2004-289762 | A | | 10/2004 |
| JP | 2005503638 | A | * | 2/2005 |
| JP | 2005-064744 | A | | 3/2005 |
| JP | 2005-130205 | A | | 5/2005 |
| JP | 2005-168888 | A | | 6/2005 |
| JP | 2005-227511 | A | | 8/2005 |
| JP | 2005-260944 | A | | 9/2005 |
| JP | 2005-295175 | A | | 10/2005 |
| JP | 2006-107044 | A | | 4/2006 |
| JP | 2006331533 | A | * | 12/2006 |
| JP | 3938322 | B2 | * | 6/2007 ........... H04R 25/453 |
| JP | 2009-003040 | A | | 1/2009 |
| JP | 4464391 | B2 | | 5/2010 |
| JP | 5247062 | B2 | | 7/2013 |
| JP | 2017-147677 | A | | 8/2017 |
| KR | 100347595 | B1 | * | 8/2002 |
| KR | 10-2002-0086433 | A | | 11/2002 |
| KR | 10-0366231 | B1 | | 12/2002 |
| KR | 10-2003-0013732 | A | | 2/2003 |
| KR | 10-2003-0058432 | A | | 7/2003 |
| KR | 10-2003-0068021 | A | | 8/2003 |
| KR | 10-2003-0069471 | A | | 8/2003 |
| KR | 10-0607492 | B1 | | 8/2006 |
| KR | 10-0783099 | B1 | | 12/2007 |
| KR | 10-1154948 | B1 | | 6/2012 |
| KR | 10-1194923 | B1 | | 10/2012 |
| TW | 200615862 | A | | 5/2006 |
| WO | 86/00133 | A1 | | 1/1986 |
| WO | 93/26084 | A1 | | 12/1993 |
| WO | 93/26085 | A1 | | 12/1993 |
| WO | 94/23520 | A1 | | 10/1994 |
| WO | 97/25790 | A2 | | 7/1997 |
| WO | 98/54878 | A1 | | 12/1998 |
| WO | 99/43185 | A1 | | 8/1999 |
| WO | 00/37156 | A1 | | 6/2000 |
| WO | 01/01731 | A1 | | 1/2001 |
| WO | 01/24576 | A1 | | 4/2001 |
| WO | 01/57852 | A1 | | 8/2001 |
| WO | 01/89083 | A1 | | 11/2001 |
| WO | 02/13522 | A2 | | 2/2002 |
| WO | 02/17835 | A1 | | 3/2002 |
| WO | 02/17836 | A1 | | 3/2002 |
| WO | 02/93891 | A1 | | 11/2002 |
| WO | 2002/101720 | A1 | | 12/2002 |
| WO | 03/23766 | A2 | | 3/2003 |
| WO | 03/56790 | A1 | | 7/2003 |
| WO | 03/73790 | A1 | | 9/2003 |
| WO | 03/96031 | A2 | | 11/2003 |
| WO | 2004/016037 | A1 | | 2/2004 |
| WO | 2004/053435 | A1 | | 6/2004 |
| WO | 2004/114722 | A1 | | 12/2004 |
| WO | 2005/029468 | A1 | | 3/2005 |
| WO | 2005/073875 | A1 | | 8/2005 |
| WO | 2005/107320 | A1 | | 11/2005 |
| WO | 2006/026812 | A2 | | 3/2006 |
| WO | 2006/034029 | A2 | | 3/2006 |
| WO | 2006/036262 | A2 | | 4/2006 |
| WO | 2006037156 | A1 | | 4/2006 |
| WO | 2006/054205 | A1 | | 5/2006 |
| WO | 2006/054698 | A1 | | 5/2006 |
| WO | 2006/074082 | A1 | | 7/2006 |
| WO | 2006/097099 | A1 | | 9/2006 |
| WO | 2006/114101 | A1 | | 11/2006 |
| WO | 2007/007916 | A1 | | 1/2007 |
| WO | 2007/017809 | A1 | | 2/2007 |
| WO | 2007/017810 | A2 | | 2/2007 |
| WO | 2007/028250 | A2 | | 3/2007 |
| WO | 2007/073818 | A1 | | 7/2007 |
| WO | 2007/082579 | A2 | | 7/2007 |
| WO | 2007/092660 | A1 | | 8/2007 |
| WO | 2007/112838 | A1 | | 10/2007 |
| WO | 2007/147077 | A2 | | 12/2007 |
| WO | 2008/017326 | A1 | | 2/2008 |
| WO | 2008/050583 | A1 | | 5/2008 |
| WO | 2008/067454 | A2 | | 6/2008 |
| WO | 2008/096125 | A2 | | 8/2008 |
| WO | 2009/023633 | A1 | | 2/2009 |
| WO | 2009/023784 | A1 | | 2/2009 |
| WO | 2009/097009 | A1 | | 8/2009 |
| WO | 2011/110901 | A1 | | 9/2011 |
| WO | 2011/161487 | A1 | | 12/2011 |
| WO | 2012/097150 | A1 | | 7/2012 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

Zeadally et al., "Protocol support for audio streaming between bluetooth devices" Radio and Wireless Conference IEEE, 2004 pp. 303-306.

Elias Pampalk, Tim Pohle, and Gerhard Widmer, "Dynamic Playlist Generation Based On Skipping Behavior", Published in: Proc. of the 6th International Society for Music Information Retrieval (ISMIR) Conference, 2005.

Provisional Patent Application for U.S. Appl. No. 60/805,985, filed Jun. 28, 2006.

Zotkin et al., "Creation of Virtual Auditory Spaces", Acoustics Speech and Signal Processing (ICASSP), May 2002.

Begault et al., "Direct Comparison of the Impact of Head Tracking, Reverberation, and Individualized Head-Related Transfer Functions on the Spatial Perception of a Virtual Speech Source", J. Audio Eng. Soc., vol. 49, No. 10, Oct. 2001.

Nov. 3, 2022 [16] Notice of Deposition of David Kleinschmidt, Exhibit-16, Filed on Nov. 3, 2022—Cited in IPR2022-00282, challenging U.S. Pat. No. 8,315,400, 3 pages.

3M/Aearo Technologies' E-A-RFitTM Dual-Ear Validation System ("E-A-RFit"), Sept. 4, 2015 WayBack Machine capture of 3M's website contains an image of the E-A-RFit and states "[t]he 3M™ E-A-Rfit™ Dual Ear Validation System makes. . . " https://web. archive.org/web/20150904132810/ http:/solutions.3m.com/wps/ portal/3M/en_US/3M-PPE-Safety-Solutions/Personal-Protective-Equipment/safety-management/safety-training/hearing-protection-fit-testing/?WT.mc_id=www.3m.com/EARfitDe mo/ (SAM-TECH_ 00052276; SAM-TECH ; SAM-TECH 00052239), 2 pgs.

3M/Aearo Technologies' E-A-RFitTM Validation System ("E-A-RFit"), 2010 brochure from 3M' s website describes the E-A-RFit and identifies model 393-1000 as an available mode. https://

(56) References Cited

OTHER PUBLICATIONS multimedia.3m.com/mws/media/62914 90/3m-e-a-rfit-validation-system-brochure.pdf (SAM-TECH 00052186), 5 pages.
3M/Aearo Technologies' E-A-RFitTM Validation System ("E-A-RFit"), Abstract titled "New from ISEA member 3M Company (www.3m.com] is the E-A-Rfit Validation System a quantitative hearing protector fittest", publ. in Jul. 2012. New from ISEA member 3M Company (www.3m.com] is the E-A-Rfit Validation System a quantitative hearing Protector fittest, EHS today, vol. 5, Iss.7, ISSN 1945-9599, Gale Group Trade & Industry Database (Jul. 2012), avail. at https://dialog.proquest.com/professional/docview/1095272736?accountid=154502 (SAM-TECH_00052203), 1 pg.
3M/Aearo Technologies' E-A-RFitTM Validation System ("E-A-RFit"), Apr. 24, 2007 article publ. by E.H. Berger from Aearo Technologies discusses E- A-RFit and notes that "[t]he E-A-RFitTM Validation System is a quick and accurate Method of estimating real-ear attenuation for a given fitting of a pair of earplugs" and "has been designed and built to be an integral . . . " See E.H. Berger, Recommended Applications for the E-A-RFitTM Validation System in a Workplace Hearing Conservation Program, Aearo Company (2007) (SAM-TECH_00056087-SAM-TECH_0005609), 6 pgs.
3M/Aearo Technologies' E-A-RFitTM Validation System ("E-A-RFit"), Mar. 16, 2016 WayBack Machine capture of 3M's website lists the E-A-RFit for purchase. https://web.archive.org/web/20160316180537/ http://www.3m.com/3M/en_US/company-us/all-3m-products/-/All-3M-Products/Personal-Protective-Equipment/Hearing-Protection/Safety/Worker-Health-Safety/E-A-R-Fit-Validation-Tools/?N=5002385+8709322+8711017+8711405+8720539+8720546 +8720770+ 329 4857497&rt=r3 (SAM-TECH 00052201), 1 pages.
3M/Aearo Technologies' E-A-RFitTM Validation System ("E-A-RFit"), Mar. 20, 2016 WayBack Machine capture of 3M's website describes the Validation System and protection that the system offers. https://web.archive.org/web/20160320080156/ http:/www.3m.com/3M/en_US/company-us/all-3m-products/-/All-3M- Products/Personal-Protective—Equipment/Hearing—Protection/Safety/Worker—Health—Safety/?N=5002385+8709322+8711017+871 1405 +8720539+8720546+3294857497&rt=r3 (SAM-TECH_00052278; SAM-TECH 00052292), 2 pages.
3M/Aearo Technologies' E-A-RFitTM Validation System ("E-A-RFit"), Sep. 10, 2015 WayBack Machine capture of 3M's website depicts a brochure describing the E-A-RFit and "Individual Fit Testing Using F-Mire." https://web. archive.org/web/20150910084252/ http:/multimedia.3m.com/mws/media/ 10622 670/earfit-dual-ear-brochure- US.pdf? fn=EARfit%20Dual- Ear%20Brochure%20US.pdf (SAM-TECH_00052333 - SAM-TECH_00052336; Sam-Tech 00052339 - SAM-TECH 00052339), 5 pages.
400 Patent Family Tree, Exhibit—1009, Filed on Dec. 10, 2021—Cited in IPR2022-00282, challenging U.S. Pat. No. 8,315,400, 1 pages.
U.S. Appl. No. 90/015,146, Samsung Electronics Co, Ltd. and Samsung Electronics, America, Inc, Request for Ex Parte Reexamination of U.S. Pat. No. 10,979,836, 133 pages.
U.S. Appl. No. 90/019,169, Samsung Electronics Co, Ltd. and Samsung Electronics, America, Inc, Request For Ex Parte Reexamination Of U.S. Pat. No. 11,244,666, 148 pages.
A binaural processor for missing data speech recognition in the presence of noise and small-room reverberation, Kalle Palomaki, Guy Brown & Deliang Wang, Speech Communication, 43, Sep. 2004, pp. 361-378.
A compact multi-sensor headset for hands-free communication, Liu, Zicheng & Seltzer, Michael & Acero, A. & Tashev, Ivan & Zhang, Zhengyou & Sinclair, Michael, IEEE Workshop on Applications of Signal Processing to Audio and Acoustics, 138 - 141. 10.1109/ASPAA.2005.1540188, 5 pages.
A Dual—Mode Human—Machine Interface for Robotic Control Based on Acoustic Sensitivity of the Aural Cavity—Ravi Vaidyanathan, et al., Feb. 2006, 7 pages.

A Dual-Mode Human-Machine Interface for Robotic Control Based on Acoustic Sensitivity of the Aural Cavity Claim Chart (Exhibit N49 to Samsung's Invalidity Contentions), 2006, 7 pages.
A Local Active Noise Control System for Locomotive Drivers, internoise 2000, the 29th International Congress and Exhibition on Noise Control Enginerring, Nielsen, Saebo, Ottesen, Reinen, Sorsdal, Aug. 2000, 4 pages.
A MFCC-based CELP speech coder for server-based speech recognition in network environments, Yoon, Jae Sam, Gil Ho Lee, and Hong Kook Kim, Ieice Transactions on Fundamentals of Electronics, Communications and Computer Sciences 90.3, 626-632, Mar. 2007, 7 pages.
A Modified Coherence Based Method for Dual Microphone Speech Enhancement, M. Rahmani, et al., Signal Processing and Communications, 2007, 4 pages.
A New Two—Sensor Active Noise Cancellation Algorithm, K.C. Zangi, 1993 IEEE International Conference on Acoustics, Speech, and Signal Processing, Minneapolis, MN, USA, 1993, pp. 351-354 vol.2, doi: 10, 4 pages.
A Pattern Recognition Approach to Voiced-Unvoiced-Silence Classification with Applications to Speech Recognition, B. Atal and L. Rabiner, IEEE Transactions on Acoustics, Speech, and Signal Processing, vol. 24, No. 3, pp. 201-212, Jun. 1976, 12 pages.
Aarts, Exhibit—1015, Filed on Jan. 14, 2022—Cited in IPR2022-00410, challenging U.S. Pat. No. 10,979,836, 12 pages.
Active Noise Attenuation Using LQG/LTR Control, Garcia, Jose & Bortoloto, Edson & Ribeiro, Jean & GARCIA, Eletronica de Potencia. 9. 23-27, Eletronica de Potencia. 9. 23-27. 10.18618/REP. 2005.2.023027, Nov. 2004, 5 pages.
Active Noise Cancellation for Headphones Used in High Noise Environments Using Conventional Analog Circuitry, Mark C. Flohr, May 1, 1987, 74 pages.
Active Noise Control System for Headphone Applications Sen M. Kuo, et al. 2006, 5 pages.
Active Noise Control: Low—Frequency Techniques for Suppressing Acoustic Noise Leap Forward with Signal Processing, S.J. Elliott and P.A. Nelson, Oct. 1993, 24 pages.
Active Noise Reduction Headphone Measurement: Comparison Of Physical And Psychophysical Protocols And Effects Of Microphone Placement, Perala, Apr. 10, 2006, 204 pages.
Active noise Reduction in an ear terminal, Ottesen, The Journal of the Acoustical Society of America, vol. 105, Issue 2, Feb. 1999, 4 pages.
Adaptive Feedback Active Noise Control Headset: Implementation, Evaluation, and its Extensions, Woon S. Gan, et al. 2005, 8 pages.
Adaptive Filtering (Dentino), Exhibit-1012, Filed on Dec. 10, 2021—Cited in IPR2022-00282, challenging U.S. Pat. No. 8,315,400, 2 pages.
Adaptive Filtering Algorithims (Diniz), Exhibit-1013, Filed on Dec. 10, 2021—Cited in IPR2022-00282, challenging U.S. Pat. No. 8,315,400, 74 pages.
Adaptive Noise Cancellation in a Multimicrophone System for Distortion Product Otoacoustic Emission Acquisition, Rafael E. Delgado, et al., 2000, 11 pages.
Adaptive Noise Cancelling (Widrow), Exhibit-1011, Filed on Dec. 10, 2021—Cited in IPR2022-00282, challenging U.S. Pat. No. 8,315,400, 26 pages.
Adaptive Noise Cancelling In Headsets, Per Rubak, Henrik D. Green & Lars G. Johansen, Proceedings of IEEE Nordic Signal Processing Symposium, NORSIG'96, Sep. 24-27, 1996, Espoo, Finland, 8 pages.
Air- and Bone-Conductive Integrated Microphones for Robust Speech Detection and Enhancement, Yanli Zheng, et al., 2003 IEEE Workshop on Automatic Speech Recognition and Understanding, 6 pages.
AirPods (1st generation)—Technical Specifications, Exhibit-2009, Filed on Sep. 13, 2022—Cited in IPR2022-00243, challenging U.S. Pat. No. 8, 111,839, 4 pages.
*Amended Complaint, Techiya v. Samsung, E.D. Tex,* Exhibit-1014, Filed on Jan. 14, 2022—Cited in IPR2022-00410, challenging U.S. Pat. No. 10,979,836, 52 pages.

(56)     References Cited

OTHER PUBLICATIONS

*Amended Complaint, Techiya* v. *Samsung, E.D. Tex,* Exhibit-1014, Filed on Dec. 21, 2021—Cited in IPR2022-00302, challenging U.S. Pat. No. 9,609,424, 52 pages.
*Amended Complaint, Techiya* v. *Samsung, E.D. Tex,* Exhibit-1017, Filed on Jan. 4, 2022—Cited in IPR2022-00388, challenging U.S. Pat. No. 10,966,015, 52 pages.
*Amended Complaint, Techiya* v. *Samsung, E.D. Tex,* Exhibit-1017, Filed on Dec. 30, 2021—Cited in IPR2022-00369, challenging U.S. Pat. No. 10,405,082, 52 pages.
Amended Docket Control Order, DN 156 from E.D. Tex, Exhibit-1023, Filed on Nov. 10, 2022—Cited in IPR2022-01099, challenging U.S. Pat. No. 11,244,666, 6 pages.
Amended Docket Control Order, DN 156 from E.D. Tex, Exhibit-1026, Filed on Nov. 10, 2022—Cited in IPR2022-01078, challenging U.S. Pat. No. 11,057,701, 6 pages.
Amended Docket Control Order, DN 156 from E.D. Tex, Exhibit-1032, Filed on Nov. 10, 2022—Cited in IPR2022-01106, challenging U.S. Pat. No. 11,039,259, 6 pages.
Amended Docket Control Order, DN 156 from E.D. Tex. 21-cv-00413, Exhibit-1029, Filed on Nov. 15, 2022—Cited in IPR2022-01098, challenging U.S. Pat. No. 11,217,237, 6 pages.
Amended Notice of Deposition of Les E. Atlas, Ph.D, Exhibit-15, Filed on Mar. 14, 2023—Cited in IPR2022-01106, challenging U.S. Pat. No. 11,039,259, 3 pages.
Amendment in U.S. Appl. No. 11/616,973, dated Apr. 13, 2015, Exhibit-2009, Filed on Oct. 11, 2022—Cited in IPR2022-01106, challenging U.S. Pat. No. 11,039,259, 10 pages.
An Integrated Audio And Active Noise Control Headsets, W. S. Gan & S. M. Kuo, IEEE Transactions on Consumer Electronics, vol. 48, No. 2, pp. 242-247, May 2002, 6 pages.
Anderson Declaration ISO MSJ of No Infringement of '259 Patent, Exhibit-2019, Filed on Aug. 14, 2023—Cited in IPR2022-01106, challenging U.S. Pat. No. 11,039,259, 2 pages.
Anderson Non-Infringement Report (excerpt, redacted), Exhibit-2020, Filed on Aug. 14, 2023—Cited in IPR2022-01106, challenging U.S. Pat. No. 11,039,259, 1 pages.
Anderson Rebuttal Report (Redacted, Excerpt), Exhibit-2017, Filed on Apr. 10, 2023—Cited in IPR2022-01106, challenging U.S. Pat. No. 11,039,259, 39 pages.
Android Central, The History of True Wireless Earbuds, Exhibit-2009, Filed on Oct. 17, 2022—Cited in IPR2022-00324, challenging U.S. Pat. No. 8,254,591, 19 pages.
Android Central, The History of True Wireless Earbuds, Exhibit-2011, Filed on Sep. 13, 2022—Cited in IPR2022-00243, challenging U.S. Pat. No. 8,111,839, 19 pages.
Appendix 10A-10C for U.S. Pat. No. 10,979,836 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.
Appendix 11A-11C for U.S. Pat. No. 11,039,259 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 12 pages.
Appendix 12A-12C for U.S. Pat. No. 11,057,701 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 14 pages.
Appendix 13A-13C for U.S. Pat. No. 11,217,237 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 23 pages.
Appendix 14A-14C for U.S. Pat. No. 11,244,666 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 15 pages.
Appendix 1A-1C for U.S. Pat. No. 8,111,839 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Appendix 2A-2C for U.S. Pat. No. 8,254,591 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 31 pages.
Appendix 3A-3C for U.S. Pat. No. 8,315,400 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 21 pages.
Appendix 4A-4C for U.S. Pat. No. 9,124,982 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.
Appendix 5A-5C for U.S. Pat. No. 9,270,244 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 22 pages.
Appendix 6A-6C for U.S. Pat. No. 9,491,542 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.
Appendix 7A-7C for U.S. Pat. No. 9,609,424 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 45 pages.
Appendix 8A-8C for U.S. Pat. Nos. 10,405,082 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 13 pages.
Appendix 9A-9Cfor U.S. Pat. No. 8,111,839 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 14 pages.
Apple's AirPods Pro ("AirPods Pro"), Article on Apple's website published Apr. 15, 2020 mentions the AirPods Pro has an Ear Tip Fit test available. https://support.apple.com/en-US/HT210633 (SAM-TECH_00072120-SAM-TECH_00072123), 4 pages.
Apple's AirPods Pro ("AirPods Pro"), article published by Dan Seifert on Mar. 29, 2019 reviews the AirPods Pro and states Apple is selling the second-gen AirPods in two ways: with the new wireless charging case for $199 or with the standard case for the same $159 as before. https://www.theverge.com/2019/3/29/182860 12/apple-airpods-2-new-2nd-gen-review-price-specs-features; (SAM-TECH_00057262-SAM-TECH_00057275), 14 pages.
Apple's AirPods Pro ("AirPods Pro"), Dec. 21, 2019 WayBack Machine capture of Apple's website displays an image of the AirPods Pro and states "[u]se the Ear Tip Fit Test to create the optimal listening experience—you'll get the right tip size for your ears, and the best seal for noise cancellation." https://web.archive.org/web/20191221170719/ https://www.apple.com/airpods-pro/ (SAM-TECH_00054447; SAM-TECH_00054134), 12 pages.
Apple's AirPods Pro ("AirPods Pro"), Nov. 2, 2019 article by Karisa Bell published on mashable.com discusses whether Apple's AirPods Pro are compatible with Androids. https://mashable.com/article/do-airpods-pro-work-with-android. (SAM-TECH_00052378-SAM-TECH_00052390), 13 pages.
Apple's AirPods Pro ("AirPods Pro"), Oct. 29, 2019 artcile by Sarah Rense also discusses testing out the AirPods Pro with active-noise cancellation. https://www.esquire.com/lifestyle/a29612084/apple-

(56) References Cited

OTHER PUBLICATIONS airpods-pro-active-noise-cancellation-review/ (SAM-TECH_00058067-SAM-TECH_00058080), 14 pages.

Apple's AirPods Pro ("AirPods Pro"), The specs of the AirPods Pro can be found here https://web.archive.org/web/20191224065355/ https://www.apple.com/airpods-pro/specs/ (SAM-TECH_00052343-SAM-TECH_00052352; SAM-TECH_00053159), May 6, 2022, 11 pages.

Apple's iPhone 11 (iPhone 11), Oct. 11, 2019 article published by Jake Peterson discusses the eartip fit test using AirPods Pro and an iPhone running iOS 13.2. https://ios.gadgethacks.com/how-to/make-your-airpods-pro-fit-better-by-testing-rubber-tips-0210500/ (SAM-TECH_00056564-SAM-TECH_00056569), 6 pages.

Apple's iPhone 11 (iPhone 11"), Press release from Apple's website dated Sep. 10, 2019 states "Apple introduces dual camera iPhone 11" and that "Customers in the US, Puerto Rico, the US Virgin Islands and more than 30 other countries and regions will be able to pre-order iPhone 11 beginning at 5 a.m. PDT on Friday, Sep. 13 with availability beginning Friday, Sep. 20." https://www.apple.com/newsroom/2019/09/apple-introduces-dual-camera-iphone-11/ (SAM-TECH_00056571-SAM-TECH_00056588), 18 pages.

Apple's iPhone 11 (iPhone 11"), Sep. 15, 2019 WayBack Machine capture of Apple's website has an image of the iPhone 11 and lists it for sale on the website. https://web.archive.org/web/20190915061032 /https://www.apple.com/shop/buy-iphone/iphone-11; (SAM-TECH_00055106-SAM-TECH_00055123), 18 pages.

Apple's iPhone 11 (iPhone 11"), WayBack Machine capture from Sep. 16, 2019 of Apple's website, displays the iPhone and states "Available 9.20." https://web.archive.org/web/20190916102733/ https://www.apple.com/iphone-11/specs/. (SAM-TECH_00056907), 1 pages.

Audiometric Ear Canal Probe with Active Ambient Noise Control, B. Rafaely & M. Furst, IEEE Transactions on Speech and Audio Processing, vol. 4, No. 3, pp. 224-230, May 1996, 7 pages.

Bang and Olufsen EarSet 2 Bluetooth Headset, At least by 2006, https://www.dexigner.com/news/9935 (SAM-TECH 00094865), 7 pages.

Bang and Olufsen EarSet 2 Bluetooth Headset, At least by 2006, https://www.beoworld.org/prod details.asp?pid=733 (SAM-TECH 00094798), 3 pages.

Berger, Preferred Methods for Measuring Hearing Protector Attenuation, Environmental Noise Control, 2005, The 2005 Congress and Exposition on Noise Control Engineering, 2005, 11 pages.

Brian Hobbs et al., Wideband Hearing, Intelligibility, and Sound Protection, Jan. 10, 2008 Final Report AFRL-RH-WP-TR-2009-0031 at 2 (SAM-TECH_00053002-116), 115 pages.

Build These Noise-Cancelling Headphones, Jules Ryckebusch, 1997, 10 pages.

C.V. of Richard Stern, Ph.D, Exhibit-1003, Filed on Jan. 4, 2022—Cited in IPR2022-00388, challenging U.S. Pat. No. 10,966,015, 30 pages.

C.V. of Richard Stern, Ph.D, Exhibit-1003, Filed on Dec. 10, 2021—Cited in IPR2022-00282, challenging U.S. Pat. No. 8,315,400, 27 pages.

CDC, What Noises Cause Hearing Loss?, Exhibit-2009, Filed on Sep. 13, 2022—Cited in IPR2022-00242, challenging U.S. Pat. No. 8,111,839, 3 pages.

Christopher J. Struck CV, Exhibit-2002, Filed on Apr. 13, 2022—Cited in IPR2022-00302, challenging U.S. Pat. No. 9,609,424, 5 pages.

Chung, Challenges and Recent Developments in Hearing Aids, Trends in Amplification, 2004, pp. 125-164, vol. 8, No. 4.

Claim Construction Order, Exhibit-2008, Filed on Feb. 22, 2023—Cited in IPR2022-00253, challenging U.S. Pat. No. 9,491,542, 51 pages.

Claim Construction Order, Exhibit-2008, Filed on Apr. 18, 2023—Cited in IPR2022-00281, challenging U.S. Pat. No. 9,270,244, 51 pages.

Claim Construction Order, Exhibit-2013, Filed on Apr. 10, 2023—Cited in IPR2022-01106, challenging U.S. Pat. No. 11,039,259, 51 pages.

Combined feedback-feedforward active noise-reducing headset-The effect of the acoustics on broadband performance, Boaz Rafaely & Matthew Jones, J. Acoust. Soc. Am. Sep. 1, 2002; 112 (3): 981-989, 10 pages.

Complaint, DN 1 from E.D. Tex. 21-cv-00413, Exhibit-1022, Filed on Nov. 10, 2022—Cited in IPR2022-01099, challenging U.S. Pat. No. 11,244,666, 49 pages.

Complaint, DN 1 from E.D. Tex. 21-cv-00413, Exhibit-1025, Filed on Nov. 10, 2022—Cited in IPR2022-01078, challenging U.S. Pat. No. 11,057,701, 49 pages.

Complaint, DN 1 from E.D. Tex. 21-cv-00413, Exhibit-1028, Filed on Nov. 15, 2022—Cited in IPR2022-01098, challenging U.S. Pat. No. 11,217,237, 49 pages.

Complaint, DN 1 from E.D. Tex. 21-cv-00413, Exhibit-1031, Filed on Nov. 10, 2022—Cited in IPR2022-01106, challenging U.S. Pat. No. 11,039,259, 2 pages.

Complaint, E.D. Tex, 22-cv-53, Exhibit-1024, Filed on May 10, 2022—Cited in IPR2022-00302, challenging U.S. Pat. No. 9,609,424, 28 pages.

Complaint, E.D. Tex, 22-cv-53, Exhibit-1032, Filed on May 11, 2022—Cited in IPR2022-00324, challenging U.S. Pat. No. 8,254,591, 28 pages.

Complaint, E.D. Tex. 22-53, Exhibit-1020, Filed on Jun. 14, 2022—Cited in IPR2022-00369, challenging U.S. Pat. No. 10,405,082, 28 pages.

Complaint, E.D. Tex. 22-53, Exhibit-1020, Filed on Jun. 14, 2022—Cited in IPR2022-00388, challenging U.S. Pat. No. 10,966,015, 28 pages.

Complaint, E.D. Tex. 22-53, Exhibit-1021, Filed on Jun. 14, 2022—Cited in IPR2022-00410, challenging U.S. Pat. No. 10,979,836, 28 pages.

*Complaint, Techiya* v. *Samsung, E.D. Tex*, Exhibit-1008, Filed on Jan. 14, 2022—Cited in IPR2022-00410, challenging U.S. Pat. No. 10,979,836, 49 pages.

*Complaint, Techiya* v. *Samsung, E.D. Tex*, Exhibit-1008, Filed on Dec. 21, 2021—Cited in IPR2022-00302, challenging U.S. Pat. No. 9,609,424, 49 pages.

Consolidation Order, E.D. Tex, Exhibit-1025, Filed on May 10, 2022—Cited in IPR2022-00302, challenging U.S. Pat. No. 9,609,424, 2 pages.

Consolidation Order, E.D. Tex, Exhibit-1033, Filed on May 11, 2022—Cited in IPR2022-00324, challenging U.S. Pat. No. 8,254,591, 7 pages.

Consolidation Order, E.D. Tex. 21-413 & 22-53, Exhibit-1021, Filed on Jun. 14, 2022—Cited in IPR2022-00369, challenging U.S. Pat. No. 10,405,082, 2 pages.

Consolidation Order, E.D. Tex. 21-413 & 22-53, Exhibit-1021, Filed on Jun. 14, 2022—Cited in IPR2022-00388, challenging U.S. Pat. No. 10,966,015, 2 pages.

Consolidation Order, E.D. Tex. 21-413 & 22-53, Exhibit-1022, Filed on Jun. 14, 2022—Cited in IPR2022-00410, challenging U.S. Pat. No. 10,979,836, 2 pages.

Corrected Declaration of Richard Stern, Ph.D, Exhibit-1002, Filed on Jan. 4, 2022—Cited in IPR2022-00388, challenging U.S. Pat. No. 10,966,015, 173 pages.

Corrected Declaration of Richard Stern, Ph.D, Exhibit-1002, Filed on Dec. 10, 2021. Cited in IPR2022-00282, challenging U.S. Pat. No. 8,315,400, 123 pages.

Corrected Petition for Inter Partes Review of U.S. Pat. No. 8,111,839, Exhibit-11, Filed on Feb. 3, 2022—Cited in IPR2022-00243, challenging U.S. Pat. No. 8,111,839, 58 pages.

Corrected Petition for Inter Partes Review of U.S. Pat. No. 8,111,839, Exhibit-12, Filed on Feb. 3, 2022—Cited in IPR2022-00242, challenging U.S. Pat. No. 8,111,839, 84 pages.

Corrected Petition for IPR of U.S. Pat. No. 8,315,400, Exhibit-4, Filed on Dec. 10, 2021—Cited in IPR2022-00282, challenging U.S. Pat. No. 8,315,400, 79 pages.

Curriculum Vitae of Christopher J. Struck, Exhibit-2002, Filed on Oct. 7, 2022—Cited in IPR2022-01078, challenging U.S. Pat. No. 11,057,701, 5 pages.

Curriculum Vitae of Christopher J. Struck, Exhibit-2002, Filed on Oct. 7, 2022—Cited in IPR2022-01098, challenging U.S. Pat. No. 11,217,237, 5 pages.

(56) References Cited

OTHER PUBLICATIONS

Curriculum Vitae of David Kleinschmidt, Exhibit-2002, Filed on Oct. 11, 2022—Cited in IPR2022-01106, challenging U.S. Pat. No. 11,039,259, 3 pages.

Curriculum Vitae of David Kleinschmidt, Exhibit-2002, Filed on Oct. 7, 2022—Cited in IPR2022-01099, challenging U.S. Pat. No. 11,244,666, 3 pages.

CV for Marshall Buck, Ph.D, Exhibit-2002, Filed on May 18, 2022—Cited in IPR2022-00369, challenging U.S. Pat. No. 10,405,082, 6 pages.

CV of Chris Kyriakakis, Ph.D, Exhibit-1003, Filed on Dec. 21, 2021—Cited in IPR2022-00302, challenging U.S. Pat. No. 9,609,424, 17 pages.

CV of Christopher J. Struck, Exhibit-2002, Filed on May 18, 2022—Cited in IPR2022-00410, challenging U.S. Pat. No. 10,979,836, 5 pages.

CV of Daniel P. Anagnos, Exhibit-2002, Filed on Mar. 23, 2022—Cited in IPR2022-00242, challenging U.S. Pat. No. 8,111,839, 7 pages.

CV of Daniel P. Anagnos, Exhibit-2002, Filed on Mar. 23, 2022—Cited in IPR2022-00243, challenging U.S. Pat. No. 8,111,839, 7 pages.

CV of Daniel P. Anagnos; Exhibit-2002, Filed on Mar. 21, 2022—Cited in IPR2022-00234, challenging U.S. Pat. No. 9,124,982, 7 pages.

CV of Dr. Chris Kyriakakis, Exhibit-1003, Filed on Jan. 14, 2022—Cited in IPR2022-00410, challenging U.S. Pat. No. 10,979,836, 17 pages.

CV of Les E. Atlas, Ph.D, Exhibit-1003, Filed on Dec. 20, 2021—Cited in IPR2022-00324, challenging U.S. Pat. No. 8,254,591, 25 pages.

CV of Les E. Atlas, Ph.D, Exhibit-1004, Filed on Dec. 13, 2021—Cited in IPR2022-00242, challenging U.S. Pat. No. 8,111,839, 25 pages.

CV of Les E. Atlas, Ph.D, Exhibit-1004, Filed on Dec. 13, 2021—Cited in IPR2022-00243, challenging U.S. Pat. No. 8,111,839, 25 pages.

CV of Marshall Buck, Ph.D, Exhibit-2002, Filed on May 18, 2022—Cited in IPR2022-00388, challenging U.S. Pat. No. 10,966,015, 6 pages.

CV of Nathaniel Polish, Ph.D, Exhibit-1003, Filed on Dec. 17, 2021—Cited in IPR2022-00253, challenging U.S. Pat. No. 9,491,542, 15 pages.

CV of Nathaniel Polish, Ph.D, Exhibit-1003, Filed on Dec. 21, 2021—Cited in IPR2022-00281, challenging U.S. Pat. No. 9,270,244, 15 pages.

CV of of Les E. Atlas, Ph.D.; Exhibit-1003, Filed on Dec. 13, 2021—Cited in IPR2022-00234, challenging U.S. Pat. No. 9,124,982, 25 pages.

CV of Richard Stern, Ph.D, Exhibit-1003, Filed on Dec. 30, 2021—Cited in IPR2022-00369, challenging U.S. Pat. No. 10,405,082, 30 pages.

Daniel P. Anagnos CV, Exhibit-2002, Filed on Apr. 13, 2022—Cited in IPR2022-00324, challenging U.S. Pat. No. 8,254,591, 7 pages.

David Kleinschmidt CV, Exhibit-2002, Filed on Mar. 21, 2022—Cited in IPR2022-00282, challenging U.S. Pat. No. 8,315,400, 3 pages.

David Kleinschmidt CV, Exhibit-2002, Filed on Apr. 18, 2022—Cited in IPR2022-00253, challenging U.S. Pat. No. 9,491,542, 3 pages.

David Kleinschmidt CV, Exhibit-2002, Filed on Apr. 18, 2022—Cited in IPR2022-00281, challenging U.S. Pat. No. 9,270,244, 3 pages.

Dec. 25, 2005 WayBack Machine Capture of Maico's website has an image of the Maico MI26 and discusses the products features. https://web.archive.org/web/20051225200404/http:/www.maico-diagnostics.com/eprise/main/Maico/Products/ Files/MI26/SpecSheet. MI24-26.NEW.pdf (SAM-TECH 00051161-SAM-Tech 00051162), 2 pages.

Decision Denying Institution of Inter Partes Review 35 U.S.C. § 314, Exhibit-10, Filed on Jan. 3, 2023—Cited in IPR2022-01099, challenging U.S. Pat. No. 11,244,666, 31 pages.

Decision Denying Institution of Inter Partes Review 35 U.S.C. § 314, Exhibit-11, Filed on Jan. 3, 2023—Cited in IPR2022-01098, challenging U.S. Pat. No. 11,217,237, 22 pages.

Decision Granting Institution of Inter Partes Review 35 U.S.C. sec 314, Exhibit-10, Filed on Dec. 29, 2022—Cited in IPR2022-01078, challenging U.S. Pat. No. 11,057,701, 41 pages.

Declaration and Affirmation of Debbie Montgomery, as presented in *Samsung* v. *Techiya*, IPR2022-00410 as Exhibit 1018, including that Declaration's attached Exhibit A (2022), 10 pages.

Declaration of Chris Kyriakakis, Ph.D, Exhibit-1002, Filed on Dec. 21, 2021—Cited in IPR2022-00302, challenging U.S. Pat. No. 9,609,424, 154 pages.

Declaration of Christopher J. Struck in Support of Patent Owner's Preliminary Response, Exhibit-2001, Filed on Oct. 7, 2022—Cited in IPR2022-01078, challenging U.S. Pat. No. 11,057,701, 48 pages.

Declaration of Christopher J. Struck in Support of Patent Owner's Preliminary Response, Exhibit-2001, Filed on Oct. 7, 2022—Cited in IPR2022-01098, challenging U.S. Pat. No. 11,217,237, 30 pages.

Declaration of Christopher J. Struck in Support of Patent Owner's Preliminary Response, Exhibit-2001, Filed on Apr. 13, 2022—Cited in IPR2022-00302, challenging U.S. Pat. No. 9,609,424, 50 pages.

Declaration of Christopher J. Struck in Support of Patent Owner's Preliminary Response, Exhibit-2001, Filed on May 18, 2022—Cited in IPR2022-00410, challenging U.S. Pat. No. 10,979,836, 38 pages.

Declaration of Christopher J. Struck in Support of Patent Owner's Response, Exhibit-2006, Filed on Oct. 17, 2022—Cited in IPR2022-00302, challenging U.S. Pat. No. 9,609,424, 53 pages.

Declaration of Christopher Struck in Support of POR, Exhibit-2013, Filed on Mar. 23, 2023—Cited in IPR2022-01078, challenging U.S. Pat. No. 11,057,701, 52 pages.

Declaration of Daniel P. Anagnos in Support of Patent Owner Response; Exhibit-2006, Filed on Sep. 9, 2022—Cited in IPR2022-00234, challenging U.S. Pat. No. 9,124,982, 57 pages.

Declaration of Daniel P. Anagnos in Support of Patent Owner's Preliminary Response, Exhibit-2001, Filed on Apr. 13, 2022—Cited in IPR2022-00324, challenging U.S. Pat. No. 8,254,591, 61 pages.

Declaration of Daniel P. Anagnos in Support of Patent Owner's Response, Exhibit-2006, Filed on Oct. 17, 2022—Cited in IPR2022-00324, challenging U.S. Pat. No. 8,254,591, 66 pages.

Declaration of Daniel P. Anagnos in Support of Patent Owner's Response, Exhibit-2006, Filed on Sep. 13, 2022—Cited in IPR2022-00242, challenging U.S. Pat. No. 8,111,839, 60 pages.

Declaration of Daniel P. Anagnos in Support of Patent Owner's Response, Exhibit-2006, Filed on Sep. 13, 2022—Cited in IPR2022-00243, challenging U.S. Pat. No. 8,111,839, 45 pages.

Declaration of Daniel P. Anagnos, Exhibit-2001, Filed on Mar. 23, 2022—Cited in IPR2022-00242, challenging U.S. Pat. No. 8,111,839, 63 pages.

Declaration of Daniel P. Anagnos, Exhibit-2001, Filed on Mar. 23, 2022—Cited in IPR2022-00243, challenging U.S. Pat. No. 8,111,839, 48 pages.

Declaration of Daniel P. Anagnos; Exhibit-2001, Filed on Mar. 21, 2022—Cited in IPR2022-00234, challenging U.S. Pat. No. 9,124,982, 64 pages.

Declaration of David Kleinschmidt in Support of Patent Owner's Preliminary Response, Exhibit-2001, Filed on Oct. 11, 2022—Cited in IPR2022-01106, challenging U.S. Pat. No. 11,039,259, 39 pages.

Declaration of David Kleinschmidt in Support of Patent Owner's Preliminary Response, Exhibit-2001, Filed on Oct. 7, 2022—Cited in IPR2022-01099, challenging U.S. Pat. No. 11,244,666, 24 pages.

Declaration of David Kleinschmidt in Support of Patent Owner's Preliminary Response, Exhibit-2001, Filed on Mar. 21, 2022—Cited in IPR2022-00282, challenging U.S. Pat. No. 8,315,400, 77 pages.

Declaration of David Kleinschmidt in Support of Patent Owner's Preliminary Response, Exhibit-2001, Filed on Apr. 18, 2022—Cited in IPR2022-00253, challenging U.S. Pat. No. 9,491,542, 47 pages.

(56) References Cited

OTHER PUBLICATIONS

Declaration of David Kleinschmidt in Support of Patent Owner's Preliminary Response, Exhibit-2001, Filed on Apr. 18, 2022—Cited in IPR2022-00281, challenging U.S. Pat. No. 9,270,244, 52 pages.
Declaration of David Kleinschmidt in Support of Patent Owner's Response, Exhibit-2006, Filed on Oct. 19, 2022—Cited in IPR2022-00253, challenging U.S. Pat. No. 9,491,542, 66 pages.
Declaration of David Kleinschmidt in Support of Patent Owner's Response, Exhibit-2006, Filed on Oct. 19, 2022—Cited in IPR2022-00281, challenging U.S. Pat. No. 9,270,244, 54 pages.
Declaration of David Kleinschmidt in Support of Patent Owner's Response, Exhibit-2009, Filed on Sep. 9, 2022—Cited in IPR2022-00282, challenging U.S. Pat. No. 8,315,400, 66 pages.
Declaration of Dr. Chris Kyriakakis, Exhibit-1002, Filed on Jan. 14, 2022—Cited in IPR2022-00410, challenging U.S. Pat. No. 10,979,836, 123 pages.
Declaration of Dr. David Anderson Regarding Claim Construction dated Oct. 21, 2022, Exhibit-2011, Filed on Nov. 8, 2022—Cited in IPR2022-00388, challenging U.S. Pat. No. 10,966,015, 81 pages.
Declaration of Dr. Eric Tarr, Exhibit-2001, Filed on Dec. 6, 2024—Cited in IPR2024-00559, challenging U.S. Pat. No. 11,610,587, 36 pages.
Declaration of Les E. Atlas, Ph.D, Exhibit-1002, Filed on Dec. 13, 2021—Cited in IPR2022-00242, challenging U.S. Pat. No. 8,111,839, 181 pages.
Declaration of Les E. Atlas, Ph.D, Exhibit-1002, Filed on Dec. 20, 2021—Cited in IPR2022-00324, challenging U.S. Pat. No. 8,254,591, 174 pages.
Declaration of Les E. Atlas, Ph.D, Exhibit-1003, Filed on Dec. 13, 2021—Cited in IPR2022-00243, challenging U.S. Pat. No. 8,111,839, 160 pages.
Declaration of Les E. Atlas, Ph.D.; Exhibit-1002, Filed on Dec. 13, 2021—Cited in IPR2022-00234, challenging U.S. Pat. No. 9,124,982, 202 pages.
Declaration of Marshall Buck in Support of Patent Owner's Preliminary Response, Exhibit-2001, Filed on May 18, 2022—Cited in IPR2022-00369, challenging U.S. Pat. No. 10,405,082, 40 pages.
Declaration of Marshall Buck in Support of Patent Owner's Preliminary Response, Exhibit-2001, Filed on May 18, 2022—Cited in IPR2022-00388, challenging U.S. Pat. No. 10,966,015, 37 pages.
Declaration of Marshall D. Buck, Ph.D. in Support of Patent Owner Response, Exhibit-2008, Filed on Nov. 8, 2022—Cited in IPR2022-00369, challenging U.S. Pat. No. 10,405,082, 43 pages.
Declaration of Marshall D. Buck, Ph.D. in Support of Patent Owner's Response, Exhibit-2008, Filed on Nov. 8, 2022—Cited in IPR2022-00388, challenging U.S. Pat. No. 10,966,015, 41 pages.
Declaration of Nathaniel Polish, Ph.D, Exhibit-1002, Filed on Dec. 17, 2021—Cited in IPR2022-00253, challenging U.S. Pat. No. 9,491,542, 192 pages.
Declaration of Nathaniel Polish, Ph.D, Exhibit-1002, Filed on Dec. 21, 2021—Cited in IPR2022-00281, challenging U.S. Pat. No. 9,270,244, 163 pages.
Declaration of Richard Stern, Ph.D, Exhibit-1002, Filed on Dec. 10, 2021—Cited in IPR2022-00282, challenging U.S. Pat. No. 8,315,400, 123 pages.
Declaration of Richard Stern, Ph.D, Exhibit-1002, Filed on Dec. 30, 2021—Cited in IPR2022-00369, challenging U.S. Pat. No. 10,405,082, 165 pages.
Declaration of Roy Falik In Support of Motion for the Pro Hac Vice Admission, Exhibit-2001, Filed on Jul. 5, 2024—Cited in IPR2024-01003, challenging U.S. Pat. No. 9,191,083, 3 pages.
Declaration of Roy Falik In Support of Motion for the Pro Hac Vice Admission, Exhibit-2001, Filed on Jul. 5, 2024—Cited in IPR2024-01004, challenging U.S. Pat. No. 9,614,943, 3 pages.
Declaration of Roy Falik In Support of Motion for the Pro Hac Vice AdmissionExhibit2001,Jul. 5, 2024—Cited in IPR2024-01033, challenging U.S. Pat. No. 8,434,966, 3 pages.
Declaration of Roy Falik, Exhibit-2001, Filed on Jul. 18, 2024—Cited in IPR2024-01031, challenging U.S. Pat. No. 7,049,850, 3 pages.

Declaration of Roy Falik, Exhibit-2001, Filed on Jul. 18, 2024—Cited in IPR2024-01034, challenging U.S. Pat. No. 9,279,263, 3 pages.
Declaration of Scott Delman with attached exhibit, Exhibit-1024, Filed on Dec. 21, 2021—Cited in IPR2022-00281, challenging U.S. Pat. No. 9,270,244, 6 pages.
Deposition Transcript of David Kleinschmidt, dated Jun. 9, 2023, Exhibit-1034, Filed on Jun. 30, 2023—Cited in IPR2022-01106, challenging U.S. Pat. No. 11,039,259, 111 pages.
Determining All Challenged Claims Unpatentable 35 U.S.C. § 318(a), Exhibit-31, Filed on Aug. 11, 2023—Cited in IPR2022-00388, challenging U.S. Pat. No. 10,966,015, 82 pages.
Determining All Challenged Claims Unpatentable 35 U.S.C. § 318(a), Exhibit-32, Filed on Aug. 11, 2023—Cited in IPR2022-00369, challenging U.S. Pat. No. 10,405,082, 81 pages.
Determining All Challenged Claims Unpatentable 35 U.S.C. § 318(a), Exhibit-26, Filed on Nov. 13, 2023—Cited in IPR2022-01078, challenging U.S. Pat. No. 11,057,701, 44 pages.
Determining Some Challenged Claims Unpatentable 35 U.S.C. § 318(a), Exhibit-37, Filed on Jul. 7, 2023—Cited in IPR2022-00302, challenging U.S. Pat. No. 9,609,424, 69 pages.
Direct filtering for air- and bone-conductive microphones, Zicheng Liu, Zhengyou Zhang, A. Acero, J. Droppo and Xuedong Huang, IEEE 6th Workshop on Multimedia Signal Processing, 2004, Siena, Italy, 2004, pp. 363-366, 6 pages.
Docket Control Order, E.D. Tex, Exhibit-1014, Filed on Apr. 20, 2022—Cited in IPR2022-00282, challenging U.S. Pat. No. 8,315,400, 7 pages.
Docket Control Order, E.D. Tex, Exhibit-1043, Filed on Apr. 20, 2022—Cited in IPR2022-00242, challenging U.S. Pat. No. 8,111,839, 7 pages.
Docket Control Order, E.D. Tex, Exhibit-1043, Filed on Apr. 20, 2022—Cited in IPR2022-00243, challenging U.S. Pat. No. 8,111,839, 7 pages.
Docket Control Order, E.D. Tex.; Exhibit-1033, Filed on Apr. 20, 2022—Cited in IPR2022-00234, challenging U.S. Pat. No. 9,124,982, 7 pages.
E-3 In-Flight Acoustic Exposure Studies and Mitigation Via Active Noise Reduction Headset, Frank Mobley, John Allen Hall, & Donald Yeager, Dec. 2002, 73 pages.
Edwards, The Future of Hearing Aid Technology, Exhibit-2008, Filed on Sep. 13, 2022—Cited in IPR2022-00243, challenging U.S. Pat. No. 8,111,839, 15 pages.
Etymotic ER-6 Earphones, At least by Feb. 7, 2005, https://www.cnet. com/reviews/etymoti c-er-6-review/ (SAM-TECH 00095121), 5 pages.
Etymotic ER-6 Earphones, At least by Feb. 7, 2005, https://www.etymotic.com/ephp/er6i-ts.aspx (SAM-TECH 00095178), 1 pages.
Etymotic's ER-33 Occlusion Effect Meter ("ER-33"), Apr. 9, 2001 WayBack Machine capture of Etymotic's website contains an image of the ER-33 and states that "[t]he ER-33 Occlusion Effect Meter quickly quantifies the occlusion effect and earmold leakage" and was on sale for $350.00. https://web.archive.org/web/20010404224259/ https://www.etymotic.com/ (SAM-TECH_00054976), 1 pages.
Etymotic's ER-33 Occlusion Effect Meter ("ER-33"), Aug. 2003 article by H. Gustav Mueller in the Hearing Journal, Mueller describes the ER-33 as a product manufactured by Etymotic that "costs no more than a few bottles of good wine." See H. Gustav Mueller, There's less talking in barrels, but the occlusion effect is still with us, 56 Hearing J. 10, 14 (2003) (SAM-TECH_00054761-SAM-TECH_00054764), 4 pages.
Etymotic's ER-33 Occlusion Effect Meter ("ER-33"), Dec. 5, 2004 article submitted by Wayne J. Staab to The Hearing Review, discusses the ER-33 and notes "[t]he occlusion effect was measured with the ER-33 Occlusion Effect meter (Figure 5) using a probe tube extending 2 mm beyond the receiver tip. The ER-33 is a hand-held device that measures both . . . " https://hearingreview.com/practice-building/practice-management/measuring-the-occlusion-effect-in-a-deep-fitting-hearing-device (SAM-TECH_00060339-SAM-TECH_00060350), 12 pgs.
Etymotic's ER-33 Occlusion Effect Meter ("ER-33"), Mar. 3, 2005 capture of Etymotic's website contains a description of the ER-33

(56)         References Cited

OTHER PUBLICATIONS which includes a sale price for $350.00. https://web.archive.org/web/20050303170952/ http://www.etymotic.com/pro/er33.asp (SAM-TECH_00054986), 1 pages.

Etymotic's ER-33 Occlusion Effect Meter ("ER-33"), Mar. 4, 2005 WayBack Machine capture of Etymotic's website contains a user manual for the ER-33 which was on sale at that time. https://web.archive.org/web/20050304030715/ http://www.etymotic.com/pdf/er33-oem-usermanual.pdf (SAM-TECH_00055001; SAM-TECH_00060165), 11 pages.

EX 1032—Protective Order (*Staton Techiya, LLC* v. *Samsung Electronics Co, Ltd*, 21-CV-00413-JRG-RSP), Exhibit-1032, Filed on Apr. 13, 2023—Cited in IPR2022-00302, challenging U.S. Pat. No. 9,609,424, 16 pages.

Ex 1045—Nov. 18, 2022, Deposition Transcript of Daniel P Anagnos, Exhibit-1045, Filed on Dec. 6, 2022—Cited in IPR2022-00242, challenging U.S. Pat. No. 8,111,839, 65 pages.

Ex 1045—Nov. 18, 2022, Deposition Transcript of Daniel P Anagnos, Exhibit-1045, Filed on Dec. 6, 2022—Cited in IPR2022-00243, challenging U.S. Pat. No. 8,111,839, 65 pages.

Ex 1046—Patent Owner's Response in IPR2022-00243, Paper 21, Exhibit-1046, Filed on Dec. 6, 2022—Cited in IPR2022-00242, challenging U.S. Pat. No. 8,111,839, 46 pages.

Ex 1047—Patent Owner Response for IPR2022-00234, Paper 17, Exhibit-1047, Filed on Dec. 6, 2022—Cited in IPR2022-00242, challenging U.S. Pat. No. 8,111,839, 57 pages.

Ex 1047—Patent Owner Response for IPR2022-00234, Paper 17, Exhibit-1047, Filed on Dec. 6, 2022—Cited in IPR2022-00243, challenging U.S. Pat. No. 8,111,839, 57 pages.

Ex 1048—Institution Decision for IPR2022-00234, Paper 12, Exhibit-1048, Filed on Dec. 6, 2022—Cited in IPR2022-00242, challenging U.S. Pat. No. 8,111,839, 58 pages.

Ex 1049—File History for 382 Patent, Exhibit-1049, Filed on Dec. 6, 2022—Cited in IPR2022-00242, challenging U.S. Pat. No. 8,111,839, 502 pages.

Ex 1053—Excerpts from The Authoritative Dictionary of IEEE Standards Terms, Exhibit-1053, Filed on Dec. 6, 2022—Cited in IPR2022-00242, challenging U.S. Pat. No. 8,111,839, 4 pages.

Ex 1054—Supplemental Declaration of Les E Atlas PhD (Atlas-Supp), Exhibit-1054, Filed on Dec. 6. 2022—Cited in IPR2022-00243, challenging U.S. Pat. No. 8,111,839, 42 pages.

Ex. 1002—Declaration of Dr. Les Atlas, Ph.D, Exhibit-1002, Filed on Jun. 9, 2022—Cited in IPR2022-01106, challenging U.S. Pat. No. 11,039,259, 185 pages.

Ex. 1002—Declaration of Nathaniel Polish, Ph.D, Exhibit-1002, Filed on Jun. 9, 2022—Cited in IPR2022-01098, challenging U.S. Pat. No. 11,217,237, 174 pages.

Ex. 1002—Declaration of Nathaniel Polish, Ph.D, Exhibit-1002, Filed on Jun. 9, 2022—Cited in IPR2022-01099, challenging U.S. Pat. No. 11,244,666, 185 pages.

Ex. 1002—Kyriakakis DeclarationExhibit1002,Jun. 18, 2024—Cited in IPR2024-01033, challenging U.S. Pat. No. 8,434,966, 145 pages.

Ex. 1002 Declaration of Chris Kyriakakis, Exhibit-1002, Filed on Jul. 1, 2024—Cited in IPR2024-01034, challenging U.S. Pat. No. 9,279,263, 221 pages.

Ex. 1002 Declaration of Dr. Richard M. Stern, Exhibit-1002, Filed on Jun. 9, 2022—Cited in IPR2022-01078, challenging U.S. Pat. No. 11,057,701, 150 pages.

Ex. 1003—CV of Dr. Les Atlas, Ph.D, Exhibit-1003, Filed on Jun. 9, 2022—Cited in IPR2022-01106, challenging U.S. Pat. No. 11,039,259, 24 pages.

Ex. 1003—CV of Nathaniel Polish, Ph.D, Exhibit-1003, Filed on Jun. 9, 2022—Cited in IPR2022-01098, challenging U.S. Pat. No. 11,217,237, 15 pages.

Ex. 1003—CV of Nathaniel Polish, Ph.D, Exhibit-1003, Filed on Jun. 9, 2022—Cited in IPR2022-01099, challenging U.S. Pat. No. 11,244,666, 15 pages.

Ex. 1003—Kyriakakis CVExhibit1003,Jun. 18, 2024—Cited in IPR2024-01033, challenging U.S. Pat. No. 8,434,966, 17 pages.

Ex. 1003 Chris Kyriakakis CV, Exhibit-1003, Filed on Jul. 1, 2024—Cited in IPR2024-01034, challenging U.S. Pat. No. 9,279,263, 17 pages.

Ex. 1003 CV of Dr. Richard M. Stern, Exhibit-1003, Filed on Jun. 9, 2022—Cited in IPR2022-01078, challenging U.S. Pat. No. 11,057,701, 27 pages.

Ex. 1004—U.S. Appl. No. 16/571,973 File History for 259, Exhibit-1004, Filed on Jun. 9, 2022—Cited in IPR2022-01106, challenging U.S. Pat. No. 11,039,259, 662 pages.

Ex. 1004—File History for U.S. Pat. No. 11,750,965Exhibit1004,Jun. 18, 2024—Cited in IPR2024-01033, challenging U.S. Pat. No. 8,434,966, 1041 pages.

Ex. 1004—File History of U.S. Appl. No. 11/217,237, Exhibit-1004, Filed on Jun. 9, 2022—Cited in IPR2022-01098, challenging U.S. Pat. No. 11,217,237, 291 pages.

Ex. 1004—File History of U.S. Appl. No. 11/244,666, Exhibit-1004, Filed on Jun. 9, 2022—Cited in IPR2022-01099, challenging U.S. Pat. No. 11,244,666, 249 pages.

Ex. 1004 File History for U.S. Pat. No. 11,665,493, Exhibit-1004, Filed on Jul. 1, 2024—Cited in IPR2024-01034, challenging U.S. Pat. No. 9,279,263, 387 pages.

Ex. 1004 File History of U.S. Pat. No. 11,057,701, Exhibit-1004, Filed on Jun. 9, 2022—Cited in IPR2022-01078, challenging U.S. Pat. No. 11,057,701, 221 pages.

Ex. 1005—U.S. Appl. No. 13/917,079 File History part 1 of 2, Exhibit-1005, Filed on Jun. 9, 2022—Cited in IPR2022-01106, challenging U.S. Pat. No. 11,039,259, 350 pages.

Ex. 1005 U.S. Appl. No. 61/098,250, Exhibit-1005, Filed on Jul. 1, 2024—Cited in IPR2024-01034, challenging U.S. Pat. No. 9,279,263, 55 pages.

Ex. 1006—U.S. Appl. No. 12/555,570 File History, Exhibit-1006, Filed on Jun. 9, 2022—Cited in IPR2022-01106, challenging U.S. Pat. No. 11,039,259, 272 pages.

Ex. 1006 U.S. Appl. No. 12/115,349 File History, Exhibit-1006, Filed on Jun. 9, 2022—Cited in IPR2022-01078, challenging U.S. Pat. No. 11,057,701, 168 pages.

Ex. 1006 U.S. Appl. No. 12/555,864, Exhibit-1006, Filed on Jul. 1, 2024—Cited in IPR2024-01034, challenging U.S. Pat. No. 9,279,263, 28 pages.

Ex. 1007—U.S. Appl. No. 61/096,128 File History, Exhibit-1007, Filed on Sep. 9, 2022—Cited in IPR2022-01106, challenging U.S. Pat. No. 11,039,259, 46 pages.

Ex. 1007 U.S. Appl. No. 60/916,271 File History, Exhibit-1007, Filed on Jun. 9, 2022—Cited in IPR2022-01078, challenging U.S. Pat. No. 11,057,701, 46 pages.

Ex. 1008—JP3353701B2 to Kondo with Translation, Exhibit-1008, Filed on Jun. 9, 2022—Cited in IPR2022-01098, challenging U.S. Pat. No. 11,217,237, 34 pages.

Ex. 1009 Translation of JPA 2002-204500 (Hayashi), Exhibit-1009, Filed on Jul. 1, 2024—Cited in IPR2024-01034, challenging U.S. Pat. No. 9,279,263, 6 pages.

Ex. 1010—Redline—965 versus parentExhibit1010,Jun. 18, 2024—Cited in IPR2024-01033, challenging U.S. Pat. No. 8,434,966, 32 pages.

Ex. 1012—Prov60893617Exhibit1012,Jun. 18, 2024—Cited in IPR2024-01033, challenging U.S. Pat. No. 8,434,966, 43 pages.

Ex. 1013—150139_14109987 NOA referred to in 965 NOAExhibit1013,Jun. 18, 2024—Cited in IPR2024-01033, challenging U.S. Pat. No. 8,434,966, 67 pages.

Ex. 1013 Deterministic Broad-Band Signal (Chu), Exhibit-1013, Filed on Jul. 1, 2024—Cited in IPR2024-01034, challenging U.S. Pat. No. 9,279,263, 4 pages.

Ex. 1013 IPR2022-00282 Patent Owner Preliminary Response, Exhibit-1013, Filed on Jun. 9, 2022—Cited in IPR2022-01078, challenging U.S. Pat. No. 11,057,701, 77 pages.

Ex. 1014—Mulgrew 2002, Exhibit-1014, Filed on Jun. 9, 2022—Cited in IPR2022-01099, challenging U.S. Pat. No. 11,244,666, 14 pages.

Ex. 1014—Redline—682 parent versus ultimate parent 812Exhibit1014,Jun. 18, 2024—Cited in IPR2024-01033, challenging U.S. Pat. No. 8,434,966, 18 pages.

(56)         References Cited

OTHER PUBLICATIONS

Ex. 1014 701 Patent Family Tree, Exhibit-1014, Filed on Jun. 9, 2022—Cited in IPR2022-01078, challenging U.S. Pat. No. 11,057,701, 1 pages.
Ex. 1015—666 Family Tree, Exhibit—1015, Filed on Jun. 9, 2022—Cited in IPR2022-01099, challenging U.S. Pat. No. 11,244,666, 1 pages.
Ex. 1015—Letter re 965 IPR StipulationExhibit1015,Jun. 18, 2024—Cited in IPR2024-01033, challenging U.S. Pat. No. 8,434,966, 2 pages.
Ex. 1015 Complaint, E.D. Tex. 22-53, Exhibit-1015, Filed on Jun. 9, 2022—Cited in IPR2022-01078, challenging U.S. Pat. No. 11,057,701, 28 pages.
Ex. 1016—Complaint, E.D. Tex, 22-53, Exhibit-1016, Filed on Jun. 9, 2022—Cited in IPR2022-01099, challenging U.S. Pat. No. 11,244,666, 28 pages.
Ex. 1016 GSM 6.31, Exhibit-1016, Filed on Jun. 9, 2022—Cited in IPR2022-01078, challenging U.S. Pat. No. 11,057,701, 14 pages.
Ex. 1016 Reply Declaration of Richard Stern, PhD, Exhibit-1016, Filed on Dec. 2, 2022—Cited in IPR2022-00282, challenging U.S. Pat. No. 8,315,400, 30 pages.
Ex. 1017—Amended Complaint, E.D. Tex, 21-413, Exhibit-1017, Filed on Jun. 9, 2022—Cited in IPR2022-01099, challenging U.S. Pat. No. 11,244,666, 52 pages.
Ex. 1017—Rose 2003, Exhibit-1017, Filed on Jun. 9, 2022—Cited in IPR2022-01106, challenging U.S. Pat. No. 11,039,259, 6 pages.
Ex. 1017 David Kleinschmidt Depo Transcript, Exhibit-1017, Filed on Dec. 2, 2022—Cited in IPR2022-00282, challenging U.S. Pat. No. 8,315,400, 173 pages.
Ex. 1017 Final Rejection from Reexam U.S. Appl. 90/015,146, Exhibit-1017, Filed on Jul. 1, 2024—Cited in IPR2024-01034, challenging U.S. Pat. No. 9,279,263, 94 pages.
Ex. 1017 GSM 6.12, Exhibit-1017, Filed on Jun. 9, 2022—Cited in IPR2022-01078, challenging U.S. Pat. No. 11,057,701, 7 pages.
Ex. 1018—Consolidation Order, E.D. Tex, 21-413 & 22-53, Exhibit-1018, Filed on Jun. 9, 2022—Cited in IPR2022-01099, challenging U.S. Pat. No. 11,244,666, 2 pages.
Ex. 1018 Consolidation Order, E.D. Tex. 21-413 & 22-53, Exhibit-1018, Filed on Jun. 9, 2022—Cited in IPR2022-01078, challenging U.S. Pat. No. 11,057,701, 2 pages.
Ex. 1018 Excerpts from Wiley Electrical & Electronics Engineering Dictionary, Exhibit-1018, Filed on Dec. 2, 2022—Cited in IPR2022-00282, challenging U.S. Pat. No. 8,315,400, 6 pages.
Ex. 1019—Docket Control Order, E.D. Tex, 21-413, Exhibit-1019, Filed on Jun. 9, 2022—Cited in IPR2022-01099, challenging U.S. Pat. No. 11,244,666, 7 pages.
Ex. 1019—Duffner 2006, Exhibit-1019, Filed on Jun. 9, 2022—Cited in IPR2022-01098, challenging U.S. Pat. No. 11,217,237, 262 pages.
Ex. 1019 Docket Control Order, E.D. Tex. 21-413, Exhibit-1019, Filed on Jun. 9, 2022—Cited in IPR2022-01078, challenging U.S. Pat. No. 11,057,701, 7 pages.
Ex. 1019 Dual-Channel MLS-Based Test System (Schneider), Exhibit-1019, Filed on Jul. 1, 2024—Cited in IPR2024-01034, challenging U.S. Pat. No. 9,279,263, 12 pages.
Ex. 1020—Letter re IPR Stipulation, Exhibit-1020, Filed on Jun. 9, 2022—Cited in IPR2022-01099, challenging U.S. Pat. No. 11,244,666, 2 pages.
Ex. 1020 Letter re IPR Stipulation, Exhibit-1020, Filed on Jun. 9, 2022—Cited in IPR2022-01078, challenging U.S. Pat. No. 11,057,701, 2 pages.
Ex. 1021—Complaint. E.D. Tex, 22-00053, Exhibit-1021, Filed on Jun. 9, 2022—Cited in IPR2022-01098, challenging U.S. Pat. No. 11,217,237, 28 pages.
Ex. 1021—Hsu 2005, Exhibit-1021, Filed on Jun. 9, 2022—Cited in IPR2022-01106, challenging U.S. Pat. No. 11,039,259, 2 pages.
Ex. 1021—Stipulation Letter, Exhibit-1021, Filed on May 20, 2022—Cited in IPR2022-00253, challenging U.S. Pat. No. 9,491,542, 8 pages.
Ex. 1021 Amended Complaint, E.D. Tex. 21-413, Exhibit-1021, Filed on Jun. 9, 2022—Cited in IPR2022-01078, challenging U.S. Pat. No. 11,057,701, 52 pages.
Ex. 1021 Claim Construction Order, ED Tex, Exhibit-1021, Filed on Jul. 1, 2024—Cited in IPR2024-01034, challenging U.S. Pat. No. 9,279,263, 51 pages.
Ex. 1022—Amended Complaint, E.D.Tex, 21-00413, Exhibit-1022, Filed on Jun. 9, 2022—Cited in IPR2022-01098, challenging U.S. Pat. No. 11,217,237, 52 pages.
Ex. 1022—Complaint, E.D. Tex, Exhibit-1022, Filed on May 20, 2022—Cited in IPR2022-00253, challenging U.S. Pat. No. 9,491,542, 28 pages.
Ex. 1022 Letter to Techiya re 493 IPR Stipulation, Exhibit-1022, Filed on Jul. 1, 2024—Cited in IPR2024-01034, challenging U.S. Pat. No. 9,279,263, 3 pages.
Ex. 1023—Consolidation Order, E.D. Tex, Exhibit-1023, Filed on May 20, 2022—Cited in IPR2022-00253, challenging U.S. Pat. No. 9,491,542, 2 pages.
Ex. 1023—Consolidation Order, E.D.Tex, 21-00413 & 22-00053, Exhibit-1023, Filed on Jun. 9, 2022—Cited in IPR2022-01098, challenging U.S. Pat. No. 11,217,237, 2 pages.
Ex. 1023 Techiya Appeal Brief from Reexam U.S. Appl. No. 90/015,146, Exhibit-1023, Filed on Jul. 1, 2024—Cited in IPR2024-01034, challenging U.S. Pat. No. 9,279,263, 59 pages.
Ex. 1024—259 Family Tree, Exhibit-1024, Filed on Jun. 9, 2022—Cited in IPR2022-01106, challenging U.S. Pat. No. 11,039,259, 1 pages.
Ex. 1024—Docket Control Order, E.D. Tex, 21-00413, Exhibit-1024, Filed on Jun. 9, 2022—Cited in IPR2022-01098, challenging U.S. Pat. No. 11,217,237, 7 pages.
Ex. 1024 Judicial Caseload Profile, Exhibit-1024, Filed on Jul. 1, 2024—Cited in IPR2024-01034, challenging U.S. Pat. No. 9,279,263, 95 pages.
Ex. 1025—Complaint, E.D. Tex. 22-53, Exhibit-1025, Filed on Jun. 9, 2022—Cited in IPR2022-01106, challenging U.S. Pat. No. 11,039,259, 28 pages.
Ex. 1025—Letter re IPR Stipulation, Exhibit-1025, Filed on Jun. 9, 2022—Cited in IPR2022-01098, challenging U.S. Pat. No. 11,217,237, 2 pages.
Ex. 1025—Stipulation Letter, Exhibit-1025, Filed on May 27, 2022—Cited in IPR2022-00281, challenging U.S. Pat. No. 9,270,244, 8 pages.
Ex. 1026—237 Family Tree, Exhibit-1026, Filed on Jun. 9, 2022—Cited in IPR2022-01098, challenging U.S. Pat. No. 11,217,237, 1 pages.
Ex. 1026—Amended Complaint, E.D. Tex. 21-413, Exhibit-1026, Filed on Jun. 9, 2022—Cited in IPR2022-01106, challenging U.S. Pat. No. 11,039,259, 52 pages.
Ex. 1026—Complaint, E.D. Tex, Exhibit-1026, Filed on May 27, 2022—Cited in IPR2022-00281, challenging U.S. Pat. No. 9,270,244, 28 pages.
Ex. 1027—Consolidation Order, E.D. Tex, Exhibit-1027, Filed on May 27, 2022—Cited in IPR2022-00281, challenging U.S. Pat. No. 9,270,244, 2 pages.
Ex. 1027—Docket Control Order, E.D. Tex. 21-413, Exhibit-1027, Filed on Jun. 9, 2022—Cited in IPR2022-01106, challenging U.S. Pat. No. 11,039,259, 7 pages.
Ex. 1027—Transcript of Deposition of Christopher Struck, Exhibit-1027, Filed on Jan. 10, 2023—Cited in IPR2022-00302, challenging U.S. Pat. No. 9,609,424, 182 pages.
Ex. 1028—Errata Sheet for Deposition of Christopher Struck, Exhibit-1028, Filed on Jan. 10, 2023—Cited in IPR2022-00302, challenging U.S. Pat. No. 9,609,424, 2 pages.
Ex. 1029—Letter re IPR Stipulation, Exhibit-1029, Filed on Jun. 9, 2022—Cited in IPR2022-01106, challenging U.S. Pat. No. 11,039,259, 2 pages.
Ex. 1029—Patent Owner's Opening Claim Construction Brief, E.D. Tex, Exhibit-1029, Filed on Jan. 10, 2023—Cited in IPR2022-00302, challenging U.S. Pat. No. 9,609,424, 39 pages.
Ex. 1029 Petitioners' Oral Hearing Demonstratives, Exhibit-1029, Filed on Sep. 26, 2023—Cited in IPR2022-01078, challenging U.S. Pat. No. 11,057,701, 88 pages.

(56)  References Cited

OTHER PUBLICATIONS

Ex. 1030—Petitioners' Oral Hearing Demonstratives, Exhibit-1030, Filed on Apr. 11, 2023—Cited in IPR2022-00302, challenging U.S. Pat. No. 9,609,424, 63 pages.

Ex. 1034—Redacted Deposition of Christopher Struck, E.D. Tex, Exhibit-1034, Filed on May 15, 2023—Cited in IPR2022-00302, challenging U.S. Pat. No. 9,609,424, 309 pages.

Ex. 1037—Petitioners' Oral Hearing Demonstratives, Exhibit-1037, Filed on Oct. 11, 2023—Cited in IPR2022-01106, challenging U.S. Pat. No. 11,039,259, 67 pages.

Ex. 3001, Exhibit-3001, Filed on Nov. 8, 2024—Cited in IPR2024-01003, challenging U.S. Pat. No. 9,191,083, 1 pages.

Ex. 3001, Exhibit-3001, Filed on Nov. 8, 2024—Cited in IPR2024-01004, challenging U.S. Pat. No. 9,614,943, 1 pages.

Ex. 3001, Exhibit-3001, Filed on Nov. 8, 2024—Cited in IPR2024-01031, challenging U.S. Pat. No. 7,049,850, 1 pages.

Ex. 3001, Exhibit-3001, Filed on Nov. 8, 2024—Cited in IPR2024-01033, challenging U.S. Pat. No. 8,434,966, 1 pages.

Ex. 3001, Exhibit-3001, Filed on Nov. 8, 2024—Cited in IPR2024-01034, challenging U.S. Pat. No. 9,279,263, 1 pages.

Ex. 3001, Exhibit-3001, Filed on Nov. 8, 2024—Cited in IPR2022-00388, challenging U.S. Pat. No. 10,966,015, 2 pages.

Ex. A1 (Nacre QuietPro) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 49 pages.

Ex. A10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 59 pages.

Ex. A11 (NaturalRecorder) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.

Ex. A12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.

Ex. A13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 20 pages.

Ex. A14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. A15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 34 pages.

Ex. A16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. A17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 37 pages.

Ex. A18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 34 pages.

Ex. A19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 42 pages.

Ex. A2 (Silynx QuietOps) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 69 pages.

Ex. A20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.

Ex. A21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 52 pages.

Ex. A22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.

Ex. A23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 45 pages.

Ex. A24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.

Ex. A25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 16 pages.

Ex. A26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. A27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 32 pages.

Ex. A28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. A29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.

Ex. A3 (Motorola H5) to Samsung's Invalidity Contentions and P.R. 3-3 And 3-4 Disclosures for U.S. Pat. Nos. 8,111,839, 8,254,591, 8,315,400, 9, 124,982, 9,270,244, 9,491,542, 9,609,424, 10,405,082, 10,966,015 (Case No. 2:22-CV-00053-JRG-RSP), served May 18, 2022, 55 pages.

Ex. A30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 21 pages.

(56) References Cited

OTHER PUBLICATIONS

Ex. A31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 343 pages.

Ex. A32 (Olympus WS-320M) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 97 pages.

Ex. A33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.

Ex. A34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 27 pages.

Ex. A35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 65 pages.

Ex. A4 (Jawbone Aliph) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 50 pages.

Ex. A5 (Snooper) to Samsung's Invalidity Contentions and P.R. 3-3 And 3-4 Disclosures for U.S. Pat. Nos. 8,111,839, 8,254,591, 8,315,400, 9, 124,982, 9,270,244, 9,491,542, 9,609,424, 10,405,082, 10,966,015 (Case No. 2:22-CV-00053-JRG-RSP), served May 18, 2022, 29 pages.

Ex. A6 (Nch Swift) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 58 pages.

Ex. A7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022, 66 pages.

Ex. A8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 35 pages.

Ex. A9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.

Ex. B1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 63 pages.

Ex. B10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 73 pages.

Ex. B11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 127 pages.

Ex. B12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 67 pages.

Ex. B13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 69 pages.

Ex. B14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 78 pages.

Ex. B15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 76 pages.

Ex. B16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 102 pages.

Ex. B17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 77 pages.

Ex. B18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 110 pages.

Ex. B19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 102 pages.

Ex. B2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 104 pages.

Ex. B3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.

Ex. B4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.

Ex. B5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 79 pages.

Ex. B6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 80 pages.

Ex. B7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.

(56)        References Cited

OTHER PUBLICATIONS

Ex. B8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.

Ex. B9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 72 pages.

Ex. C1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 65 pages.

Ex. C10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 96 pages.

Ex. C11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 140 pages.

Ex. C12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 51 pages.

Ex. C13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.

Ex. C14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 115 pages.

Ex. C15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 112 pages.

Ex. C2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 144 pages.

Ex. C3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 103 pages.

Ex. C4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 123 pages.

Ex. C5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 97 pages.

Ex. C6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 141 pages.

Ex. C7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 89 pages.

Ex. C8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 169 pages.

Ex. C9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.

Ex. D1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 47 pages.

Ex. D10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 32 pages.

Ex. D11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 58 pages.

Ex. D12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.

Ex. D13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.

Ex. D14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.

Ex. D15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. D16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 38 pages.

Ex. D17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 38 pages.

Ex. D18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 34 pages.

Ex. D19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 42 pages.

(56)        References Cited

OTHER PUBLICATIONS

Ex. D2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 30 pages.

Ex. D20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.

Ex. D21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 25 pages.

Ex. D22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.

Ex. D23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 67 pages.

Ex. D24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 51 pages.

Ex. D25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.

Ex. D26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 17 pages.

Ex. D27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.

Ex. D28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. D29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.

Ex. D3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.

Ex. D30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 20 pages.

Ex. D31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 21 pages.

Ex. D32 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 254 pages.

Ex. D4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 128 pages.

Ex. D5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 120 pages.

Ex. D6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 77 pages.

Ex. D7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 62 pages.

Ex. D8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 54 pages.

Ex. D9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 61 pages.

Ex. E1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 136 pages.

Ex. E10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 86 pages.

Ex. E11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.

Ex. E12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 54 pages.

Ex. E13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 123 pages.

Ex. E14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 101 pages.

Ex. E15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 147 pages.

(56)  References Cited

OTHER PUBLICATIONS

Ex. E16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 95 pages.

Ex. E17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 23 pages.

Ex. E18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.

Ex. E2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 59 pages.

Ex. E3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 79 pages.

Ex. E4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 63 pages.

Ex. E5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 101 pages.

Ex. E6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 49 pages.

Ex. E7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.

Ex. E8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 54 pages.

Ex. E9 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 55 pages.

Ex. F1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 192 pages.

Ex. F10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 133 pages.

Ex. F11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 55 pages.

Ex. F12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 82 pages.

Ex. F13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 174 pages.

Ex. F14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 151 pages.

Ex. F15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 221 pages.

Ex. F16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 139 pages.

Ex. F17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 27 pages.

Ex. F18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.

Ex. F2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 80 pages.

Ex. F3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 105 pages.

Ex. F4 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 78 pages.

Ex. F5 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 81 pages.

Ex. F6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 61 pages.

Ex. F7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 116 pages.

Ex. F8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.

(56)        References Cited

OTHER PUBLICATIONS

Ex. F9 (corrected) to Samsung's Invalidity Contentions and P.R. 3-3 And 3-4 Disclosures for U.S. Pat. Nos. 8,111,839, 8,254,591, 8,315,400, 9, 124,982, 9,270,244, 9,491,542, 9,609,424, 10,405,082, 10,966,015 (Case No. 2:22-CV-00053-JRG-RSP), served May 18, 2022, 78 pages.
Ex. G1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 143 pages.
Ex. G10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 51 pages.
Ex. G11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 47 pages.
Ex. G12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 35 pages.
Ex. G13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. G14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Ex. G15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 259 pages.
Ex. G16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 96 pages.
Ex. G17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 74 pages.
Ex. G18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 58 pages.
Ex. G19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.
Ex. G2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.
Ex. G20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. G21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Ex. G22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 83 pages.
Ex. G23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 94 pages.
Ex. G24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 166 pages.
Ex. G25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 69 pages.
Ex. G26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 134 pages.
Ex. G27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 64 pages.
Ex. G28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022, 54 pages.
Ex. G29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022, 35 pages.
Ex. G3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. G30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 50 pages.
Ex. G31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 52 pages.
Ex. G32 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 242 pages.
Ex. G33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 166 pages.

(56)　　　　　References Cited

OTHER PUBLICATIONS

Ex. G34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 185 pages.

Ex. G35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 56 pages.

Ex. G4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 212 pages.

Ex. G5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 114 pages.

Ex. G6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 92 pages.

Ex. G7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 81 pages.

Ex. G8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 81 pages.

Ex. G9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.

Ex. H1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 187 pages.

Ex. H10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 124 pages.

Ex. H11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 159 pages.

Ex. H12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 141 pages.

Ex. H15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 175 pages.

Ex. H16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 92 pages.

Ex. H17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 44 pages.

Ex. H18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 32 pages.

Ex. H19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 114 pages.

Ex. H2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 138 pages.

Ex. H20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 78 pages.

Ex. H3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 93 pages.

Ex. H4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 59 pages.

Ex. H6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.

Ex. H7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 73 pages.

Ex. H8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 55 pages.

Ex. H9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 86 pages.

Ex. 11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 209 pages.

Ex. 110 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 161 pages.

Ex. 111 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 219 pages.

(56) References Cited

OTHER PUBLICATIONS

Ex. I12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 182 pages.

Ex. I15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 219 pages.

Ex. I16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 112 pages.

Ex. I17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 190 pages.

Ex. I18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 120 pages.

Ex. I2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 183 pages.

Ex. I3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 121 pages.

Ex. I4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 73 pages.

Ex. I5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 138 pages.

Ex. I6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 79 pages.

Ex. I7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 87 pages.

Ex. I8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 48 pages.

Ex. I9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 86 pages.

Ex. J1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 91 pages.

Ex. J10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.

Ex. J11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 129 pages.

Ex. J12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 340 pages.

Ex. J13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 331 pages.

Ex. J14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 134 pages.

Ex. J15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 63 pages.

Ex. J16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 253 pages.

Ex. J17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 62 pages.

Ex. J18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 57 pages.

Ex. J19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 154 pages.

Ex. J2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.

Ex. J20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 102 pages.

Ex. J21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 88 pages.

Ex. J22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.

(56)　　　　　References Cited

OTHER PUBLICATIONS

Ex. J23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 85 pages.

Ex. J24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 82 pages.

Ex. J25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 89 pages.

Ex. J26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 103 pages.

Ex. J27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 83 pages.

Ex. J28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 239 pages.

Ex. J29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 172 pages.

Ex. J3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 199 pages.

Ex. J30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 240 pages.

Ex. J4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 145 pages.

Ex. J5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 141 pages.

Ex. J6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 98 pages.

Ex. J7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.

Ex. J8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.

Ex. J9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 71 pages.

EX1002—Declaration of Christopher Schmandt, Exhibit-1002, Filed on Feb. 9, 2024—Cited in IPR2024-00559, challenging U.S. Pat. No. 11,610,587, 161 pages.

EX1002—Declaration of Nathaniel Polish, Exhibit-1002, Filed on Jun. 25, 2024—Cited in IPR2024-01031, challenging U.S. Pat. No. 7,049,850, 129 pages.

EX1002—Kyriakakis Declaration, Exhibit-1002, Filed on Jun. 12, 2024—Cited in IPR2024-01003, challenging U.S. Pat. No. 9,191,083, 256 pages.

EX1002-Kyriakakis Declaration, Exhibit-1002, Filed on Jun. 12, 2024—Cited in IPR2024-01004, challenging U.S. Pat. No. 9,614,943, 151 pages.

EX1003—Nathaniel Polish CV, Exhibit-1003, Filed on Jun. 25, 2024—Cited in IPR2024-01031, challenging U.S. Pat. No. 7,049,850, 5 pages.

EX1003—Kyriakakis CV, Exhibit-1003, Filed on Jun. 12, 2024— Cited in IPR2024-01003, challenging U.S. Pat. No. 9,191,083, 17 pages.

EX1003—Kyriakakis CV, Exhibit-1003, Filed on Jun. 12, 2024— Cited in IPR2024-01004, challenging U.S. Pat. No. 9,614,943, 17 pages.

EX1003—Schmandt CV, Exhibit-1003, Filed on Feb. 9, 2024— Cited in IPR2024-00559, challenging U.S. Pat. No. 11,610,587, 7 pages.

EX1004—File History for U.S. Pat. No. 11,659,315—Part 1 of 2, Exhibit-1004, Filed on Jun. 25, 2024—Cited in IPR2024-01031, challenging U.S. Pat. No. 7,049,850, 396 pages.

EX1004—File History for U.S. Pat. No. 11,710,473_Part 1 of 3, Exhibit-1004, Filed on Jun. 12, 2024—Cited in IPR2024-01003, challenging U.S. Pat. No. 9,191,083, 369 pages.

EX1004—File History for U.S. Pat. No. 11,710,473_Part 1 of 3, Exhibit-1004, Filed on Jun. 12, 2024—Cited in IPR2024-01004, challenging U.S. Pat. No. 9,614,943, 369 pages.

EX1004—File History for U.S. Pat. No. 11,710,473_Part 2 of 3, Exhibit-1004, Filed on Jun. 12, 2024—Cited in IPR2024-01003, challenging U.S. Pat. No. 9,191,083, 373 pages.

EX1004—File History for U.S. Pat. No. 11,710,473_Part 2 of 3, Exhibit-1004, Filed on Jun. 12, 2024—Cited in IPR2024-01004, challenging U.S. Pat. No. 9,614,943, 373 pages.

EX1004—File History for U.S. Pat. No. 11,710,473_Part 3 of 3, Exhibit-1004, Filed on Jun. 12, 2024—Cited in IPR2024-01004, challenging U.S. Pat. No. 9,614,943, 259 pages.

EX1004—USFH11610587 Part 1 of 2, Exhibit-1004, Filed on Feb. 9, 2024—Cited in IPR2024-00559, challenging U.S. Pat. No. 11,610,587, 398 pages.

EX1005—U.S. Appl. No. 60/885,917, Exhibit-1005, Filed on Jun. 12, 2024—Cited in IPR2024-01003, challenging U.S. Pat. No. 9,191,083, 39 pages.

EX1005—U.S. Appl. No. 60/885,917, Exhibit-1005, Filed on Jun. 12, 2024—Cited in IPR2024-01004, challenging U.S. Pat. No. 9,614,943, 39 pages.

EX1005—U.S. Appl. No. 61/737,932 Provisional, Exhibit-1005, Filed on Jun. 25, 2024—Cited in IPR2024-01031, challenging U.S. Pat. No. 7,049,850, 37 pages.

EX1005—U.S. Appl. No. 61/098,914 (Provisional Application), Exhibit-1005, Filed on Feb. 9, 2024—Cited in IPR2024-00559, challenging U.S. Pat. No. 11,610,587, 86 pages.

EX1006—16266829 (829 App), Exhibit-1006, Filed on Jun. 25, 2024—Cited in IPR2024-01031, challenging U.S. Pat. No. 7,049,850, 85 pages.

EX1006—U.S. Appl. No. 17/321,892, Exhibit-1006, Filed on Jun. 12, 2024—Cited in IPR2024-01003, challenging U.S. Pat. No. 9,191,083, 55 pages.

(56)  References Cited

OTHER PUBLICATIONS

EX1006—U.S. Appl. No. 17/321,892, Exhibit-1006, Filed on Jun. 12, 2024—Cited in IPR2024-01004, challenging U.S. Pat. No. 9,614,943, 55 pages.
EX1006—U.S. Appl. No. 17/203,731, Exhibit-1006, Filed on Feb. 9, 2024—Cited in IPR2024-00559, challenging U.S. Pat. No. 11,610,587, 70 pages.
EX1007—315 Patent Family Tree, Exhibit-1007, Filed on Jun. 25, 2024—Cited in IPR2024-01031, challenging U.S. Pat. No. 7,049,850, 1 pages.
EX1008—Docket Control Order, Exhibit-1008, Filed on Jun. 25, 2024—Cited in IPR2024-01031, challenging U.S. Pat. No. 7,049,850, 6 pages.
EX1008—File History for U.S. Pat. No. 11,244,666, Exhibit-1008, Filed on Jun. 12, 2024—Cited in IPR2024-01003, challenging U.S. Pat. No. 9,191,083, 288 pages.
EX1008—File History for U.S. Pat. No. 11,244,666, Exhibit-1008, Filed on Jun. 12, 2024—Cited in IPR2024-01004, challenging U.S. Pat. No. 9,614,943, 288 pages.
EX1009—Letter from Nikhil Krishnan to Thomas J. Friel, Jr, Exhibit-1009, Filed on Jun. 25, 2024—Cited in IPR2024-01031, challenging U.S. Pat. No. 7,049,850, 2 pages.
EX1009—USSN 90_019,169 RE of U.S. Pat. No. 11,244,666_Part 1 of 5, Exhibit-1009, Filed on Jun. 12, 2024—Cited in IPR2024-01003, challenging U.S. Pat. No. 9,191,083, 494 pages.
EX1009—USSN 90_019, 169 RE of U.S. Pat. No. 11,244,666_Part 1 of 5, Exhibit-1009, Filed on Jun. 12, 2024—Cited in IPR2024-01004, challenging U.S. Pat. No. 9,614,943, 494 pages.
EX1009—USSN 90_019, 169 RE of U.S. Pat. No. 11,244,666_Part 2 of 5, Exhibit-1009, Filed on Jun. 12, 2024—Cited in IPR2024-01003, challenging U.S. Pat. No. 9,191,083, 466 pages.
EX1009—USSN 90_019, 169 RE of U.S. Pat. No. 11,244,666_Part 2 of 5, Exhibit-1009, Filed on Jun. 12, 2024—Cited in IPR2024-01004, challenging U.S. Pat. No. 9,614,943, 466 pages.
EX1009—USSN 90_019,169 RE of U.S. Pat. No. 11,244,666_Part 3 of 5, Exhibit-1009, Filed on Jun. 12, 2024—Cited in IPR2024-01003, challenging U.S. Pat. No. 9,191,083, 361 pages.
EX1009—USSN 90_019, 169 RE of U.S. Pat. No. 11,244,666_Part 3 of 5, Exhibit-1009, Filed on Jun. 12, 2024—Cited in IPR2024-01004, challenging U.S. Pat. No. 9,614,943, 361 pages.
EX1009—USSN 90_019, 169 RE of U.S. Pat. No. 11,244,666_Part 4 of 5, Exhibit-1009, Filed on Jun. 12, 2024—Cited in IPR2024-01003, challenging U.S. Pat. No. 9,191,083, 456 pages.
EX1009—USSN 90_019, 169 RE of U.S. Pat. No. 11,244,666_Part 4 of 5, Exhibit-1009, Filed on Jun. 12, 2024—Cited in IPR2024-01004, challenging U.S. Pat. No. 9,614,943, 456 pages.
EX1009—USSN 90_019,169 RE of U.S. Pat. No. 11,244,666_Part 5 of 5, Exhibit-1009, Filed on Jun. 12, 2024—Cited in IPR2024-01004, challenging U.S. Pat. No. 9,614,943, 421 pages.
EX1010—473 Patent Family Tree, Exhibit-1010, Filed on Jun. 12, 2024—Cited in IPR2024-01003, challenging U.S. Pat. No. 9,191,083, 1 pages.
EX1010—473 Patent Family Tree, Exhibit-1010, Filed on Jun. 12, 2024—Cited in IPR2024-01004, challenging U.S. Pat. No. 9,614,943, 1 pages.
EX1011—Claim Construction Order, ED Tex, Exhibit-1011, Filed on Jun. 12, 2024—Cited in IPR2024-01003, challenging U.S. Pat. No. 9,191,083, 51 pages.
EX1011—Claim Construction Order, ED Tex, Exhibit-1011, Filed on Jun. 12, 2024—Cited in IPR2024-01004, challenging U.S. Pat. No. 9,614,943, 51 pages.
EX1012—Docket Control Order, ED Tex, Exhibit-1012, Filed on Jun. 12, 2024—Cited in IPR2024-01003, challenging U.S. Pat. No. 9,191,083, 6 pages.
EX1012—Docket Control Order, ED Tex, Exhibit-1012, Filed on Jun. 12, 2024—Cited in IPR2024-01004, challenging U.S. Pat. No. 9,614,943, 6 pages.
EX1013—Letter from Nikhil Krishnan to Thomas J Friel, Jr, Exhibit-1013, Filed on Jun. 12, 2024—Cited in IPR2024-01003, challenging U.S. Pat. No. 9,191,083, 3 pages.

EX1013—Letter from Nikhil Krishnan to Thomas J Friel, Jr, Exhibit-1013, Filed on Jun. 12, 2024—Cited in IPR2024-01004, challenging U.S. Pat. No. 9,614,943, 3 pages.
EX1016—Stay Order from E.D. Tex.Exhibit1016, Nov. 20, 2024—Cited in IPR2024-01033, challenging U.S. Pat. No. 8,434,966, 2 pages.
EX1019—US Provisional App 60-841990 (Rosenberg Provisional) (annotated), Exhibit-1019, Filed on Jun. 12, 2024—Cited in IPR2024-01003, challenging U.S. Pat. No. 9,191,083, 26 pages.
EX1023—Preliminary Constructions, E.D. Tex, Exhibit-1023, Filed on Jan. 31, 2023—Cited in IPR2022-00369, challenging U.S. Pat. No. 10,405,082, 5 pages.
EX1023—Preliminary Constructions, E.D. Tex, Exhibit-1023, Filed on Jan. 31, 2023—Cited in IPR2022-00388, challenging U.S. Pat. No. 10,966,015, 5 pages.
EX1024—Cohen, Exhibit-1024, Filed on Feb. 9, 2024—Cited in IPR2024-00559, challenging U.S. Pat. No. 11,610,587, 16 pages.
EX1024—Transcript of Deposition of Marshall Buck, Exhibit-1024, Filed on Jan. 31, 2023—Cited in IPR2022-00369, challenging U.S. Pat. No. 10,405,082, 213 pages.
EX1024—Transcript of Deposition of Marshall Buck, Exhibit-1024, Filed on Jan. 31, 2023—Cited in IPR2022-00388, challenging U.S. Pat. No. 10,966,015, 213 pages.
EX1025—Blattner et al., Earcons and Icons, Exhibit-1025, Filed on Jun. 25, 2024—Cited in IPR2024-01031, challenging U.S. Pat. No. 7,049,850, 34 pages.
Ex1025—Deposition Transcript of David Kleinschmidt, Exhibit-1025, Filed on Jan. 11, 2023—Cited in IPR2022-00253, challenging U.S. Pat. No. 9,491,542, 171 pages.
EX1025—Stay Order from E.D. Tex, Exhibit-1025, Filed on Nov. 20, 2024—Cited in IPR2024-01034, challenging U.S. Pat. No. 9,279,263, 2 pages.
EX1025—Tanenbaum, Exhibit-1025, Filed on Feb. 9, 2024—Cited in IPR2024-00559, challenging U.S. Pat. No. 11,610,587, 21 pages.
EX1025 Petitioners' Oral Hearing Demonstratives, Exhibit-1025, Filed on May 9, 2023—Cited in IPR2022-00369, challenging U.S. Pat. No. 10,405,082, 51 pages.
EX1025 Petitioners' Oral Hearing Demonstratives, Exhibit-1025, Filed on May 9, 2023—Cited in IPR2022-00388, challenging U.S. Pat. No. 10,966,015, 51 pages.
Ex1026—Cessation from Merriam-Webster's Collegiate Dictionary, 10th Ed, Exhibit-1026, Filed on Jan. 11, 2023—Cited in IPR2022-00253, challenging U.S. Pat. No. 9,491,542, 4 pages.
EX1026—Computer Dictionary 2nd Ed, Exhibit-1026, Filed on Feb. 9, 2024—Cited in IPR2024-00559, challenging U.S. Pat. No. 11,610,587, 5 pages.
Ex1027—Cessation from New World Dictionary, 2d College Ed, Exhibit-1027, Filed on Jan. 11, 2023—Cited in IPR2022-00253, challenging U.S. Pat. No. 9,491,542, 2 pages.
EX1028—Basu, Exhibit-1028, Filed on Jun. 12, 2024—Cited in IPR2024-01003, challenging U.S. Pat. No. 9,191,083, 4 pages.
EX1028—Basu, Smart Headphones, Exhibit-1028, Filed on Jun. 12, 2024—Cited in IPR2024-01004, challenging U.S. Pat. No. 9,614,943, 4 pages.
Ex1028—Supplemental Declaration of Nathanial Polish, Ph.D, Exhibit-1028, Filed on Jan. 11, 2023—Cited in IPR2022-00253, challenging U.S. Pat. No. 9,491,542, 20 pages.
EX1029—Declaration of Nathanial Polish, Exhibit-1029, Filed on Jan. 11, 2023—Cited in IPR2022-00281, challenging U.S. Pat. No. 9,270,244, 23 pages.
EX1029—Mueller, Transparent Hearing, Exhibit-1029, Filed on Jun. 12, 2024—Cited in IPR2024-01003, challenging U.S. Pat. No. 9,191,083, 2 pages.
EX1029—Mueller, Transparent Hearing, Exhibit-1029, Filed on Jun. 12, 2024—Cited in IPR2024-01004, challenging U.S. Pat. No. 9,614,943, 2 pages.
EX1030—Deposition Transcript of David Kleinschmidt, Exhibit-1030, Filed on Jan. 11, 2023—Cited in IPR2022-00281, challenging U.S. Pat. No. 9,270,244, 171 pages.
EX1031—587 Patent Family Tree, Exhibit-1031, Filed on Feb. 9, 2024—Cited in IPR2024-00559, challenging U.S. Pat. No. 11,610,587, 1 pages.

(56) References Cited

OTHER PUBLICATIONS

EX1031—Basu, et al., Smart Headphones, Exhibit-1031, Filed on Jun. 25, 2024—Cited in IPR2024-01031, challenging U.S. Pat. No. 7,049,850, 4 pages.
EX1031—Cessation from Merriam-Webster's Collegiate Dictionary, 10th Ed, Exhibit-1031, Filed on Jan. 11, 2023—Cited in IPR2022-00281, challenging U.S. Pat. No. 9,270,244, 4 pages.
EX1031—Patent Rule 4-3 Joint Claim Construction and Prehearing Statement, E.D. Tx, Exhibit-1031, Filed on Mar. 7, 2023—Cited in IPR2022-00253, challenging U.S. Pat. No. 9,491,542, 32 pages.
EX1032—Cessation from New World Dictionary, 2d College Ed, Exhibit-1032, Filed on Jan. 11, 2023—Cited in IPR2022-00281, challenging U.S. Pat. No. 9,270,244, 3 pages.
EX1032—Ex. A-01_U.S. Appl. No. 11/610,587 Samsung Infringement Claim Chart, Exhibit-1032, Filed on Feb. 9, 2024—Cited in IPR2024-00559, challenging U.S. Pat. No. 11,610,587, 96 pages.
EX1032—Excerpts from Microsoft Computer Dictionary, 4th ed, Exhibit-1032, Filed on Jun. 25, 2024—Cited in IPR2024-01031, challenging U.S. Pat. No. 7,049,850, 3 pages.
Ex1032—Petitioners' Oral Hearing Demonstratives, Exhibit-1032, Filed on Apr. 12, 2023—Cited in IPR2022-00253, challenging U.S. Pat. No. 9,491,542, 66 pages.
EX1033—Order Granting Proposed Docket Control Order, Exhibit-1033, Filed on Feb. 9, 2024—Cited in IPR2024-00559, challenging U.S. Pat. No. 11,610,587, 6 pages.
EX1033—Pending from Merriam-Webster's Collegiate Dictionary, 10th Ed, Exhibit-1033, Filed on Jan. 11, 2023—Cited in IPR2022-00281, challenging U.S. Pat. No. 9,270,244, 3 pages.
EX1034—Computer Dictionary 2nd Ed, Exhibit-1034, Filed on Jun. 12, 2024—Cited in IPR2024-01003, challenging U.S. Pat. No. 9,191,083, 5 pages.
EX1034—D Del Statistics, Exhibit-1034, Filed on Feb. 9, 2024—Cited in IPR2024-00559, challenging U.S. Pat. No. 11,610,587, 1 pages.
EX1034—Pause from Merriam-Webster's Collegiate Dictionary, 10th Ed, Exhibit-1034, Filed on Jan. 11, 2023—Cited in IPR2022-00281, challenging U.S. Pat. No. 9,270,244, 3 pages.
EX1035—Deposition Transcript for Daniel P. Anagnos, Exhibit-1035, Filed on Jan. 10, 2023—Cited in IPR2022-00324, challenging U.S. Pat. No. 8,254,591, 75 pages.
EX1035—File History of U.S. Pat. No. 10,635,382; Exhibit-1035, Filed on Dec. 2, 2022—Cited in IPR2022-00234, challenging U.S. Pat. No. 9,124,982, 502 pages.
EX1035—Letter to Techiya re 587 IPR Stipulation, Exhibit-1035, Filed on Feb. 9, 2024—Cited in IPR2024-00559, challenging U.S. Pat. No. 11,610,587, 3 pages.
EX1035—National Judicial Caseload Profile, Exhibit-1035, Filed on Jun. 25, 2024—Cited in IPR2024-01031, challenging U.S. Pat. No. 7,049,850, 95 pages.
EX1035—Patent Rule 4-3 Joint Claim Construction and Prehearing Statement, E.D. Tx, Exhibit-1035, Filed on Mar. 7, 2023—Cited in IPR2022-00281, challenging U.S. Pat. No. 9,270,244, 32 pages.
EX1035—Tanenbaum Excerpt, Exhibit-1035, Filed on Jun. 12, 2024—Cited in IPR2024-01003, challenging U.S. Pat. No. 9,191,083, 18 pages.
EX1036—LinkedIn Profile for Harish Jonnalagadda, Exhibit-1036, Filed on Jan. 10, 2023—Cited in IPR2022-00324, challenging U.S. Pat. No. 8,254,591, 3 pages.
EX1036—Oshana excerpt, Exhibit-1036, Filed on Jun. 12, 2024—Cited in IPR2024-01003, challenging U.S. Pat. No. 9,191,083, 16 pages.
EX1036—Oshana excerpt, Exhibit-1036, Filed on Jun. 12, 2024—Cited in IPR2024-01004, challenging U.S. Pat. No. 9,614,943, 16 pages.
EX1036—Petitioners' Oral Hearing Demonstratives, Exhibit-1036, Filed on Apr. 13, 2023—Cited in IPR2022-00281, challenging U.S. Pat. No. 9,270,244, 70 pages.
EX1036—Stay Order from E.D. Tex, Exhibit-1036, Filed on Nov. 20, 2024—Cited in IPR2024-01031, challenging U.S. Pat. No. 7,049,850, 2 pages.

EX1038—Handbook for Sound Engineers_Part 1 of 2, Exhibit-1038, Filed on Jun. 12, 2024—Cited in IPR2024-01003, challenging U.S. Pat. No. 9,191,083, 18 pages.
EX1040—IPR2022-00234, Ex 2001, Declaration of Daniel P Anagnos; Exhibit-1040, Filed on Dec. 2, 2022—Cited in IPR2022-00234, challenging U.S. Pat. No. 9,124,982, 63 pages.
EX1041—Nov. 18, 2022, Deposition Transcript of Daniel P Anagnos; Exhibit-1041, Filed on Dec. 2, 2022—Cited in IPR2022-00234, challenging U.S. Pat. No. 9,124,982, 15 pages.
EX1041—Supplemental Declaration of Les E. Atlas, Ph.D, Exhibit-1041, Filed on Jan. 10, 2023—Cited in IPR2022-00324, challenging U.S. Pat. No. 8,254,591, 36 pages.
EX1042—Excerpts from the Authoritative Dictionary of IEEE Standards Terms; Exhibit-1042, Filed on Dec. 2, 2022—Cited in IPR2022-00234, challenging U.S. Pat. No. 9,124,982, 4 pages.
Ex1042—Petitioners' Oral Hearing Demonstratives, Exhibit-1042, Filed on Apr. 4, 2023—Cited in IPR2022-00324, challenging U.S. Pat. No. 8,254,591, 63 pages.
EX1043—Institution Decision, IPR2022-00234, Paper 16; Exhibit-1043, Filed on Dec. 2, 2022—Cited in IPR2022-00234, challenging U.S. Pat. No. 9,124,982, 73 pages.
EX1044—Patent Owner Response, IPR2022-00234, Paper 22; Exhibit-1044, Filed on Dec. 2, 2022—Cited in IPR2022-00234, challenging U.S. Pat. No. 9,124,982, 58 pages.
EX1045—Excerpt of Prosecution History of U.S. Appl. No. 17/483,190, Exhibit-1045, Filed on Jun. 12, 2024—Cited in IPR2024-01003, challenging U.S. Pat. No. 9,191,083, 20 pages.
EX1056—USP11710473 Samsung Infringement Claim Chart, Ex. A-06, Exhibit-1056, Filed on Jun. 12, 2024—Cited in IPR2024-01003, challenging U.S. Pat. No. 9,191,083, 167 pages.
EX1056—USP11710473 Samsung Infringement Claim Chart, Ex. A-06, Exhibit-1056, Filed on Jun. 12, 2024—Cited in IPR2024-01004, challenging U.S. Pat. No. 9,614,943, 167 pages.
EX1058—Kuo, Active Noise Control, Exhibit-1058, Filed on Jun. 12, 2024—Cited in IPR2024-01004, challenging U.S. Pat. No. 9,614,943, 31 pages.
Ex1058—Petitioners' Oral Hearing Demonstratives, Exhibit - 1058, Filed on 3/16/2023- Cited in IPR2022-00242, challenging U.S. Patent No. 8, 111,839, 110 pages.
Ex1058—Petitioners' Oral Hearing Demonstratives, Exhibit-1058, Filed on Mar. 16, 2023—Cited in IPR2022-00243, challenging U.S. Pat. No. 8,111,839, 110 pages.
EX1059—Stay Order from E.D. Tex, Exhibit-1059, Filed on Nov. 20, 2024—Cited in IPR2024-01003, challenging U.S. Pat. No. 9,191,083, 2 pages.
EX1059—Stay Order from E.D. Tex, Exhibit-1059, Filed on Nov. 20, 2024—Cited in IPR2024-01004, challenging U.S. Pat. No. 9,614,943, 2 pages.
Excerpt from Computer Dictionary, 2d ed, Exhibit-1027, Filed on Dec. 13, 2021—Cited in IPR2022-00242, challenging U.S. Pat. No. 8,111,839, 5 pages.
Excerpt from Computer Dictionary, 2d ed, Exhibit-1027, Filed on Dec. 13, 2021—Cited in IPR2022-00243, challenging U.S. Pat. No. 8,111,839, 5 pages.
Excerpt from Computer Dictionary, 2d ed.; Exhibit-1029, Filed on Dec. 13, 2021—Cited in IPR2022-00234, challenging U.S. Pat. No. 9,124,982, 5 pages.
Excerpt from Dictionary of Scientific and Technical Terms, 5th ed, Exhibit-1026, Filed on Dec. 20, 2021—Cited in IPR2022-00324, challenging U.S. Pat. No. 8,254,591, 5 pages.
Excerpt from McGraw Hill Dictionary of Scientific and Technical Terms, 5th ed, Exhibit-1025, Filed on Dec. 13, 2021—Cited in IPR2022-00242, challenging U.S. Pat. No. 8,111,839, 5 pages.
Excerpt from McGraw-Hill Dictionary of Scientific and Technical Terms, 5th ed, Exhibit-1025, Filed on Dec. 13, 2021—Cited in IPR2022-00243, challenging U.S. Pat. No. 8,111,839, 5 pages.
Excerpt from Oshana; Exhibit-1030, Filed on Dec. 13, 2021—Cited in IPR2022-00234, challenging U.S. Pat. No. 9,124,982, 160 pages.
Excerpt of File History of U.S. Appl. No. 12/100,281; Exhibit-1006, Filed on Dec. 13, 2021—Cited in IPR2022-00234, challenging U.S. Pat. No. 9,124,982, 85 pages.

(56) References Cited

OTHER PUBLICATIONS

Excerpt of File History of U.S. Appl. No. 13/352,694; Exhibit-1007, Filed on Dec. 13, 2021—Cited in IPR2022-00234, challenging U.S. Pat. No. 9,124,982, 58 pages.

Excerpts from Discrete-Time Signal Processing, Third Edition, Alan V. Oppenheim & Ronald W. Schafer, Aug. 18, 2009, 161 pages.

Excerpts from Federal Court Management Statistics, Exhibit-1022, Filed on Jul. 1, 2022—Cited in IPR2022-00369, challenging U.S. Pat. No. 10,405,082, 2 pages.

Excerpts from Federal Court Management Statistics, Exhibit-1022, Filed on Jul. 1, 2022—Cited in IPR2022-00388, challenging U.S. Pat. No. 10,966,015, 2 pages.

Excerpts from Federal Court Management Statistics, Exhibit-1023, Filed on Jul. 1, 2022—Cited in IPR2022-00410, challenging U.S. Pat. No. 10,979,836, 2 pages.

Excerpts from Federal Court Management Statistics, Exhibit-1024, Filed on Jul. 1, 2022—Cited in IPR2022-00253, challenging U.S. Pat. No. 9,491,542, 2 pages.

Excerpts from Federal Court Management Statistics, Exhibit-1026, Filed on Jul. 1, 2022—Cited in IPR2022-00302, challenging U.S. Pat. No. 9,609,424, 2 pages.

Excerpts from Federal Court Management Statistics, Exhibit-1028, Filed on Jul. 1, 2022—Cited in IPR2022-00281, challenging U.S. Pat. No. 9,270,244, 2 pages.

Excerpts from Federal Court Management Statistics, Exhibit-1034, Filed on Jul. 1, 2022—Cited in IPR2022-00324, challenging U.S. Pat. No. 8,254,591, 2 pages.

Excerpts from McGraw-Hill Dictionary of Scientific and Technical Terms, 5th ed.; Exhibit-1021, Filed on Dec. 13, 2021—Cited in IPR2022-00234, challenging U.S. Pat. No. 9,124,982, 5 pages.

Excerpts from Openheim, Exhibit-1016, Filed on Jan. 4, 2022—Cited in IPR2022-00388, challenging U.S. Pat. No. 10,966,015, 161 pages.

Excerpts from Oppenheim & Schafer, 3rd ed, Exhibit-1016, Filed on Dec. 30, 2021—Cited in IPR2022-00369, challenging U.S. Pat. No. 10,405,082, 161 pages.

Excerpts from Oshana, Exhibit-1027, Filed on Dec. 20, 2021—Cited in IPR2022-00324, challenging U.S. Pat. No. 8,254,591, 160 pages.

Excerpts from Oshana, Exhibit-1028, Filed on Dec. 13, 2021—Cited in IPR2022-00242, challenging U.S. Pat. No. 8,111,839, 160 pages.

Excerpts from Oshana, Exhibit-1028, Filed on Dec. 13, 2021—Cited in IPR2022-00243, challenging U.S. Pat. No. 8,111,839, 160 pages.

Exhbit-1001—U.S. Pat. No. 11,589,329, filed by Steven W. Goldstein, Assignee: Staton Techiya LLC, IPR2024-01300, filed on Apr. 20, 2021, pp. 1-19.

Exhbit-1001—U.S. Pat. No. 8,805,692, filed by Steven Wayne Goldstein, Assignee: Personics Holdings, LLC, IPR2024-01301, filed on Jan. 7, 2014, pp. 1-17.

Exhbit-1004—U.S. Pat. No. 7,570,158, filed by Michael S. Denny, Assignee: AT&T Intellectual Property I, L.P., IPR2024-01300, filed on Aug. 17, 2006, pp. 1-22.

Exhbit-1004—U.S. Publication No. 20060132382, filed by James H. Jannard, IPR2024-01301, filed on Dec. 22, 2004, pp. 1-79.

Exhbit-1005—U.S. Pat. No. 7,529,677, filed by John W. Wittenberg, Assignee: ITT Manufacturing Enterprises, Inc.,, IPR2024-01301, filed on Jan. 21, 2005, pp. 1-10.

Exhbit-1006—U.S. Publication No. 20070038395, filed by David John Green, IPR2024-01300, filed on Sep. 2, 2004, pp. 1-8.

Exhbit-1007—U.S. Publication No. 20060020960, filed by Sandeep Relan, IPR2024-01301, filed on Sep. 6, 2005, pp. 1-39.

Exhbit-1009—U.S. Pat. No. 6,219,645, filed by Charles Calvin Byers, Assignee: Lucent Technologies, Inc., IPR2024-01300, filed on Dec. 2, 1999, pp. 1-20.

Exhbit-1009—U.S. Publication No. 20030130852, filed by Shinichi Tanaka, Assignee: Kabushiki Kaisha Toshiba, IPR2024-01301, filed on Jan. 2, 2003, pp. 1-41.

Exhbit-1010—U.S. Publication No. 20100311390, filed by Gerald R. Black, IPR2024-01301, filed on Sep. 22, 2008, pp. 1-40.

Exhbit-1011—U.S. Publication No. 20070165875, filed by Behrooz Rezvani, IPR2024-01301, filed on Dec. 1, 2006, pp. 1-18.

Exhbit-1012—Introduction to Computer Network, Source: A.S. Tanenbaum: Computer Networks, 3rd. Edition, *Harman* V. *St Cases Tech*, under Case IPR2024-01300, 1997, pp. 1-7.

Exhbit-1012—United States District Courts National Judicial Caseload Profile, filed by *Harman* v. *ST Cases Tech*, Under Case IPR2024-01301, Dated Aug. 30, 2024, pp. 1-95.

Exhbit-1013—"Architecture & Terminology Overview: Specification of the Bluetooth System Wireless connections made easy", Specification vol. 1, Version 1.2, IPR2024-01300, Nov. 5, 2003, pp. 1-31.

Exhbit-1013—U.S. Publication No. 20060136378, filed by Anthony G. Martin, IPR2024-01301, filed on Dec. 17, 2004, pp. 1-13.

Exhbit-1014—Australian Patent Application No. 2005201979, filed by NEC Corporation, IPR2024-01301, filed on May 10, 2005, pp. 1-50.

Exhbit-1014—U.S. Pat. No. 7,529,677, filed by John W. Wittenberg, Assignee: ITT Manufacturing Enterprises, Inc., IPR2024-01300, filed on Jun. 21, 2005, pp. 1-10.

Exhbit-1015—Computer Dictionary, 2nd Edition, The Comprehensive Standard for Business, School, Library, and Home, software engineering, *Harman* v. *ST Cases Tech*, Under Case IPR2024-01301, 1994, pp. 1-5.

Exhbit-1015—U.S. Pat. No. 7,769,591, filed by George M. White, IPR2024-01300, filed on Aug. 31, 2006, pp. 1-22.

Exhbit-1016—U.S. Pat. No. 5,251,263, filed by Douglas Andrea, Assignee: Andrea Electronics Corporation, IPR2024-01301, filed on May 22, 1992, pp. 1-33.

Exhbit-1019—Complaint for Patent Infringement filed by *Staton Techiya, LLC*, v. *Harman International Industries*, Incorporated and Harman-Kardon, Inc., Case 1:23-cv-00802-UNA, Under IPR2024-01301, Jul. 26, 2023, pp. 1-252.

Exhibit-10—Term Order filed by *Harman International Industries, Inc.*, v. *St Casestech, LLC*, for IPR2024-01299 (U.S. Pat. No. 8,319,620 B2) IPR2024-01300 (U.S. Pat. No. 11,589,329 B1) IPR2024-01301 (U.S. Pat. No. 8,805,692 B2) IPR2024-01302 (U.S. Pat. No. 8,150,044 B2) IPR2024-01303 (U.S. Pat. No. 11,521,632 B2)1, Dated Jan. 14, 2025, 5 pages.

Exhibit-11—Notice of Refund, Filed by *Harman International Industries, Inc.*, v. *St Casestech, LLC*, for U.S. Pat. No. 8,805,692 Under Case IPR2024-01301, Mailed on Jan. 17, 2024, 2 pages.

Exhibit-12—Notice of Refund filed by *Harman International Industries, Inc.*, vs. *St Casestech, LLC*, for U.S. Pat. No. 11,589,329 under Case IPR2024-01300, Mailed on Jan. 17, 2024, 2 pages.

Exhibit-9—Term Order filed by *Harman International Industries, Inc.*, vs. *St Casestech, LLC*, for IPR2024-01299 (U.S. Pat. No. 8,319,620 B2) IPR2024-01300 (U.S. Pat. No. 11,589,329 B1) IPR2024-01301 (U.S. Pat. No. 8,805,692 B2) IPR2024-01302 (U.S. Pat. No. 8,150,044 B2) IPR2024-01303 (U.S. Pat. No. 11,521,632 B2)1, Dated Jan. 14, 2025, 5 pages.

Exhibit 3001, Exhibit-3001, Filed on Jan. 5, 2023—Cited in IPR2022-00282, challenging U.S. Pat. No. 8,315,400, 2 pages.

Exhibit 3001, Exhibit-3001, Filed on Nov. 3, 2022—Cited in IPR2022-01078, challenging U.S. Pat. No. 11,057,701, 2 pages.

Exhibit 3001, Exhibit-3001, Filed on Nov. 3, 2022—Cited in IPR2022-01106, challenging U.S. Pat. No. 11,039,259, 2 pages.

Exhibit 3001, Exhibit-3001, Filed on Apr. 6, 2023—Cited in IPR2022-00369, challenging U.S. Pat. No. 10,405,082, 2 pages.

Exhibit E9- Invalidity of U.S. Pat. No. 9,270,244 ("the '244 Patent") in view of U.S. Pat. App. Pub. 6,567,524 ("Svean"), pp. 1-55 (date not available), 55 pages.

Exhibit F5-Invalidity of U.S. Pat. No. 9,491,542 ("the '542 Patent") in view of U.S. Pat. App. Pub. 2011/0293103 ("Park"), pp. 1-81 (date not available), 81 pages.

Exhibit H5-Invalidity of U.S. Pat. No. 10,405,082 ("the '082 Patent") in view of U.S. Pat. Appl. Pub. No. 2014/0163976, pp. 1-151 (date not available), 151 pages.

(56)        References Cited

OTHER PUBLICATIONS

Exhibit K1 (Calhoun) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 469 pages.

Exhibit K10 (Kelliher) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 157 pages.

Exhibit K11 (Kopra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 285 pages.

Exhibit K12 (Lagassey '043) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 332 pages.

Exhibit K13 (Lemelson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 206 pages.

Exhibit K14 (Pickering) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 45 pages.

Exhibit K15 (Schuler) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 281 pages.

Exhibit K16 (Soufflet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 64 pages.

Exhibit K17 (White) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 186 pages.

Exhibit K18 (BlueAnt V1) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 266 pages.

Exhibit K19 (Lg Chocolate) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 168 pages.

Exhibit K2 (Cerra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 279 pages.

Exhibit K20 (Midomi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 262 pages.

Exhibit K21 (Promptu) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 219 pages.

Exhibit K22 (Samsung SCH-a950) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 288 pages.

Exhibit K23 (W850) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 170 pages.

Exhibit K24 (Ears) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 98 pages.

Exhibit K25 (Motorola Pebl) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 110 pages.

Exhibit K26 (Silynx QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 218 pages.

Exhibit K27 (Nacre QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 306 pages.

Exhibit K28 (Shazam) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 174 pages.

Exhibit K29 (Vlingo) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 69 pages.

Exhibit K3 (Chen '353) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 269 pages.

Exhibit K30 (Yoon) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 78 pages.

Exhibit K4 (Comerford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 136 pages.

Exhibit K5 (Couper) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 170 pages.

Exhibit K6 (Emoto) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 157 pages.

Exhibit K7 (Zaykovskiy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 124 pages.

Exhibit K8 (Hunter) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 114 pages.

Exhibit K9 (Jones) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 115 pages.

Exhibit L1 (Alves 801) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 83 pages.

Exhibit L10 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 38 pages.

Exhibit L11 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 54 pages.

Exhibit L12 (Visser '958) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 162 pages.

Exhibit L13 (Zhang 099) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 123 pages.

(56) References Cited

OTHER PUBLICATIONS

Exhibit L14 (Byford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 61 pages.

Exhibit L15 (Mejia '156) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 135 pages.

Exhibit L16 (Yang '130) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 83 pages.

Exhibit L2 (Burnett 421) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 71 pages.

Exhibit L3 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 70 pages.

Exhibit L4 (Huang 798) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 30 pages.

Exhibit L5 (Jaber) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 70 pages.

Exhibit L6 (LG HBM-730) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 93 pages.

Exhibit L7 (Nokia BH-600) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 57 pages.

Exhibit L8 (Nokia BH-900) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 75 pages.

Exhibit L9 (Pedersen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 83 pages.

Exhibit M1 (Armstrong) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 53 pages.

Exhibit M10 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 82 pages.

Exhibit M11 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 66 pages.

Exhibit M12 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 57 pages.

Exhibit M13 (Rasmussen 245) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 44 pages.

Exhibit M14 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 92 pages.

Exhibit M15 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 128 pages.

Exhibit M16 (Zurek 379) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 60 pages.

Exhibit M17 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 164 pages.

Exhibit M18 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 128 pages.

Exhibit M19 (Nacre QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 205 pages.

Exhibit M2 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 68 pages.

Exhibit M20 (SenSay) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 110 pages.

Exhibit M21 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 65 pages.

Exhibit M22 (Darbut) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 88 pages.

Exhibit M23 (Ramakrishnan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 96 pages.

Exhibit M3 (Dijsktra 972) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 56 pages.

Exhibit M4 (Hamacher 031) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 52 pages.

Exhibit M5 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 80 pages.

Exhibit M6 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 35 pages.

Exhibit M7 (Kondo 701) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 53 pages.

Exhibit M8 (Kvaldy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 81 pages.

Exhibit M9 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 87 pages.

Exhibit N1 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 104 pages.

(56) References Cited

OTHER PUBLICATIONS

Exhibit N10 (Bose) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 67 pages.

Exhibit N11 (Emoto) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 96 pages.

Exhibit N12 (Dijkstra 243) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 117 pages.

Exhibit N13 (Cohen 908) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 115 pages.

Exhibit N14 (Rast) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 123 pages.

Exhibit N15 (Bothra 629) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 53 pages.

Exhibit N16 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 139 pages.

Exhibit N17 (Engle) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 90 pages.

Exhibit N18 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 128 pages.

Exhibit N19 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 73 pages.

Exhibit N2 (Kvaløy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 79 pages.

Exhibit N20 (Killion 056) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 74 pages.

Exhibit N21 (Bothra 087) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 72 pages.

Exhibit N22 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 86 pages.

Exhibit N23 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 90 pages.

Exhibit N24 (Hohman) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 82 pages.

Exhibit N25 (Bergeron) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 100 pages.

Exhibit N26 (Frank) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 116 pages.

Exhibit N27 (Darbut 423) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 92 pages.

Exhibit N28 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 205 pages.

Exhibit N29 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 172 pages.

Exhibit N3 (Inanaga) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 100 pages.

Exhibit N30 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 189 pages.

Exhibit N31 (EarSet 2) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 172 pages.

Exhibit N32 (Etymotic ER-6) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 256 pages.

Exhibit N33 (Zen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 188 pages.

Exhibit N34 (Motorola H605) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 121 pages.

Exhibit N35 (Peltor Lite-Com II) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 223 pages.

Exhibit N36 (Discovery 655) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 308 pages.

Exhibit N37 (MX200 Series) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 121 pages.

Exhibit N38 (Sony S700) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 155 pages.

Exhibit N39 (H5 Miniblue) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 172 pages.

Exhibit N4 (Rosenberg) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 92 pages.

Exhibit N40 (3D Active Ambient IEM) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 291 pages.

Exhibit N41 (Armstrong 422) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 232 pages.

(56)         References Cited

OTHER PUBLICATIONS

Exhibit N42 (Hohn) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 160 pages.
Exhibit N43 (Mejia 228) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 180 pages.
Exhibit N44 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 264 pages.
Exhibit N45 (Thomasson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 95 pages.
Exhibit N46 (Zurek 003) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 230 pages.
Exhibit N47 (Kurcan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 444 pages.
Exhibit N48 (Rafaely) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 205 pages.
Exhibit N49 (Vaidyanathan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 155 pages.
Exhibit N5 (Visser 958) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 117 pages.
Exhibit N50 (Westerlund) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 154 pages.
Exhibit N51 (Zhang) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 138 pages.
Exhibit N6 (Terlizzi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 123 pages.
Exhibit N7 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 103 pages.
Exhibit N8 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 107 pages.
Exhibit N9 (McCune) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 118 pages.
Exhibit-3001—Email from Trials Subject Patent Owner Staton Techiya IPR Request, Under IPR2024-01299, -01300, -01301, -01302, -01303, Mailed on Dec. 4, 2024, 4 pages.
Exhibit-1002—File History of U.S. Appl. No. 14/148,752 Under IPR2024-01301, Dated Aug. 30, 2024, pp. 1-268.
Exhibit-1002—File History of U.S. Appl. No. 17/235,130 Under IPR2024-01300, Dated Aug. 30, 2024, pp. 1-730.
Exhibit-1003 - Declaration of Dr. Michael T. Johnson In Support of Petition For Inter Partes Review of U.S. Pat. No. 8,805,692 filed by

*Harman International Industries, Incorporated,* v. *St Casestech LLC,* for U.S. Pat. No. 8,805,692 Under Case IPR2024-01301, Aug. 30, 2024, pp. 1-161.
Exhibit-1003 - Declaration of Dr. Sayfe Kiaei in Support of Petition for Inter Partes Review of U.S. Pat. No. 11,589,329, filed by *Harman International Industries, Incorporated,* v. *St Casestech LLC,* for U.S. Pat. No. 11,589,329 Under IPR2024-01300, filed on Aug. 30, 2024, pp. 1-177.
Exhibit-1005—U.S. Publication No. 20080132199 filed by Kazuko Hirata, Assignee: Jupiter Net Incorporated, IPR2024-01300, filed on Aug. 30, 2024, pp. 1-28.
Exhibit-1006, U.S. Appl. No. 11/038,426, filed by *Harman* v. *ST CasesTech,* titled Methods and Apparatus for Remotely Processing Locally Generated Commands To Control a Local Device, filed on Jan. 21, 2005, pp. 1-34.
Exhibit-1007—Translation of Japanese Patent Application Publication No. 2004-212544, filed by *Harman* v. *ST CasesTech,* Under IPR2024-01300, filed on Aug. 30, 2024, pp. 1-63.
Exhibit-1008—Original Copy of Japanese Publication No. 2004-212544, filed by *Harman* v. *ST CasesTech,* Under IPR2024-01300, filed on Aug. 30, 2024, pp. 1-33.
Exhibit-1010—United States District Courts—National Judicial Caseload Profile filed by *Harman* v. *ST CasesTech,* Under IPR2024-01300, filed on Aug. 30, 2024, pp. 1-95.
Exhibit-1011—Complaint for Patent Infringement filed by *Staton Techiya, LLC,* v. *Harman International Industries,* Incorporated Case 1:23-cv-00801-UNA, IPR2024-01300 filed on Jul. 25, 2023, pp. 1-86.
Exhibit-1016—File History of U.S. Appl. No. 16/736,820 Under IPR2024-01300, Dated Jan. 8, 2020, 151 pages.
Exhibit-1017—File History for U.S. Appl. No. 16/055,488, filed by *Herman* v. *ST Cases Tech,* IPR2024-01300, filed on Aug. 30, 2024, pp. 1-165.
Exhibit-1017, File History of U.S. Appl. No. 60/806,769, filed by *Harman* v. *ST CasesTech,* titled Personalized Services delivered to a Personal Audio Assistant (PAA), filed on Jul. 8, 2006, pp. 1-44.
Exhibit-1018—File History of U.S. Appl. No. 13/976,636 Under IPR2024-01300, filed on Aug. 30, 2024, 572 pages.
Exhibit-1019—Declaration of Jonathan Bradford in Support Of Petition for Inter Partes Review of U.S. Pat. No. 11,589,329 filed by *Harman International Industries, Inc.,* v. *St Casestech, LLC,* for U.S. Pat. No. 11,589,329 Under Case IPR2024-01300, Aug. 30, 2024, pp. 1-7.
Exhibit-1020—Declaration of Jonathan Bradford in Support Of Petition for Inter Partes Review of U.S. Pat. No. 8,805,692 filed by *Harman International Industries, Inc.,* v. *St Casestech, LLC,* for U.S. Pat. No. 8,805,692 Under Case IPR2024-01301, Aug. 30, 2024, pp. 1-7.
Exhibit-5—Notice of Filing Date Accorded to Petition and Time for Filing Patent Owner Preliminary Response filed by *Harman International Industries, Inc.,* v. *St Casestech, LLC,* for U.S. Pat. No. 8,805,692 Under IPR2024-01301, Mailed on Oct. 15, 2024, 6 pages.
Exhibit-6—Notice of Filing Date Accorded to Petition and Time for Filing Patent Owner Preliminary Response filed by *Harman International Industries, Inc.,* v. *St Casestech, LLC,* for U.S. Pat. No. 11,589,329 Under IPR2024-01300, Mailed on Oct. 10, 2024, 6 pages.
Experimentation To Address Appropriate Test Techniques For Measuring The Attenuation Provided By Double ANR Hearing Protectors, Susan E. Mercy, Christopher Tubb and Soo H. James, New Directions for Improving Audio Effectiveness (pp. 18-1-18-14). Meeting Proceedings RTO-MP-HFM-123, Paper 18. Neuilly-sur-seine, France: RTO, Apr. 1, 2005, 15 pages.
Extract from Federal Court Management Statistics, Exhibit-1021, Filed on Nov. 10, 2022—Cited in IPR2022-01099, challenging U.S. Pat. No. 11,244,666, 2 pages.
Extract from Federal Court Management Statistics, Exhibit-1024, Filed on Nov. 10, 2022—Cited in IPR2022-01078, challenging U.S. Pat. No. 11,057,701, 2 pages.
Extract from Federal Court Management Statistics, Exhibit-1027, Filed on Nov 15, 2022—Cited in IPR2022-01098, challenging U.S. Pat. No. 11,217,237, 2 pages.

(56) References Cited

OTHER PUBLICATIONS

Extract from Federal Court Management Statistics, Exhibit-1030, Filed on Nov. 10, 2022—Cited in IPR2022-01106, challenging U.S. Pat. No. 11,039,259, 2 pages.

Federal Court Management Statistics (excerpt), Exhibit-2004, Filed on Jul. 1, 2022—Cited in IPR2022-00253, challenging U.S. Pat. No. 9,491,542, 1 pages.

Federal Court Management Statistics (excerpt), Exhibit-2004, Filed on Jul. 1, 2022—Cited in IPR2022-00281, challenging U.S. Pat. No. 9,270,244, 1 pages.

Federal Court Management Statistics (excerpt), Exhibit-2004, Filed on Jul. 1, 2022—Cited in IPR2022-00302, challenging U.S. Pat. No. 9,609,424, 1 pages.

Federal Court Management Statistics (excerpt), Exhibit-2004, Filed on Jul. 1, 2022—Cited in IPR2022-00324, challenging U.S. Pat. No. 8,254,591, 1 pages.

Federal Court Management Statistics (excerpt), Exhibit-2005, Filed on Jul. 1, 2022—Cited in IPR2022-00369, challenging U.S. Pat. No. 10,405,082, 1 pages.

Federal Court Management Statistics (excerpt), Exhibit-2005, Filed on Jul. 1, 2022—Cited in IPR2022-00410, challenging U.S. Pat. No. 10,979,836, 1 pages.

Federal Court Management Statistics (excerpt), Exhibit-2006, Filed on Jul. 1, 2022—Cited in IPR2022-00388, challenging U.S. Pat. No. 10,966,015, 1 pages.

File History for U.S. Pat. No. 9,491,542, Exhibit-1004, Filed on Dec. 17, 2021—Cited in IPR2022-00253, challenging U.S. Pat. No. 9,491,542, 206 pages.

File History of U.S. Appl. No. 16/168,752, Exhibit-2005, Filed on May 18, 2022—Cited in IPR2022-00388, challenging U.S. Pat. No. 10,966,015, 172 pages.

File History of corresponding Reexamination U.S. Appl. No. 90/015,146, filed Oct. 28, 2022, 1270 pages.

File History of corresponding Reexamination U.S. Appl. No. 90/019,169, filed Feb. 24, 2023, Reexamination Certificate Issued Oct. 11, 2023 as U.S. Pat. No. 11,244,666 C1. 998 pages.

File History of U.S. Appl. No. 12/555,864, Exhibit-1012, Filed on Jan. 14, 2022—Cited in IPR2022-00410, challenging U.S. Pat. No. 10,979,836, 268 pages.

File History of U.S. Appl. No. 14/054,015, Exhibit-1011, Filed on Jan. 14, 2022—Cited in IPR2022-00410, challenging U.S. Pat. No. 10,979,836, 140 pages.

File History of U.S. Appl. No. 14/827,332, Exhibit-1010, Filed on Jan. 14, 2022—Cited in IPR2022-00410, challenging U.S. Pat. No. 10,979,836, 253 pages.

File History of U.S. Appl. No. 15/700,511, Exhibit-1009, Filed on Jan. 14, 2022—Cited in IPR2022-00410, challenging U.S. Pat. No. 10,979,836, 162 pages.

File History of U.S. Appl. 16/414,136, Exhibit-1013, Filed on Jan. 14, 2022—Cited in IPR2022-00410, challenging U.S. Pat. No. 10,979,836, 220 pages.

File History of U.S. Pat. No. 8,111,839, Exhibit-1005, Filed on Dec. 13, 2021—Cited in IPR2022-00242, challenging U.S. Pat. No. 8,111,839, 244 pages.

File History of U.S. Pat. No. 8,111,839, Exhibit-1005, Filed on Dec. 13, 2021—Cited in IPR2022-00243, challenging U.S. Pat. No. 8,111,839, 244 pages.

File History of U.S. Pat. No. 8,254,591, Exhibit-1004, Filed on Dec. 20, 2021—Cited in IPR2022-00324, challenging U.S. Pat. No. 8,254,591, 263 pages.

File History of U.S. Pat. No. 9,124,982; Exhibit-1004, Filed on Dec. 13, 2021—Cited in IPR2022-00234, challenging U.S. Pat. No. 9,124,982, 152 pages.

File History of U.S. Pat. No. 10,405,082, Exhibit-1004, Filed on Dec. 30, 2021—Cited in IPR2022-00369, challenging U.S. Pat. No. 10,405,082, 172 pages.

File History of U.S. Pat. No. 10,966,015, Exhibit-1005, Filed on Jan. 4, 2022—Cited in IPR2022-00388, challenging U.S. Pat. No. 10,966,015, 139 pages.

File History of U.S. Pat. No. 10,979,836, U.S. Appl. No. 16/838,277, Exhibit-1004, Filed on Jan. 14, 2022—Cited in IPR2022-00410, challenging U.S. Pat. No. 10,979,836, 263 pages.

File History of U.S. Pat. No. 8,315,400, Exhibit-1004, Filed on Dec. 10, 2021—Cited in IPR2022-00282, challenging U.S. Pat. No. 8,315,400, 237 pages.

File History of U.S. Pat. No. 8,774,433, Exhibit-1009, Filed on Dec. 21, 2021—Cited in IPR2022-00302, challenging U.S. Pat. No. 9,609,424, 275 pages.

File History of U.S. Pat. No. 9,270,244, Exhibit-1004, Filed on Dec. 21, 2021—Cited in IPR2022-00281, challenging U.S. Pat. No. 9,270,244, 195 pages.

File History of U.S. Pat. No. 9,332,364, Exhibit-1005, Filed on Dec. 21, 2021—Cited in IPR2022-00302, challenging U.S. Pat. No. 9,609,424, 194 pages.

File History of U.S. Pat. No. 9,609,424, Exhibit-1004, Filed on Dec. 21, 2021—Cited in IPR2022-00302, challenging U.S. Pat. No. 9,609,424, 151 pages.

File History of U.S. Appl. No. 60/910,808; Exhibit-1005, Filed on Dec. 13, 2021—Cited in IPR2022-00234, challenging U.S. Pat. No. 9,124,982, 45 pages.

File History of U.S. Appl. No. 61/098,250, Exhibit-1005, Filed on Jan. 14, 2022—Cited in IPR2022-00410, challenging U.S. Pat. No. 10,979,836, 55 pages.

File History of U.S. Appl. No. 60/619,517 (Allen Provisional), Exhibit-1020, Filed on Dec. 21, 2021—Cited in IPR2022-00302, challenging U.S. Pat. No. 9,609,424, 41 pages.

File History of U.S. Appl. No. 60/866,420, Exhibit-1010, Filed on Dec. 21, 2021—Cited in IPR2022-00302, challenging U.S. Pat. No. 9,609,424, 81 pages.

Final Written Decision, IPR2022-00282 (Paper No. 28, Jun. 14, 2023), Exhibit-1035, Filed on Jun. 30, 2023—Cited in IPR2022-01106, challenging U.S. Pat. No. 11,039,259, 96 pages.

Final Written Decision: Final Written Decision Determining All Challenged Claims Unpatentable 35 U.S.C. sec. 318a, Exhibit-32, Filed on Jan. 5, 2024—Cited in IPR2022-01106, challenging U.S. Pat. No. 11,039,259, 104 pages.

Final Written Decision: original, Exhibit-28, Filed on Jun. 14, 2023—Cited in IPR2022-00282, challenging U.S. Pat. No. 8,315,400, 96 pages.

Final Written Decision: original, Exhibit-31, Filed on Jul. 13, 2023—Cited in IPR2022-00281, challenging U.S. Pat. No. 9,270,244, 37 pages.

Final Written Decision: original, Exhibit-33, Filed on Jul. 10, 2023—Cited in IPR2022-00324, challenging U.S. Pat. No. 8,254,591, 90 pages.

Final Written Decision: original, Exhibit-33, Filed on Jul. 14, 2023—Cited in IPR2022-00253, challenging U.S. Pat. No. 9,491,542, 92 pages.

Final Written Decision: original, Exhibit-36, Filed on Jun. 16, 2023—Cited in IPR2022-00242, challenging U.S. Pat. No. 8,111,839, 86 pages.

Final Written Decision: original; Exhibit-29, Filed on Jun. 14, 2023—Cited in IPR2022-00234, challenging U.S. Pat. No. 9,124,982, 85 pages.

Final Written Decision: Judgement Final Written Decision Determining All Challenged Claims Unpatentable 35 U.S. C. § 318(a), Exhibit-35, Filed on Jun. 20, 2023—Cited in IPR2022-00243, challenging U.S. Pat. No. 8,111,839, 59 pages.

*First Amended Complaint, Staton Techiya* v. *Samsung*, E.D. Tex, Exhibit-1008, Filed on Dec. 10, 2021—Cited in IPR2022-00282, challenging U.S. Pat. No. 8,315,400, 52 pages.

*First Amended Complaint, Staton Techiya* v. *Samsung*, E.D. Tex, Exhibit-1018, Filed on Dec. 21, 2021—Cited in IPR2022-00281, challenging U.S. Pat. No. 9,270,244, 52 pages.

*First Amended Complaint, Staton Techiya* v. *Samsung*, E.D. Tex, Exhibit-1020, Filed on Dec. 17, 2021—Cited in IPR2022-00253, challenging U.S. Pat. No. 9,491,542, 52 pages.

*First Amended Complaint, Staton Techiya* v. *Samsung*, E.D. Tex, Exhibit-1029, Filed on Dec. 20, 2021—Cited in IPR2022-00324, challenging U.S. Pat. No. 8,254,591, 52 pages.

(56) References Cited

OTHER PUBLICATIONS

*First Amended Complaint, Techiya* v. *Samsung*, E.D. Tex, Exhibit-1040, Filed on Dec. 13, 2021—Cited in IPR2022-00242, challenging U.S. Pat. No. 8,111,839, 52 pages.
*First Amended Complaint, Techiya* v. *Samsung*, E.D. Tex, Exhibit-1040, Filed on Dec. 13, 2021—Cited in IPR2022-00243, challenging U.S. Pat. No. 8,111,839, 52 pages.
*First Amended Complaint, Techiya* v. *Samsung*, E.D. Tex., Exhibit-1031, Filed on Dec. 13, 2021—Cited in IPR2022-00234, challenging U.S. Pat. No. 9,124,982, 52 pages.
Fit-Testing of Hearing Protection, WITT, The Hearing Review, May 21, 2008, 9 pages.
Gennum Zen Digital Wireless Headset ("Zen"), At least by 2004, CNET Article—Gennum Zen Bluetooth Headset Review (SAM-TECH 00098419), 4 pages.
Gennum Zen Digital Wireless Headset ("Zen"), At least by 2004, Gennum Zen User Manual (SAM-TECH 00098432), 2005, 44 pages.
Gennum Zen Digital Wireless Headset ("Zen"), At least by 2004, Globe and Mail Article—Gennum Z-E-N Headset for Bluetooth (SAM-TECH 00098485), 5 pages.
Granting Institution of Inter Partes Review 35 U.S.C. § 314, Exhibit-13, Filed on Jul. 15, 2022—Cited in IPR2022-00253, challenging U.S. Pat. No. 9,491,542, 26 pages.
Granting Institution of Inter Partes Review 35 U.S.C. § 314, Exhibit-13, Filed on Jul. 15, 2022—Cited in IPR2022-00281, challenging U.S. Pat. No. 9,270,244, 25 pages.
Granting Institution of Inter Partes Review 35 U.S.C. § 314, Exhibit-13, Filed on Aug. 16, 2022—Cited in IPR2022-00388, challenging U.S. Pat. No. 10,966,015, 42 pages.
Granting Institution of Inter Partes Review 35 U.S.C. § 314, Exhibit-14, Filed on Aug. 16, 2022—Cited in IPR2022-00369, challenging U.S. Pat. No. 10,405,082, 39 pages.
Harman Q&As about Microphone Windscreens, Exhibit-2013, Filed on Sep. 13, 2022—Cited in IPR2022-00242, challenging U.S. Pat. No. 8,111,839, 6 pages.
Harman, Q&As about Microphone Screens; Exhibit-2012, Filed on Sep. 9, 2022—Cited in IPR2022-00234, challenging U.S. Pat. No. 9,124,982, 6 pages.
Huseyin Dogan, Trym Holter, & Ingrid Svagard, Trial of a special end user terminal that aids field operators during emergency rescue operations, Proceedings of the 3rd International !Scram China Workshop, Harbin, China, at 4 (Aug. 2008) discusses the PARAT as well (SAM-TECH_00051920-SAM-TECH_00051931), 12 pages.
IEEE Dictionary of Standards Terms (excerpts), Exhibit-2006, Filed on Mar. 21, 2022—Cited in IPR2022-00282, challenging U.S. Pat. No. 8,315,400, 3 pages.
In-Ear Microphone Speech Data Recognition using HMMs, R. S. Kurcan, M. P. Fargues and R. Vaidyanathan, 2006 IEEE 12th Digital Signal Processing Workshop & 4th IEEE Signal Processing Education Workshop, Teton National Park, WY, USA, 2006, 5 pages.
In-Ear Microphone Speech Data Segmentation and Recognition using Neural Networks, G. Bulbuller, Monique Fargues & Ravi Vaidyanathan, IEEE 12th Digital Signal Processing Workshop and 4th IEEE Signal Processing Education Workshop, 2006, 6 pages.
In-Ear Microphone Techniques For Severe Noise Situations, N. Westerlund, M. Dahl, I. Claesson, Nov. 2005, 39 pages.
Institution Decision: Deny, Exhibit-12, Filed on Aug. 12, 2022—Cited in IPR2022-00410, challenging U.S. Pat. No. 10,979,836, 23 pages.
Institution Decision: Grant, Exhibit-10, Filed on Jan. 9, 2023—Cited in IPR2022-01106, challenging U.S. Pat. No. 11,039,259, 68 pages.
Institution Decision: Grant, Exhibit-12, Filed on Jun. 17, 2022—Cited in IPR2022-00282, challenging U.S. Pat. No. 8,315,400, 60 pages.
Institution Decision: Grant, Exhibit-13, Filed on Jul. 11, 2022—Cited in IPR2022-00302, challenging U.S. Pat. No. 9,609,424, 61 pages.

Institution Decision: Grant, Exhibit-13, Filed on Jul. 11, 2022—Cited in IPR2022-00324, challenging U.S. Pat. No. 8,254,591, 64 pages.
Institution Decision: Grant, Exhibit-15, Filed on Jun. 21, 2022—Cited in IPR2022-00243, challenging U.S. Pat. No. 8,111,839, 9 pages.
Institution Decision: Grant, Exhibit-16, Filed on Jun. 21, 2022—Cited in IPR2022-00242, challenging U.S. Pat. No. 8,111,839, 73 pages.
Institution Decision: Grant, Exhibit-8, Filed on Aug. 16, 2024—Cited in IPR2024-00559, challenging U.S. Pat. No. 11,610,587, 10 pages.
Institution Decision: Grant; Exhibit-12, Filed on Jun. 17, 2022—Cited in IPR2022-00234, challenging U.S. Pat. No. 9,124,982, 58 pages.
International Preliminary Report on Patentability received for PCT application No. PCT/US07/73061, mailed on Jan. 13, 2009, 4 pages.
International search Report and written opinion received for PCT application No. PCT/US07/73061, mailed on Feb. 1, 2008, 4 pages.
Isolated Word Recognition from In—Ear Microphone Data Using Hidden Markov Models (HMM), Remzi Serdar Kurcan, Mar. 2006, 179 pages.
Jawbone Aliph, At least by Sep. 9, 2004, https://www.capecodtimes.com/story/news/20 06/12/24/new-earphones-let-you-go/50845129007 (SAM-TECH 00062054), 2 pages.
Jawbone Aliph, At least by Sep. 9, 2004, https://www.cnet.com/reviews/aliph-iawbone-bluetooth-headset-review/ (SAM-TECH 00060121), 3 pages.
Jawbone Aliph, At least by Sep. 9, 2004, https://www.wired.com/2004/09/military-headset-reaches-masses (SAM-TECH 00062036), 7 pages.
Jawbone Aliph, At least by Sep. 9, 2004, Jawbone User Manual (SAM-TECH_00061992), 16 pages.
Joint Motion to Consolidate; Exhibit-2005, Filed on Apr. 29, 2022—Cited in IPR2022-00234, challenging U.S. Pat. No. 9,124,982, 7 pages.
Joint Motion to Terminate Proceeding filed by *Harman International Industries, Inc.,* v. *St Casestech, LLC,* for U.S. Pat. No. 11,589,329 Under Case IPR2024-01300, Dated Dec. 19, 2024, 8 pages.
Joint Motion to Terminate Proceeding filed by *Harman International Industries, Inc.,* v. *St Casestech, LLC,* for U.S. Pat. No. 8,805,692 Under Case IPR2024-01301, Dated Dec. 19, 2024, 8 pages.
Joint Motion to Terminate Proceeding, Exhibit-17, Filed on Dec. 9, 2024—Cited in IPR2024-00559, challenging U.S. Pat. No. 11,610,587, 7 pages.
Joint Request to Treat Settlement Agreement as Business Confidential Information filed by *Harman International Industries, Inc.,* v. *St Casestech, LLC,* for U.S. Pat. No. 11,589,329 under Case IPR2024-01300, Dated Dec. 19, 2024, 5 pages.
Joint Request to Treat Settlement Agreement as Business Confidential Information filed by *Harman International Industries, Inc.,* v. *St Casestech, LLC,* for U.S. Pat. No. 8,805,692 under Case IPR2024-01301, Dated Dec. 19, 2024, 5 pages.
Joint Request to Treat Settlement Agreement as Business Confidential Information, Exhibit-14, Filed on Dec. 9, 2024—Cited in IPR2024-01003, challenging U.S. Pat. No. 9,191,083, 5 pages.
Joint Request to Treat Settlement Agreement as Business Confidential Information, Exhibit-14, Filed on Dec. 9, 2024—Cited in IPR2024-01004, challenging U.S. Pat. No. 9,614,943, 5 pages.
Joint Request to Treat Settlement Agreement as Business Confidential Information, Exhibit-14, Filed on Dec. 9, 2024—Cited in IPR2024-01031, challenging U.S. Pat. No. 7,049,850, 5 pages.
Joint Request to Treat Settlement Agreement as Business Confidential Information, Exhibit-15, Filed on Dec. 9, 2024—Cited in IPR2024-01034, challenging U.S. Pat. No. 9,279,263, 5 pages.
Joint Request to Treat Settlement Agreement as Business Confidential Information, Exhibit-18, Filed on Dec. 9, 2024—Cited in IPR2024-00559, challenging U.S. Pat. No. 11,610,587, 5 pages.
Joint Request to Treat Settlement Agreement as Business Confidential InformationPaper13, Dec. 9, 2024—Cited in IPR2024-01033, challenging U.S. Pat. No. 8,434,966, 5 pages.

(56) References Cited

OTHER PUBLICATIONS

Joint Statement Regarding Oral Argument, Exhibit-15, Filed on Jul. 29, 2022—Cited in IPR2022-00253, challenging U.S. Pat. No. 9,491,542, 3 pages.

Joint Statement Regarding Oral Argument, Exhibit-15, Filed on Jul. 29, 2022—Cited in IPR2022-00281, challenging U.S. Pat. No. 9,270,244, 3 pages.

Joint Statement Regarding Oral Argument, Exhibit-15, Filed on Jul. 29, 2022—Cited in IPR2022-00302, challenging U.S. Pat. No. 9,609,424, 3 pages.

Joint Statement Regarding Oral Argument, Exhibit-15, Filed on Aug. 24, 2022—Cited in IPR2022-00388, challenging U.S. Pat. No. 10,966,015, 3 pages.

Joint Statement Regarding Oral Argument, Exhibit-16, Filed on Jul. 29, 2022—Cited in IPR2022-00324, challenging U.S. Pat. No. 8,254,591, 3 pages.

Joint Statement Regarding Oral Argument, Exhibit-16, Filed on Aug. 24, 2022—Cited in IPR2022-00369, challenging U.S. Pat. No. 10,405,082, 3 pages.

Joint Statement Regarding Oral Argument, Exhibit-18, Filed on Jul. 29, 2022—Cited in IPR2022-00243, challenging U.S. Pat. No. 8,111,839, 3 pages.

Joint Statement Regarding Oral Argument, Exhibit-19, Filed on Jul. 29, 2022—Cited in IPR2022-00242, challenging U.S. Pat. No. 8,111,839, 3 pages.

Joint Stipulation To Modify Due Dates 1-3, Exhibit-10, Filed on Oct. 25, 2024—Cited in IPR2024-00559, challenging U. S. Pat. No. 11,610,587, 4 pages.

Joint Stipulation To Modify Due Dates 1-3, Exhibit-12, Filed on Nov. 22, 2024—Cited in IPR2024-00559, challenging U.S. Pat. No. 11,610,587, 4 pages.

Joint Stipulation to Modify Scheduling Order, Exhibit-14, Filed on Mar. 14, 2023—Cited in IPR2022-01106, challenging U.S. Pat. No. 11,039,259, 3 pages.

Joint Stipulation to Modify the Scheduling Order, Exhibit-16, Filed on Aug. 16, 2022—Cited in IPR2022-00253, challenging U.S. Pat. No. 9,491,542, 3 pages.

Joint Stipulation to Modify the Scheduling Order, Exhibit-16, Filed on Aug. 16, 2022—Cited in IPR2022-00281, challenging U.S. Pat. No. 9,270,244, 3 pages.

Joint Stipulation to Modify the Scheduling Order, Exhibit-16, Filed on Aug. 16, 2022—Cited in IPR2022-00302, challenging U.S. Pat. No. 9,609,424, 3 pages.

Joint Stipulation to Modify the Scheduling Order, Exhibit-19, Filed on Aug. 16, 2022—Cited in IPR2022-00324, challenging U.S. Pat. No. 8,254,591, 15 pages.

Kleinschmidt Declaration in Support of Patent Owner Response, Exhibit-2018, Filed on Apr. 10, 2023—Cited in IPR2022-01106, challenging U.S. Pat. No. 11,039,259, 41 pages.

LEAP Practitioner Request and Verification Form (Patent Owner), Exhibit-29, Filed on Feb. 28, 2023—Cited in IPR2022-00243, challenging U.S. Pat. No. 8,111,839, 10 pages.

LEAP Practitioner Request and Verification Form (Patent Owner), Exhibit-30, Filed on Feb. 28, 2023—Cited in IPR2022-00242, challenging U.S. Pat. No. 8,111,839, 4 pages.

LEAP Practitioner Request and Verification Form (Petitioner), Exhibit-30, Filed on Mar. 13, 2023—Cited in IPR2022-00243, challenging U.S. Pat. No. 8,111,839, 4 pages.

LEAP Practitioner Request and Verification Form (Petitioner), Exhibit-31, Filed on Mar. 13, 2023—Cited in IPR2022-00242, challenging U.S. Pat. No. 8,111,839, 4 pages.

Learning-Based Three Dimensional Sound Localization Using a Compact Non-Coplanar Array of Microphones, Kamen Y. Guentchev and John J. Weng, Aaai Technical Report SS-98-02, 1998, 10 pages.

Letter from Petitioners' Counsel to PO's Counsel Apr. 20, 2022, Exhibit-2004, Filed on May 18, 2022—Cited in IPR2022-00369, challenging U.S. Pat. No. 10,405,082, 8 pages.

Letter from Petitioners' Counsel to PO's Counsel Apr. 20, 2022, Exhibit-2004, Filed on May 18, 2022—Cited in IPR2022-00388, challenging U.S. Pat. No. 10,966,015, 8 pages.

Letter from Petitioners' Counsel to PO's Counsel Apr. 20, 2022, Exhibit-2004, Filed on May 18, 2022—Cited in IPR2022-00410, challenging U.S. Pat. No. 10,979,836, 8 pages.

Maico MI26 Tymp/audiometer combo ("Maico MI26"), Aug. 12, 2004 WayBack Machine Capture of Maico' s website has an image of the Maico MI26 and lists the Maico MI26 as a product available for purchase. https://web.archive.org/web/20040422090329/http://www.maico-diagnostics.com:80/eprise/main/Maico/US_en/ProductCategories/ LSTO1_Tympanometers (SAM-TECH_00060329-SAM-TECH 00060331), 3 pages.

Mar. 17, 2006 Wayback Machine capture of Maico' s website has a user manual available for the Maico MI26 https:// web.archive.org/web/20060317092410/ http:/www.maico-diagnostics.com/eprise/main/Maico/Products/ Files/MI26/1162-0322REVD.pdf (SAM-TECH 00051168-SAM-TECH 00051215), 48 pages.

Mar. 17, 2006 WayBack Machine Capture of Maico's website discusses frequently asked questions about the Maico MI26 andis' features. https://web.archive.org/web/20060317092109/http://www.maico-diagnostics.com/eprise/main/Maico/Products/Files/MI24/FAQ.MI24-26.pdf (SAM-TECH 00051250-SAM-TECH 00051251), 2 pages.

Markman Hearing Transcript (excerpts), Exhibit-2022, Filed on Oct. 19, 2023—Cited in IPR2022-01106, challenging U.S. Pat. No. 11,039,259, 10 pages.

Mauer, Embedded Indexing, Exhibit-2008, Filed on Sep. 13, 2022—Cited in IPR2022-00242, challenging U.S. Pat. No. 8,111,839, 2 pages.

Mauer, Embedded Indexing: Pros and Cons for the Indexer; Exhibit-2008, Filed on Sep. 9, 2022—Cited in IPR2022-00234, challenging U.S. Pat. No. 9124982, 2 pages.

McGraw-Hill Dictionary of Scientific and Technical Terms, Exhibit-2010, Filed on Sep. 13, 2022—Cited in IPR2022-00242, challenging U.S. Pat. No. 8,111,839, 5 pages.

McGraw-Hill Dictionary of Scientific and Technical Terms; Exhibit-2009, Filed on Sep. 9, 2022—Cited in IPR2022-00234, challenging U.S. Pat. No. 9,124,982, 5 pages.

Merriam-Webster's Collegiate Dictionary (excerpt), Exhibit-2010, Filed on Oct. 11, 2022—Cited in IPR2022-01106, challenging U.S. Pat. No. 11,039,259, 3 pages.

Methods Of Developing And Validating A Field—MIRE Approach For Measuring Hearing Protector Attenuation, Berger, Elliott & Voix, Jeremie & Kieper, R, Feb. 9, 2007, in connection with 3M/Aearo Technologies' E-A-RFitTM Validation System ("E-A-RFit"); This article was originally prepared for the 32nd Annual Conference of the National Hearing Conservation Association, held on Feb. 15-17, 2007, in Savannah, Georgia, and published in Spectrum, vol. 24, Suppl. 1, 16 pages.

Methods of measuring the attenuation of hearing protection devices, E H Berger, The Journal of the Acoustical Society of America vol. 79,6 (1986), 34 pages.

Microphone Array for Headset with Spatial Noise Suppressor, Ivan Tashev, Michael Seltzer & Alex Acero, 2005, 4 pages.

Microphone Array Processing for Robust Speech Recognition, Michael L. Seltzer, Jul. 2003, 163 pages.

Montgomery Declaration with Exhibit A, Exhibit-1018, Filed on Jan. 14, 2022—Cited in IPR2022-00410, challenging U.S. Pat. No. 10,979,836, 10 pages.

Motion for Leave to File Corrected Petition, Exhibit-10, Filed on Jan. 31, 2022—Cited in IPR2022-00242, challenging U.S. Pat. No. 8,111,839, 8 pages.

Motion: Motion to dismiss due to settlement (pre-DI), Exhibit-13, Filed on Dec. 9, 2024—Cited in IPR2024-01003, challenging U.S. Pat. No. 9,191,083, 9 pages.

Motion: Motion to dismiss due to settlement (pre-DI), Exhibit-13, Filed on Dec. 9, 2024—Cited in IPR2024-01004, challenging U.S. Pat. No. 9,614,943, 9 pages.

Motion: Motion to dismiss due to settlement (pre-DI), Exhibit-13, Filed on Dec. 9, 2024—Cited in IPR2024-01031, challenging U.S. Pat. No. 7,049,850, 8 pages.

Motion: Motion to dismiss due to settlement (pre-DI), Exhibit-14, Filed on Dec. 9, 2024—Cited in IPR2024-01034, challenging U.S. Pat. No. 9,279,263, 7 pages.

(56)  References Cited

OTHER PUBLICATIONS

Motion: Motion to dismiss due to settlement (pre-DI)Paper12, Dec. 9, 2024—Cited in IPR2024-01033, challenging U.S. Pat. No. 8,434,966, 6 pages.

Motorola H5 Miniblue Bluetooth Headset, Jan. 14, 2005, https://newatlas.com/ces-2006-bluetooth-innovations-abound-inner-ear-headset-bluetooth-keyboard-and-wireless-ipod-companion/4977/ (SAM-TECH_00060368) (Motorola H5 Miniblue Bluetooth Headset), 12 pages.

Motorola H5 Miniblue Bluetooth Headset, Jan. 14, 2005, https://www.engadget.com/2006-01-04-motorolas-h5-miniblue-bluetooth-headset.html (SAM-TECH 00060628), 3 pages.

Motorola H5 Miniblue Bluetooth Headset, Jan. 14, 2005, https://www.cnet.com/tech/mobile/motorola-h5-miniblue-bluetooth-headset/ (SAM-TECH_00060424) (Motorola H5 Miniblue Bluetooth Headset), 5 pages.

Motorola H5 Miniblue Headset ("Miniblue"), Jan. 2006, Motorola H9 Bluetooth Headset User Manual (SAM-TECH 00060509-14), 6 pages.

Motorola H605, At least by 2006, CNET Article—Motorola H605 Bluetooth Headset Review (SAM-TECH 00098639), 4 pages.

Motorola H605, At least by 2006, Motorola H605 User Manual (SAM-TECH 00098719), 5 pages.

Motorola H605, At least by 2006, PhoneArena Article—Motorola H605 Review (SAM-TECH 00098743), 12 pages.

Motorola Miniblue Press Release (https://web.archive.org/web/20060212115000/http://www.motorola.com/motoinfo/product/de tails/0,, 133,00.html) (SAM-TECH 00056060), retrieved on May 16, 2022, 1 page.

Motorola's Astro XTS 5000 Digital Portable Radio ("Motorola XTS 5000"), At least by Jun. 2002, Motorola's Detailed Service Manuel has a release date in 2003. See Detailed Service Manuel for Astro XTS 5000 VHF/UHF Range 1/ Range 2/700-800 MHZ, Digital Portable Radios (2003) (SAM-TECH_00051382-SAM-TECH 00051711), 330 pages.

Motorola's Astro XTS 5000 Digital Portable Radio ("Motorola XTS 5000"), Jun. 14, 2002 WayBack Machine capture of Motorola Inc.'s website contains an image of the Motorola and states that "[t]he top of the line XTS 5000 portable radio is ready and equipped to meet the needs of demanding environments" and that it IS "Motorola's newest maximum performance two-way radio." https://web.archive.org/web/20020614082842/ http://www.motorola.com:80/cgiss/portables/ xts5000.shtml (SAM-TECH_00051718)., 1 pages.

Motorola's XTS 2500 Digital Portable Radio ("Motorola XTS 2500"), Motorola XTS 2500's Basic Service Manual dated 2002-2003, see XTS 2500 XTS 1500 MT 1500 700-800 MHz Digital Portable Radios, Basic Service Manual at 70 (SAM_00051287-SAM-TECH_00051374), 88 pages.

Motorola's XTS 2500 Digital Portable Radio ("Motorola XTS 2500"), Nov. 9, 2001, WayBack Machine capture of Motorola's website contains an image of the XTS 2500 and states that "[t]he XTS 2500 portable radio is Motorola's high- performance, small-sized, digital two-way radio." https://web.archive.org/web/20020804062125/ http://www.motorola.com:80/cgiss/portables/xts2500.shtml (SAM-TECH 00051258), 1 pages.

Mueller, There's less talking in barrels, but the occlusion effect is still with US, The Hearing Journal, Aug. 2003, pp. 10-16, vol. 56, No. 8.

Muggleton, Nacre's QUIETPRO+ Intelligent Hearing System: Delivering Performance and Hearing Protection Now for the Future of the Soldier, SoldierMod Jan. 2009, pp. 28-29, vol. 2.

Multi-Microphone Correlation-Based Processing for Robust Automatic Speech Recognition, Thomas M. Sullivan, Department of Electrical and Computer Engineering Carnegie Mellon University, Aug. 1996, 113 pages.

Multi-Microphone Signal Acquisition for Speech Recognition Systems, Kevin Fink, Ee 586 - Speech Recognition Systems, Dec. 16, 1993, 13 pages.

Multi-sensory microphones for robust speech detection, enhancement and recognition, Zhengyou Zhang, Zicheng Liu, M. Sinclair, A. Acero, L. Deng, J. Droppo, Xuedong Huang, Yanli Zheng, 2004 IEEE International Conference on Acoustics, Speech, and Signal Processing 3 (2004), 4 pages.

NACRE QuietPro, In a Mar. 7, 2013 presentation by Blake Martin of Honeywell Safety Products to the Alberta Industrial Fire Protection Association, Mr. Martin identifies "2005" as the "First commercial success for Quietpro." (SAM-TECH_00054652), 33 pages.

NACRE QuietPro, In Aug. 2006, Nacre won U.S. Government Contract No. W912DQ-06-D-0037 to supply the NACRE QuietPro to the U.S. military. U.S. Government Contract No. W912DQ-06-D-0037 (SAM-TECH 00055735), 3 pages.

NACRE QuietPro, In proceedings before the U.S. Trademark Trial and Appeal Board, Nacre stated that it "has used in commerce with the United States, long since prior to Apr. 28, 2006, the registered trademark QUIETPRO on one or more of headphones, earphones . . ." Nacre AS v. Silynx Communications, Inc, Sep. 4, 2007 Notice of Opposition. (SAM-TECH_00054696), 9 pages.

NACRE QuietPro, Mar. 9, 2005, Article posted at: https://www.tu.no/artikler/quietproverner-og-forsterker-horselen/261960 (SAM-TECH 00097600), 6 pages.

NACRE QuietPro, Mar. 9, 2005, Honeywell Quietpro QP100ex Mar. 2013 presentation (SAM-TECH_00063985), 33 pages.

NACRE QuietPro, Mar. 9, 2005, IEEE Explore Article (SAMTECH_00063687), 6 pages.

NACRE QuietPro, Mar. 9, 2005, NACRE QuietPro User Manual v2.0 (SAMTECH 00055181), 48 pages.

NACRE QuietPro, Mar. 9, 2005, New Scientist Article (SAMTECH_00064068), 2 pages.

NACRE QuietPro, Mar. 9, 2005, SoldierMod Article (SAM-TECH_00065729), 2 pages.

NACRE QuietPro, Mar. 9, 2005, WayBack Machine capture of Nacre's website contains an image of the NACRE QuietPro and states that "Nacre has secured MNOK 27,5 from a consortium led by Ferd Venture" and that "[m]ost of the money will be spent to boost efforts within sales and marketing of QUIETPRO in the global military market.", (SAM-TECH_00054131) 2 pages.

Nacre's PARAT earplug ("Parat"), 1999 article publ.by one of the PARAT's designers Georg E. Ottensen, discusses the PARAT system and states, "[a]n active ear terminal IS beeing designed atSEVTEF Telecom and informatics. The acronym of the consept is PARAT—Personal Active Radio/Audio Terminal." Georg E. Ottesen, Active noise reduction in an ear terminal, The Journal of the Acoustical Society of America 105, 300(1999); https://doi.org/10.1121/1.424828, SINTEF Telecom and Informatics, N-7465 (SAM-TECH 00051952-SAM-TECH 00051955), 4 pgs.

Nacre's PARAT earplug ("Parat"), Jan. 2004 publication by Fredrik Vraalsen et al., describes how "[p]articular attention has been given to voice interaction m noisy industrial scenarios, utilising the PARAT earplug." Fredrik Vraalsen, Trym Holter, Ingrid Storruste Svagard, and Oyvind Kvennas, A Multimodal Context Aware Mobile Maintenance Terminal For Noisy Environments, SINTEF ICT, N-7465 Trondheim, Norway, 79, 79 (Jan. 2004) (SAM-TECH_00051938-SAM-TECH 00051951), 14 pages.

Noise attenuation and proper insertion of earplugs into ear canals, Markku Toivonen, Rauno Pääkkönen, Seppo Savolainen, Kyösti Lehtomäki, The Annals of occupational hygiene, vol. 46,6 (2002): 527-530, 4 pages.

Notice : Mandatory Notice, Exhibit-5, Filed on Jul. 16, 2024—Cited in IPR2024-01031, challenging U.S. Pat. No. 7,049,850, 7 pages.

Notice : Mandatory Notice, Exhibit-6, Filed on Jul. 16, 2024—Cited in IPR2024-01034, challenging U.S. Pat. No. 9,279,263, 7 pages.

Notice : Mandatory Notice, Exhibit-7, Filed on Mar. 1, 2024—Cited in IPR2024-00559, challenging U.S. Pat. No. 11,610,587, 5 pages.

Notice : Other—Notice of Ranking, Exhibit-4, Filed on Jul. 1, 2024—Cited in IPR2024-01034, challenging U.S. Pat. No. 9,279,263, 5 pages.

Notice : Power of Attorney for Harman International Industries, Exhibit-3, Filed on Feb. 9, 2024—Cited in IPR2024-00559, challenging U.S. Pat. No. 11,610,587, 4 pages.

Notice : Power of Attorney for Harman International Industries, Inc, Exhibit-3, Filed on Jun. 25, 2024—Cited in IPR2024-01031, challenging U.S. Pat. No. 7,049,850, 4 pages.

(56) References Cited

OTHER PUBLICATIONS

Notice : Power of Attorney for Harman International Industries, Inc, Exhibit-3, Filed on Jul. 1, 2024—Cited in IPR2024-01034, challenging U.S. Pat. No. 9,279,263, 4 pages.

Notice : Power of Attorney for Samsung Electronics America, Exhibit-2, Filed on Feb. 9, 2024—Cited in IPR2024-00559, challenging U.S. Pat. No. 11,610,587, 3 pages.

Notice : Power of Attorney for Samsung Electronics America, Inc, Exhibit-2, Filed on Jun. 12, 2024—Cited in IPR2024-01003, challenging U.S. Pat. No. 9,191,083, 3 pages.

Notice : Power of Attorney for Samsung Electronics America, Inc, Exhibit-2, Filed on Jun. 12, 2024—Cited in IPR2024-01004, challenging U.S. Pat. No. 9,614,943, 3 pages.

Notice : Power of Attorney for Samsung Electronics America, Inc, Exhibit-2, Filed on Jun. 25, 2024—Cited in IPR2024-01031, challenging U.S. Pat. No. 7,049,850, 4 pages.

Notice : Power of Attorney for Samsung Electronics America, Inc, Exhibit-2, Filed on Jul. 1, 2024—Cited in IPR2024-01034, challenging U.S. Pat. No. 9,279,263, 4 pages.

Notice : Power of Attorney for Samsung Electronics America, Inc. Paper2,Jun. 18, 2024—Cited in IPR2024-01033, challenging U.S. Pat. No. 8,434,966, 4 pages.

Notice : Power of Attorney for Samsung Electronics Co, Ltd, Exhibit-1, Filed on Feb. 9, 2024—Cited in IPR2024-00559, challenging U.S. Pat. No. 11,610,587, 3 pages.

Notice : Power of Attorney for Samsung Electronics Co, Ltd, Exhibit-1, Filed on Jun. 12, 2024—Cited in IPR2024-01003, challenging U.S. Pat. No. 9,191,083, 3 pages.

Notice : Power of Attorney for Samsung Electronics Co, Ltd, Exhibit-1, Filed on Jun. 12, 2024—Cited in IPR2024-01004, challenging U.S. Pat. No. 9,614,943, 3 pages.

Notice : Power of Attorney for Samsung Electronics Co, Ltd, Exhibit-1, Filed on Jul. 1, 2024—Cited in IPR2024-01034, challenging U.S. Pat. No. 9,279,263, 4 pages.

Notice : Power of Attorney for Samsung Electronics Co, Ltd. Paper1,Jun. 18, 2024—Cited in IPR2024-01033, challenging U.S. Pat. No. 8,434,966, 4 pages.

Notice : Power of Attorney for Samsung Electronics Corp, Exhibit-1, Filed on Jun. 25, 2024—Cited in IPR2024-01031, challenging U.S. Pat. No. 7,049,850, 4 pages.

Notice : Power of Attorney, Exhibit-6, Filed on Mar. 1, 2024—Cited in IPR2024-00559, challenging U.S. Pat. No. 11,610,587, 4 pages.

Notice : Power of Attorney, Exhibit-6, Filed on Jul. 16, 2024—Cited in IPR2024-01031, challenging U.S. Pat. No. 7,049,850, 5 pages.

Notice : Power of Attorney, Exhibit-7, Filed on Jul. 16, 2024—Cited in IPR2024-01034, challenging U.S. Pat. No. 9,279,263, 5 pages.

Notice of Deposition of Chris Kyriakakis, Ph.D, Exhibit-17, Filed on Sep. 13, 2022—Cited in IPR2022-00302, challenging U.S. Pat. No. 9,609,424, 3 pages.

Notice of Deposition of Daniel P Anagnos, Exhibit-21, Filed on Dec. 14, 2022—Cited in IPR2022-00324, challenging U.S. Pat. No. 8,254,591, 3 pages.

Notice of Deposition of David Kleinschmidt, Exhibit-20, Filed on Dec. 2, 2022—Cited in IPR2022-00253, challenging U.S. Pat. No. 9,491,542, 3 pages.

Notice of Deposition of David Kleinschmidt, Exhibit-20, Filed on Dec. 2, 2022—Cited in IPR2022-00281, challenging U.S. Pat. No. 9,270,244, 3 pages.

Notice of Deposition of Les E. Atlas, Ph.D, Exhibit-13, Filed on Mar. 9, 2023—Cited in IPR2022-01106, challenging U.S. Pat. No. 11,039,259, 3 pages.

Notice of Deposition of Les E. Atlas, Ph. D, Exhibit-17, Filed on Aug. 8, 2022—Cited in IPR2022-00324, challenging U.S. Pat. No. 8,254,591, 3 pages.

Notice of Deposition of Les E. Atlas, Ph.D, Exhibit-19, Filed on Aug. 4, 2022—Cited in IPR2022-00243, challenging U.S. Pat. No. 8,111,839, 3 pages.

Notice of Deposition of Les E. Atlas, Ph.D, Exhibit-20, Filed on Aug. 4, 2022—Cited in IPR2022-00242, challenging U.S. Pat. No. 8,111,839, 3 pages.

Notice of Deposition of Les E. Atlas, Ph.D.; Exhibit-15, Filed on Aug. 4, 2022—Cited in IPR2022-00234, challenging U.S. Pat. No. 9,124,982, 3 pages.

Notice of Deposition of Marshall Buck, Exhibit-19, Filed on Dec. 16, 2022—Cited in IPR2022-00388, challenging U.S. Pat. No. 10,966,015, 3 pages.

Notice of Deposition of Marshall Buck, Exhibit-20, Filed on Dec. 16, 2022—Cited in IPR2022-00369, challenging U.S. Pat. No. 10,405,082, 3 pages.

Notice of Deposition of Nathaniel Polish, Ph.D, Exhibit-18, Filed on Sep. 13, 2022—Cited in IPR2022-00253, challenging U.S. Pat. No. 9,491,542, 3 pages.

Notice of Deposition of Nathaniel Polish, Ph.D, Exhibit-18, Filed on Sep. 13, 2022—Cited in IPR2022-00281, challenging U.S. Pat. No. 9,270,244, 3 pages.

Notice of Deposition of Richard M. Stern, Ph.D, Exhibit-13, Filed on Feb. 28, 2023—Cited in IPR2022-01078, challenging U.S. Pat. No. 11,057,701, 3 pages.

Notice of Deposition of Richard M. Stern, Ph.D, Exhibit-14, Filed on Aug. 5, 2022—Cited in IPR2022-00282, challenging U.S. Pat. No. 8,315,400, 3 pages.

Notice of Deposition of Richard M. Stern, Ph.D, Exhibit-17, Filed on Oct. 14, 2022—Cited in IPR2022-00388, challenging U.S. Pat. No. 10,966,015, 3 pages.

Notice of Deposition of Richard M. Stern, Ph.D, Exhibit-18, Filed on Oct. 14, 2022—Cited in IPR2022-00369, challenging U.S. Pat. No. 10,405,082, 3 pages.

Notice of Filing Date Accorded To Petition, Exhibit-5, Filed on Dec. 23, 2021—Cited in IPR2022-00242, challenging U.S. Pat. No. 8,111,839, 5 pages.

Notice of Filing Date Accorded To Petition, Exhibit-5, Filed on Dec. 23, 2021—Cited in IPR2022-00243, challenging U.S. Pat. No. 8,111,839, 5 pages.

Notice of Ranking, Exhibit-4, Filed on Dec. 13, 2021—Cited in IPR2022-00242, challenging U.S. Pat. No. 8,111, 839, 6 pages.

Notice of Ranking, Exhibit-4, Filed on Dec. 13, 2021—Cited in IPR2022-00243, challenging U.S. Pat. No. 8,111, 839, 6 pages.

Notice of Ranking, Exhibit-4, Filed on Jun. 12, 2024—Cited in IPR2024-01003, challenging U.S. Pat. No. 9,191,083, 6 pages.

Notice of Ranking, Exhibit-4, Filed on Jun. 12, 2024—Cited in IPR2024-01004, challenging U.S. Pat. No. 9,614,943, 6 pages.

Notice Regarding Transcript of Markman Hearing, Exhibit-29, Filed on Oct. 19, 2023—Cited in IPR2022-01106, challenging U.S. Pat. No. 11,039,259, 3 pages.

Notice: Notice filing date accorded, Exhibit-5, Filed on Dec. 21, 2021—Cited in IPR2022-00282, challenging U.S. Pat. No. 8,315,400, 5 pages.

Notice: Notice filing date accorded, Exhibit-5, Filed on Feb. 27, 2024—Cited in IPR2024-00559, challenging U.S. Pat. No. 11,610,587, 6 pages.

Notice: Notice filing date accorded, Exhibit-5, Filed on Jun. 17, 2024—Cited in IPR2024-01003, challenging U.S. Pat. No. 9,191,083, 6 pages.

Notice: Notice filing date accorded, Exhibit-5, Filed on Jun. 18, 2024—Cited in IPR2024-01004, challenging U.S. Pat. No. 9,614,943, 6 pages.

Notice: Notice filing date accorded, Exhibit-6, Filed on Jan. 13, 2022—Cited in IPR2022-00302, challenging U.S. Pat. No. 9,609,424, 6 pages.

Notice: Notice filing date accorded, Exhibit-6, Filed on Jan. 13, 2022—Cited in IPR2022-00324, challenging U.S. Pat. No. 8,254,591, 6 pages.

Notice: Notice filing date accorded, Exhibit-6, Filed on Jan. 18, 2022—Cited in IPR2022-00253, challenging U.S. Pat. No. 9,491,542, 5 pages.

Notice: Notice filing date accorded, Exhibit-6, Filed on Jan. 18, 2022—Cited in IPR2022-00281, challenging U.S. Pat. No. 9,270,244, 5 pages.

Notice: Notice filing date accorded, Exhibit-6, Filed on Feb. 18, 2022—Cited in IPR2022-00410, challenging U.S. Pat. No. 10,979,836, 5 pages.

(56)        References Cited

OTHER PUBLICATIONS

Notice: Notice filing date accorded, Exhibit-6, Filed on Jul. 7, 2022—Cited in IPR2022-01078, challenging U.S. Pat. No. 11,057,701, 6 pages.
Notice: Notice filing date accorded, Exhibit-6, Filed on Jul. 7, 2022—Cited in IPR2022-01099, challenging U.S. Pat. No. 11,244,666, 6 pages.
Notice: Notice filing date accorded, Exhibit-6, Filed on Jul. 8, 2022—Cited in IPR2022-01106, challenging U.S. Pat. No. 11,039,259, 6 pages.
Notice: Notice filing date accorded, Exhibit-7, Filed on Feb. 18, 2022—Cited in IPR2022-00388, challenging U.S. Pat. No. 10,966,015, 5 pages.
Notice: Notice filing date accorded, Exhibit-7, Filed on Jul. 7, 2022—Cited in IPR2022-01098, challenging U.S. Pat. No. 11,217,237, 6 pages.
Notice: Notice filing date accorded, Exhibit-8, Filed on Feb. 18, 2022—Cited in IPR2022-00369, challenging U.S. Pat. No. 10,405,082, 5 pages.
Notice: Notice filing date accorded, Exhibit-8, Filed on Jul. 24, 2024—Cited in IPR2024-01031, challenging U.S. Pat. No. 7,049,850, 6 pages.
Notice: Notice filing date accorded, Exhibit-9, Filed on Aug. 16, 2024—Cited in IPR2024-01034, challenging U.S. Pat. No. 9,279,263, 6 pages.
Notice: Notice filing date accorded; Exhibit-4, Filed on Dec. 21, 2021—Cited in IPR2022-00234, challenging U.S. Pat. No. 9,124,982, 5 pages.
Notice: Notice filing date accordedPaper4,Jun. 20, 2024—Cited in IPR2024-01033, challenging U.S. Pat. No. 8,434,966, 6 pages.
Notice: refund approved, Exhibit-13, Filed on Mar. 7, 2023—Cited in IPR2022-01099, challenging U.S. Pat. No. 11,244,666, 3 pages.
Notice: refund approved, Exhibit-14, Filed on Jan. 20, 2023—Cited in IPR2022-00410, challenging U.S. Pat. No. 10,979,836, 3 pages.
Notice: refund approved, Exhibit-14, Filed on Mar. 7, 2023—Cited in IPR2022-01098, challenging U.S. Pat. No. 11,217,237, 3 pages.
Notice: refund approved, Exhibit-18, Filed on Dec. 17, 2024—Cited in IPR2024-01003, challenging U.S. Pat. No. 9,191,083, 3 pages.
Notice: refund approved, Exhibit-18, Filed on Dec. 17, 2024—Cited in IPR2024-01004, challenging U.S. Pat. No. 9,614,943, 3 pages.
Notice: refund approved, Exhibit-18, Filed on Dec. 17, 2024—Cited in IPR2024-01031, challenging U.S. Pat. No. 7,049,850, 3 pages.
Notice: refund approved, Exhibit-19, Filed on Dec. 17, 2024—Cited in IPR2024-01034, challenging U.S. Pat. No. 9,279,263, 3 pages.
Notice: refund approvedPaper17, Dec. 17, 2024—Cited in IPR2024-01033, challenging U.S. Pat. No. 8,434,966, 3 pages.
Nov. 3, 2019 article published by Imran Hussain discusses how to use the ear tip fit test with the AirPods Pro and an iOS device such as the iPhone 11 for the best fit. https://www.esquire.com/lifestyle/a29612084/apple-airpods-pro-active-noise-cancellation-review/ (SAM-TECH_00052413-SAM-TECH_00052424), 12 pages.
Oct. 20, 2019 article by Tim Hardwick discussing how to perform an ear tip fit test using Apple's AirPods Pro with Apple's iPhone 11. https://www.macrumors.com/how-to/perform-ear-tip-fit-test-airpods-pro/; (SAM-TECH 00052357-SAM-TECH 00052370), 14 pages.
Oct. 29, 2019 on BusinessToday.in states the AirPods Pro require Apple devices running iOS 13.2 or later, iPadOS 13.2 or later, watchOS 6.1 or later, tvOS 13.2 or later, or macOS Catalina 10.15.1 or later. https://www.businesstoday.in/technology/lau nch/story/apple-airpods-pro-with-noise-cancellation-launched-check-out-price-in-india features-235269-2019-10-29 (SAM-TECH 00061346-SAM-TECH 00061349), 4 pages.
Oct. 31, 2019 article published by Charlie Sorrel discusses the Ear tip fit test for the AirPods Pro in the iPhone settings. https://www.cultofmac.com/662548/airpods- pro-ear-tip-fit-test/; (Sam- Tech 00056870 - SAM-TECH 00056881), 12 pages.
Olwal 2005, Exhibit-1023, Filed on Dec. 21, 2021—Cited in IPR2022-00281, challenging U.S. Pat. No. 9,270,244, 3 pages.

Olympus WS-320M, At least by Nov. 25, 2005 (Olympus WS-320M) https://web.archive.org/web/20051125000137mp_, http://www.olympusamerica.com/cpg_se ction/cpg_vr_digitalmusic.asp (SAM-TECH 00051760), 2 pages.
Olympus WS-320M, At least by Nov. 25, 2005 (Olympus WS-320M) https://web.archive.org/web/20060314095402/, http://www.olympusamerica.com/cpg_sectio n/product.asp?product= 1195&fl= 2 (SAM-TECH 00051767; SAM-TECH 00051753), 3 pages.
Olympus WS-320M, At least by Nov. 25, 2005 Olympus WS-320M Instruction Manual (SAM-TECH 00051833), 87 pages.
Optimal Feedback Control Formulation of the Active Noise Cancellation Problem: Pointwise and Distributed, Kambiz C. Zangi, Rle Technical Report No. 583, Research Laboratory of Electronics Massachusetts Institute of Technology, May 1994, 158 pages.
Order Adopting Claim Construction Order, Exhibit-2015, Filed on Apr. 10, 2023—Cited in IPR2022-01106, challenging U.S. Pat. No. 11,039,259, 2 pages.
Order Clarifying Claim Construction Order, Exhibit-2014, Filed on Apr. 10, 2023—Cited in IPR2022-01106, challenging U.S. Pat. No. 11,039,259, 1 pages.
Order Conditionally Granting Patent Owner's Motion to Withdraw and Substitute Counsel 37 C.F.R. § 42.10, Exhibit-12, Filed on Dec. 9, 2024—Cited in IPR2024-01003, challenging U.S. Pat. No. 9,191,083, 5 pages.
Order Conditionally Granting Patent Owner's Motion to Withdraw and Substitute Counsel 37 C.F.R. § 42.10, Exhibit-12, Filed on Dec. 9, 2024—Cited in IPR2024-01004, challenging U.S. Pat. No. 9,614,943, 5 pages.
Order Conditionally Granting Patent Owner's Motion to Withdraw and Substitute Counsel 37 C.F.R. § 42.10, Exhibit-12, Filed on Dec. 9, 2024—Cited in IPR2024-01031, challenging U.S. Pat. No. 7,049,850, 5 pages.
Order Conditionally Granting Patent Owner's Motion to Withdraw and Substitute Counsel 37 C.F.R. § 42.10, Exhibit-13, Filed on Dec. 9, 2024—Cited in IPR2024-01034, challenging U.S. Pat. No. 9,279,263, 5 pages.
Order Conditionally Granting Patent Owner's Motion to Withdraw and Substitute Counsel 37 C.F.R. § 42.10Paper11, Dec. 9, 2024—Cited in IPR2024-01033, challenging U.S. Pat. No. 8,434,966, 5 pages.
Order Conditionally Granting Patent Owner's Motion to Withdraw and Substitute Counsel, Exhibit-13, Filed on Dec. 5, 2024—Cited in IPR2024-00559, challenging U.S. Pat. No. 11,610,587, 4 pages.
Order Granting Patent Owner's Motions for Pro Hac Vice Admission of Roy Falik 37 C.F.R. § 42.10(c), Exhibit-9, Filed on Sep. 23, 2024—Cited in IPR2024-01031, challenging U.S. Pat. No. 7,049,850, 4 pages.
Order Trial Hearing 37 C.F.R. 42.70, Exhibit-23, Filed on Feb. 6, 2023—Cited in IPR2022-00282, challenging U.S. Pat. No. 8,315,400, 10 pages.
Order Trial Hearing 37 C.F.R. 42.70; Exhibit-24, Filed on Feb. 6, 2023—Cited in IPR2022-00234, challenging U.S. Pat. No. 9,124,982, 10 pages.
Order Trial Hearing 37 C.F.R. § 42.70, Exhibit-24, Filed on Mar. 1, 2023—Cited in IPR2022-00302, challenging U.S. Pat. No. 9,609,424, 10 pages.
Order Trial Hearing 37 C.F.R. § 42.70, Exhibit-26, Filed on Oct. 10, 2023—Cited in IPR2022-01106, challenging U.S. Pat. No. 11,039,259, 10 pages.
Order Trial Hearing 37 C.F.R. § 42.70, Exhibit-26, Filed on Mar. 1, 2023—Cited in IPR2022-00324, challenging U.S. Pat. No. 8,254,591, 10 pages.
Order Trial Hearing 37 C.F.R. sec 42.70, Exhibit-28, Filed on Feb. 8, 2023—Cited in IPR2022-00243, challenging U.S. Pat. No. 8,111,839, 10 pages.
Order Trial Hearing 37 C.F.R. sec 42.70, Exhibit-29, Filed on Feb. 8, 2023—Cited in IPR2022-00242, challenging U.S. Pat. No. 8,111,839, 10 pages.
Order Trial Hearing, Exhibit-25, Filed on Mar. 1, 2023—Cited in IPR2022-00281, challenging U.S. Pat. No. 9,270,244, 10 pages.
Order Vacating Standing Orders, Exhibit-2005, Filed on Jul. 1, 2022—Cited in IPR2022-00253, challenging U.S. Pat. No. 9,491,542, 2 pages.

(56)　　　　References Cited

OTHER PUBLICATIONS

Order Vacating Standing Orders, Exhibit-2005, Filed on Jul. 1, 2022—Cited in IPR2022-00281, challenging U.S. Pat. No. 9,270,244, 2 pages.

Order Vacating Standing Orders, Exhibit-2005, Filed on Jul. 1, 2022—Cited in IPR2022-00302, challenging U.S. Pat. No. 9,609,424, 2 pages.

Order Vacating Standing Orders, Exhibit-2005, Filed on Jul. 1, 2022—Cited in IPR2022-00324, challenging U.S. Pat. No. 8,254,591, 2 pages.

Order Vacating Standing Orders, Exhibit-2006, Filed on Jul. 1, 2022—Cited in IPR2022-00369, challenging U.S. Pat. No. 10,405,082, 2 pages.

Order Vacating Standing Orders, Exhibit-2006, Filed on Jul. 1, 2022—Cited in IPR2022-00410, challenging U.S. Pat. No. 10,979,836, 2 pages.

Order Vacating Standing Orders, Exhibit-2007, Filed on Jul. 1, 2022—Cited in IPR2022-00388, challenging U.S. Pat. No. 10,966,015, 2 pages.

Order: Conduct of the Proceeding 37 C.F.R. sec. 42.5, Exhibit-18, Filed on Jan. 5, 2023—Cited in IPR2022-00282, challenging U.S. Pat. No. 8,315,400, 3 pages.

Order: Granting Patent Owner's Motion for Pro Hac Vice Admission of Roy Falik 37 C.F.R. § 42.10, Exhibit-10, Filed on Oct. 4, 2024—Cited in IPR2024-01034, challenging U.S. Pat. No. 9,279,263, 5 pages.

Order: Granting Patent Owner's Motions for Admission Pro Hac Vice of Roy Falik 37 C.F.R. § 42.10, Exhibit-9, Filed on Oct. 4, 2024—Cited in IPR2024-01004, challenging U.S. Pat. No. 9,614,943, 5 pages.

Order: Granting Patent Owner's Motions for Admission Pro Hac Vice of Roy Falik 37 C.F.R. § 42.10Paper8, Oct. 4, 2024—Cited in IPR2024-01033, challenging U.S. Pat. No. 8,434,966, 5 pages.

Order: on Motion, Exhibit-9, Filed on Oct. 4, 2024—Cited in IPR2024-01003, challenging U.S. Pat. No. 9,191,083, 5 pages.

Order: Other, Exhibit-12, Filed on Feb. 22, 2023—Cited in IPR2022-01078, challenging U.S. Pat. No. 11,057,701, 3 pages.

Order: Scheduling Order, Exhibit-13, Filed on Jun. 17, 2022—Cited in IPR2022-00282, challenging U.S. Pat. No. 8,315,400, 14 pages.

Order: Scheduling Order; Exhibit-13, Filed on Jun. 17, 2022—Cited in IPR2022-00234, challenging U.S. Pat. No. 9,124,982, 14 pages.

Order: Hearing Order, Exhibit-26, Filed on Apr. 7, 2023—Cited in IPR2022-00388, challenging U.S. Pat. No. 10,966,015, 10 pages.

Order: Hearing Order, Exhibit-27, Filed on Apr. 7, 2023—Cited in IPR2022-00369, challenging U.S. Pat. No. 10,405,082, 10 pages.

Order: Order Setting Oral Argument 37 C.F.R. § 42.70, Exhibit-22, Filed on Aug. 21, 2023—Cited in IPR2022-01078, challenging U.S. Pat. No. 11,057,701, 10 pages.

Order: Panel Change Order, Exhibit-22, Filed on Feb. 10, 2023—Cited in IPR2022-00253, challenging U.S. Pat. No. 9,491,542, 3 pages.

Order: Trial Hearing (Revised), Exhibit-25, Filed on Mar. 3, 2023—Cited in IPR2022-00302, challenging U.S. Pat. No. 9,609,424, 10 pages.

Order: Trial Hearing (Revised), Exhibit-27, Filed on Mar. 3, 2023—Cited in IPR2022-00324, challenging U.S. Pat. No. 8,254,591, 10 pages.

Order: Trial Hearing—37 CFR 42.70, Exhibit-26, Filed on Mar. 2, 2023—Cited in IPR2022-00253, challenging U.S. Pat. No. 9,491,542, 10 pages.

Osha, Appx A to 1910.95—Noise Exposure Computation, Exhibit-2014, Filed on Sep. 13, 2022—Cited in IPR2022-00242, challenging U.S. Pat. No. 8,111,839, 8 pages.

Osha, Appx A to 1910.95—Noise Exposure Computation; Exhibit-2013, Filed on Sep. 9, 2022—Cited in IPR2022-00234, challenging U.S. Pat. No. 9,124,982, 8 pages.

Oshana, Chapters 3-4, Exhibit-1017, Filed on Jan. 14, 2022—Cited in IPR2022-00410, challenging U.S. Pat. No. 10,979,836, 95 pages.

Oshana, DSP Software Development Techniques for Embedded and Real-Time Systems, Chapters 3 and 4, pp. 35-121, Elsevier, Inc., Amsterdam, Netherlands (2006).

Other: Hearing transcript, Exhibit-27, Filed on Apr. 18, 2023—Cited in IPR2022-00282, challenging U.S. Pat. No. 8,315,400, 79 pages.

Other: Hearing transcript, Exhibit-30, Filed on Jul. 25, 2023—Cited in IPR2022-00388, challenging U.S. Pat. No. 10,966,015, 56 pages.

Other: Hearing transcript, Exhibit-31, Filed on Jul. 25, 2023—Cited in IPR2022-00369, challenging U.S. Pat. No. 10,405,082, 56 pages.

Other: Hearing transcript, Exhibit-32, Filed on Jul. 6, 2023—Cited in IPR2022-00253, challenging U.S. Pat. No. 9,491,542, 62 pages.

Other: Hearing transcript, Exhibit-34, Filed on Jun. 1, 2023—Cited in IPR2022-00243, challenging U.S. Pat. No. 8,111,839, 6 pages.

Other: Hearing transcript, Exhibit-35, Filed on Jun. 1, 2023—Cited in IPR2022-00242, challenging U.S. Pat. No. 8,111,839, 88 pages.

Other: Hearing transcript, Exhibit-36, Filed on Jul. 6, 2023—Cited in IPR2022-00302, challenging U.S. Pat. No. 9,609,424, 63 pages.

Other: Hearing transcript; Exhibit-28, Filed on Apr. 18, 2023—Cited in IPR2022-00234, challenging U.S. Pat. No. 9,124,982, 76 pages.

Other: Order Granting Motion for Leave to File Corrected Petition, Exhibit-10, Filed on Feb. 2, 2022—Cited in IPR2022-00243, challenging U.S. Pat. No. 8,111,839, 4 pages.

Other: Order Granting Motion for Leave to File Corrected Petition, Exhibit-11, Filed on Feb. 2, 2022—Cited in IPR2022-00242, challenging U.S. Pat. No. 8,111,839, 4 pages.

Other: Fed Circuit mandate, Exhibit-34, Filed on Jun. 27, 2024—Cited in IPR2022-01106, challenging U.S. Pat. No. 11,039,259, 2 pages.

Other: Fed Circuit mandate, Exhibit-36, Filed on Jun. 27, 2024—Cited in IPR2022-00324, challenging U.S. Pat. No. 8,254,591, 2 pages.

Other: Hearing transcript, Exhibit-25, Filed on Oct. 16, 2023—Cited in IPR2022-01078, challenging U.S. Pat. No. 11,057,701, 58 pages.

Other: Hearing transcript, Exhibit-31, Filed on Dec. 13, 2023—Cited in IPR2022-01106, challenging U.S. Pat. No. 11,039,259, 59 pages.

Other: Hearing transcript, Exhibit-32, Filed on Jul. 3, 2023—Cited in IPR2022-00324, challenging U.S. Pat. No. 8,254,591, 57 pages.

Other: Hearing transcript, Exhibit-32, Filed on Jul. 31, 2023—Cited in IPR2022-00281, challenging U.S. Pat. No. 9,270,244, 58 pages.

Other: Hearing transcript, Exhibit-34, Filed on Jun. 22, 2023—Cited in IPR2022-00302, challenging U.S. Pat. No. 9,609,424, 63 pages.

Oxford Dictionary of Elecs and Electrical Eng (excerpts), Exhibit-2005, Filed on Mar. 21, 2022—Cited in IPR2022-00282, challenging U.S. Pat. No. 8,315,400, 3 pages.

P.R. 4-5(d) Joint Claim Construction Chart, Exhibit-2009, Filed on Feb. 22, 2023—Cited in IPR2022-00253, challenging U.S. Pat. No. 9,491,542, 54 pages.

P.R. 4-5(d) Joint Claim Construction Chart, Exhibit-2009, Filed on Feb. 22, 2023—Cited in IPR2022-00281, challenging U.S. Pat. No. 9,270,244, 54 pages.

Panel Change Order, Exhibit-12, Filed on Feb. 3, 2023—Cited in IPR2022-01106, challenging U.S. Pat. No. 11,039,259, 3 pages.

Patent Owner Brief Regarding Interim Procedure for Discretionary Denials, Exhibit-12, Filed on Jul. 1, 2022—Cited in IPR2022-00253, challenging U.S. Pat. No. 9,491,542, 6 pages.

Patent Owner Response; Exhibit-17, Filed on Sep. 9, 2022—Cited in IPR2022-00234, challenging U.S. Pat. No. 9,124,982, 57 pages.

Patent Owner Stanton Techiya LLC's Mandatory NoticePaper6,Jul. 3, 2024—Cited in IPR2024-01033, challenging U.S. Pat. No. 8,434,966, 7 pages.

Patent Owner Staton Techiya, LLC's Mandatory Notice, Exhibit-7, Filed on Jul. 3, 2024—Cited in IPR2024-01004, challenging U.S. Pat. No. 9,614,943, 7 pages.

Patent Owner Staton Techiya, LLC's Mandatory Notices, Exhibit-7, Filed on Jul. 3, 2024—Cited in IPR2024-01003, challenging U.S. Pat. No. 9,191,083, 7 pages.

(56) References Cited

OTHER PUBLICATIONS

Patent Owner Staton Techiya, LLC's Motion for the Pro Hac Vice Admission of Roy Falik, Exhibit-8, Filed on Jul. 5, 2024—Cited in IPR2024-01003, challenging U.S. Pat. No. 9,191,083, 8 pages.

Patent Owner Staton Techiya, LLC's Motion for the Pro Hac Vice Admission of Roy Falik, Exhibit-8, Filed on Jul. 5, 2024—Cited in IPR2024-01004, challenging U.S. Pat. No. 9,614,943, 8 pages.

Patent Owner Staton Techiya, LLC's Motion for the Pro Hac Vice Admission of Roy FalikPaper7,Jul. 5, 2024—Cited in IPR2024-01033, challenging U.S. Pat. No. 8,434,966, 8 pages.

Patent Owner Staton Techiya, LLC's Power of Attorney, Exhibit-6, Filed on Jul. 3, 2024—Cited in IPR2024-01003, challenging U.S. Pat. No. 9,191,083, 5 pages.

Patent Owner Staton Techiya, LLC's Power of Attorney, Exhibit-6, Filed on Jul. 3, 2024—Cited in IPR2024-01004, challenging U.S. Pat. No. 9,614,943, 5 pages.

Patent Owner Staton Techiya, LLC's Power of AttorneyPaper5,Jul. 3, 2024—Cited in IPR2024-01033, challenging U.S. Pat. No. 8,434,966, 5 pages.

Patent Owner's Brief Regarding Interim Procedure for Discretionary Denials, Exhibit-11, Filed on Jul. 1, 2022—Cited in IPR2022-00410, challenging U.S. Pat. No. 10,979,836, 6 pages.

Patent Owner's Brief Regarding Interim Procedure for Discretionary Denials, Exhibit-12, Filed on Jul. 1, 2022—Cited in IPR2022-00281, challenging U.S. Pat. No. 9,270,244, 6 pages.

Patent Owner's Brief Regarding Interim Procedure for Discretionary Denials, Exhibit-12, Filed on Jul. 1, 2022—Cited in IPR2022-00302, challenging U.S. Pat. No. 9,609,424, 6 pages.

Patent Owner's Brief Regarding Interim Procedure for Discretionary Denials, Exhibit-12, Filed on Jul. 1, 2022—Cited in IPR2022-00324, challenging U.S. Pat. No. 8,254,591, 6 pages.

Patent Owner's Brief Regarding Interim Procedure for Discretionary Denials, Exhibit-12, Filed on Jul. 1, 2022—Cited in IPR2022-00388, challenging U.S. Pat. No. 10,966,015, 6 pages.

Patent Owner's Brief Regarding Interim Procedure for Discretionary Denials, Exhibit-13, Filed on Jul. 1, 2022—Cited in IPR2022-00369, challenging U.S. Pat. No. 10,405,082, 6 pages.

Patent Owner's Corrected Notice of Appeal, Exhibit-38, Filed on Aug. 15, 2023—Cited in IPR2022-00243, challenging U.S. Pat. No. 8,111,839, 64 pages.

Patent Owner's Demonstratives, Exhibit-2008, Filed on Apr. 11, 2023—Cited in IPR2022-00302, challenging U.S. Pat. No. 9,609,424, 23 pages.

Patent Owner's Demonstratives, Exhibit-2010, Filed on Apr. 12, 2023—Cited in IPR2022-00253, challenging U.S. Pat. No. 9,491,542, 27 pages.

Patent Owner's Demonstratives, Exhibit-2010, Filed on Apr. 13, 2023—Cited in IPR2022-00281, challenging U.S. Pat. No. 9,270,244, 36 pages.

Patent Owner's Demonstratives, Exhibit-2010, Filed on Apr. 4, 2023—Cited in IPR2022-00324, challenging U.S. Pat. No. 8,254,591, 14 pages.

Patent Owner's Demonstratives, Exhibit-2012, Filed on May 9, 2023—Cited in IPR2022-00369, challenging U.S. Pat. No. 10,405,082, 34 pages.

Patent Owner's Demonstratives, Exhibit-2012, Filed on May 9, 2023—Cited in IPR2022-00388, challenging U.S. Pat. No. 10,966,015, 34 pages.

Patent Owner's Demonstratives, Exhibit-2014, Filed on Mar. 14, 2023—Cited in IPR2022-00282, challenging U.S. Pat. No. 8,315,400, 52 pages.

Patent Owner's Demonstratives, Exhibit-2014, Filed on Sep. 25, 2023—Cited in IPR2022-01078, challenging U.S. Pat. No. 11,057,701, 25 pages.

Patent Owner's Demonstratives, Exhibit-2015, Filed on Mar. 16, 2023—Cited in IPR2022-00242, challenging U.S. Pat. No. 8,111,839, 44 pages.

Patent Owner's Demonstratives, Exhibit-2015, Filed on Mar. 16, 2023—Cited in IPR2022-00243, challenging U.S. Pat. No. 8,111,839, 44 pages.

Patent Owner's Demonstratives, Exhibit-2021, Filed on Oct. 11, 2023—Cited in IPR2022-01106, challenging U.S. Pat. No. 11,039,259, 48 pages.

Patent Owner's Demonstratives; Exhibit-2014, Filed on Mar. 14, 2023—Cited in IPR2022-00234, challenging U.S. Pat. No. 9,124,982, 34 pages.

Patent Owner's Mandatory Notice under 37 C.F.R. 42.8, Exhibit-5, Filed on Jan. 19, 2022—Cited in IPR2022-00388, challenging U.S. Pat. No. 10,966,015, 5 pages.

Patent Owner's Mandatory Notice under 37 C.F.R. 42.8, Exhibit-5, Filed on Jan. 19, 2022—Cited in IPR2022-00410, challenging U.S. Pat. No. 10,979,836, 4 pages.

Patent Owner's Mandatory Notice under 37 C.F.R. 42.8, Exhibit-5, Filed on Dec. 28, 2021—Cited in IPR2022-00253, challenging U.S. Pat. No. 9,491,542, 4 pages.

Patent Owner's Mandatory Notice under 37 C.F.R. 42.8, Exhibit-5, Filed on Dec. 28, 2021—Cited in IPR2022-00281, challenging U.S. Pat. No. 9,270,244, 4 pages.

Patent Owner's Mandatory Notice under 37 C.F.R. 42.8, Exhibit-5, Filed on Dec. 28, 2021—Cited in IPR2022-00302, challenging U.S. Pat. No. 9,609,424, 4 pages.

Patent Owner's Mandatory Notice under 37 C.F.R. 42.8, Exhibit-5, Filed on Dec. 28, 2021—Cited in IPR2022-00324, challenging U.S. Pat. No. 8,254,591, 4 pages.

Patent Owner's Mandatory Notice under 37 C.F.R. 42.8, Exhibit-5, Filed on Jun. 22, 2022—Cited in IPR2022-01078, challenging U.S. Pat. No. 11,057,701, 4 pages.

Patent Owner's Mandatory Notice under 37 C.F.R. 42.8, Exhibit-5, Filed on Jun. 22, 2022—Cited in IPR2022-01099, challenging U.S. Pat. No. 11,244,666, 4 pages.

Patent Owner's Mandatory Notice under 37 C.F.R. 42.8, Exhibit-5, Filed on Jun. 22, 2022—Cited in IPR2022-01106, challenging U.S. Pat. No. 11,039,259, 4 pages.

Patent Owner's Mandatory Notice under 37 C.F.R. 42.8, Exhibit-6, Filed on Jun. 22, 2022—Cited in IPR2022-01098, challenging U.S. Pat. No. 11,217,237, 4 pages.

Patent Owner's Mandatory Notice under 37 C.F.R. 42.8, Exhibit-7, Filed on Dec. 28, 2021—Cited in IPR2022-00242, challenging U.S. Pat. No. 8,111,839, 4 pages.

Patent Owner's Mandatory Notice under 37 C.F.R. 42.8, Exhibit-7, Filed on Dec. 28, 2021—Cited in IPR2022-00243, challenging U.S. Pat. No. 8,111,839, 5 pages.

Patent Owner's Mandatory Notice under 37 C.F.R. 42.8, Exhibit-7, Filed on Dec. 28, 2021—Cited in IPR2022-00282, challenging U.S. Pat. No. 8,315,400, 4 pages.

Patent Owner's Mandatory Notice under 37 C.F.R. 42.8; Exhibit-6, Filed on Dec. 28, 2021—Cited in IPR2022-00234, challenging U.S. Pat. No. 9,124,982, 5 pages.

Patent Owner's Mandatory Notice under 37 CFR 42.8, Exhibit-6, Filed on Jan. 19, 2022—Cited in IPR2022-00369, challenging U.S. Pat. No. 10,405,082, 5 pages.

Patent Owner's Notice of Appeal, Exhibit-30, Filed on Aug. 11, 2023—Cited in IPR2022-00282, challenging U.S. Pat. No. 8,315,400, 101 pages.

Patent Owner's Notice of Appeal, Exhibit-33, Filed on Mar. 5, 2024—Cited in IPR2022-01106, challenging U.S. Pat. No. 11,039,259, 109 pages.

Patent Owner's Notice of Appeal, Exhibit-33, Filed on Sep. 8, 2023—Cited in IPR2022-00281, challenging U.S. Pat. No. 9,270,244, 42 pages.

Patent Owner's Notice of Appeal, Exhibit-34, Filed on Sep. 8, 2023—Cited in IPR2022-00253, challenging U.S. Pat. No. 9,491,542, 97 pages.

Patent Owner's Notice of Appeal, Exhibit-34, Filed on Sep. 8, 2023—Cited in IPR2022-00324, challenging U.S. Pat. No. 8,254,591, 95 pages.

Patent Owner's Notice of Appeal, Exhibit-38, Filed on Aug. 15, 2023—Cited in IPR2022-00242, challenging U.S. Pat. No. 8,111,839, 91 pages.

Patent Owner's Notice of Appeal; Exhibit-31, Filed on Aug. 11, 2023—Cited in IPR2022-00234, challenging U.S. Pat. No. 9,124,982, 90 pages.

(56) References Cited

OTHER PUBLICATIONS

Patent Owner's Notice of Cross-Appeal, Exhibit-39, Filed on Aug. 23, 2023—Cited in IPR2022-00302, challenging U.S. Pat. No. 9,609,424, 74 pages.

Patent Owner's Power of Attorney, Exhibit-4, Filed on Jan 19, 2022—Cited in IPR2022-00388, challenging U.S. Pat. No. 10,966,015, 3 pages.

Patent Owner's Power of Attorney, Exhibit-4, Filed on Jan 19, 2022—Cited in IPR2022-00410, challenging U.S. Pat. No. 10,979,836, 3 pages.

Patent Owner's Power of Attorney, Exhibit-4, Filed on Dec. 28, 2021—Cited in IPR2022-00253, challenging U.S. Pat. No. 9,491,542, 3 pages.

Patent Owner's Power of Attorney, Exhibit-4, Filed on Dec. 28, 2021—Cited in IPR2022-00281, challenging U.S. Pat. No. 9,270,244, 3 pages.

Patent Owner's Power of Attorney, Exhibit-4, Filed on Dec. 28, 2021—Cited in IPR2022-00302, challenging U.S. Pat. No. 9,609,424, 3 pages.

Patent Owner's Power of Attorney, Exhibit-4, Filed on Dec. 28, 2021—Cited in IPR2022-00324, challenging U.S. Pat. No. 8,254,591, 3 pages.

Patent Owner's Power of Attorney, Exhibit-4, Filed on Jun. 22, 2022—Cited in IPR2022-01078, challenging U.S. Pat. No. 11,057,701, 3 pages.

Patent Owner's Power of Attorney, Exhibit-4, Filed on Jun. 22, 2022—Cited in IPR2022-01099, challenging U.S. Pat. No. 11,244,666, 3 pages.

Patent Owner's Power of Attorney, Exhibit-4, Filed on Jun. 22, 2022—Cited in IPR2022-01106, challenging U.S. Pat. No. 11,039,259, 3 pages.

Patent Owner's Power of Attorney, Exhibit-5, Filed on Jan. 19, 2022—Cited in IPR2022-00369, challenging U.S. Pat. No. 10,405,082, 3 pages.

Patent Owner's Power of Attorney, Exhibit-5, Filed on Jun. 22, 2022—Cited in IPR2022-01098, challenging U.S. Pat. No. 11,217,237, 3 pages.

Patent Owner's Power of Attorney, Exhibit-6, Filed on Dec. 28, 2021—Cited in IPR2022-00242, challenging U.S. Pat. No. 8,111,839, 3 pages.

Patent Owner's Power of Attorney, Exhibit-6, Filed on Dec. 28, 2021—Cited in IPR2022-00243, challenging U.S. Pat. No. 8,111,839, 3 pages.

Patent Owner's Power of Attorney, Exhibit-6, Filed on Dec. 28, 2021—Cited in IPR2022-00282, challenging U.S. Pat. No. 8,315,400, 3 pages.

Patent Owner's Power of Attorney; Exhibit-5, Filed on Dec. 28, 2021—Cited in IPR2022-00234, challenging U.S. Pat. No. 9,124,982, 3 pages.

Patent Owner's Preliminary Response, Exhibit-12, Filed on Mar. 23, 2022—Cited in IPR2022-00243, challenging U.S. Pat. No. 8,111,839, 59 pages.

Patent Owner's Preliminary Response, Exhibit-13, Filed on Mar. 23, 2022—Cited in IPR2022-00242, challenging U.S. Pat. No. 8,111,839, 68 pages.

Patent Owner's Preliminary Response, Exhibit-7, Filed on Oct. 11, 2022—Cited in IPR2022-01106, challenging U.S. Pat. No. 11,039,259, 56 pages.

Patent Owner's Preliminary Response, Exhibit-7, Filed on Oct. 7, 2022—Cited in IPR2022-01099, challenging U.S. Pat. No. 11,244,666, 34 pages.

Patent Owner's Preliminary Response, Exhibit-7, Filed on May 18, 2022—Cited in IPR2022-00410, challenging U.S. Pat. No. 10,979,836, 47 pages.

Patent Owner's Preliminary Response, Exhibit-8, Filed on Oct. 7, 2022—Cited in IPR2022-01098, challenging U.S. Pat. No. 11,217,237, 47 pages.

Patent Owner's Preliminary Response, Exhibit-8, Filed on Apr. 13, 2022—Cited in IPR2022-00302, challenging U.S. Pat. No. 9,609,424, 76 pages.

Patent Owner's Preliminary Response, Exhibit-8, Filed on Apr. 13, 2022—Cited in IPR2022-00324, challenging U.S. Pat. No. 8,254,591, 68 pages.

Patent Owner's Preliminary Response, Exhibit-8, Filed on Apr. 18, 2022—Cited in IPR2022-00253, challenging U.S. Pat. No. 9,491,542, 70 pages.

Patent Owner's Preliminary Response, Exhibit-8, Filed on Apr. 18, 2022—Cited in IPR2022-00281, challenging U.S. Pat. No. 9,270,244, 75 pages.

Patent Owner's Preliminary Response, Exhibit-8, Filed on May 18, 2022—Cited in IPR2022-00388, challenging U.S. Pat. No. 10,966,015, 54 pages.

Patent Owner's Preliminary Response, Exhibit-9, Filed on Mar. 21, 2022—Cited in IPR2022-00282, challenging U.S. Pat. No. 8,315,400, 77 pages.

Patent Owner's Preliminary Response, Exhibit-9, Filed on May 18, 2022—Cited in IPR2022-00369, challenging U.S. Pat. No. 10,405,082, 55 pages.

Patent Owner's Preliminary Response; Exhibit-9, Filed on Mar. 21, 2022—Cited in IPR2022-00234, challenging U.S. Pat. No. 9,124,982, 69 pages.

Patent Owner's Preliminary Sur-Reply, Exhibit-10, Filed on Nov. 22, 2022—Cited in IPR2022-01098, challenging U.S. Pat. No. 11,217,237, 8 pages.

Patent Owner's Preliminary Sur-Reply, Exhibit-10, Filed on May 19, 2022—Cited in IPR2022-00302, challenging U.S. Pat. No. 9,609,424, 8 pages.

Patent Owner's Preliminary Sur-Reply, Exhibit-10, Filed on May 20, 2022—Cited in IPR2022-00324, challenging U.S. Pat. No. 8,254,591, 8 pages.

Patent Owner's Preliminary Sur-Reply, Exhibit-10, Filed on May 31, 2022—Cited in IPR2022-00253, challenging U.S. Pat. No. 9,491,542, 8 pages.

Patent Owner's Preliminary Sur-Reply, Exhibit-10, Filed on Jun. 23, 2022—Cited in IPR2022-00388, challenging U.S. Pat. No. 10,966,015, 8 pages.

Patent Owner's Preliminary Sur-Reply, Exhibit-10, Filed on Jun. 7, 2022—Cited in IPR2022-00281, challenging U.S. Pat. No. 9,270,244, 8 pages.

Patent Owner's Preliminary Sur-Reply, Exhibit-11, Filed on Apr. 29, 2022—Cited in IPR2022-00282, challenging U.S. Pat. No. 8,315,400, 9 pages.

Patent Owner's Preliminary Sur-Reply, Exhibit-11, Filed on Jun. 23, 2022—Cited in IPR2022-00369, challenging U.S. Pat. No. 10,405,082, 8 pages.

Patent Owner's Preliminary Sur-Reply, Exhibit-14, Filed on Apr. 29, 2022—Cited in IPR2022-00243, challenging U.S. Pat. No. 8,111,839, 9 pages.

Patent Owner's Preliminary Sur-Reply, Exhibit-15, Filed on Apr. 29, 2022—Cited in IPR2022-00242, challenging U.S. Pat. No. 8,111,839, 9 pages.

Patent Owner's Preliminary Sur-Reply, Exhibit-9, Filed on Nov. 17, 2022—Cited in IPR2022-01099, challenging U.S. Pat. No. 11,244,666, 9 pages.

Patent Owner's Preliminary Sur-Reply, Exhibit-9, Filed on Nov. 18, 2022—Cited in IPR2022-01078, challenging U.S. Pat. No. 11,057,701, 9 pages.

Patent Owner's Preliminary Sur-Reply, Exhibit-9, Filed on Nov. 18, 2022—Cited in IPR2022-01106, challenging U.S. Pat. No. 11,039,259, 5 pages.

Patent Owner's Preliminary Sur-Reply, Exhibit-9, Filed on Jun. 23, 2022—Cited in IPR2022-00410, challenging U.S. Pat. No. 10,979,836, 8 pages.

Patent Owner's Preliminary Sur-Reply; Exhibit-11, Filed on Apr. 29, 2022—Cited in IPR2022-00234, challenging U.S. Pat. No. 9,124,982, 9 pages.

Patent Owner's Request for Oral Argument, Exhibit-21, Filed on Feb. 3, 2023—Cited in IPR2022-00282, challenging U.S. Pat. No. 8,315,400, 4 pages.

Patent Owner's Request for Oral Argument, Exhibit-21, Filed on Aug, 17, 2023—Cited in IPR2022-01078, challenging U.S. Pat. No. 11,057,701, 3 pages.

(56) References Cited

OTHER PUBLICATIONS

Patent Owner's Request for Oral Argument, Exhibit-22, Filed on Feb. 28, 2023—Cited in IPR2022-00302, challenging U.S. Pat. No. 9,609,424, 4 pages.

Patent Owner's Request for Oral Argument, Exhibit-23, Filed on Mar. 1, 2023—Cited in IPR2022-00281, challenging U.S. Pat. No. 9,270,244, 4 pages.

Patent Owner's Request for Oral Argument, Exhibit-24, Filed on Feb. 28, 2023—Cited in IPR2022-00324, challenging U.S. Pat. No. 8,254,591, 4 pages.

Patent Owner's Request for Oral Argument, Exhibit-24, Filed on Mar. 1, 2023—Cited in IPR2022-00253, challenging U.S. Pat. No. 9,491,542, 4 pages.

Patent Owner's Request for Oral Argument, Exhibit-24, Filed on Apr. 4, 2023—Cited in IPR2022-00388, challenging U.S. Pat. No. 10,966,015, 4 pages.

Patent Owner's Request for Oral Argument, Exhibit-25, Filed on Apr. 4, 2023—Cited in IPR2022-00369, challenging U.S. Pat. No. 10,405,082, 4 pages.

Patent Owner's Request for Oral Argument, Exhibit-25, Filed on Aug. 28, 2023—Cited in IPR2022-01106, challenging U.S. Pat. No. 11,039,259, 3 pages.

Patent Owner's Request for Oral Argument, Exhibit-26, Filed on Feb. 7, 2023—Cited in IPR2022-00243, challenging U.S. Pat. No. 8,111,839, 4 pages.

Patent Owner's Request for Oral Argument, Exhibit-27, Filed on Feb. 7, 2023—Cited in IPR2022-00242, challenging U.S. Pat. No. 8,111,839, 4 pages.

Patent Owner's Request for Oral Argument; Exhibit-22, Filed on Feb. 3, 2023—Cited in IPR2022-00234, challenging U.S. Pat. No. 9124982, 4 pages.

Patent Owner's Response, Exhibit-14, Filed on Mar. 23, 2023—Cited in IPR2022-01078, challenging U.S. Pat. No. 11,057,701, 53 pages.

Patent Owner's Response, Exhibit-15, Filed on Sep. 9, 2022—Cited in IPR2022-00282, challenging U.S. Pat. No. 8,315,400, 73 pages.

Patent Owner's Response, Exhibit-16, Filed on Dec. 6, 2024—Cited in IPR2024-00559, challenging U.S. Pat. No. 11,610,587, 36 pages.

Patent Owner's Response, Exhibit-17, Filed on Apr. 10, 2023—Cited in IPR2022-01106, challenging U.S. Pat. No. 11,039,259, 59 pages.

Patent Owner's Response, Exhibit-18, Filed on Oct. 17, 2022—Cited in IPR2022-00302, challenging U.S. Pat. No. 9,609,424, 67 pages.

Patent Owner's Response, Exhibit-18, Filed on Nov. 8, 2022—Cited in IPR2022-00388, challenging U.S. Pat. No. 10,966,015, 55 pages.

Patent Owner's Response, Exhibit-19, Filed on Oct. 19, 2022—Cited in IPR2022-00281, challenging U.S. Pat. No. 9,270,244, 71 pages.

Patent Owner's Response, Exhibit-19, Filed on Nov. 8, 2022—Cited in IPR2022-00369, challenging U.S. Pat. No. 10,405,082, 51 pages.

Patent Owner's Response, Exhibit-20, Filed on Oct. 17, 2022—Cited in IPR2022-00324, challenging U.S. Pat. No. 8,254,591, 37 pages.

Patent Owner's Response, Exhibit-21, Filed on Sep. 13, 2022—Cited in IPR2022-00243, challenging U.S. Pat. No. 8,111,839, 5 pages.

Patent Owner's Response, Exhibit-22, Filed on Sep. 13, 2022—Cited in IPR2022-00242, challenging U.S. Pat. No. 8,111,839, 58 pages.

Patent Owner's Sur-Reply, Exhibit-19, Filed on Jan. 12, 2023—Cited in IPR2022-00282, challenging U.S. Pat. No. 8,315,400, 28 pages.

Patent Owner's Sur-Reply, Exhibit-19, Filed on Jul. 26, 2023—Cited in IPR2022-01078, challenging U.S. Pat. No. 11,057,701, 29 pages.

Patent Owner's Sur-Reply, Exhibit-21, Filed on Feb. 21, 2023—Cited in IPR2022-00302, challenging U.S. Pat. No. 9,609,424, 29 pages.

Patent Owner's Sur-Reply, Exhibit-22, Filed on Feb. 22, 2023—Cited in IPR2022-00281, challenging U.S. Pat. No. 9,270,244, 31 pages.

Patent Owner's Sur-Reply, Exhibit-22, Filed on Mar. 13, 2023—Cited in IPR2022-00388, challenging U.S. Pat. No. 10,966,015, 21 pages.

Patent Owner's Sur-Reply, Exhibit-23, Filed on Feb. 20, 2023—Cited in IPR2022-00324, challenging U.S. Pat. No. 8,254,591, 23 pages.

Patent Owner's Sur-Reply, Exhibit-23, Filed on Feb. 22, 2023—Cited in IPR2022-00253, challenging U.S. Pat. No. 9,491,542, 28 pages.

Patent Owner's Sur-Reply, Exhibit-23, Filed on Mar. 13, 2023—Cited in IPR2022-00369, challenging U.S. Pat. No. 10,405,082, 22 pages.

Patent Owner's Sur-Reply, Exhibit-23, Filed on Aug. 14, 2023—Cited in IPR2022-01106, challenging U.S. Pat. No. 11,039,259, 33 pages.

Patent Owner's Sur-Reply, Exhibit-25, Filed on Jan. 17, 2023—Cited in IPR2022-00243, challenging U.S. Pat. No. 8,111,839, 20 pages.

Patent Owner's Sur-Reply, Exhibit-26, Filed on Jan. 12, 2023—Cited in IPR2022-00242, challenging U.S. Pat. No. 8,111,839, 20 pages.

Patent Owner's Sur-Reply; Exhibit-21, Filed on Jan. 13, 2023—Cited in IPR2022-00234, challenging U.S. Pat. No. 9,124,982, 26 pages.

Patent Owner's Unopposed Motion To Withdraw and Substitute Counsel Under 37 CFR 11.116, Exhibit-11, Filed on Nov. 13, 2024—Cited in IPR2024-00559, challenging U.S. Pat. No. 11,610,587, 4 pages.

Patent Owner's Unopposed Motion to Withdraw and Substitute Counsel Under 37 CFR 11.116, Exhibit-11, Filed on Nov. 21, 2024—Cited in IPR2024-01003, challenging U.S. Pat. No. 9,191,083, 4 pages.

Patent Owner's Unopposed Motion To Withdraw and Substitute Counsel Under 37 CFR 11.116, Exhibit-11, Filed on Nov. 21, 2024—Cited in IPR2024-01004, challenging U.S. Pat. No. 9,614,943, 4 pages.

Patent Owner's Unopposed Motion To Withdraw and Substitute Counsel Under 37 CFR 11.116, Exhibit-11, Filed on Nov. 21, 2024—Cited in IPR2024-01031, challenging U.S. Pat. No. 7,049,850, 4 pages.

Patent Owner's Unopposed Motion To Withdraw and Substitute Counsel Under 37 CFR 11.116, Exhibit-12, Filed on Nov. 21, 2024—Cited in IPR2024-01034, challenging U.S. Pat. No. 9,279,263, 4 pages.

Patent Owner's Unopposed Motion To Withdraw and Substitute Counsel Under 37 CFR 11.116Paper10, Nov. 21, 2024—Cited in IPR2024-01033, challenging U.S. Pat. No. 8,434,966, 4 pages.

Patent Owner's Updated Exhibit List, Exhibit-23, Filed on Sep. 25, 2023—Cited in IPR2022-01078, challenging U.S. Pat. No. 11,057,701, 4 pages.

Patent Owner's Updated Mandatory Notice under 37 C.F.R. 42.8, Exhibit-15, Filed on Jul. 27, 2022—Cited in IPR2022-00324, challenging U.S. Pat. No. 8,254,591, 5 pages.

Patent Owner's Updated Mandatory Notice under 37 C.F.R. 42.8, Exhibit-17, Filed on Jul. 27, 2022—Cited in IPR2022-00243, challenging U.S. Pat. No. 8,111,839, 5 pages.

Patent Owner's Updated Mandatory Notice under 37 C.F.R. 42.8, Exhibit-18, Filed on Jul. 27, 2022—Cited in IPR2022-00242, challenging U.S. Pat. No. 8,111,839, 5 pages.

Patent Owner's Updated Mandatory Notice under 37 C.F.R. 42.8, Exhibit-8, Filed on Dec. 28, 2021—Cited in IPR2022-00242, challenging U.S. Pat. No. 8,111,839, 5 pages.

Patent Owner's Updated Mandatory Notice under 37 C.F.R. 42.8; Exhibit-14, Filed on Jul. 27, 2022—Cited in IPR2022-00234, challenging U.S. Pat. No. 9,124,982, 5 pages.

(56) References Cited

OTHER PUBLICATIONS

Patent Owner's Updated Mandatory Notice under 37 C.F.R. 42.8; Exhibit-7, Filed on Dec. 28, 2021—Cited in IPR2022-00234, challenging U.S. Pat. No. 9,124,982, 5 pages.
Patent Owner's Updated Mandatory Notice, Exhibit-17, Filed on Sep. 13, 2022—Cited in IPR2022-00253, challenging U.S. Pat. No. 9,491,542, 4 pages.
Patent Owner's Updated Mandatory Notice, Exhibit-17, Filed on Sep. 13, 2022—Cited in IPR2022-00281, challenging U.S. Pat. No. 9,270,244, 4 pages.
Patent Owner's Updated Mandatory Notice, Exhibit-18, Filed on Jun. 28, 2023—Cited in IPR2022-01078, challenging U.S. Pat. No. 11,057,701, 4 pages.
Patent Owner's Updated Mandatory Notice, Exhibit-20, Filed on Jun. 28, 2023—Cited in IPR2022-01106, challenging U.S. Pat. No. 11,039,259, 4 pages.
Patent Owner's Updated Mandatory Notice, Exhibit-29, Filed on Jun. 28, 2023—Cited in IPR2022-00282, challenging U.S. Pat. No. 8,315,400, 4 pages.
Patent Owner's Updated Mandatory Notice, Exhibit-29, Filed on Jun. 28, 2023—Cited in IPR2022-00388, challenging U.S. Pat. No. 10,966,015, 5 pages.
Patent Owner's Updated Mandatory Notice, Exhibit-30, Filed on Jun. 28, 2023—Cited in IPR2022-00281, challenging U.S. Pat. No. 9,270,244, 4 pages.
Patent Owner's Updated Mandatory Notice, Exhibit-30, Filed on Jun. 28, 2023—Cited in IPR2022-00369, challenging U.S. Pat. No. 10,405,082, 5 pages.
Patent Owner's Updated Mandatory Notice, Exhibit-31, Filed on Jun. 28, 2023—Cited in IPR2022-00253, challenging U.S. Pat. No. 9,491,542, 4 pages.
Patent Owner's Updated Mandatory Notice, Exhibit-31, Filed on Jun. 28, 2023—Cited in IPR2022-00324, challenging U.S. Pat. No. 8,254,591, 5 pages.
Patent Owner's Updated Mandatory Notice, Exhibit-35, Filed on Jun. 28, 2023—Cited in IPR2022-00302, challenging U.S. Pat. No. 9,609,424, 5 pages.
Patent Owner's Updated Mandatory Notice, Exhibit-36, Filed on Jun. 28, 2023—Cited in IPR2022-00243, challenging U.S. Pat. No. 8,111,839, 86 pages.
Patent Owner's Updated Mandatory Notice, Exhibit-37, Filed on Jun. 28, 2023—Cited in IPR2022-00242, challenging U.S. Pat. No. 8,111,839, 5 pages.
Patent Owner's Updated Mandatory Notice; Exhibit-30, Filed on Jun. 28, 2023—Cited in IPR2022-00234, challenging U.S. Pat. No. 9,124,982, 6 pages.
Patent Owner's Updated Mandatory Notices, Exhibit-15, Filed on Dec. 6, 2024—Cited in IPR2024-00559, challenging U.S. Pat. No. 11,610,587, 6 pages.
Patent Owner's Updated Power of Attorney Pursuant to 37 CFR 41.10(b), Exhibit-14, Filed on Dec. 6, 2024—Cited in IPR2024-00559, challenging U.S. Pat. No. 11,610,587, 5 pages.
Patent Owner'S Unopposed Motion to Withdraw And Substitute Counsel Under 37 C.F.R. § 11.116 filed by *Harman International Industries, Inc.*, v. *St Casestech, LLC* for U.S. Pat. No. 11,589,329 Under Case No. IPR2024-01300, Nov. 21, 2024, 4 pages.
Patent Owner'S Unopposed Motion to Withdraw And Substitute Counsel Under 37 C.F.R. § 11.116 filed by *Harman International Industries, Inc.*, v. *St Casestech, LLC* for U.S. Pat. No. 8,805,692 Under Case No. IPR2024-01301, Nov. 21, 2024, 4 pages.
Peltor Lite-Com II, At least by 1999, Peltor Lite-Com II Manual (SAM-TECH_00099254), 13 pages.
Peltor Lite-Com II, At least by 1999, Peltor Lite-Com II Brochure (SAM-TECH 00099203), 6 pages.
Performance of dual microphone in-the-ear hearing aids, Michael Valente, Gerald Schuchmant, Lisa G. Potts & Lucille B. Beck, Journal of the American Academy of Audiology, 2000, 9 pages.
Petition : as filed for Inter Partes Review of U.S. Pat. No. 11,610,587, Exhibit-4, Filed on Feb. 9, 2024—Cited in IPR2024-00559, challenging U.S. Pat. No. 11,610,587, 88 pages.
Petition : as filed, Exhibit-3, Filed on Jun. 12, 2024—Cited in IPR2024-01003, challenging U.S. Pat. No. 9,191, 083, 93 pages.
Petition : as filed, Exhibit-3, Filed on Jun. 12, 2024—Cited in IPR2024-01004, challenging U.S. Pat. No. 9,614,943, 91 pages.
Petition : as filed, Exhibit-4, Filed on Jun. 25, 2024—Cited in IPR2024-01031, challenging U.S. Pat. No. 7,049,850, 96 pages.
Petition : as filed, Exhibit-5, Filed on Jul. 1, 2024—Cited in IPR2024-01034, challenging U.S. Pat. No. 9,279,263, 107 pages.
Petition: as filedPaper3,Jun. 18, 2024—Cited in IPR2024-01033, challenging U.S. Pat. No. 8,434,966, 116 pages.
Petition for Inter Partes Review filed by *Harman International Industries, Inc.* v. *St Casestech, LLC*, for U.S. Pat. No. 11,589,329 Under Case IPR2024-01300, Dated Aug. 30, 2024, 78 pages.
Petition For Inter Partes Review filed by *Harman International Industries, Inc.* v. *St Casestech, LLC*, U.S. Pat. No. 8,805,692 under Case IPR2024-01301, dated Aug. 30, 2024, 85 pages.
Petition for Inter Partes Review of U.S. Pat. No. 11,217,237, Exhibit-4, Filed on Jun. 9, 2022—Cited in IPR2022-01098, challenging U.S. Pat. No. 11,217,237, 84 pages.
Petition for Inter Partes Review of U.S. Pat. No. 11,244,666, Exhibit-3, Filed on Jun. 9, 2022—Cited in IPR2022-01099, challenging U.S. Pat. No. 11,244,666, 83 pages.
Petition for Inter Partes Review of U.S. Pat. No. 8,254,591, Exhibit-3, Filed on Dec. 20, 2021—Cited in IPR2022-00324, challenging U.S. Pat. No. 8,254,591, 80 pages.
Petition for Inter Partes Review of U.S. Pat. No. 10,405,082, Exhibit-3, Filed on Dec. 30, 2021—Cited in IPR2022-00369, challenging U.S. Pat. No. 10,405,082, 96 pages.
Petition for Inter Partes Review of U.S. Pat. No. 10,966,015, Exhibit-3, Filed on Jan. 4, 2022—Cited in IPR2022-00388, challenging U.S. Pat. No. 10,966,015, 93 pages.
Petition for Inter Partes Review of U.S. Pat. No. 10,979,836, Exhibit-3, Filed on Jan. 14, 2022—Cited in IPR2022-00410, challenging U.S. Pat. No. 10,979,836, 88 pages.
Petition for Inter Partes Review of U.S. Pat. No. 11,039,259, Exhibit-3, Filed on Jun. 9, 2022—Cited in IPR2022-01106, challenging U.S. Pat. No. 11,039,259, 90 pages.
Petition for Inter Partes Review of U.S. Pat. No. 8,111,839, Exhibit-3, Filed on Dec. 13, 2021—Cited in IPR2022-00242, challenging U.S. Pat. No. 8,111,839, 84 pages.
Petition for Inter Partes Review of U.S. Pat. No. 8,111,839, Exhibit-3, Filed on Dec. 13, 2021—Cited in IPR2022-00243, challenging U.S. Pat. No. 8,111,839, 58 pages.
Petition for Inter Partes Review of U.S. Pat. No. 9,124,982; Exhibit-3, Filed on Dec. 13, 2021—Cited in IPR2022-00234, challenging U.S. Pat. No. 9,124,982, 84 pages.
Petition for Inter Partes Review of U.S. Pat. No. 9,270,244, Exhibit-3, Filed on Dec. 21, 2021—Cited in IPR2022-00281, challenging U.S. Pat. No. 9,270,244, 80 pages.
Petition for Inter Partes Review of U.S. Pat. No. 9,491,542, Exhibit-3, Filed on Dec. 17, 2021—Cited in IPR2022-00253, challenging U.S. Pat. No. 9,491,542, 79 pages.
Petition for Inter Partes Review of U.S. Pat. No. 9,609,424, Exhibit-3, Filed on Dec. 21, 2021—Cited in IPR2022-00302, challenging U.S. Pat. No. 9,609,424, 91 pages.
Petition of Inter Partes Review of U.S. Pat. No. 11,057,701, Exhibit-3, Filed on Jun. 9, 2022—Cited in IPR2022-01078, challenging U.S. Pat. No. 11,057,701, 95 pages.
Petition with Proposed Corrections in Redline, Exhibit-1042, Filed on Jan. 31, 2022—Cited in IPR2022-00242, challenging U.S. Pat. No. 8,111,839, 84 pages.
Petition with Proposed Corrections in Redline, Exhibit-1042, Filed on Jan. 31, 2022—Cited in IPR2022-00243, challenging U.S. Pat. No. 8,111,839, 58 pages.
Petitioner Harman International Industries, Inc. Corrected Power of Attorney filed by *Harman International Industries, Inc.* v. *St Casestech LLC1*, for U.S. Pat. No. 11,589,329 Under Case IPR2024-01300, Dated Aug. 31, 2024, 5 pages.
Petitioner Harman International Industries, Inc. Power Of Attorney U.S. Pat. No. 11,589,329 filed by *Harman International Industries, Inc.* v. *Staton Techiya, LLC*, fr U.S. Pat. No. 11,589,329 Under Case IPR2024-01300 Dated Aug. 26, 2024, 3 pages.

(56) References Cited

OTHER PUBLICATIONS

Petitioner Harman International Industries, Inc. Power Of Attorney U.S. Pat. No. 8,805,692 filed by *Harman International Industries, Inc.*, v. *St Casestech LLC*, for U.S. Pat. No. 8,805,692 Under Case IPR2024-01301, Dated Aug. 26, 2024, 3 pages.

Petitioner's Power of Attorney from Samsung Electronics Co, Ltd.; Exhibit-1, Filed on Dec. 13, 2021—Cited in IPR2022-00234, challenging U.S. Pat. No. 9,124,982, 3 pages.

Petitioner's Power of Attorney from Samsung Electronics, America, Inc.; Exhibit-2, Filed on Dec. 13, 2021—Cited in IPR2022-00234, challenging U.S. Pat. No. 9,124,982, 3 pages.

Petitioner's Updated Mandatory Notices, Exhibit-16, Filed on Oct. 13, 2022—Cited in IPR2022-00388, challenging U.S. Pat. No. 10,966,015, 5 pages.

Petitioner's Updated Mandatory Notices, Exhibit-17, Filed on Oct. 13, 2022—Cited in IPR2022-00369, challenging U.S. Pat. No. 10,405,082, 5 pages.

Petitioner's Updated Mandatory Notices; Exhibit-27, Filed on Apr. 3, 2023—Cited in IPR2022-00234, challenging U.S. Pat. No. 9,124,982, 6 pages.

Petitioner'S Request for Refund of Post-Institution Fees filed by *Harman International Industries, Inc.* v. *St Casestech, LLC*, for U.S. Pat. No. 11,589,329 under Case IPR2024-01300, dated Jan. 16, 2025, 3 pages.

Petitioner'S Request for Refund of Post-Institution Fees filed by *Harman International Industries, Inc.* v. *St Casestech, LLC*, for U.S. Pat. No. 8,805,692 under Case IPR2024-01301, dated Jan. 16, 2025, 3 pages.

Petitioners Supplemental Brief on Interim Fintiv Guidance, Exhibit-10, Filed on Jul. 1, 2022—Cited in IPR2022-00410, challenging U.S. Pat. No. 10,979,836, 8 pages.

Petitioners Supplemental Brief on Interim Fintiv Guidance, Exhibit-11, Filed on Jul. 1, 2022—Cited in IPR2022-00253, challenging U.S. Pat. No. 9,491,542, 8 pages.

Petitioners Supplemental Brief on Interim Fintiv Guidance, Exhibit-11, Filed on Jul. 1, 2022—Cited in IPR2022-00281, challenging U.S. Pat. No. 9,270,244, 8 pages.

Petitioners Supplemental Brief on Interim Fintiv Guidance, Exhibit-11, Filed on Jul. 1, 2022—Cited in IPR2022-00302, challenging U.S. Pat. No. 9,609,424, 8 pages.

Petitioners Supplemental Brief on Interim Fintiv Guidance, Exhibit-11, Filed on Jul. 1, 2022—Cited in IPR2022-00324, challenging U.S. Pat. No. 8,254,591, 8 pages.

Petitioners Supplemental Brief on Interim Fintiv Guidance, Exhibit-11, Filed on Jul. 1, 2022—Cited in IPR2022-00388, challenging U.S. Pat. No. 10,966,015, 8 pages.

Petitioners Supplemental Brief on Interim Fintiv Guidance, Exhibit-12, Filed on Jul. 1, 2022—Cited in IPR2022-00369, challenging U.S. Pat. No. 10,405,082, 8 pages.

Petitioners' Demonstrative Exhibits for Oral Argument, Exhibit-1019, Filed on Mar. 14, 2023—Cited in IPR2022-00282, challenging U.S. Pat. No. 8,315,400, 53 pages.

Petitioners' Demonstrative Exhibits for Oral Argument; Exhibit-1045, Filed on Mar. 14, 2023—Cited in IPR2022-00234, challenging U.S. Pat. No. 9,124,982, 101 pages.

Petitioners' Motion for Leave to File Corrected Petition, Exhibit-9, Filed on Jan. 31, 2022—Cited in IPR2022-00243, challenging U.S. Pat. No. 8,111,839, 8 pages.

Petitioners' Motion to Submit Supplemental Information Pursuant to 37 C.F.R. §42.123(b), Exhibit-29, Filed on Apr. 13, 2023—Cited in IPR2022-00302, challenging U.S. Pat. No. 9,609,424, 6 pages.

Petitioners' Notice of Appeal, Exhibit-31, Filed on Aug. 11, 2023—Cited in IPR2022-00282, challenging U.S. Pat. No. 8,315,400, 104 pages.

Petitioners' Notice of Appeal, Exhibit-38, Filed on Aug. 11, 2023—Cited in IPR2022-00302, challenging U.S. Pat. No. 9,609,424, 77 pages.

Petitioners' Notice of Cross-Appeal, Exhibit-34, Filed on Sep. 20, 2023—Cited in IPR2022-00281, challenging U.S. Pat. No. 9,270,244, 45 pages.

Petitioners' Notice of Cross-Appeal, Exhibit-35, Filed on Sep. 20, 2023—Cited in IPR2022-00253, challenging U.S. Pat. No. 9,491,542, 100 pages.

Petitioners' Notice of Cross-Appeal, Exhibit-35, Filed on Sep. 20, 2023—Cited in IPR2022-00324, challenging U.S. Pat. No. 8,254,591, 97 pages.

Petitioners' Notice of Cross-Appeal, Exhibit-39, Filed on Aug. 24, 2023—Cited in IPR2022-00242, challenging U.S. Pat. No. 8,111,839, 94 pages.

Petitioners' Notice of Cross-Appeal; Exhibit-32, Filed on Aug. 24, 2023—Cited in IPR2022-00234, challenging U.S. Pat. No. 9,124,982, 93 pages.

Petitioners' Notice of Depo of Chrisotpher Struck, Exhibit-16, Filed on May 15, 2023—Cited in IPR2022-01078, challenging U.S. Pat. No. 11,057,701, 3 pages.

Petitioners' Notice of Deposition of Christopher Struck, Exhibit-19, Filed on Nov. 15, 2022—Cited in IPR2022-00302, challenging U.S. Pat. No. 9,609,424, 3 pages.

Petitioners' Notice of Deposition of Daniel P. Anagnos, Exhibit-23, Filed on Nov. 9, 2022—Cited in IPR2022-00243, challenging U.S. Pat. No. 8,111,839, 3 pages.

Petitioners' Notice of Deposition of Daniel P. Anagnos, Exhibit-24, Filed on Nov. 9, 2022—Cited in IPR2022-00242, challenging U.S. Pat. No. 8,111,839, 3 pages.

Petitioners' Notice of Deposition of Daniel P. Anagnos; Exhibit-19, Filed on Nov. 9, 2022—Cited in IPR2022-00234, challenging U.S. Pat. No. 9,124,982, 3 pages.

Petitioners' Notice of Deposition of David Kleinschmidt, Exhibit-19, Filed on May 24, 2023—Cited in IPR2022-01106, challenging U.S. Pat. No. 11,039,259, 5 pages.

Petitioners' Notice of Objections to Evidence, Exhibit-18, Filed on Apr. 19, 2023—Cited in IPR2022-01106, challenging U.S. Pat. No. 11,039,259, 4 pages.

Petitioners' Notice of Objections to Evidence, Exhibit-22, Filed on Sep. 20, 2022—Cited in IPR2022-00243, challenging U.S. Pat. No. 8,111,839, 5 pages.

Petitioners' Notice of Objections to Evidence, Exhibit-23, Filed on Sep. 20, 2022—Cited in IPR2022-00242, challenging U.S. Pat. No. 8,111,839, 6 pages.

Petitioners' Notice of Objections to Evidence; Exhibit-18, Filed on Sep. 16, 2022—Cited in IPR2022-00234, challenging U.S. Pat. No. 9,124,982, 6 pages.

Petitioners' Preliminary Reply, Exhibit-10, Filed on Apr. 20, 2022—Cited in IPR2022-00282, challenging U.S. Pat. No. 8,315,400, 9 pages.

Petitioners' Preliminary Reply, Exhibit-10, Filed on Jun. 14, 2022—Cited in IPR2022-00369, challenging U.S. Pat. No. 10,405,082, 10 pages.

Petitioners' Preliminary Reply, Exhibit-13, Filed on Apr. 20, 2022—Cited in IPR2022-00243, challenging U.S. Pat. No. 8,111,839, 10 pages.

Petitioners' Preliminary Reply, Exhibit-14, Filed on Apr. 20, 2022—Cited in IPR2022-00242, challenging U.S. Pat. No. 8,111,839, 10 pages.

Petitioners' Preliminary Reply, Exhibit-8, Filed on Nov. 10, 2022—Cited in IPR2022-01078, challenging U.S. Pat. No. 11,057,701, 10 pages.

Petitioners' Preliminary Reply, Exhibit-8, Filed on Nov. 10, 2022—Cited in IPR2022-01099, challenging U.S. Pat. No. 11,244,666, 12 pages.

Petitioners' Preliminary Reply, Exhibit-8, Filed on Nov. 10, 2022—Cited in IPR2022-01106, challenging U.S. Pat. No. 11,039,259, 9 pages.

Petitioners' Preliminary Reply, Exhibit-8, Filed on Jun. 14, 2022—Cited in IPR2022-00410, challenging U.S. Pat. No. 10,979,836, 10 pages.

Petitioners' Preliminary Reply, Exhibit-9, Filed on Nov. 15, 2022—Cited in IPR2022-01098, challenging U.S. Pat. No. 11,217,237, 10 pages.

Petitioners' Preliminary Reply, Exhibit-9, Filed on May 10, 2022—Cited in IPR2022-00302, challenging U.S. Pat. No. 9,609,424, 10 pages.

(56) References Cited

OTHER PUBLICATIONS

Petitioners' Preliminary Reply, Exhibit-9, Filed on May 11, 2022—Cited in IPR2022-00324, challenging U.S. Pat. No. 8,254,591, 10 pages.

Petitioners' Preliminary Reply, Exhibit-9, Filed on May 20, 2022—Cited in IPR2022-00253, challenging U.S. Pat. No. 9,491,542, 9 pages.

Petitioners' Preliminary Reply, Exhibit-9, Filed on May 27, 2022—Cited in IPR2022-00281, challenging U.S. Pat. No. 9,270,244, 9 pages.

Petitioners' Preliminary Reply, Exhibit-9, Filed on Jun. 14, 2022—Cited in IPR2022-00388, challenging U.S. Pat. No. 10,966,015, 10 pages.

Petitioners' Preliminary Reply; Exhibit-10, Filed on Apr. 20, 2022—Cited in IPR2022-00234, challenging U.S. Pat. No. 9124982, 10 pages.

Petitioners' Reply to Patent Owner's Response, Exhibit-17, Filed on Dec. 2, 2022—Cited in IPR2022-00282, challenging U.S. Pat. No. 8,315,400, 33 pages.

Petitioners' Reply to Patent Owner's Response, Exhibit-17, Filed on Jun. 15, 2023—Cited in IPR2022-01078, challenging U.S. Pat. No. 11,057,701, 40 pages.

Petitioners' Reply to Patent Owner's Response, Exhibit-20, Filed on Jan. 10, 2023—Cited in IPR2022-00302, challenging U.S. Pat. No. 9,609,424, 33 pages.

Petitioners' Reply to Patent Owner's Response, Exhibit-20, Filed on Jan. 31, 2023—Cited in IPR2022-00388, challenging U.S. Pat. No. 10,966,015, 23 pages.

Petitioners' Reply to Patent Owner's Response, Exhibit-21, Filed on Jan. 11, 2023—Cited in IPR2022-00281, challenging U.S. Pat. No. 9,270,244, 32 pages.

Petitioners' Reply to Patent Owner's Response, Exhibit-21, Filed on Jan. 31, 2023—Cited in IPR2022-00369, challenging U.S. Pat. No. 10,405,082, 20 pages.

Petitioners' Reply to Patent Owner's Response, Exhibit-21, Filed on Jun. 30, 2023—Cited in IPR2022-01106, challenging U.S. Pat. No. 11,039,259, 56 pages.

Petitioners' Reply to Patent Owner's Response, Exhibit-22, Filed on Jan. 10, 2023—Cited in IPR2022-00324, challenging U.S. Pat. No. 8,254,591, 37 pages.

Petitioners' Reply to Patent Owner's Response, Exhibit-24, Filed on Dec. 6, 2022—Cited in IPR2022-00243, challenging U.S. Pat. No. 8,111,839, 37 pages.

Petitioners' Reply to Patent Owner's Response, Exhibit-25, Filed on Dec. 6, 2022—Cited in IPR2022-00242, challenging U.S. Pat. No. 8,111,839, 36 pages.

Petitioners' Reply to Patent Owner's Response; Exhibit-20, Filed on Dec. 2, 2022—Cited in IPR2022-00234, challenging U.S. Pat. No. 9,124,982, 37 pages.

Petitioners' Reply to Patent Owners Response, Exhibit-21, Filed on Jan. 11, 2023—Cited in IPR2022-00253, challenging U.S. Pat. No. 9,491,542, 36 pages.

Petitioners' Request for Oral Argument, Exhibit-20, Filed on Aug. 17, 2023—Cited in IPR2022-01078, challenging U.S. Pat. No. 11,057,701, 4 pages.

Petitioners' Request for Oral Argument, Exhibit-22, Filed on Feb. 3, 2023—Cited in IPR2022-00282, challenging U.S. Pat. No. 8,315,400, 4 pages.

Petitioners' Request for Oral Argument, Exhibit-23, Filed on Feb. 28, 2023—Cited in IPR2022-00302, challenging U.S. Pat. No. 9,609,424, 4 pages.

Petitioners' Request for Oral Argument, Exhibit-24, Filed on Mar. 1, 2023—Cited in IPR2022-00281, challenging U.S. Pat. No. 9,270,244, 4 pages.

Petitioners' Request for Oral Argument, Exhibit-24, Filed on Aug. 28, 2023—Cited in IPR2022-01106, challenging U.S. Pat. No. 11,039,259, 4 pages.

Petitioners' Request for Oral Argument, Exhibit-25, Filed on Feb. 28, 2023—Cited in IPR2022-00324, challenging U.S. Pat. No. 8,254,591, 4 pages.

Petitioners' Request for Oral Argument, Exhibit-25, Filed on Mar. 1, 2023—Cited in IPR2022-00253, challenging U.S. Pat. No. 9,491,542, 4 pages.

Petitioners' Request for Oral Argument, Exhibit-25, Filed on Apr. 4, 2023—Cited in IPR2022-00388, challenging U.S. Pat. No. 10,966,015, 4 pages.

Petitioners' Request for Oral Argument, Exhibit-26, Filed on Apr. 4, 2023—Cited in IPR2022-00369, challenging U.S. Pat. No. 10,405,082, 4 pages.

Petitioners' Request for Oral Argument, Exhibit-27, Filed on Feb. 7, 2023—Cited in IPR2022-00243, challenging U.S. Pat. No. 8,111,839, 5 pages.

Petitioners' Request for Oral Argument, Exhibit-28, Filed on Feb. 7, 2023—Cited in IPR2022-00242, challenging U.S. Pat. No. 8,111,839, 5 pages.

Petitioners' Request for Oral Argument; Exhibit-23, Filed on Feb. 3, 2023—Cited in IPR2022-00234, challenging U.S. Pat. No. 9,124,982, 4 pages.

Petitioners' Request for Refund of Post-Institution Fee, Exhibit-12, Filed on Mar. 2, 2023—Cited in IPR2022-01099, challenging U.S. Pat. No. 11,244,666, 3 pages.

Petitioners' Request for Refund of Post-Institution Fee, Exhibit-13, Filed on Jan. 18, 2023—Cited in IPR2022-00410, challenging U.S. Pat. No. 10,979,836, 3 pages.

Petitioners' Request for Refund of Post-Institution Fee, Exhibit-13, Filed on Mar. 2, 2023—Cited in IPR2022-01098, challenging U.S. Pat. No. 11,217,237, 3 pages.

Petitioners' Request for Refund of Post-Institution Fees, Exhibit-17, Filed on Dec. 16, 2024—Cited in IPR2024-01003, challenging U.S. Pat. No. 9,191,083, 3 pages.

Petitioners' Request for Refund of Post-Institution Fees, Exhibit-17, Filed on Dec. 16, 2024—Cited in IPR2024-01004, challenging U.S. Pat. No. 9,614,943, 3 pages.

Petitioners' Request for Refund of Post-Institution Fees, Exhibit-17, Filed on Dec. 16, 2024—Cited in IPR2024-01031, challenging U.S. Pat. No. 7,049,850, 3 pages.

Petitioners' Request for Refund of Post-Institution Fees, Exhibit-18, Filed on Dec. 16, 2024—Cited in IPR2024-01034, challenging U.S. Pat. No. 9,279,263, 3 pages.

Petitioners' Request for Refund of Post-Institution FeesPaper16, Dec. 16, 2024—Cited in IPR2024-01033, challenging U.S. Pat. No. 8,434,966, 3 pages.

Petitioners' Submission of Supplemental Information, Exhibit-33, Filed on May 15, 2023—Cited in IPR2022-00302, challenging U.S. Pat. No. 9,609,424, 6 pages.

Petitioners' Sur-Sur-Reply to Patent Owner's Sur-Reply, Exhibit-20, Filed on Jan. 27, 2023—Cited in IPR2022-00282, challenging U.S. Pat. No. 8,315,400, 10 pages.

Petitioners' Sur-Sur-Reply to Patent Owner's Sur-Reply, Exhibit-26, Filed on Mar. 7, 2023—Cited in IPR2022-00281, challenging U.S. Pat. No. 9,270,244, 11 pages.

Petitioners' Sur-Sur-Reply to Patent Owner's Sur-Reply, Exhibit-27, Filed on Mar. 7, 2023—Cited in IPR2022-00253, challenging U.S. Pat. No. 9,491,542, 10 pages.

Petitioners' Updated Exhibit List, Exhibit-10, Filed on Nov. 20, 2024—Cited in IPR2024-01003, challenging U.S. Pat. No. 9,191,083, 6 pages.

Petitioners' Updated Exhibit List, Exhibit-10, Filed on Nov. 20, 2024—Cited in IPR2024-01004, challenging U.S. Pat. No. 9,614,943, 6 pages.

Petitioners' Updated Exhibit List, Exhibit-10, Filed on Nov. 20, 2024—Cited in IPR2024-01031, challenging U.S. Pat. No. 7,049,850, 5 pages.

Petitioners' Updated Exhibit List, Exhibit-11, Filed on Nov. 20, 2024—Cited in IPR2024-01034, challenging U.S. Pat. No. 9,279,263, 4 pages.

Petitioners' Updated Exhibit List, Exhibit-15, Filed on Dec. 11, 2024—Cited in IPR2024-01003, challenging U.S. Pat. No. 9,191,083, 6 pages.

Petitioners' Updated Exhibit List, Exhibit-15, Filed on Apr. 11, 2024—Cited in IPR2024-01004, challenging U.S. Pat. No. 9,614,943, 6 pages.

(56)          References Cited

OTHER PUBLICATIONS

Petitioners' Updated Exhibit List, Exhibit-15, Filed on Dec. 11, 2024—Cited in IPR2024-01031, challenging U.S. Pat. No. 7,049,850, 5 pages.

Petitioners' Updated Exhibit List, Exhibit-16, Filed on Dec. 11, 2024—Cited in IPR2024-01034, challenging U.S. Pat. No. 9,279,263, 4 pages.

Petitioners' Updated Exhibit List, Exhibit-19, Filed on Dec. 11, 2024—Cited in IPR2024-00559, challenging U.S. Pat. No. 11,610,587, 5 pages.

Petitioners' Updated Exhibit List, Exhibit-24, Filed on Mar. 14, 2023—Cited in IPR2022-00282, challenging U.S. Pat. No. 8,315,400, 4 pages.

Petitioners' Updated Exhibit List, Exhibit-24, Filed on Sep. 26, 2023—Cited in IPR2022-01078, challenging U.S. Pat. No. 11,057,701, 5 pages.

Petitioners' Updated Exhibit List, Exhibit-27, Filed on May 9, 2023—Cited in IPR2022-00388, challenging U.S. Pat. No. 10,966,015, 4 pages.

Petitioners' Updated Exhibit List, Exhibit-28, Filed on Oct. 11, 2023—Cited in IPR2022-01106, challenging U.S. Pat. No. 11,039,259, 4 pages.

Petitioners' Updated Exhibit List, Exhibit-28, Filed on Apr. 11, 2023—Cited in IPR2022-00302, challenging U.S. Pat. No. 9,609,424, 5 pages.

Petitioners' Updated Exhibit List, Exhibit-28, Filed on Apr. 13, 2023—Cited in IPR2022-00281, challenging U.S. Pat. No. 9,270,244, 5 pages.

Petitioners' Updated Exhibit List, Exhibit-28, Filed on May 9, 2023—Cited in IPR2022-00369, challenging U.S. Pat. No. 10,405,082, 4 pages.

Petitioners' Updated Exhibit List, Exhibit-30, Filed on Apr. 12, 2023—Cited in IPR2022-00253, challenging U.S. Pat. No. 9,491,542, 5 pages.

Petitioners' Updated Exhibit List, Exhibit-30, Filed on Apr. 13, 2023—Cited in IPR2022-00302, challenging U.S. Pat. No. 9,609,424, 5 pages.

Petitioners' Updated Exhibit List, Exhibit-30, Filed on Apr. 4, 2023—Cited in IPR2022-00324, challenging U.S. Pat. No. 8,254,591, 6 pages.

Petitioners' Updated Exhibit List, Exhibit-31, Filed on Mar. 16, 2023—Cited in IPR2022-00243, challenging U.S. Pat. No. 8,111,839, 5 pages.

Petitioners' Updated Exhibit List, Exhibit-31, Filed on Apr. 13, 2023—Cited in IPR2022-00302, challenging U.S. Pat. No. 9,609,424, 5 pages.

Petitioners' Updated Exhibit List, Exhibit-32, Filed on Mar. 16, 2023—Cited in IPR2022-00242, challenging U.S. Pat. No. 8,111,839, 4 pages.

Petitioners' Updated Exhibit List; Exhibit-25, Filed on Mar. 14, 2023—Cited in IPR2022-00234, challenging U.S. Pat. No. 9,124,982, 4 pages.

Petitioners' Updated Exhibit ListPaper14, Nov. 11, 2024—Cited in IPR2024-01033, challenging U.S. Pat. No. 8,434,966, 4 pages.

Petitioners' Updated Exhibit ListPaper9, Nov. 20, 2024—Cited in IPR2024-01033, challenging U.S. Pat. No. 8,434,966, 4 pages.

Petitioners' Updated Mandatory Notices, Exhibit-15, Filed on Apr. 3, 2023—Cited in IPR2022-01078, challenging U.S. Pat. No. 11,057,701, 6 pages.

Petitioners' Updated Mandatory Notices, Exhibit-16, Filed on Mar. 28, 2023—Cited in IPR2022-01106, challenging U.S. Pat. No. 11,039,259, 6 pages.

Petitioners' Updated Mandatory Notices, Exhibit-18, Filed on Aug. 10, 2022—Cited in IPR2022-00324, challenging U.S. Pat. No. 8,254,591, 5 pages.

Petitioners' Updated Mandatory Notices, Exhibit-20, Filed on Aug. 10, 2022—Cited in IPR2022-00243, challenging U.S. Pat. No. 8,111,839, 5 pages.

Petitioners' Updated Mandatory Notices, Exhibit-21, Filed on Feb. 8, 2023—Cited in IPR2022-00388, challenging U.S. Pat. No. 10,966,015, 5 pages.

Petitioners' Updated Mandatory Notices, Exhibit-21, Filed on Aug. 10, 2022—Cited in IPR2022-00242, challenging U.S. Pat. No. 8,111,839, 5 pages.

Petitioners' Updated Mandatory Notices, Exhibit-22, Filed on Feb. 8, 2023—Cited in IPR2022-00369, challenging U.S. Pat. No. 10,405,082, 5 pages.

Petitioners' Updated Mandatory Notices, Exhibit-23, Filed on Apr. 3, 2023—Cited in IPR2022-00388, challenging U.S. Pat. No. 10,966,015, 6 pages.

Petitioners' Updated Mandatory Notices, Exhibit-24, Filed on Apr. 3, 2023—Cited in IPR2022-00369, challenging U.S. Pat. No. 10,405,082, 6 pages.

Petitioners' Updated Mandatory Notices, Exhibit-26, Filed on Apr. 3, 2023—Cited in IPR2022-00282, challenging U.S. Pat. No. 8,315,400, 6 pages.

Petitioners' Updated Mandatory Notices, Exhibit-26, Filed on Apr. 3, 2023—Cited in IPR2022-00302, challenging U.S. Pat. No. 9,609,424, 6 pages.

Petitioners' Updated Mandatory Notices, Exhibit-27, Filed on Apr. 3, 2023—Cited in IPR2022-00281, challenging U.S. Pat. No. 9,270,244, 6 pages.

Petitioners' Updated Mandatory Notices, Exhibit-28, Filed on Apr. 3, 2023—Cited in IPR2022-00253, challenging U.S. Pat. No. 9,491,542, 6 pages.

Petitioners' Updated Mandatory Notices, Exhibit-28, Filed on Apr. 3, 2023—Cited in IPR2022-00324, challenging U.S. Pat. No. 8,254,591, 6 pages.

Petitioners' Updated Mandatory Notices, Exhibit-33, Filed on Apr. 3, 2023—Cited in IPR2022-00243, challenging U.S. Pat. No. 8,111,839, 6 pages.

Petitioners' Updated Mandatory Notices, Exhibit-34, Filed on Apr. 3, 2023—Cited in IPR2022-00242, challenging U.S. Pat. No. 8,111,839, 6 pages.

Petitioners' Updated Mandatory Notices, Exhibit-4, Filed on Jan. 6, 2022—Cited in IPR2022-00369, challenging U.S. Pat. No. 10,405,082, 4 pages.

Petitioners' Updated Mandatory Notices, Exhibit-6, Filed on Jan. 20, 2022—Cited in IPR2022-00388, challenging U.S. Pat. No. 10,966,015, 5 pages.

Petitioners' Updated Mandatory Notices, Exhibit-7, Filed on Jan. 20, 2022—Cited in IPR2022-00253, challenging U.S. Pat. No. 9,491,542, 5 pages.

Petitioners' Updated Mandatory Notices, Exhibit-7, Filed on Jan. 20, 2022—Cited in IPR2022-00281, challenging U.S. Pat. No. 9,270,244, 5 pages.

Petitioners' Updated Mandatory Notices, Exhibit-7, Filed on Jan. 20, 2022—Cited in IPR2022-00302, challenging U.S. Pat. No. 9,609,424, 5 pages.

Petitioners' Updated Mandatory Notices, Exhibit-7, Filed on Jan. 20, 2022—Cited in IPR2022-00324, challenging U.S. Pat. No. 8,254,591, 5 pages.

Petitioners' Updated Mandatory Notices, Exhibit-7, Filed on Jan. 20, 2022—Cited in IPR2022-00369, challenging U.S. Pat. No. 10,405,082, 5 pages.

Petitioners' Updated Mandatory Notices, Exhibit-8, Filed on Jan. 20, 2022—Cited in IPR2022-00243, challenging U.S. Pat. No. 8,111,839, 5 pages.

Petitioners' Updated Mandatory Notices, Exhibit-8, Filed on Jan. 20, 2022—Cited in IPR2022-00282, challenging U.S. Pat. No. 8,315,400, 5 pages.

Petitioners' Updated Mandatory Notices, Exhibit-9, Filed on Jan. 20, 2022—Cited in IPR2022-00242, challenging U.S. Pat. No. 8,111,839, 5 pages.

Petitioners' Updated Mandatory Notices; Exhibit-16, Filed on Aug. 10, 2022—Cited in IPR2022-00234, challenging U.S. Pat. No. 9,124,982, 5 pages.

Petitioners' Updated Mandatory Notices; Exhibit-8, Filed on Jan. 20, 2022—Cited in IPR2022-00234, challenging U.S. Pat. No. 9,124,982, 5 pages.

(56)        References Cited

OTHER PUBLICATIONS

Plantronics Discovery 655, At least by 2006, CNET Article—Plantronics Discovery 655 Bluetooth Headset Review (SAM-TECH_00099287), 4 pages.

Plantronics Discovery 655, At least by 2006, Plantronics Discovery 655 Brochure (SAM-TECH_00099296), 2 pages.

Plantronics Discovery 655, At least by 2006, Plantronics Discovery 655 User Guide (SAM-TECH_00099344), 16 pages.

Plantronics Discovery 655, At least by 2006, Silicon Poip Culture Article—Plantronics Discovery 655 (SAM-TECH_00099387), 4 pages.

Plantronics MX200, At least by 2006, Plantronics MX200 Brochure (SAM-TECH_00099419), 2 pages.

Plantronics MX200, At least by 2006, Plantronics MX200 User Guide (SAM-TECH_00099435), 2 pages.

Plantronics MX200, At least by 2006, Plantronics MX250 User Guide (SAM-TECH_00099461), 2 pages.

PO's Opposition to Motion to File Supplemental Information, Exhibit-32, Filed on Apr. 17, 2023—Cited in IPR2022-00302, challenging U.S. Pat. No. 9,609,424, 6 pages.

PO's Updated Exhibit List, Exhibit-25, Filed on Mar. 14, 2023—Cited in IPR2022-00282, challenging U.S. Pat. No. 8,315,400, 4 pages.

PO's Updated Exhibit List, Exhibit-27, Filed on Oct. 11, 2023—Cited in IPR2022-01106, challenging U.S. Pat. No. 11,039,259, 4 pages.

PO's Updated Exhibit List, Exhibit-27, Filed on Apr. 11, 2023—Cited in IPR2022-00302, challenging U.S. Pat. No. 9,609,424, 4 pages.

PO's Updated Exhibit List, Exhibit-28, Filed on May 9, 2023—Cited in IPR2022-00388, challenging U.S. Pat. No. 10,966,015, 4 pages.

PO's Updated Exhibit List, Exhibit-29, Filed on Apr. 12, 2023—Cited in IPR2022-00253, challenging U.S. Pat. No. 9,491,542, 4 pages.

PO's Updated Exhibit List, Exhibit-29, Filed on Apr. 13, 2023—Cited in IPR2022-00281, challenging U.S. Pat. No. 9,270,244, 4 pages.

PO's Updated Exhibit List, Exhibit-29, Filed on Apr. 4, 2023—Cited in IPR2022-00324, challenging U.S. Pat. No. 8,254,591, 4 pages.

PO's Updated Exhibit List, Exhibit-29, Filed on May 9, 2023—Cited in IPR2022-00369, challenging U.S. Pat. No. 10,405,082, 4 pages.

PO's Updated Exhibit List, Exhibit-30, Filed on Oct. 19, 2023—Cited in IPR2022-01106, challenging U.S. Pat. No. 11,039,259, 4 pages.

PO's Updated Exhibit List, Exhibit-32, Filed on Mar. 16, 2023—Cited in IPR2022-00243, challenging U.S. Pat. No. 8,111,839, 4 pages.

PO's Updated Exhibit List, Exhibit-33, Filed on Mar. 16, 2023—Cited in IPR2022-00242, challenging U.S. Pat. No. 8,111,839, 5 pages.

PO's Updated Exhibit List; Exhibit-26, Filed on Mar. 14, 2023—Cited in IPR2022-00234, challenging U.S. Pat. No. 9,124,982, 4 pages.

PocketLint Article—Zen Gennum Bluetooth Headset (SAM-TECH_00098490), Feb. 3, 2005, 13 pages.

Power of Attorney for Samsung Electronics America, Inc, Exhibit-2, Filed on Dec. 30, 2021—Cited in IPR2022-00369, challenging U.S. Pat. No. 10,405,082, 4 pages.

Power of Attorney for Samsung Electronics America, Inc, Exhibit-2, Filed on Jun. 9, 2022—Cited in IPR2022-01078, challenging U.S. Pat. No. 11,057,701, 3 pages.

Power of Attorney for Samsung Electronics America, Inc, Exhibit-2, Filed on Jun. 9, 2022—Cited in IPR2022-01098, challenging U.S. Pat. No. 11,217,237, 3 pages.

Power of Attorney for Samsung Electronics America, Inc, Exhibit-2, Filed on Jun. 9, 2022—Cited in IPR2022-01099, challenging U.S. Pat. No. 11,244,666, 3 pages.

Power of Attorney for Samsung Electronics America, Inc, Exhibit-2, Filed on Jun. 9, 2022—Cited in IPR2022-01106, challenging U.S. Pat. No. 11,039,259, 3 pages.

Power of Attorney for Samsung Electronics Co, Ltd, Exhibit-1, Filed on Dec. 10, 2021—Cited in IPR2022-00282, challenging U.S. Pat. No. 8,315,400, 4 pages.

Power of Attorney for Samsung Electronics Co, Ltd, Exhibit-1, Filed on Dec. 30, 2021—Cited in IPR2022-00369, challenging U.S. Pat. No. 10,405,082, 4 pages.

Power of Attorney for Samsung Electronics Co, Ltd, Exhibit-1, Filed on Jun. 9, 2022—Cited in IPR2022-01098, challenging U.S. Pat. No. 11,217,237, 3 pages.

Power of Attorney for Samsung Electronics Co, Ltd, Exhibit-1, Filed on Jun. 9, 2022—Cited in IPR2022-01099, challenging U.S. Pat. No. 11,244,666, 3 pages.

Power of Attorney for Samsung Electronics Co, Ltd, Exhibit-1, Filed on Jun. 9, 2022—Cited in IPR2022-01106, challenging U.S. Pat. No. 11,039,259, 3 pages.

Power of Attorney for Samsung Electronics Co. Ltd, Exhibit-1, Filed on Jun. 9, 2022—Cited in IPR2022-01078, challenging U.S. Pat. No. 11,057,701, 3 pages.

Power of Attorney for Samsung Electronics, America, Inc, Exhibit-2, Filed on Dec. 10, 2021—Cited in IPR2022-00282, challenging U.S. Pat. No. 8,315,400, 4 pages.

Power of Attorney from Samsung Electronics America, Inc, Exhibit-2, Filed on Jan. 14, 2022—Cited in IPR2022-00410, challenging U.S. Pat. No. 10,979,836, 4 pages.

Power of Attorney from Samsung Electronics America, Inc, Exhibit-2, Filed on Jan. 4, 2022—Cited in IPR2022-00388, challenging U.S. Pat. No. 10,966,015, 4 pages.

Power of Attorney from Samsung Electronics America, Inc, Exhibit-2, Filed on Dec. 13, 2021—Cited in IPR2022-00242, challenging U.S. Pat. No. 8,111,839, 3 pages.

Power of Attorney from Samsung Electronics America, Inc, Exhibit-2, Filed on Dec. 13, 2021—Cited in IPR2022-00243, challenging U.S. Pat. No. 8,111,839, 3 pages.

Power of Attorney from Samsung Electronics America, Inc, Exhibit-2, Filed on Dec. 17, 2021—Cited in IPR2022-00253, challenging U.S. Pat. No. 9,491,542, 4 pages.

Power of Attorney from Samsung Electronics America, Inc, Exhibit-2, Filed on Dec. 20, 2021—Cited in IPR2022-00324, challenging U.S. Pat. No. 8,254,591, 4 pages.

Power of Attorney from Samsung Electronics America, Inc, Exhibit-2, Filed on Dec. 21, 2021—Cited in IPR2022-00281, challenging U.S. Pat. No. 9,270,244, 4 pages.

Power of Attorney from Samsung Electronics America, Inc, Exhibit-2, Filed on Dec. 13, 2021—Cited in IPR2022-00302, challenging U.S. Pat. No. 9,609,424, 3 pages.

Power of Attorney from Samsung Electronics Co, Ltd, Exhibit-1, Filed on Jan. 14, 2022—Cited in IPR2022-00410, challenging U.S. Pat. No. 10,979,836, 4 pages.

Power of Attorney from Samsung Electronics Co, Ltd, Exhibit-1, Filed on Jan. 4, 2022—Cited in IPR2022-00388, challenging U.S. Pat. No. 10,966,015, 4 pages.

Power of Attorney from Samsung Electronics Co, Ltd, Exhibit-1, Filed on Dec. 13, 2021—Cited in IPR2022-00242, challenging U.S. Pat. No. 8,111,839, 3 pages.

Power of Attorney from Samsung Electronics Co, Ltd, Exhibit-1, Filed on Dec. 13, 2021—Cited in IPR2022-00243, challenging U.S. Pat. No. 8,111,839, 3 pages.

Power of Attorney from Samsung Electronics Co, Ltd, Exhibit-1, Filed on Dec. 17, 2021—Cited in IPR2022-00253, challenging U.S. Pat. No. 9,491,542, 4 pages.

Power of Attorney from Samsung Electronics Co, Ltd, Exhibit-1, Filed on Dec. 20, 2021—Cited in IPR2022-00324, challenging U.S. Pat. No. 8,254,591, 4 pages.

Power of Attorney from Samsung Electronics Co, Ltd, Exhibit-1, Filed on Dec. 21, 2021—Cited in IPR2022-00281, challenging U.S. Pat. No. 9,270,244, 4 pages.

Power of Attorney from Samsung Electronics Co, Ltd, Exhibit-1, Filed on Dec. 21, 2021—Cited in IPR2022-00302, challenging U.S. Pat. No. 9,609,424, 3 pages.

(56) References Cited

OTHER PUBLICATIONS

PR 4-3 JCC Statement, Exhibit-2013, Filed on Jan. 12, 2023—Cited in IPR2022-00282, challenging U.S. Pat. No. 8,315,400, 6 pages.
PR 4-5(d) JCC Chart, Exhibit-2011, Filed on Jan. 12, 2023—Cited in IPR2022-00282, challenging U.S. Pat. No. 8,315,400, 17 pages.
Preferred methods for measuring hearing protector attenuation, Elliott Berger, International Congress on Noise Control Engineering 2005, INTERNOISE 2005, 10 pages.
Products of Interest, Project Muse, Computer Music Journal, vol. 30, No. 3, Fall 2006, 16 pages.
Reducing the Negative Effects of Ear-Canal Occlusion, Samuel S. Job, Department of Electrical and Computer Engineering Brigham Young University, 2002, 6 pages.
Research in Motion's BlackBerry 7520 ("BlackBerry"), At least by 2004, Blackberry 7520 Wireles Handheld Model No. RALIIIN, Version 4.1 User Guide, last modified Mar. 6, 2006 (SAM-TECH 00054461-SAM-TECH 00054618), 158 pages.
Research in Motion's BlackBerry 7520 ("BlackBerry"), At least by 2004, BlackBerry Wireless Handheld Getting Started Guide (SAM-TECH 00228841), 13 pages.
Research in Motion's BlackBerry 7520 ("BlackBerry"), Nextel Services Guide for the Blackberry is dated the year 2004; (SAM-TECH 00226708), 29 pages.
Research in Motion's BlackBerry 7520 ("BlackBerry"), Jun. 28, 2006 WayBack Machine capture of the BlackBerry lists it for sale and describes the Blackberry as a "strong addition to the product line-up." https://web.archive.org/web/20060628035351 /http://www.blackberry-7520.com (SAM-TECH_00054619; SAM-TECH_00054624; SAM-TECH_00054622), 3 pages.
Revised Scheduling Order, Exhibit-22, Filed on Jul. 12, 2023—Cited in IPR2022-01106, challenging U.S. Pat. No. 11,039,259, 14 pages.
Robert Oshana, DSP Software Development Techniques for Embedded and Real-Time Systems, Embedded Technology Series, Elsevier Inc, 2006, ISBN-10: 0-7506-7759-7, 601 pages.
Ronald M. Aarts, Roy Irwan, and Augustus J. E.. Janssen, Efficient Tracking of the Cross-Correlation Coefficient, IEEE Transactions on Speech and Audio Processing, vol. 10, No. 6, Sep. 2002, 12 pages.
Roy Falik, Exhibit-7, Filed on Jul. 18, 2024—Cited in IPR2024-01031, challenging U.S. Pat. No. 7,049,850, 8 pages.
Roy Falik, Exhibit-8, Filed on Jul. 18, 2024—Cited in IPR2024-01034, challenging U.S. Pat. No. 9,279,263, 8 pages.
Sage Journal, The Future of Hearing Aid Technology, Exhibit-2008, Filed on Oct. 17, 2022—Cited in IPR2022-00324, challenging U.S. Pat. No. 8,254,591, 15 pages.
*Samsung Elecs. Co, Ltd, et al. v. Staton Techiya, LLC*, IPR2022-00302, Paper 11, Exhibit-2006, Filed on Oct. 11, 2022—Cited in IPR2022-01106, challenging U.S. Pat. No. 11,039,259, 8 pages.
*Samsung Elecs. Co, Ltd, et al. v. Staton Techiya, LLC*, IPR2022-00302, Paper 11, Exhibit-2006, Filed on Oct. 7, 2022—Cited in IPR2022-01078, challenging U.S. Pat. No. 11,057,701, 8 pages.
*Samsung Elecs. Co, Ltd, et al. v. Staton Techiya, LLC*, IPR2022-00302, Paper 11, Exhibit-2006, Filed on Oct. 7, 2022—Cited in IPR2022-01098, challenging U.S. Pat. No. 11,217,237, 8 pages.
*Samsung Elecs. Co, Ltd, et al. v. Staton Techiya, LLC*, IPR2022-00302, Paper 11, Exhibit-2006, Filed on Oct. 7, 2022—Cited in IPR2022-01099, challenging U.S. Pat. No. 11,244,666, 8 pages.
*Samsung Electronics Co, Ltd, And Samsung Electronics, America, Inc*, v. *Staton Techi a, LLC*, IPR2022-00234, Dec. 21, 2021, 5 pages.
*Samsung Electronics Co, Ltd, And Samsung Electronics, America, Inc*, v. *Staton Techi a, LLC*, IPR2022-00242, Dec. 23, 2021, 5 pages.
*Samsung Electronics Co, Ltd, And Samsung Electronics, America, Inc*, v. *Staton Techi a, LLC*, IPR2022-00243, Dec. 23, 2021, 5 pages.
*Samsung Electronics Co, Ltd, And Samsung Electronics, America, Inc*, v. *Staton Techi a, LLC*, IPR2022-00253, Jan. 18, 2022, 5 pages.
*Samsung Electronics Co, Ltd, And Samsung Electronics, America, Inc*, v. *Staton Techi a, LLC*, IPR2022-00281, Jan. 18, 2022, 5 pages.
*Samsung Electronics Co, Ltd, And Samsung Electronics, America, Inc*, v. *Staton Techi a, LLC*, IPR2022-00282, Dec. 21, 2021, 5 pages.

*Samsung Electronics Co, Ltd, And Samsung Electronics, America, Inc*, v. *Staton Techi a, LLC*, IPR2022-00302, Jan. 13, 2022, 6 pages.
*Samsung Electronics Co, Ltd, And Samsung Electronics, America, Inc*, v. *Staton Techi a, LLC*, IPR2022-00324, Jan. 13, 2022, 6 pages.
*Samsung Electronics Co, Ltd, And Samsung Electronics, America, Inc*, v. *Staton Techiya, LLC*, IPR2022-00369, Feb. 18, 2022, 5 pages.
*Samsung Electronics Co, Ltd, And Samsung Electronics, America, Inc*, v. *Staton Techiya, LLC*, IPR2022-00388, Feb. 18, 2022, 5 pages.
*Samsung Electronics Co, Ltd, And Samsung Electronics, America, Inc*, v. *Staton Techiya, LLC*, IPR2022-00410, Feb. 18, 2022, 5 pages.
*Samsung Electronics Co, Ltd, And Samsung Electronics, America, Inc*, v. *Staton Techiya, LLC*, IPR2022-00559, Feb. 9, 2024, 88 pages.
*Samsung Electronics Co, Ltd, And Samsung Electronics, America, Inc*, v. *Staton Techiya, LLC*, IPR2022-01078, Jun. 9, 2022, 95 pages.
*Samsung Electronics Co, Ltd, And Samsung Electronics, America, Inc*, v. *Staton Techiya, LLC*, IPR2022-01098, Jun. 9, 2022, 84 pages.
*Samsung Electronics Co, Ltd, And Samsung Electronics, America, Inc*, v. *Staton Techiya, LLC*, IPR2022-01099, Jun. 9, 2022, 83 pages.
*Samsung Electronics Co, Ltd, And Samsung Electronics, America, Inc*, v. *Staton Techiya, LLC*, IPR2022-01106, Jun. 9, 2022, 90 pages.
Samsung's Claim Construction Brief, Exhibit-2012, Filed on Jan. 12, 2023—Cited in IPR2022-00282, challenging U.S. Pat. No. 8,315,400, 42 pages.
Samsung's Responsive Claim Construction Brief, Exhibit-2012, Filed on Apr. 10, 2023—Cited in IPR2022-01106, challenging U.S. Pat. No. 11,039,259, 42 pages.
Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 1009 pages.
Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 1307 pages.
Samsung's Motion for Summary Judgment of Invalidity under 35 U.S.C. §112 of the '666 Patent (Redacted), Jun. 26, 2023, 78 pages.
Samsung's Reply in Support of Its Motion for Summary Judgment of Invalidity under 35 U.S.C. § 112 of the '666 Patent (Redacted), Aug. 7, 2023, 22 pages.
Scheduling Order, Exhibit-11, Filed on Jan. 9, 2023—Cited in IPR2022-01106, challenging U.S. Pat. No. 11,039,259, 13 pages.
Scheduling Order, Exhibit-11, Filed on Dec. 30, 2022—Cited in IPR2022-01078, challenging U.S. Pat. No. 11,057,701, 12 pages.
Scheduling Order, Exhibit-14, Filed on Jul. 12, 2022—Cited in IPR2022-00302, challenging U.S. Pat. No. 9,609,424, 12 pages.
Scheduling Order, Exhibit-14, Filed on Jul. 12, 2022—Cited in IPR2022-00324, challenging U.S. Pat. No. 8,254,591, 12 pages.
Scheduling Order, Exhibit-14, Filed on Jul. 15, 2022—Cited in IPR2022-00253, challenging U.S. Pat. No. 9,491,542, 12 pages.
Scheduling Order, Exhibit-14, Filed on Jul. 15, 2022—Cited in IPR2022-00281, challenging U.S. Pat. No. 9,270,244, 12 pages.
Scheduling Order, Exhibit-14, Filed on Aug. 16, 2022—Cited in IPR2022-00388, challenging U.S. Pat. No. 10,966,015, 12 pages.
Scheduling Order, Exhibit-15, Filed on Aug. 16, 2022—Cited in IPR2022-00369, challenging U.S. Pat. No. 10,405,082, 12 pages.
Scheduling Order, Exhibit-16, Filed on Jun. 21, 2022—Cited in IPR2022-00243, challenging U.S. Pat. No. 8,111,839, 12 pages.
Scheduling Order, Exhibit-17, Filed on Jun. 21, 2022—Cited in IPR2022-00242, challenging U.S. Pat. No. 8,111,839, 12 pages.
Scheduling Order, Exhibit-9, Filed on Aug. 22, 2024—Cited in IPR2024-00559, challenging U.S. Pat. No. 11,610,587, 13 pages.
SeboTek Hearing Systems' PAC (Post Auricular Canal) Instrument ("Sebotek"), Mar. 19, 2003 WayBack Machine capture of SeboTek's website contains a description of the PAC, which notes that "[t]he PAC is an exciting new hearing system by SeboTek that is significantly different from traditional hearing aids. If offers deep canal fitting, superior acoustics, incredible discreetness, and unmatched comfort." https://web.archive.org/web/20030319140205/ http://www.sebotek.com:80/ (SAM-TECH_00052377), 1 pages.

(56) References Cited

OTHER PUBLICATIONS

SeboTek Hearing Systems' PAC (Post Auricular Canal) Instrument ("Sebotek"), May 26, 2007 WayBack Machine capture of SeboTek's website contains a description of the PAC, and notes that "Prior to 2003, depending on the level of hearing loss, consumers could choose between four primary styles, none of which offered superior sound quality, comfort or cosmetic appeal. All that changed in 2003, when SeboTek introduced the . . . " https://web.archive.org/ web/ 20070526135524 /http://www.sebotek.com:80/OurProducts/our Products.html (SAM-TECH 00052392), 1 pg.
SeboTek Hearing Systems' PAC (Post Auricular Canal) Instrument ("Sebotek"), Oct. 6, 2003 post by Bruce Gefvert, Director of Sales and Marketing at SeboTek Hearing Systems, on audiologyonline. com discusses the PAC, and states "PAC refers to Post Auricular Canal, an entirely new style of hearing aid that is intended to provide hearing professionals with one more option for treating hearing loss in the mild to severe ranges." https://www.audiologyonline. com/ask-th ·· experts/sebotek-pac-post-auricular-canal-601 (SAM_ 00052353-SAM-TECH 00052356), 4 pages.
SeboTek Hearing Systems' PAC (Post Auricular Canal) Instrument ("Sebotek"), Publication by King Chung in 2004 mentions that "SeboTek VoiceQ and Vivatone have recently launched newly designed behind-the- ear or postauricular canal (PAC, as SeboTek preferred) hearing aids that have . . . " See King Chung, Challenges and recent developments in hearing aids. Part II . . . , 8 Trends Amplif. 125, 150(2004), avail. at https://www.ncbi.nlm.nih.gov/ pmc/articles/PMC4111464/pdf/10.1177_108471380400800 402. pdf (SAM-TECH_00062067-SAM-TECH_00062106), 40 pgs.
Sensaphonics 3D Active Ambient In-Ear Monitor System, At least by 2006, Products of Interest Article (SAM-TECH 00096723), 16 pages.
Sensaphonics 3D Active Ambient In-Ear Monitor System, At least by 2006, Sensaphonics 3D Active Ambient IEM System Article (SAM-TECH 00100065), 1 pages.
Sensaphonics 3D Active Ambient In-Ear Monitor System, At least by 2006, Sensaphonics 3D Active Ambient In-Ear Monitor System User Guide (SA ·· TECH 00100046), 16 pages.
Silynx QuietOps, Oct. 4, 2007 Applicant's Answer to Opposer's Notice of Opposition (SAM-TECH 00052371), 6 pages.
Silynx QuietOps, https://defense-update.com/20080513_c4ops. html (SAM-TECH 00057150), 2 pages.
Silynx QuietOps, QuietOps Pocket Guide (Rev. 2.00) (Silynx QuietOps), Jul. 2007, 34 pages.
Small-footprint keyword spotting using deep neural networks, G. Chen, C. Parada and G. Heigold, 2014 IEEE International Conference on Acoustics, Speech and Signal Processing (ICASSP), Florence, Italy, 2014, pp. 4087-4091, 5 p. .
Sonar-operator active noise reduction insert-earphone: Prototype preliminary test and evaluation, Josephs. Russotti, Naval Submarine Medical Research Laboratory, Report No. 1225, Feb. 18, 2003, 22 pages.
Sonomax's Sonomax: SonoCustom and SonoPass ("Sonomax"), Apr. 8, 2006 WayBack Machine capture of Sonomax's website contains an image of the SonoCustom and describes it as a "cost effective, comfortable and resusable earpiece." https://web.archive. org/web/20060408165744 /http://sonomax.com.au:80/index.cfm/ fittingprocess/ (SAM-TECH 00052436), 1 pages.
Sonomax's Sonomax: SonoCustom and SonoPass ("Sonomax"), Apr. 8, 2006 WayBack Machine capture of Sonomax's website contains an image of the Sonomax and states that "[t]ens of Thousands of people around the world give the SonoCustom a big thumbs up for comfort." https://web.archive.org/web/20060408170243 /http://sonomax.com.au/index.cfm/aboutus/so nomax_solution/ (SAM-TECH 00052472; SAM-TECH 00052998), 3 pages.
Sonomax's Sonomax: SonoCustom and SonoPass ("Sonomax"), Apr. 8, 2006 WayBack Machine capture of Sonomax's website contains an image of the Sonomax and states that "[t]he Sonomax is a hearing protection system that combines a uniquely designed earpiece, the SonoCustom, with an optimised hardware and software application, called SonoPass." https://web.archive.org/web/

20060408170221 /http://sonomax.com.au:80/index.cfm/testingo rocess/ (SAM-TECH 00052425), 1 pages.
Sonomax's Sonomax: SonoCustom and SonoPass ("Sonomax"), Jun. 15, 2006 WayBack Machine capture of Sonomax's website contains an image of the Sonomax and states that "application provides employers the unique ability to quantify and track hearing protection performance and produce detailed reports." https://web. archive.org/web/20060615054658 /http://www.sonomax.com.au/ index.cfm/testi ngprocess/ (SAM-TECH 00052589), 1 pages.
Sonomax's Sonomax: SonoCustom and SonoPass ("Sonomax"), Jun. 15, 2006 WayBack Machine capture of Sonomax's website contains frequently asked questions about the Sonomax and states that SonoPass, our proprietary Windows-based software, drives the fitting process and provides immediate proof of functionality. https:// web.archive.org/web/20060615054356 /http://www.sonomax.com. au:80/index.cfm/fa q/ (SAM-TECH 00052643), 1 pages.
Sony S700 Walkman, At least by Oct. 13, 2006, EAFIT Article— The Sony Walkman (SAM-TECH 00099514), 9 pages.
Sony S700 Walkman, At least by Oct. 13, 2006, IDG Article— Sony's New Walkman Players Pack Noise Canceling (SAM-TECH 00099533), 3 pages.
Sony S700 Walkman, At least by Oct. 13, 2006, Sony Walkman User Manual (SAM-TECH_00099557), 22 pages.
Sony S700 Walkman, At least by Oct. 13, 2006, Stuff Article—Sony NW-S700 Review (SAM-TECH_00099579), 8 pages.
Sound Source Localization and Separation, Biniyam Tesfaye Taddese, Mathematics, Statistics, and Computer Science Honors Projects (2006), 53 pages.
Speaker Turn Segmentation Based on Between-Channel Differences, Daniel P.W. Ellis & Jerry C. Liu, LabROSA, Dept. of Electrical Engineering, Columbia University, 2004, 6 pages.
Spectral analysis of speech by linear prediction, J. Makhoul, IEEE Transactions on Audio and Electroacoustics, vol. 21, No. 3, pp. 140-148, Jun. 1973, 9 pages.
Speech Input Hardware Investigation for Future Dismounted Soldier Computer Systems, Jeffrey C. Bos & David W. Tack, DRDC Toronto CR 2005-064, May 1, 2005, 26 pages.
Speech Modeling with Magnitude-Normalized Complex Spectra and Its Application to Multisensory Speech Enhancement, A. Subramanya, Z. Zhang, Z. Liu and A. Acero, 2006 IEEE International Conference on Multimedia and Expo, Toronto, ON, Canada, 2006, pp. 1157-1160, 4 pages.
Speech Recognition in Severely Disturbed Environments Combining Ear-Mic and Active Noise Control, N. Westerlund, M. Dahl, I. Claesson, Published 2002, Engineering, Computer Science, 7 pages.
St Casestech, LLC Power of Attorney filed by *Harman International Industries, Inc.* v. *St Casestech, LLC*, for U.S. Pat. No. 11,589,329 Under Case No. IPR2024-01300, Dated Sep. 20, 2024, 4 pages.
St Casestech, LLC Power of Attorney filed by *Harman International Industries, Inc.* v. *St Casestech, LLC*, for U.S. Pat. No. 8,805,692 Under Case No. IPR2024-01301, Dated Sep. 20, 2024, 4 pages.
St Casestech, LLC'S Mandatory Notices Pursuant to 37 C.F.R. § 42.8(b) filed by *Harman International Industries, Inc.* v. *St Casestech, LLC*, for U.S. Pat. No. 11,589,329 Under Case No. IPR2024-01300, Dated Sep. 20, 2024, 8 pages.
St Casestech, LLC'S Mandatory Notices Pursuant to 37 C.F.R. § 42.8(b) filed by *Harman International Industries, Inc.* v. *St Casestech, LLC*, for U.S. Pat. No. 8,805,692 Under Case No. IPR2024-01301, Dated Sep. 20, 2024, 8 pages.
*Staton Techiya* v *Samsung*—Docket Control Order, Exhibit-2003, Filed on Apr. 18, 2022—Cited in IPR2022-00253, challenging U.S. Pat. No. 9,491,542, 7 pages.
*Staton Techiya* v *Samsung*—Docket Control Order, Exhibit-2003, Filed on Apr. 18, 2022—Cited in IPR2022-00281, challenging U.S. Pat. No. 9,270,244, 7 pages.
*Staton Techiya* v *Samsung*, Docket Control Order, Exhibit-2003, Filed on Mar. 21, 2022—Cited in IPR2022-00282, challenging U.S. Pat. No. 8,315,400, 6 pages.
*Staton Techiya* v *Samsung*, Docket Control Order, Exhibit-2003, Filed on Apr. 13, 2022—Cited in IPR2022-00302, challenging U.S. Pat. No. 9,609,424, 7 pages.

(56) References Cited

OTHER PUBLICATIONS

*Staton Techiya* v *Samsung*, Docket Control Order, Exhibit-2003, Filed on Apr. 13, 2022—Cited in IPR2022-00324, challenging U.S. Pat. No. 8,254,591, 7 pages.

*Staton Techiya* v *Samsung*, Claim Construction Order, Exhibit-2012, Filed on Mar. 23, 2023—Cited in IPR2022-01078, challenging U.S. Pat. No. 11,057,701, 51 pages.

*Staton Techiya* v *Samsung*, Docket Control Order, Exhibit-2003, Filed on Mar. 23, 2022—Cited in IPR2022-00242, challenging U.S. Pat. No. 8,111,839, 6 pages.

*Staton Techiya* v *Samsung*, Docket Control Order, Exhibit-2003, Filed on Mar. 23, 2022—Cited in IPR2022-00243, challenging U.S. Pat. No. 8,111,839, 6 pages.

*Staton Techiya* v *Samsung*, Docket Control Order, Exhibit-2003, Filed on May 18, 2022—Cited in IPR2022-00369, challenging U.S. Pat. No. 10,405,082, 7 pages.

*Staton Techiya* v *Samsung*, Docket Control Order, Exhibit-2003, Filed on May 18, 2022—Cited in IPR2022-00388, challenging U.S. Pat. No. 10,966,015, 7 pages.

*Staton Techiya* v *Samsung*, Docket Control Order, Exhibit-2003, Filed on May 18, 2022—Cited in IPR2022-00410, challenging U.S. Pat. No. 10,979,836, 7 pages.

*Staton Techiya* v *Samsung*, Docket Control Order; Exhibit-2003, Filed on Mar. 21, 2022—Cited in IPR2022-00234, challenging U.S. Pat. No. 9124982, 6 pages.

*Staton Techiya* v. *Samsung*, Joint Motion to Consolidate, Exhibit-2005, Filed on Apr. 29, 2022—Cited in IPR2022-00242, challenging U.S. Pat. No. 8,111,839, 7 pages.

*Staton Techiya* v. *Samsung*, Joint Mtn to Consolidate, Exhibit-2005, Filed on Apr. 29, 2022—Cited in IPR2022-00243, challenging U.S. Pat. No. 8,111,839, 7 pages.

*Staton Techiya* v. *Samsung*, Joint Mtn to Consolidate, Exhibit-2008, Filed on Apr. 29, 2022—Cited in IPR2022-00282, challenging U.S. Pat. No. 8,315,400, 7 pages.

*Staton Techiya* v. *Samsung*, P.R. 4-5(d) Joint Claim Construction Chart, Exhibit-2011, Filed on Mar. 23, 2023—Cited in IPR2022-01078, challenging U.S. Pat. No. 11,057,701, 6 pages.

*Staton Techiya, LLC* v. *Samsung Elecs. Co, Ltd*, Appendix B to P.R. 4-3 Statement, Exhibit-2011, Filed on Nov. 18, 2022—Cited in IPR2022-01106, challenging U.S. Pat. No. 11,039,259, 26 pages.

*Staton Techiya, LLC* v. *Samsung Elecs. Co, Ltd*, Appendix B to P.R. 4-3 Statement, Exhibit-2007, Filed on Nov. 8, 2022—Cited in IPR2022-00369, challenging U.S. Pat. No. 10,405,082, 26 pages.

*Staton Techiya, LLC* v. *Samsung Elecs. Co, Ltd*, Appendix B to P.R. 4-3 Statement, Exhibit-2009, Filed on Nov. 18, 2022—Cited in IPR2022-01078, challenging U.S. Pat. No. 11,057,701, 26 pages.

*Staton Techiya, LLC* v. *Samsung Elecs. Co, Ltd*, Appendix B to P.R. 4-3 Statement, Exhibit-2010, Filed on Nov. 8, 2022—Cited in IPR2022-00388, challenging U.S. Pat. No. 10,966,015, 26 pages.

*Staton Techiya, LLC, et al.* v. *Samsung Elecs. Co, Ltd, et al.*, Defendants' P.R. 4-2 Disclosures, Exhibit-2004, Filed on Oct. 11, 2022—Cited in IPR2022-01106, challenging U.S. Pat. No. 11,039,259, 25 pages.

*Staton Techiya, LLC, et al.* v. *Samsung Elecs. Co, Ltd, et al.*, Defendants' P.R. 4-2 Disclosures, Exhibit-2004, Filed on Oct. 7, 2022—Cited in IPR2022-01078, challenging U.S. Pat. No. 11,057,701, 25 pages.

*Staton Techiya, LLC, et al.* v. *Samsung Elecs. Co, Ltd, et al.*, Defendants' P.R. 4-2 Disclosures, Exhibit-2004, Filed on Oct. 7, 2022—Cited in IPR2022-01098, challenging U.S. Pat. No. 11,217,237, 25 pages.

*Staton Techiya, LLC, et al.* v. *Samsung Elecs. Co, Ltd, et al.*, Defendants' P.R. 4-2 Disclosures, Exhibit-2004, Filed on Oct. 7, 2022—Cited in IPR2022-01099, challenging U.S. Pat. No. 11,244,666, 25 pages.

*Staton Techiya, LLC, et al.* v. *Samsung Elecs. Co, Ltd, et al.*, Docket Control Order, Exhibit-2005, Filed on Oct. 7, 2022—Cited in IPR2022-01078, challenging U.S. Pat. No. 11,057,701, 7 pages.

*Staton Techiya, LLC, et al.* v. *Samsung Elecs. Co, Ltd, et al.*, Docket Control Order, Exhibit-2005, Filed on Oct. 7, 2022—Cited in IPR2022-01098, challenging U.S. Pat. No. 11,217,237, 7 pages.

*Staton Techiya, LLC, et al.* v. *Samsung Elecs. Co, Ltd, et al.*, Docket Control Order, Exhibit-2005, Filed on Oct. 7, 2022—Cited in IPR2022-01099, challenging U.S. Pat. No. 11,244,666, 7 pages.

*Staton Techiya, LLC, et al.* v. *Samsung Elecs. Co, Ltd, et al.*, Docket Control Order, Exhibit-2005, Filed on Oct. 11, 2022—Cited in IPR2022-01106, challenging U.S. Pat. No. 11,039,259, 7 pages.

*Staton Techiya, LLC, et al.* v. *Samsung Elecs. Co, Ltd, et al.*, Joint Motion to Consolidate, Exhibit-2007, Filed on Oct. 7, 2022—Cited in IPR2022-01078, challenging U.S. Pat. No. 11,057,701, 7 pages.

*Staton Techiya, LLC, et al.* v. *Samsung Elecs. Co, Ltd, et al.*, Joint Motion to Consolidate, Exhibit-2007, Filed on Oct. 7, 2022—Cited in IPR2022-01098, challenging U.S. Pat. No. 11,217,237, 7 pages.

*Staton Techiya, LLC, et al.* v. *Samsung Elecs. Co, Ltd, et al.*, Joint Motion to Consolidate, Exhibit-2007, Filed on Oct. 7, 2022—Cited in IPR2022-01099, challenging U.S. Pat. No. 11,244,666, 7 pages.

*Staton Techiya, LLC, et al.* v. *Samsung Elecs. Co, Ltd, et al.*, Joint Motion to Consolidate, Exhibit-2007, Filed on Oct. 11, 2022—Cited in IPR2022-01106, challenging U.S. Pat. No. 11,039,259, 7 pages.

*Staton Techiya, LLC, et al.* v. *Samsung Elecs. Co, Ltd, et al.*, Plaintiff's Infringement Contentions, dated Apr. 6, 2022, Exhibit-2008, Filed on Oct. 7, 2022—Cited in IPR2022-01078, challenging U.S. Pat. No. 11,057,701, 7 pages.

*Staton Techiya, LLC, et al.* v. *Samsung Elecs. Co, Ltd, et al.*, Plaintiff's P.R. 4-2 Disclosures, Exhibit-2003, Filed on Oct. 7, 2022—Cited in IPR2022-01099, challenging U.S. Pat. No. 11,244,666, 12 pages.

*Staton Techiya, LLC, et al.* v. *Samsung Elecs. Co, Ltd, et al.*, Plaintiffs' Infringement Contentions dated Apr. 6, 2022, Exhibit-2008, Filed on Oct. 11, 2022—Cited in IPR2022-01106, challenging U.S. Pat. No. 11,039,259, 7 pages.

*Staton Techiya, LLC, et al.* v. *Samsung Elecs. Co, Ltd, et al.*, Plaintiffs' Infringement Contentions, dated Apr. 6, 2022, Exhibit-2008, Filed on Oct. 7, 2022—Cited in IPR2022-01098, challenging U.S. Pat. No. 11,217,237, 7 pages.

*Staton Techiya, LLC, et al.* v. *Samsung Elecs. Co, Ltd, et al.*, Plaintiffs' Infringement Contentions, dated Apr. 6, 2022, Exhibit-2008, Filed on Oct. 7, 2022—Cited in IPR2022-01099, challenging U.S. Pat. No. 11,244,666, 7 pages.

*Staton Techiya, LLC, et al.* v. *Samsung Elecs. Co, Ltd, et al.*, Plaintiffs' P.R. 4-2 Disclosures, Exhibit-2003, Filed on Oct. 11, 2022—Cited in IPR2022-01106, challenging U.S. Pat. No. 11,039,259, 12 pages.

*Staton Techiya, LLC, et al.* v. *Samsung Elecs. Co, Ltd, et al.*, Plaintiffs' P.R. 4-2 Disclosures, Exhibit-2003, Filed on Oct. 7, 2022—Cited in IPR2022-01078, challenging U.S. Pat. No. 11,057,701, 12 pages.

*Staton Techiya, LLC, et al.* v. *Samsung Elecs. Co, Ltd, et al.*, Plaintiffs' P.R. 4-2 Disclosures, Exhibit-2003, Filed on Oct. 7, 2022—Cited in IPR2022-01098, challenging U.S. Pat. No. 11,217,237, 12 pages.

Stipulation Letter dated Apr. 20, 2022, Exhibit-1031, Filed on May 11, 2022—Cited in IPR2022-00324, challenging U.S. Pat. No. 8,254,591, 8 pages.

Stipulation Letter from D. Rokach to J. Snodgrass, Exhibit-1025, Filed on Nov. 10, 2022—Cited in IPR2022-01099, challenging U.S. Pat. No. 11,244,666, 2 pages.

Stipulation Letter from D. Rokach to J. Snodgrass, Exhibit-1027, Filed on Nov. 10, 2022—Cited in IPR2022-01078, challenging U.S. Pat. No. 11,057,701, 2 pages.

Stipulation Letter from D. Rokach to J. Snodgrass, Exhibit-1030, Filed on Nov. 15, 2022—Cited in IPR2022-01098, challenging U.S. Pat. No. 11,217,237, 2 pages.

Stipulation Letter from D. Rokach to J. Snodgrass, Exhibit-1033, Filed on Nov. 10, 2022—Cited in IPR2022-01106, challenging U.S. Pat. No. 11,039,259, 2 pages.

Stipulation Letter, Exhibit-1015, Filed on Apr. 20, 2022—Cited in IPR2022-00282, challenging U.S. Pat. No. 8,315,400, 8 pages.

Stipulation Letter, Exhibit-1019, Filed on Jun. 14, 2022—Cited in IPR2022-00369, challenging U.S. Pat. No. 10,405,082, 8 pages.

(56) References Cited

OTHER PUBLICATIONS

Stipulation Letter, Exhibit-1019, Filed on Jun. 14, 2022—Cited in IPR2022-00388, challenging U.S. Pat. No. 10,966,015, 8 pages.
Stipulation Letter, Exhibit-1020, Filed on Jun 14. 2022—Cited in IPR2022-00410, challenging U.S. Pat. No. 10,979,836, 8 pages.
Stipulation Letter, Exhibit-1023, Filed on May 10, 2022—Cited in IPR2022-00302, challenging U.S. Pat. No. 9,609,424, 8 pages.
Stipulation Letter, Exhibit-1044, Filed on Apr. 20, 2022—Cited in IPR2022-00242, challenging U.S. Pat. No. 8,111,839, 8 pages.
Stipulation Letter, Exhibit-1044, Filed on Apr. 20, 2022—Cited in IPR2022-00243, challenging U.S. Pat. No. 8,111,839, 8 pages.
Stipulation Letter; Exhibit-1034, Filed on Apr. 20, 2022—Cited in IPR2022-00234, challenging U.S. Pat. No. 9,124,982, 8 pages.
Strand, et al. On the Feasibility of ASR in Extreme Noise Using the Parat Earplug Communication Terminal, IEEE, 2003, pp. 315-320.
Summary of all applications in the '082 patent family, Exhibit-1018, Filed on Dec. 30, 2021—Cited in IPR2022-00369, challenging U.S. Pat. No. 10,405,082, 1 pages.
Summary of all applications in the '836 patent's family, Exhibit-1019, Filed on Jan. 14, 2022—Cited in IPR2022-00410, challenging U.S. Pat. No. 10,979,836, 1 pages.
Summary of Application in '839 Patent Priority Chain, Exhibit-1041, Filed on Dec. 13, 2021—Cited in IPR2022-00243, challenging U.S. Pat. No. 8,111,839, 1 pages.
Summary of applications in '015 patent family, Exhibit-1018, Filed on Jan. 4, 2022—Cited in IPR2022-00388, challenging U.S. Pat. No. 10,966,015, 1 pages.
Summary of applications in '591 priority chain, Exhibit-1030, Filed on Dec. 20, 2021—Cited in IPR2022-00324, challenging U.S. Pat. No. 8,254,591, 1 pages.
Summary of Applications in '839 Priority Chain, Exhibit-1041, Filed on Dec. 13, 2021—Cited in IPR2022-00242, challenging U.S. Pat. No. 8,111,839, 1 pages.
Summary of Applications in '982 Priority Chain; Exhibit-1032, Filed on Dec. 13, 2021—Cited in IPR2022-00234, challenging U.S. Pat. No. 9,124,982, 1 pages.
Survey of the Speech Recognition Techniques for Mobile Devices, Dmitry Zaykovskiy, Department of Information Technology, SPECOM'2006, St. Petersburg, Jun. 2006, 6 pages.
Techiya's Opposition to Samsung's Motion for Summary Judgment of Invalidity under 35 U.S.C. § 112 of the '666 Patent (Redacted), Jul. 24, 2023, 30 pages.
Techiya's Sur-Reply to Samsung's Motion for Summary Judgment of Invalidity under 35 U.S.C. § 112 of the '666 Patent, Aug. 21, 2023, 5 pages.
Techniques and applications for wearable augmented reality audio, Härmä, Aki & Turku, Julia & Tikander, Miikka & Karjalainen, M & Lokki, Tapio & Nironen, H & Vesa, Sampo (2003), 20 pages.
Techopedia, Faceplate, Exhibit-2011, Filed on Sep. 13, 2022—Cited in IPR2022-00242, challenging U.S. Pat. No. 8,111,839, 2 pages.
Techopedia, Faceplate; Exhibit-2010, Filed on Sep. 9, 2022—Cited in IPR2022-00234, challenging U.S. Pat. No. 9,124,982, 2 pages.
Termination Decision: Post-DI Settlement, Exhibit-20, Filed on Dec. 12, 2024—Cited in IPR2024-00559, challenging U.S. Pat. No. 11,610,587, 5 pages.
Termination Decision: Pre-DI settlement, Exhibit-16, Filed on Dec. 12, 2024—Cited in IPR2024-01003, challenging U.S. Pat. No. 9,191,083, 5 pages.
Termination Decision: Pre-DI settlement, Exhibit-16, Filed on Dec. 12, 2024—Cited in IPR2024-01004, challenging U.S. Pat. No. 9,614,943, 5 pages.
Termination Decision: Pre-DI settlement, Exhibit-16, Filed on Dec. 12, 2024—Cited in IPR2024-01031, challenging U.S. Pat. No. 7,049,850, 5 pages.
Termination Decision: Pre-DI settlement, Exhibit-17, Filed on Dec. 12, 2024—Cited in IPR2024-01034, challenging U.S. Pat. No. 9,279,263, 5 pages.
Termination Decision: Pre-DI settlementPaper15,Dec. 12, 2024—Cited in IPR2024-01033, challenging U.S. Pat. No. 8,434,966, 5 pages.
The Effect of Hearing Aid Microphone Location on the Intelligibility of Hearing Aid—Transduced Speech, John Robert Franks, Dec. 1975, 208 pages.
Transcript of Deposition of Chris Kyriakakis, Ph.D. taken Oct. 7, 2022, Exhibit—2007, Filed on Oct. 17, 2022—Cited in IPR2022-00302, challenging U.S. Pat. No. 9,609,424, 121 pages.
Transcript of Deposition of Christopher Struck, Exhibit-1028, Filed on Jun. 15, 2023—Cited in IPR2022-01078, challenging U.S. Pat. No. 11,057,701, 177 pages.
Transcript of Deposition of Dr. Les Atlas, Exhibit-2007, Filed on Oct. 17, 2022—Cited in IPR2022-00324, challenging U.S. Pat. No. 8,254,591, 88 pages.
Transcript of Deposition of Dr. Les Atlas; Exhibit-2007, Filed on Sep. 9, 2022—Cited in IPR2022-00234, challenging U.S. Pat. No. 9,124,982, 207 pages.
Transcript of Deposition of Les Atlas, Ph.D, Aug. 18, 2022, Exhibit-2007, Filed on Sep. 13, 2022—Cited in IPR2022-00242, challenging U.S. Pat. No. 8,111,839, 207 pages.
Transcript of Deposition of Les Atlas, Ph.D, Aug. 18, 2022, Exhibit-2007, Filed on Sep. 13, 2022—Cited in IPR2022-00243, challenging U.S. Pat. No. 8,111,839, 207 pages.
Transcript of Deposition of Les Atlas, Ph.D, Exhibit-2016, Filed on Apr. 10, 2023—Cited in IPR2022-01106, challenging U.S. Pat. No. 11,039,259, 105 pages.
Transcript of Deposition of Nathaniel Polish, Ph.D, taken Sep. 29, 2022, Exhibit-2007, Filed on Oct. 19, 2022—Cited in IPR2022-00253, challenging U.S. Pat. No. 9,491,542, 154 pages.
Transcript of Deposition of Nathaniel Polish, Ph.D, taken Sep. 29, 2022, Exhibit-2007, Filed on Oct. 19, 2022—Cited in IPR2022-00281, challenging U.S. Pat. No. 9,270,244, 154 pages.
Transcript of Deposition of Richard M. Stern, Exhibit-2010, Filed on Mar. 23, 2023—Cited in IPR2022-01078, challenging U.S. Pat. No. 11,057,701, 102 pages.
Transcript of Deposition of Richard M. Stern, Ph. D, taken Oct. 27, 2022, Exhibit-2009, Filed on Nov. 8, 2022—Cited in IPR2022-00369, challenging U.S. Pat. No. 10,405,082, 208 pages.
Transcript of Deposition of Richard M. Stern, Ph. D, taken Oct. 27, 2022, Exhibit-2009, Filed on Nov. 8, 2022—Cited in IPR2022-00388, challenging U.S. Pat. No. 10,966,015, 208 pages.
Transcript of Deposition of Richard Stern, Ph.D, Exhibit-2010, Filed on Sep. 9, 2022—Cited in IPR2022-00282, challenging U.S. Pat. No. 8,315,400, 263 pages.
U.S. Appl. No. 09/653,869, Exhibit-1007, Filed on Dec. 20, 2021—Cited in IPR2022-00324, challenging U.S. Pat. No. 8,254,591, 54 pages.
U.S. Pat. No. 10,405,082, Exhibit-1001, Filed on Dec. 30, 2021—Cited in IPR2022-00369, challenging U.S. Pat. No. 10,405,082, 10 pages.
U.S. Patent U.S. Appl. No. 61/778,737, Exhibit - 1008, Filed on 12/21/2021- Cited in IPR2022-00281, challenging U.S. Pat. No. 9,270,244, 31 pages.
U.S. Appl. No. 62/575,713, Exhibit - 1006, Filed on 12/30/2021-Cited in IPR2022-00369, challenging U.S. Pat. No. 10,405,082, 27 pages.
U.S. Provisional Application 62/575/713, Exhibit - 1006, Filed on 1/4/2022- Cited in IPR2022-00388, challenging U.S. Pat. No. 10,966,015, 27 pages.
Using Audio-Based Signal Processing to Passively Monitor Road Traffic, Orla Duffner, Centre for Digital Video Processing and School of Electronic Engineering Dublin City University, Jul. 2006, 262 pages.
Verifying the attenuation of earplugs in situ: Method validation using artificial head and numerical simulations, Annelies Bockstael, Bram De Greve, Timothy Van Renterghem, Dick Botteldooren, Wendy D'haenens, Hannah Keppler, Leen Maes, Birgit Philips, Freya Swinnen, Bart Vinck, The Journal of the Acoustical Society of America; 124 (2): 973-981, Aug. 1, 2008, 10 pages.
Vraalsen, A Multimodal Context Aware Mobile Maintenance Terminal for Noisy Environments, 2004, pp. 79-92.

(56)        References Cited

OTHER PUBLICATIONS

Wikipedia, Apple headphones, Exhibit - 2010, Filed on 9/13/2022-
Cited in IPR2022-00243, challenging U.S. Pat. No. 8,111,839, 7
pages.
Wikipedia, Microphone, Exhibit - 2012, Filed on 9/13/2022- Cited
in IPR2022-00242, challenging U.S. Pat. No. 8,111,839, 26 pages.
Wikipedia, Microphone; Exhibit - 2011, Filed on 9/9/2022- Cited in
IPR2022-00234, challenging U.S. Pat. No. 9124982, 26 pages.
Wiley Elec and Elecs Eng Dictionary (excerpts), Exhibit - 2004,
Filed on 3/21/2022- Cited in IPR2022-00282, challenging U.S. Pat.
No. 8,315,400, 4 pages.
Wiley Electrical and Electronics Engineering Dictionary (excerpt),
Exhibit - 2009, Filed on 10/7/2022- Cited in IPR2022-01098,
challenging U.S. Pat. No. 11,217,237, 3 pages.
Zhengyou Zhang, et al., Multi-Sensory Microphones for Robust
Speech Detection, Enhancement and Recognition, Microsoft Research,
2004, 4 pages.

* cited by examiner

Earpiece 500

Volume Control 550

Sealing Section 540

User Interactive Button 530

Recharge Ports 570

Ambient Microphone 520

510 Optional Communication Antenna

560

Communication Network

500

572

530

520

LC

570 Ear Canal Mic. (ECM)

MS

580 Ear Canal Rec. (ECR)

560

515 Wireless Module (WM)

585 Memory Storage (MS)

Communication Network

400 Comm. Network

401 Server

419

610 Requested Audio Content stored in 585

600
Setup Signal
Stored in 585

PERSONAL AUDIO ASSISTANT DEVICE AND METHOD

CROSS-REFERENCE TO RELATED APPLICATIONS

This application is a continuation of and claims priority to U.S. patent application Ser. No. 14/148,743, filed 7 Jan. 2014, which is a continuation of and claims priority to U.S. patent application Ser. No. 11/774,965, filed 9 Jul. 2007, which is an application that claims the priority benefit of U.S. Provisional Application No. 60/806,769, under 35 U.S.C. § 119(e), filed 8 Jul. 2006, all of which are incorporated herein by reference in their entireties.

FIELD

The claimed embodiments relate in general to methods and devices for the storage and recall of audio content via an earpiece, and in particular, though not exclusively, for the storage and playing of music or verbal content on a system that is built into a headphone.

BACKGROUND

Present audio content playing devices are separated from the headphone system that normally contains the speakers (also referred to as receivers). The reason for this has typically been that audio content has been stored on disks that require a separate playing system. However, even with the advent of storing audio content on non-disk RAM (Random Access Memory) storage systems, the audio content player has been separated from the earpiece system (e.g., plug in headphones or earbuds). Combining the capacity for audio download and playing in an earpiece system is not obvious over related art since the user interaction system (e.g., play button, keyboard system) does not readily appear compatible with the size of an earpiece device and the difficulty of user interaction.

Additionally, no system currently exists for registration and download of audio content into an earpiece.

BRIEF DESCRIPTION OF THE DRAWINGS

Examples of the claimed embodiments will become apparent from the following detailed description, taken in conjunction with the drawings in which:

DETAILED DESCRIPTION OF EXEMPLARY EMBODIMENTS

Figure 1:
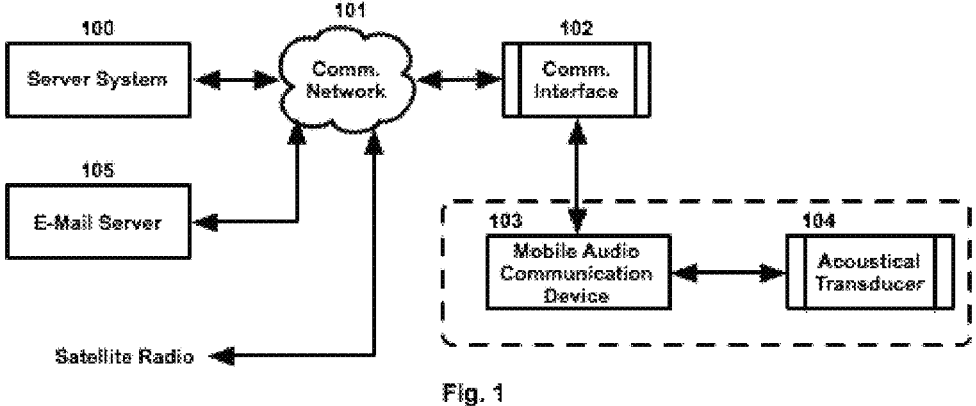
FIG. 1 illustrates the connection between an earpiece device (103 and 104) and a communication network.

The following description of exemplary embodiment(s) is merely illustrative in nature and is in no way intended to limit the claimed embodiments, its application, or uses.

Processes, methods, materials and devices known by one of ordinary skill in the relevant arts can not be discussed in detail but are intended to be part of the enabling discussion where appropriate for example the generation and use of transfer functions.

Notice that similar reference numerals and letters refer to similar items in the following figures, and thus once an item is defined in one figure, it can not be discussed for following figures.

Note that herein when referring to correcting or corrections of an error (e.g., noise), a reduction of the error and/or a correction of the error is intended.

Summary of Exemplary Embodiments

At least one exemplary embodiment is directed to a system for Personalized Services delivered to a Personal Audio Assistant incorporated within an earpiece (e.g., earbuds, headphones). Personalized Services include content such as music files (for preview or purchase) related to a user's preferences, reminders from personal scheduling software, delivery and text-to-speech, speech-to-text processing of email, marketing messages, delivery and text-to-speech of stock market information, medication reminders, foreign language instruction, academic instruction, time and date information, speech-to-speech delivery, instructions from a GPS system and others. A Personal Audio Assistant can be an audio playback platform for providing the user with Personalized Services.

At least one exemplary embodiment is directed to a Personal Audio Assistant system that is included as part of an earpiece (e.g., Headphone system). The Personal Audio Assistant is capable of digital audio playback, mitigating the need to carry a personal music player. Furthermore, a subscription-based service provides audio content to the user through the Personal Audio Assistant. The type of audio content, which is automatically provided to the user, is based on the user's preferences, which are obtained through a registration process.

The audio content, which is seamlessly downloaded to the Personal Audio Assistant in the background, is managed from a Server system and is only available on the Personal Audio Assistant for a predetermined period of time or for a fixed number of playback counts. However, the user can purchase any music file or electronic book directly from the Personal Audio Assistant with a simple one-click control interface, storing the purchased audio content on the Personal Audio Assistant as well as storing the content permanently in a user storage lock-box location on the Server system.

The system provides for audio content to be new and "fresh" each time the user auditions the content. As such, the content is typically auditioned in a first-in: first-out scenario. In one such example, the user has turned on the Personal Audio Assistant at 8:00 am and by 10:00 am has auditioned 2 hours of content that were created for the user as a manifestation of the user's choices of their preferences of genre, artist, their demographics, day of the week, time of day and purchase history. The system also provides for the elimination of a particular song or playlist in situ.

As the user's Listening History Envelope is updated based on experience, subsequent downloads will only contain content incorporating these revised preferences. The Personal Audio Assistant provides for ample memory, thus permitting hours of uninterrupted playback without the need to download additional content from the server. When in need, the Personal Audio Assistant automatically interrogates various communication platforms as it searches for connections. Once a connection is made, the Listener History Envelope file is uploaded to the server, and a new set of personalized playlist content is downloaded to the Personal Audio Assistant. Accordingly, as the Personal Audio Assistant content is auditioned and thus depleted, the communications system provides for constant replenishment.

In another embodiment, the Personal Audio Assistant also provides for a new set of business solutions to be offered to the music industry. As the personalized audio content is only available for audition for a limited period of time, and can not be sent to the user again from weeks to months, the user's purchasing behavior can be demonstrated as spontaneous. The basic model of "Try before you buy" is the expected outcome. In another iteration, the distributor of the music can choose to offer discounts, which can be time-sensitive or quantity-sensitive in nature, in effect promoting greater purchase activity from the user.

In another iteration, while in audition a user can wish to place the desired content in a hold status. The hold status forms the basis of a "wish list," thus allowing the user to hold for future consideration audio content while it is being auditioned. This content resides in the memory of the Personal Audio Assistant for a defined period, and is automatically erased, or the user can do so manually. The selected content will also appear on the user's computer via a URL address; here it resides on the server ready for audition or purchase and download.

The system is designed to operate as simply as possible. Using a single button, which has multiple contacts, the interface allows the user to purchase, delete, skip to next, and add to a wish list and even control a listening level.

In another iteration, the user can download their own music to the Personal Audio Assistant for audition. The Personal Audio Assistant system is capable of text-to-speech processing and can interface with personal scheduling software to provide auditory schedule reminders for the user. Auditory reminders relating to the user's medication schedule are also generated by the system.

At least one exemplary embodiment includes input Acoustic Transducers (microphones) for capturing user's speech as well as Environmental Audio. In further embodiments, stereo input Acoustic Transducers capture Environmental Audio, and, mixing it with the audio signal path, present the ambient sound field to the user, mitigating the need to remove the Headphone apparatus for normal conversation.

Additional exemplary embodiments are directed to various scenarios for the delivery and consumption of audio content. The Personal Audio Assistant can store and play back audio content in compressed digital audio formats. In one embodiment, the storage memory of the Personal Audio Assistant is completely closed to the end-user and controlled from the Server. This allows for audio content to be distributed on a temporary basis, as part of a subscription service. In another iteration of the present embodiments, the storage memory of the Personal Audio Assistant is not completely closed to the end-user, allowing the user to transfer audio content to the Personal Audio Assistant from any capable device such as a Personal Computer or a Personal Music Player.

In at least one exemplary embodiment the Personal Audio Assistant automatically scans for other Bluetooth®-enabled audio playback systems and notifies the user that additional devices are available. These additional devices can include a Bluetooth® video system, television system, personal video player, video camera, cell phone, another Personal Audio Assistant and others.

In another iteration, the Personal Audio Assistant can be directly connected to a Terrestrial Radio receiver, or have such a receiver built in to the system.

In another exemplary embodiment, a technique known as Sonification can be used to convey statistical or other numerical information to a headphone. For example, the user would be able to receive information about the growth or decline of a particular stock, groups of stocks or even sectors of the markets though the Personal Audio Assistant. Many different components can be altered to change the user's perception of the sound, and in turn, their perception of the underlying information being portrayed. An increase or decrease in some level of share price or trading levels can be presented to the user. A stock market price can be portrayed by an increase in the frequency of a sine tone as the stock price rose, and a decline in frequency as it fell. To allow the user to determine that more than one stock was being portrayed, different timbres and spatial locations might be used for the different stocks, or they can be played to the user from different points in space, for example, through different sides of their headphones. The user can act upon this auditory information and use the controls built-in to the headphone to either purchase or sell a particular stock position.

Furthermore, specific sonification techniques and preferences can be presented to the user as "themes" from which the user can select. For example, one theme might auralize the current trading price of one stock with an ambient sine tone in the left ear, the price of another stock in the right ear, their respective trade volumes as perceived elevation using personalized head-related transfer function binauralization, and the current global index or other market indicator as the combined perceptual loudness of both tones. Such a scheme affords ambient auditory display in this example of five dimensions of financial data without compromising the user's ability to converse or work on other tasks. In another embodiment, the system affords users the ability to customize themes to their liking and to rapidly switch among them using simple speech commands. Additionally, the user can search the web from voice commands and receive results via a text to speech synthesizer.

In yet another exemplary embodiment the Personal Audio Assistant (PAA) functions as a dictation device for medical professionals for dictating clinical information to a patient's medical record, or write prescriptions for medication or devices. Conversely, the PAA can function as text-to-speech allowing the clinician to audition information from a medical record, rather than reading. The PAA can save considerable time preparing clinician interaction with a patient.

In another iteration, the Personal Audio Assistant can function as a tool to locate other users of Personal Audio Assistant who share common interests, or who are searching for particular attributes of other users. Whereas the first user has stored specific personal information in the Public Data memory of the Personal Audio Assistant, an example of which might be related to schools attended, marital status, profession etc, or the first user can be in search of another user with these attributes and whereas a second user of a Personal Audio Assistant comes within communication range of the first user, the individual Personal Audio Assistants communicate with each other, access the personal information stored in each of their respective Public Data memories to ascertain if these users have common interests. If a match occurs, each unit can contain both audible and visual indicators announcing that a match has been made and thus each user can start dialog either physically or electronically via the environmental microphones.

Examples of Terminology

Note that the following non-limiting examples of terminology are solely intended to aid in understanding various exemplary embodiments and are not intended to be restrictive of the meaning of terms nor all inclusive.

Acoustic Isolation Cushion: An "Acoustic Isolation Cushion" shall be defined as a circum-aural or intra-aural device that provides acoustic isolation from Environmental Noise. Acoustic Isolation Cushions can be included as part of a Headphones system, allowing the output of the acoustical transducers to reach the ear unimpeded, but still providing acoustic isolation from Environmental Noise.

Acoustic Transducer: An "Acoustic Transducer" shall be defined as a device that converts sound pressure level variations into electronic voltages or vice versa. Acoustic Transducers include microphones, loudspeakers, Headphones, and other devices.

Audio Playback: "Audio Playback" shall be defined as the auditory stimuli generated when Playback Hardware reproduces audio content (music, speech, etc) for a listener or a group of listeners listening to Headphones.

Audition: "Audition" shall be defined as the process of detecting sound stimulus using the human auditory system. This includes the physical, psychophysical, psychoacoustic, and cognitive processes associated with the perception of acoustic stimuli.

Client: A "Client" shall be defined as a system that communicates with a Server, usually over a communications network, and directly interfaces with a user. Examples of Client systems include personal computers and mobile phones.

Communications Port: A Communication Port shall be defined as an interface port supporting bidirectional transmission protocols (TCP/IP, USB, IEEE 1394, IEEE 802.11, Bluetooth®, A2DP, GSM, CDMA, or others) via a communications network (e.g., the Internet, cellular networks).

Control Data: "Control Data" shall be defined as information that dictates the operating parameters for a system or a set of systems.

Earcon: An Earcon shall be defined as a Personalized Audio signal that informs the User of a pending event typically inserted in advance of the upcoming audio content.

Ear Mold Style: "Ear Mold Style" shall be defined as a description of the form factor for an intra-aural device (e.g., hearing aids). Ear Mold Styles include completely in the canal (CIC), in the canal (ITC), in the ear (ITE), and behind the ear (BTE).

Environmental Audio: "Environmental Audio" shall be defined as auditory stimuli of interest to the user in the environment where the user is present. Environmental Audio includes speech and music in the environment.

Environmental Noise: "Environmental Noise" shall be defined as the auditory stimuli inherent to a particular environment where the user is present and which the user does not wish to audition. The drone of highway traffic is a common example of Environmental Noise. Note that Environmental Noise and Audio Playback are two distinct types of auditory stimuli. Environmental Noise does not typically include Music or other audio content.

E-Tailing System: An "E-tailing System" shall be defined as a web-based solution through which a user can search, preview and acquire some available product or service. Short for "electronic retailing," E-tailing is the offering of retail goods or services on the Internet. Used in Internet discussions as early as 1995, the term E-tailing seems an almost inevitable addition to e-mail, e-business, and e-commerce. E-tailing is synonymous with business-to-consumer (B2C) transactions. Accordingly, the user can be required to register by submitting personal information, and the user can be required to provide payment in the form of Currency or other consideration in exchange for the product or service. Optionally, a sponsor can bear the cost of compensating the E-tailer, while the user would receive the product or service.

Generic HRTF: A "Generic HRTF" shall be defined as a set of HRTF data that is intended for use by any Member. A Generic HRTF can provide a generalized model of the parts of the human anatomy relevant to audition and localization, or simply a model of the anatomy of an individual other than the Member. The application of Generic HRTF data to Audio Content provides the least convincing Spatial Image for the Member, relative to Semi-Personalized and Personalized HRTF data. Generic HRTF data is generally retrieved from publicly available databases such as the CIPIC HRTF database.

Headphones: "Headphones" (also known as earphones, earbuds, stereophones, headsets, Canalphones, or the slang term "cans") are a pair of transducers that receive an electrical signal from a media player, communication receivers and transceivers, and use speakers placed in close proximity to the ears (hence the name earphone) to convert the signal into audible sound waves. Headphones are intended as personal listening devices that are placed either circum-aural or intra-aural according to one of the Ear Mold Styles, as well as other devices that meet the above definition such as advanced eyewear that includes Acoustical Transducers (i.e. Dataview). Headphones can also include stereo input Acoustic Transducers (microphones) included as part of the Ear Mold Style form factor.

HRTF: "HRTF" is an acronym for head-related transfer function—a set of data that describes the acoustical reflection characteristics of an individual's anatomy relevant to audition. Although in practice they are distinct (but directly related), this definition of HRTF encompasses the head-related impulse response (HRIR) or any other set of data that describes some aspects of an individual's anatomy relevant to audition.

Informed Consent: "Informed Consent" shall be defined as a legal condition whereby a person can provide formal consent based upon an appreciation and understanding of the facts and implications associated with a specific action. For minors or individuals without complete possession of their faculties, Informed Consent includes the formal consent of a parent or guardian.

Listening History Envelope: "Listening History Envelope" shall be defined as a record of a user's listening habits over time. The envelope includes system data, time system was turned off, time the system is presenting content, when the system doesn't audition, system transducers, when the user auditions content, time stamp of content being auditioned, content which is: skipped, deleted, played multiple times, saved in the Wish List, and time between listening sessions.

Music: "Music" shall be defined as a form of expression in the medium of time using the structures of tones and silence to create complex forms in time through construction of patterns and combinations of natural stimuli, principally sound. Music can also be referred to as audio media or audio content.

Playback Hardware: Any device used to play previously recorded or live streaming audio. Playback Hardware includes Headphones, loudspeakers, personal music players, mobile phones, and other devices.

Personal Audio Assistant: A "Personal Audio Assistant" shall be defined as a portable system capable of interfacing with a communications network, directly or through an intermediate, to transmit and receive audio signals and other data.

Personal Computer: "Personal Computer" shall be defined as any piece of hardware that is an open system capable of compiling, linking, and executing a programming language (such as C/C++, Java™, etc.).

Personal Music Player: "Personal Music Player" shall be defined as any portable device that implements perceptual audio decoder technology but is a closed system in that users are not generally allowed or able to write software for the device.

Personalized HRTF: A "Personalized HRTF" shall be defined as a set of HRTF data that is measured for a specific Member and unique to that Member. The application of Personalized HRTF data to Audio Content creates, by far, the most convincing Spatial Image for the the the Member (Begault et. al. 2001, D. Zotkin, R. Duraiswami, and L. Davis 2002).

Personalized Services: "Personalized Services" shall be defined as services customized to better meet the needs of an individual. Personalized Services include media content (for preview or purchase) related to a user's preferences, reminders from personal scheduling software, delivery and text-to-speech processing of email, marketing messages, delivery and text-to-speech of stock market information, medication reminders, foreign language instruction [real-time foreign language translation], academic instruction, time and date information, and others.

Public Data: "Public Data" shall be defined as data which contains specific and personal information about the registered user of the Personal Audio Assistant. The registered user chooses which portions of their complete Registration Process data they wish to include in this subset. This data becomes distributed to other users who have compliant devices thus allowing other users to know specific details of the registered user.

Registration Process: "Registration Process" includes the acquisition of the user's preference via a web page. Typically, the process would include the items to be captured: Age, demographics, email, gender, Relative Audiogram, Personal Preferences, banking information, credit card information, wake-up and sleep times, music preferences by genre, artist, preferences for writers and authors, desire to receive advertising, turn-on listening level, equalization, email preferences, parental control setup as well as other user-controlled settings.

Relative Audiogram: A "Relative Audiogram" shall be defined as a measured set of data describing a specific individual's hearing threshold level as a function of frequency. A Relative Audiogram is only an approximate Audiogram, leaving more complete Audiogram analysis to qualified audiologists.

Semi-Personalized HRTF: A "Semi-Personalized HRTF" shall be defined as a set of HRTF data that is selected from a database of known HRTF data as the "best-fit" for a specific user. Semi-Personalized HRTF data is not necessarily unique to one user; however, interpolation and matching algorithms can be employed to modify HRTF data from the database to improve the accuracy of a Semi-Personalized HRTF. The application of Semi-Personalized HRTF data to Audio Content provides a Spatial Image that is improved compared to that of Generic HRTF data, but less effective than that of Personalized HRTF data. The embodiments within speak to a variety of methods for determining the best-fit HRTF data for a particular Member including anthropometrical measurements extracted from photographs and deduction.

Server: A "Server" shall be defined as a system that controls centrally held data and communicates with Clients.

Sonification: "Sonification" shall be defined as the use of non-speech audio to convey information or to aurally perceptualize non-acoustic data (auralize). Due to a variety of phenomena involving human cognition, certain types of information can be better or more efficiently conveyed using auditory means than, for example, visual means.

Exemplary Embodiments

FIG. 1 illustrates the connection between an earpiece device (103 and 104) and a communication network (101) via communication interface 102, which can be operatively connected (via a wired or wireless connection) to a server system (100) and/or an e-mail server (105). Additionally a radio signal (e.g., satellite radio) can be input into the earpiece 500 (FIG. 5B) via a communication module (e.g., Bluetooth® wireless module 515).

Figure 2:
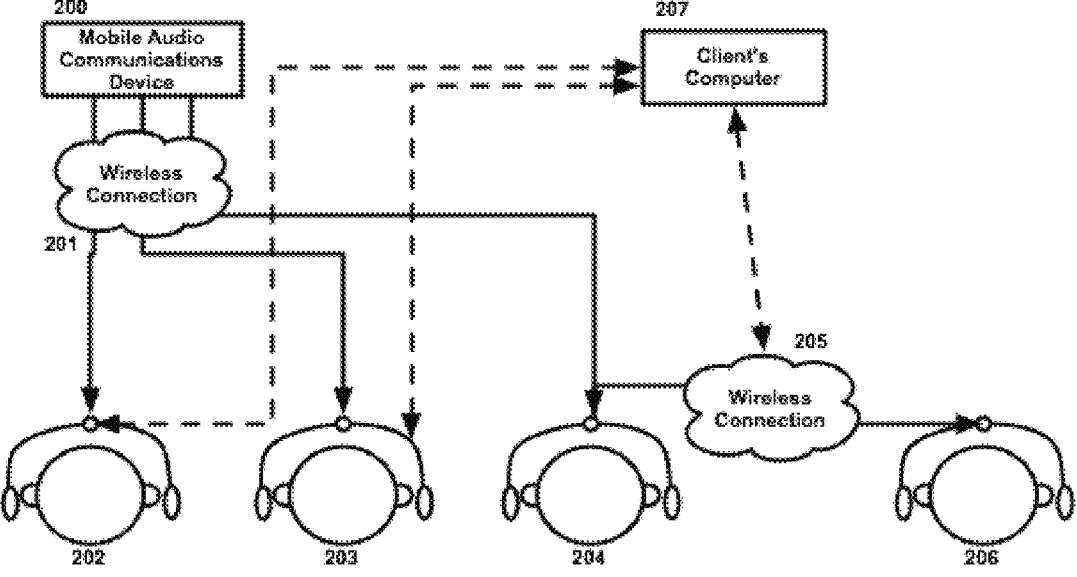
FIG. 2 illustrates at least one exemplary embodiment where earpiece devices share information with other earpiece devices within range (e.g., GPS location and identity)

FIG. 2 illustrates at least one exemplary embodiment where earpiece devices share information with other earpiece devices within range (e.g., GPS location and identity). For example multiple users (e.g., 202, 203, 204, and 206) can send signals to each individual earpiece (e.g., 500) when in range (e.g., via a wireless connection 205) or to a mobile audio communications device 200 via a wireless connection (201) with each earpiece (500). Additionally information (e.g., audio content, software download) can be sent via a client's computer 207 to each earpiece, either directly (e.g., 205), or via 200. For example audio content can be retrieved on a user's computer and sent to the earpieces that have authorization to use it.

Figure 3:
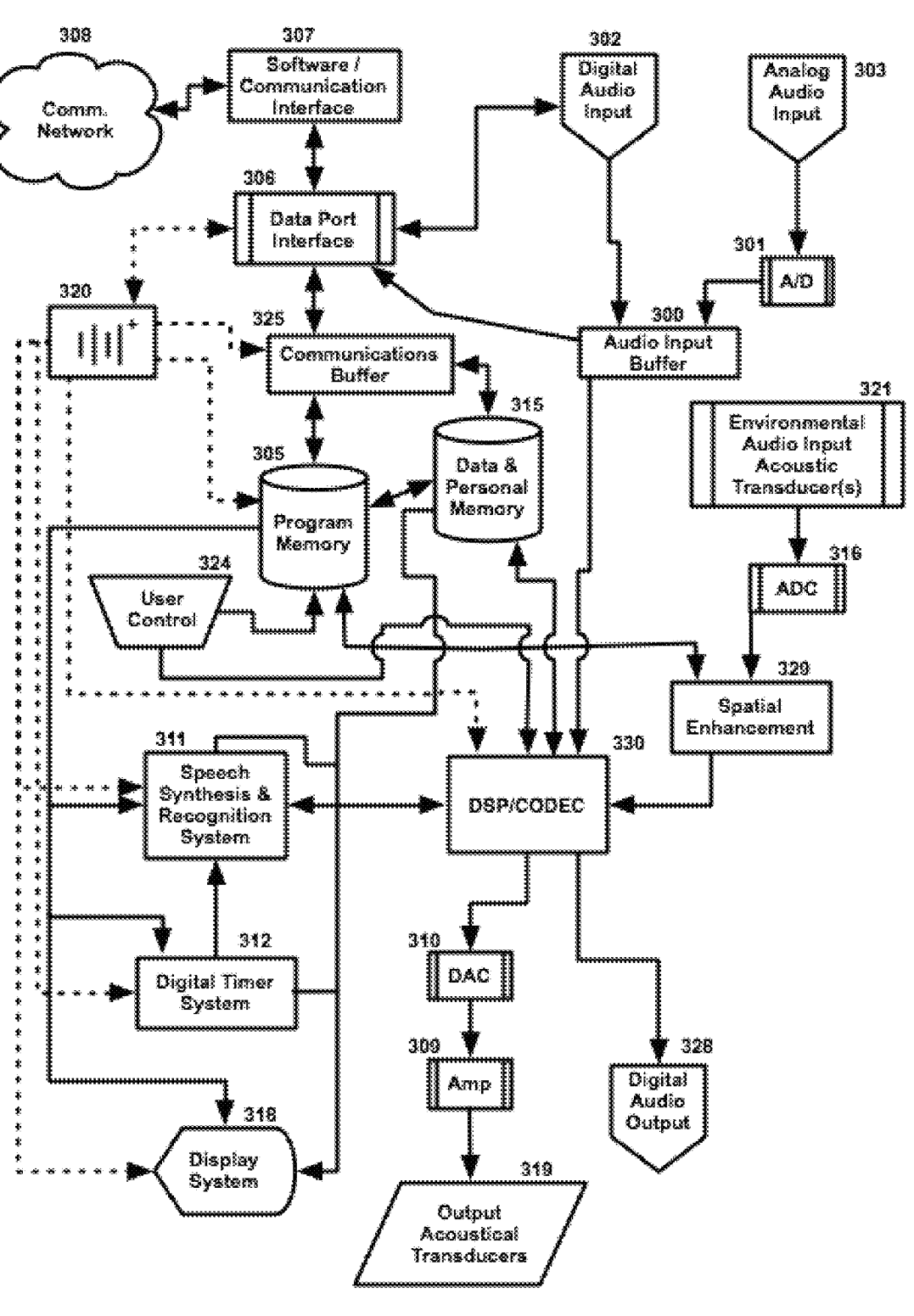
FIG. 3 illustrates an example of various elements that can be part of an earpiece device in accordance with at least one exemplary embodiment.

FIG. 3 illustrates an example of various elements that can be part of an earpiece device in accordance with at least one exemplary embodiment. The earpiece can include all or some of the elements illustrated in FIG. 5B. For example the logic circuit 572 or the operatively connected memory storage device 585, can include spatial enhancement software 329, a DSP codec 330, a speech synthesis and recognition system 311, and a digital timer system 312. Additional elements can be connected to the logic circuit 572 as needed, for example a power supply 320, a software communication interface 307 (e.g., wireless module 515) (which may be connected to communication network 308), data port interface 306, audio input buffers 300 connected to digital audio input 302 and/or analog audio input 303 converted to digital via an ADC 301, environmental audio input acoustic transducer(s) 321 converted to digital via an ADC 316, user control 324, digital audio output 328, output acoustic transducers 319 (which receive signals converted to analog via a DAC 310 and amplified via amplifier 309), display system 318, communication buffers 325, program memory 305, data and personal memory 315, as well as other electronic devices as known by one of ordinary skill in the relevant arts.

Figure 4:
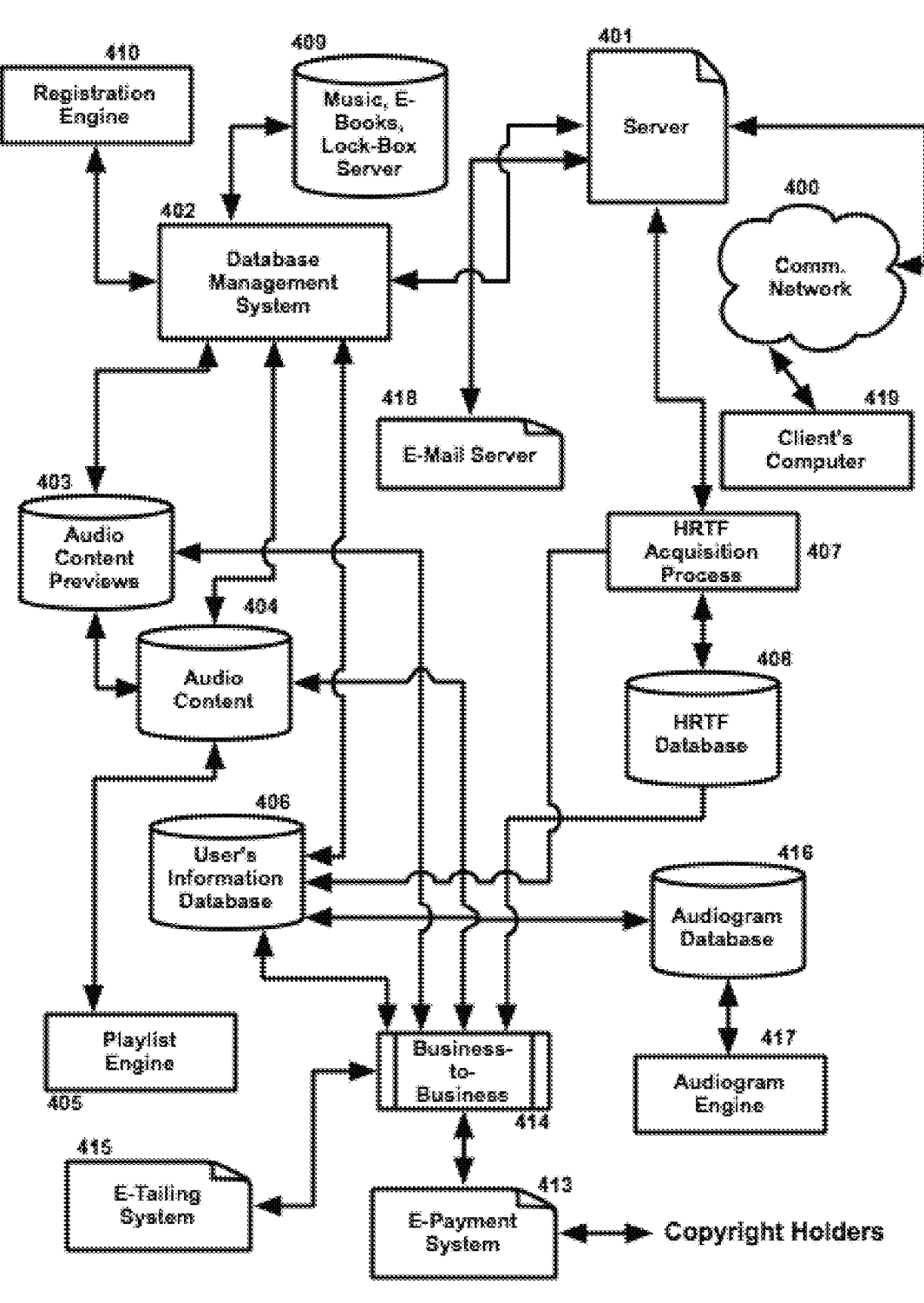
FIG. 4 illustrates an example of a communication system in accordance with at least one exemplary embodiment that a user can use to register via his/her computer.

FIG. 4 illustrates an example of a communication system in accordance with at least one exemplary embodiment that a user can use to register via his/her computer 419, via a communication network 400 (e.g., Internet connection) connected to many various database and registration systems as illustrated and labeled in FIG. 4. For example, server 401, database management system 402, audio content preview database 403, audio content database 404, playlist engine 405, user's information database 406, HRTF acquisition process module 407, HRTF database 408, lock-box server 409, registration engine 410, e-payment system 413, business-to-business module 414, e-tailing system 415, audiogram database 416, audiogram engine 417 and/or e-mail server 418.

Figures 5A, 5B:
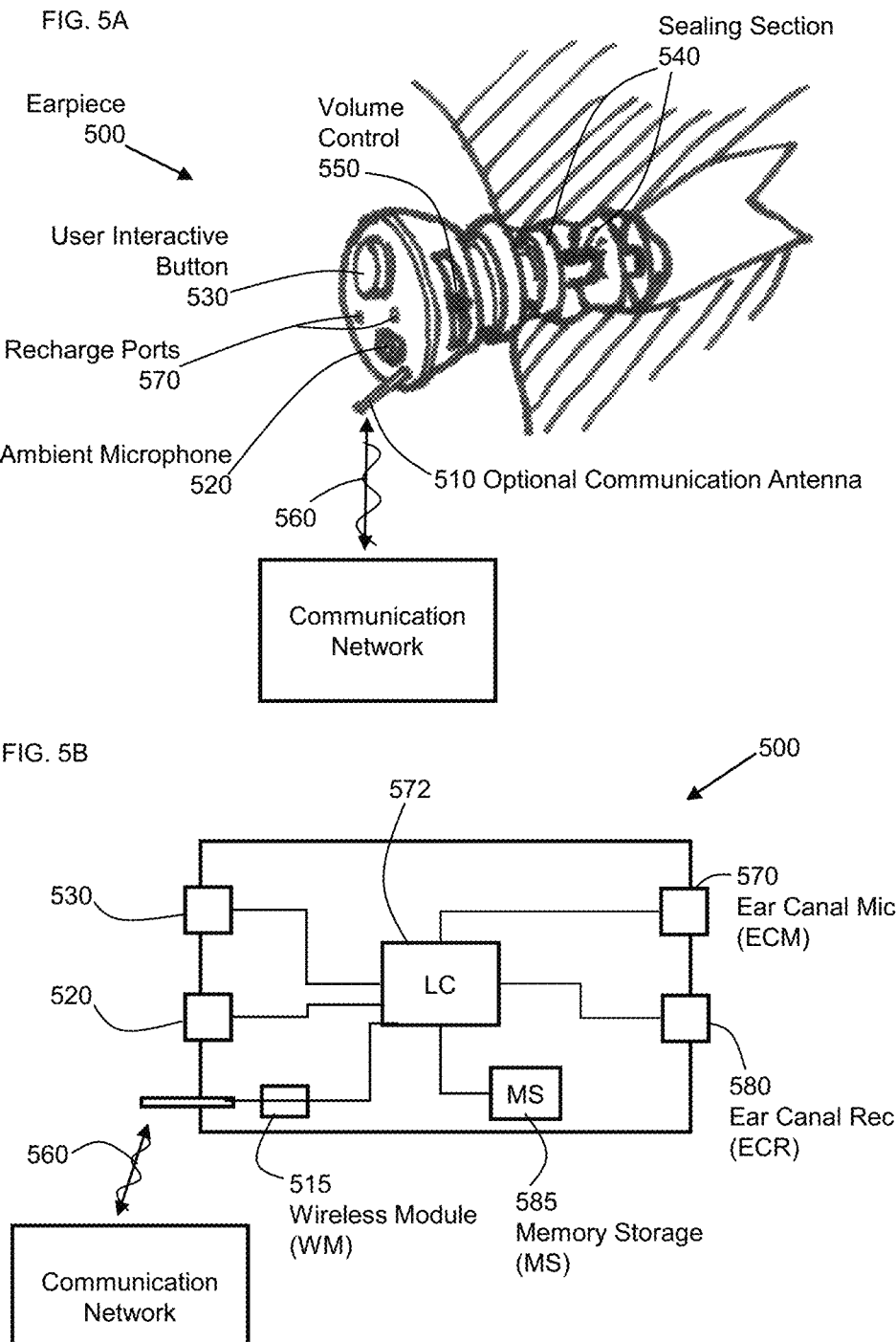
FIG. 5A illustrates an earpiece that can store and download audio content in accordance with at least one exemplary embodiment.
FIG. 5B illustrates a block diagram of the earpiece of FIG. 5A.

FIG. 5A illustrates an earpiece 500 having sealing section 540 in an ear canal that can store and download audio content 560 in accordance with at least one exemplary embodiment. The earpiece 500, can include a first user interaction element 530 (e.g., a button), that can be used to turn the earpiece 500 on, or if on then activate an audio play command to start playing saved audio content. The earpiece 500 can also include a second user interaction element 550 (e.g., a slide control) that can be used for example to control the volume. The earpiece 500 can also include recharge ports 570, that can accept two wires of varying voltage that can be inserted into the recharge ports 570 to recharge any batteries in the earpiece 500. The earpiece 500 can include an ambient microphone 520 and an optional communication antenna 510, that if needed can aid in the communication between the earpiece 500 and a communication network.

FIG. 5B illustrates a block diagram of the earpiece of FIG. 5A, illustrating the first user interaction element 530, the ambient microphone (AM) 520, that can be used to pick up ambient audio content, an ear canal microphone (ECM) 590 that can pick up audio in the ear canal region, an ear canal receiver (ECR) 580 that can direct audio content to the ear drum, all of which can be connected operatively to a logic circuit 572. A memory storage device 585 can be operatively connected to the logic circuit (LC) 572, and can store data such as registration, preference, and audio content data. The optional communication antenna 510 can be connected to a communication module (e.g., wireless module 515), and can receive or transmit information 560 to a communication network.

Figure 6:
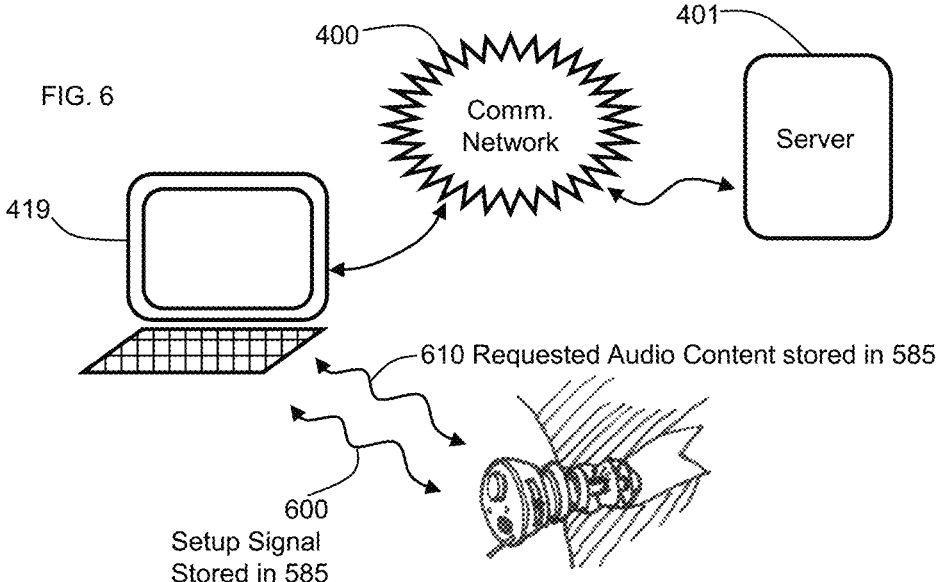
FIG. 6 illustrates a user interface for setting the parameters of the Personal Audio Assistant.

FIG. 6 illustrates a user interface for setting the parameters stored in the memory storage device 585. For example a user can use his/her computer 419 to communicate with a server 401 (e.g., via a communication network 400) to start the user's registration (e.g., with an audio content provider). The registration information can then be transmitted 600 to set the stored parameters in the memory storage device 585 of the earpiece 500. Additionally a requested (e.g., bought) audio content can be downloaded 610 into the memory storage device 585 of the earpiece 500.

At least one exemplary embodiment is directed to an earpiece comprising: an ambient microphone; an ear canal microphone; an ear canal receiver; a sealing section; a logic circuit; a communication module; a memory storage unit; and a user interaction element, where the user interaction element is configured to send a play command to the logic circuit when activated by a user where the logic circuit reads registration parameters stored on the memory storage unit and sends audio content to the ear canal receiver according to the registration parameters.

In at least one exemplary embodiment the audio content is stored in the memory storage unit. The earpiece according to claim 2, where the communications module is a wireless communications module. Additionally the earpiece can include a second user interaction element configured to alter the volume of the audio content that is emitted from the ear canal receiver.

Upon a play command being received by the logic circuit the logic circuit can check registration parameters stored in the memory storage device for example one of the registration parameters can be whether the audio content is a sample audio content or a fully purchased audio content, or the allowed number of times an audio content can be played, and a counter value that keeps track of the number of times the audio content has been played.

The earpiece can send an auditory warning to be emitted by the ear canal receiver when the counter value is greater than or equal to the allowed number of times the audio content can be played, and where the logic circuit does not send the audio content to the ear canal receiver.

Further Exemplary Embodiments

At least one exemplary embodiment is directed to a system for the delivery of Personalized Services to Personal Audio Assistants, the system comprising: a Personal Audio Assistant system for presenting Personalized Services to the user as Audio Playback; a Server system for user registration, Personalized Service management, and communication; a Registration Process for collecting detailed registration information from users, including the information necessary for creating Personalized Services; a communications protocol (TCP/IP, USB, IEEE 1394, IEEE 802.11, Bluetooth®, A2DP, GSM, CDMA, or other) and a communications network (i.e. the Internet, cellular networks) connecting the Personal Audio Assistant to the Server or connecting the Personal Audio Assistant to other Personal Audio Assistants (peer-to-peer behavior).

In at least one exemplary embodiment a Personal Computer acts as an intermediate, connecting to the Server system over a communications network and connecting to the Personal Audio Assistant over a local connection. At least one exemplary embodiment includes a Personal Hearing Damage Intervention System (e.g., USPTO—60/805, 985—Goldstein).

In at least one exemplary embodiment a Personal Audio Assistant system included as part of a Headphone system, the system comprising: a Communications Port supporting a communications protocol enabling communication with the Server system, peer devices, and other capable devices; a non-volatile program memory storage system for storing Control Data, dictating system behavior; a data memory storage system for storing data and audio content; an analog audio input/output and corresponding ADC/DAC; a digital audio input/output and a digital audio signal path; a user control system allowing the user to adjust the level of the audio output and control the behavior of the system; a user control system allowing the user to purchase the content being auditioned in real time; a user control system allowing the user to control, delete, fast forward, output level control, scan, advance, the data stored both stored in memory as well as new streaming data emails and reminders; a display system for presenting information to the user(s) visually using any method familiar to those skilled in the art (LED, LCD, or other); a display system for presenting information to the user(s) (e.g., using Earcons and other sound files); a speech synthesis system for converting text-to-speech and generating speech signals; a speech recognition system for converting speech to-text to respond and send emails and to interface with the control language as to provide navigational commands; a digital timer system; a power supply system in the form of a battery; a unique identification number for each Personal Audio Assistant; Input Acoustic Transducers; an Output Acoustic Transducer; an Audio amplification system; Acoustic Isolation Cushions conforming to one of the Ear Mold Styles (CIC, ITC, ITE, or BTE; see definitions) and other elements common to Headphone systems; a digital signal processor (DSP) system; and a CODEC processor capable of improving the perceptual sound quality of the content to be auditioned while governed by delivering the correct SPL dose.

In at least one exemplary embodiment the system is independent of a Headphone array or can be included and imbedded as part of a Personal Computer system, a Personal Music Player system, a personal monitoring system, an automotive audio system, a home audio system, an avionics audio system, a personal video system, a mobile cell phone system, a personal digital assistant system, a standalone accessory, or an advanced eye-wear system with acoustical transducers.

In at least one exemplary embodiment the various processing needed to derive the intended functions are distributed among any combination of a Server system, a Personal Computer system, a Personal Music Player system, a personal monitoring system, an automotive audio system, a home audio system, an avionics audio system, a personal video system, a mobile cell phone system, a personal digital assistant system, a standalone accessory, or an advanced eye-wear system with acoustical transducers.

In at least one exemplary embodiment the Personal Audio Assistant system can exchange audio signals with a mobile phone via the Communications Port, allowing the Personal Audio Assistant to function as a mobile phone accessory.

In at least one exemplary embodiment a communications buffer is included. For example when a network connection is available, the communications buffer uploads stored content (e.g., Listening Habits Envelope) and stores incoming transmissions (e.g., music, electronic books, and updates to the firmware or operating system) from the Communications Port; The contents of the communications buffer are then transmitted whenever a network connection becomes available. At least one exemplary embodiment includes a perceptual audio codec decoding technology in the DSP, enabling the storage and playback of compressed digital audio formats (e.g., MP3, AAC, FLAC, etc.). At least one exemplary embodiment is compliant and compatible with DRM, FairPlay® and other forms of digital content governance.

At least one exemplary embodiment includes a user control system for selecting and playing back audio content stored in memory that operates using any combination of the following methods: a button or tactile interface which upon auditioning a song can be pressed to order content; a button, tactile and/or voice controlled interface which, when pressed once, commanded to, activates playback of short audio clips or audio thumbnails of the audio content stored in memory; When the button is pressed again during audio thumbnail playback, the current audio content selection is played in its entirety; The behavior of this interface is similar to the "scan" button interface common in FM/AM radio devices; a button, tactile and/or voice controlled interface that, when pressed or commanded to, skips to the next piece of audio content, which is selected randomly from all available audio content that has a play count equal to or less than the play count of the piece of audio content currently playing; The behavior of this interface is similar to the "shuffle" behavior found in some personal music players; an interface for browsing audio content storage devices familiar to those skilled in the art; and a process to allow for increased data memory storage capacity for storing audio content.

In at least one exemplary embodiment the contents of the data memory are encrypted and controlled by the Server system only, prohibiting the end-user from loading unauthorized audio content into the data memory. Further the contents of the data memory can be manipulated by the end-user, allowing the user to transfer audio content to the Personal Audio Assistant system from any device capable of interfacing with the communications port; For example, audio content can be transferred to the system from a Personal Music Player or a Personal Computer. According to at least one exemplary embodiment, audio content (or other media content) updates are retrieved from the Server system any time a connection is detected by the communications port. Furthermore, an exemplary embodiment can include an acoustical and/or visual indicator informing the user when a transfer of data is activated.

In at least one exemplary embodiment radio wave transmissions are used to implement some communications protocol and the communications port acts as a radio receiver. Additionally the Personal Audio Assistant can include: interfaces with some personal scheduling software through the communications port; a speech synthesis system which generates speech-signal reminders corresponding to information from the scheduling software, where the digital timer system triggers the presentation of the speech-signal reminders at the appropriate time.

Additionally the Personal Audio Assistant can interface with an email platform through the communications port; The speech synthesis system converts the email in text to speech and provides email to the user in aural presentation format. The system further comprising: a process in the Registration engine allowing the user to optimize their personalization process of incoming emails by associating a specific Earcon with the importance of the incoming email. As such, normal priority email contains an introduction sound announcing to the user the level of importance the sender associated with their email; a speech recognition system for converting speech-to-text which interfaces with the control language as to provide navigational commands allowing the user to respond and send emails.

In at least one exemplary embodiment the communications port system makes use of some wireless communications protocol (802.11, Bluetooth®, A2DP, or other) to transmit and receive digital audio data for playback, the system further comprising: an audio codec to encode and decode digital audio transmissions; a wireless communications system (802.11, Bluetooth®, A2DP, etc.) for transmitting and receiving data (digital audio transmissions, Control Data, etc.); a method for pairing two or more Personal Audio Assistants through a wireless communications protocol to provide a secure exchange of audio content, data such as the user's Public Data; an audio warning signal or visual display system output that notifies the user anytime a compatible transmission becomes available; and a user control system enabling the user to switch between available compatible transmissions.

In at least one exemplary embodiment the system enables listeners to share digital audio transmissions, the system further comprising: a method for scanning for available digital audio transmissions within range; a user control interface for specifying digital audio transmission behavior;

a method for employing the system as a relay to other compliant devices; re-broadcasting digital audio transmissions to increase wireless range. In at least one exemplary embodiment multiple systems are capable of sharing the contents of their program and data memory using the wireless communications protocol.

In at least one exemplary embodiment of the system, the input Acoustic Transducer is used to record audio content to the data memory storage system, the system further comprising: an implementation of some perceptual audio codec technology in the DSP, enabling the storage of compressed audio formats (e.g., MP3, AAC, FLAC, etc); and an increased data memory storage capacity for storing recorded audio content.

In at least one exemplary embodiment, the stereo input Acoustic Transducers are ultimately connected to the audio signal path at the DSP, allowing the user to audition Environmental Audio (e.g., speech or music) and mitigating the need for the user to remove the Headphone apparatus to audition Environmental Audio, the system further comprising: a stereo pair of input Acoustic Transducers placed close to the user's ear canal input, conforming to one of the Ear Mold Styles (CIC, ITC, ITE, or BTE, see definitions); and by mounting the input Acoustic Transducers in a CIC or ITC configuration, spatial-acoustic cues are preserved, creating a spatially-accurate Environmental Audio input signal—essentially a personal binaural recording; a method for acoustically compensating for the non-linear frequency response characteristics of the Acoustical Isolation Cushions of a given Headphone system by applying corresponding inverse filters to the Environmental Audio input signal at the DSP; With this method, the system acts as a linear-frequency-response hearing protection apparatus (e.g., USPTO—60/805,985—Goldstein).

At least one exemplary embodiment includes a system for first attenuating Audio Playback and then mixing the Environmental Audio input signals, at a louder listening level, with the audio signal path using the DSP, where the system is activated by any combination of the following methods: a manual switch to activate/deactivate the system; a speech-detection apparatus to activate the system when speech is detected as the principal component of the Environmental Audio input; and a music-detection apparatus to activate the system when music is detected as the principal component of the Environmental Audio input.

At least one exemplary embodiment can include active noise reduction, echo cancellation and signal conditioning that can be environmentally customized through the registration process to better meet the user's specific needs (i.e., occupation-related noise cancellation); A typical application would be a special set of noise cancellation parameters tuned to the drilling equipment used by a dentist.

In at least one exemplary embodiment the input Acoustic Transducers are instead mounted within circum-aural, intra-aural BTE, or intra-aural ITE molds (see Ear Mold Style), the system further comprising: a spatial audio enhancement system for supplementing the spatial-acoustic cues captured by the stereo pair of input Acoustical Transducers to provide improved spatial perception of Environmental Audio using any combination of the following methods: the application of Generic, Semi-Personalized, or Personalized HRTF data to the Environmental Audio input signal; the application of binaural enhancement algorithms, familiar to those skilled in the art, to the Environmental Audio input signals; the application of a pinna simulation algorithm to the Environmental Audio input signal; and a synthetic pinna apparatus placed just before the stereo input Acoustic Transducers.

At least one exemplary embodiment includes a Server system for the creation, Registration, management, and delivery of Personalized Services, the system comprising: a communications system for interfacing with public communication networks to exchange data with Personal Audio Assistants, a Client's computer, mobile phones, PDAs or other capable devices; a database and database management system for storing and retrieving information relating to user Registration, Personalized Services, audio content, Control Data, and other data; a Registration interface system for collecting, storing, and applying information provided by users; a method for creating Personalized Services based on user Registration information; an end-user audio content Lock-Box storage system, providing every registered user access to their purchased media content; a business-to-business interface system for acquiring audio content with record labels, copyright holders, and other businesses; an E-tailing system including an electronic transactions system enabling users to purchase content, items offered for sale or pay subscription fees electronically; an E-Payment system compensating the various copyholders upon purchase of content by user; a Playlist engine, which acquires the user's Registration information, Listening History Envelope and then creates audio playlists, which is optimized for the user preferences and further refinements; and an Email server, which distributes communications to the user and others, regarding marketing data, the status of the user weekly SPL dose, and other information.

At least one exemplary embodiment includes machine-learning techniques employed to better optimize the user's preferences relating to audio content and other media content, the system further comprising: a method for tracking the purchase history of each user, relating the purchase history to media content preferences, and using the purchase history to make media content recommendations; a method for examining a user's digital media library, stored on a Personal Computer, Personal Music Player, or Personal Audio Assistant, from the Server system, and relating media content preferences and media content recommendations to the user's digital media library; and a method for examining a user's Listening History Profile.

At least one exemplary embodiment includes a Registration system for collecting a wide variety of information from users, including information necessary for creating Personalized Services, the system comprising: a Server system; an interface system for querying the user to collect registration information including demographics (age, gender), Playback Hardware information, Headphone information, occupational information, home and work locations, medication information, music-related preferences, video-related preferences, and other information; a method for customizing Control Data based on registration information; and a method for creating Personalized Services based on registration information.

In at least one exemplary embodiment a fast HRTF acquisition process is included as part of the Registration process, the system further comprising a method for the fast acquisition of Semi-Personalized HRTF data via a deduction process, the method comprising: a database system containing indexed, clustered HRTF data sets; an auditory test signal with distinctive spatial characteristics, where two or more distinct sound source locations exist; a system for the application of potential HRTF matches to the auditory test signal; and a feedback system, allowing the user to select the best listening experience from a number of candidate listening experiences, based on the spatial quality perceived in the HRTF-processed auditory test signal.

In at least one exemplary embodiment Personalized HRTF data is measured and used instead of Semi-Personalized HRTF data, by any method familiar to those skilled in the art.

In at least one exemplary embodiment the user is provided some Personal Audio Assistant free-of-charge or at a discount, given the user agrees to a subscription service commitment to receive Personalized Services for a certain amount of time.

In at least one exemplary embodiment, as part of the Personalized Services, the user is provided with temporary audio content corresponding to the preferences indicated during the registration process; Further, the user is given the option to purchase the audio content permanently; Otherwise, the audio content is replaced with new audio content from the Server, after a predetermined amount of time or a predetermined number of playback counts, the system comprising: a Personal Audio Assistant with an enhanced user control system, enabling a registered user to purchase media content directly from the Personal Audio Assistant with a button; and a Personal Audio Assistant with an enhanced user control system, enabling a registered user to store a reference to media content that can be purchased by the user at a later time.

In at least one exemplary embodiment, video or gaming content is included as well as audio content, the system further comprising: a Personal Audio Assistant with an enhanced visual display system, capable of playing video and/or gaming content.

In at least one exemplary embodiment, as part of the Personalized Services, the user receives medication reminders in the form of speech signals, audio signals, text, or graphics on the user's Personal Audio Assistant; Medication reminders are generated by the Server system based on the user's registration information.

In at least one exemplary embodiment, as part of the Personalized Services, the user receives stock market information in the form of speech signals, audio signals, text, or graphics on the user's Personal Audio Assistant; The stock market information is selected by the Server system based on the user's registration information, the system further comprising: the user having successfully registered their Personal Audio Assistant with a brokerage firm, or other stock trading engines, the user can then purchase or sell a stock by use of a user button or a speech command.

Further in at least one exemplary embodiment, the user is able to request specific media content to be transferred temporarily or permanently to the user's Personal Audio Assistant, the system further comprising: an interface system operating on the Server allowing users to request specific media content by artist, title, genre, format, keyword search, or other methods familiar to those skilled in the art; and a media content search engine system.

In at least one exemplary embodiment a Relative Audiogram compensation filter is applied to audio signal path by the digital signal processor, the system either (e.g., USPTO—60/805,985—Goldstein): (a) Retrieves Relative Audiogram compensation information from a remote Server after a registration process (during transmission, the information can include HIPAA compliant encoding); or (b) calculates a compensation filter from Relative Audiogram information obtained by the system locally. For example U.S. Pat. No. 6,840,908—Edwards, and U.S. Pat. No. 6,379, 314—Horn, discuss methods for the acquisition of an individual's Relative Audiogram.

In at least one exemplary embodiment a Satellite Radio transmitter/receiver (transceiver) is incorporated within the Headphone proper, allowing the user to at least: receive XM®, Sirius® and other broadcasts for playback over the system; select radio stations for playback over the system via the control system, the control system comprising either a single-click tactile interface or the speech-controlled circuitry; store selected portions of such broadcasts in memory for later recall and playback via the control systems; engage a novel commercial-skip feature for attenuating the playback level of suspected sales commercials broadcasts; and engage a speech-skip feature for attenuating the playback of speech (e.g., news, announcements, etc.).

At least one exemplary embodiment includes a Walkie-Talkie mode, which broadcasts input to the system's built-in microphone, whereby the user's speech can be detected by the input acoustic transducer and remotely broadcast where at least one of the following occurs: the Walkie-Talkie mode receives input via AM/FM broadcasts (as well as digital communications protocols) from a nearby user; the Walkie-Talkie mode allows nearby users to engage in conversation with increased perceptual clarity in noisy environments (e.g., aircraft cockpits), using for example a noise-cancellation system; selectively engage and disengage the Walkie-Talkie mode using the control system; detect other users of the system within a given range; and alert the user of the system when other detected systems contain certain Public Data and contain a predefined Public Message Key (e.g., "If the detected system belongs to a single male between the ages of 25 and 30 and whose favorite sport is tennis, then broadcast the message, 'I like tennis also; would you like to have coffee?'" or "If the detected system belongs to a user who attended Princeton University, then broadcast the message, 'Go Tigers!'").

At least one exemplary embodiment can use other communications to accomplish this service rather than AM/FM; as such the system can incorporate communications transmission protocols (TCP/IP, USB, IEEE 1394, IEEE 802.11, Bluetooth®, A2DP, GSM, CDMA, or other protocols) and a communications network (i.e. the Internet, cellular networks) connecting the Personal Audio Assistant to other Personal Audio Assistants. At least one exemplary embodiment can selectively control the broadcast of public data and public message keys via the control system.

At least one exemplary embodiment includes a Sonification algorithm within the Headphone, which enables auditory display of digitally received data, including for example financial data, news, GPS data, the system further containing a variety of sonification "themes" selected during the registration process that map requested data (e.g., current average trading price of AAPL stock, the Dow Jones Industrial Index, and the Nasdaq Composite®) to corresponding audio content (e.g., the frequency of a sine tone presented in the left ear, the frequency of a sine tone presented in the right ear, and the global amplitude of both sine tones, respectively).

At least one exemplary embodiment includes an auditory display, which is synthesized by the onboard Digital Signal Processor. In at least one exemplary embodiment the auditory display is created through the digital audio signal processing effects applied to any other acoustic data the system is capable of reproducing (e.g., terrestrial radio, prepurchased audio content in the user's digital library, electronic books, etc.); For example, a sudden listening level increase in the playback level of a song to which the user was listening can be triggered by a predefined alert condition (e.g., Nasdaq Composite® has exceeded 2200 points).

At least one exemplary embodiment includes the ability to create themes using a computer program and uploading a file to the Headphone system.

At least one exemplary embodiment includes a speech recognition system for converting speech to HTML (Voice Browser), whereby the user can access the Internet, provide navigational commands, perform searches and receive results via the Headphones through a text (HTML)-speech synthesize.

Additionally, the Personal Audio Assistant can be totally incorporated with a mobile cell phone, or any portable technology which incorporates any of the following protocols, TCP/IP, USB, IEEE 1394, IEEE 802.11, Bluetooth®, A2DP, GSM, CDMA, or others known to those of ordinary skill in the arts via a communications network (e.g., the Internet, cellular networks), the system further comprising: an Acoustic Transducer constructed as part of the mobile cell phone or a series of Acoustic Transducers, which are constructed as part of mobile cell phone; a commutations path incorporated into the mobile cell phone providing for bi-directional communication with a Headphone array; the incorporation of the mobile cell phone's microphone(s) to act as the Environmental Audio Acoustical Transducer(s); and the incorporation of the mobile cell phone's keyboard or touch sensitive screen to function as a manual input or to complement speech commands and that can act in a way to respond to Personalized Services offered to a user.

While the present embodiments have been described with reference to exemplary embodiments, it is to be understood that the claimed embodiments are not limited to the disclosed exemplary embodiments. The scope of the following claims is to be accorded the broadest interpretation so as to encompass all such modifications and equivalent structures and functions.

What is claimed is:

1. An earphone comprising:

an ambient microphone, configured to generate an ambient signal;

an ear canal microphone, configured to measure acoustic signals within a user's ear canal and generate an ear canal signal;

a sealing section configured to seal the earphone between a first side and a second side of the earphone;

a speaker;

a memory, where computer instructions are stored in the memory; and a processor that is configured to execute the instructions to perform operations, wherein the processor is coupled to the memory, wherein the processor is coupled to the ambient microphone, wherein the processor is coupled to the ear canal microphone, wherein the processor is coupled to the speaker, wherein the processor is coupled to the memory, and the operations comprising:

retrieving a user's compensation filter from the memory, wherein the compensation filter is generated using a user's relative audiogram, wherein the relative audiogram has been generated by the user interacting with a software on an audio playback system playing sounds through the earphone, wherein the audio playback system is wirelessly connected to the earphone, and wherein the relative audiogram is generated using ear canal signals recorded during the user interacting with the software to generate the relative audio gram;

wirelessly linking with a communication device, wherein the communication device includes a touchscreen, wherein the communication device or a server connected to the communication device evaluates the user's listening history to generate a personalized playlist, and wherein the personalized playlist is displayed on the touchscreen;

receiving an audio signal, wherein the audio signal is generated by selecting audio content from the personalized playlist;

applying the compensation filter to the audio signal to generate a modified audio signal; and sending the modified audio signal to the speaker.

2. The earphone according to claim 1 wherein the user's listening history is updated every time the user listens to audio content, and wherein the listening history is stored as a listening history envelope in memory of the communication device or memory in the server.

3. The earphone according to claim 2, wherein the ear canal microphone measures the acoustic signals from a user's ear canal second side.

4. The earphone according to claim 2, wherein the interaction element is a button.

5. The earphone according to claim 4, wherein the operations further comprise:

sending a request to the server to send the audio signal to the processor.

6. The earphone according to claim 2, wherein the operations further comprise:

receiving an ambient microphone signal.

7. The earphone according to claim 6, wherein the operations further comprise:

generating a voice command by analyzing the ambient microphone signal.

8. The earphone according to claim 2, wherein the operations further comprise:

receiving an ear canal microphone signal.

9. The earphone according to claim 8, wherein the operations further comprise:

generating a voice command by analyzing the ear canal microphone signal.

* * * * *